US010193139B1

(12) United States Patent
El-Kady et al.

(10) Patent No.: US 10,193,139 B1

(45) Date of Patent: Jan. 29, 2019

(54) REDOX AND ION-ADSORBTION ELECTRODES AND ENERGY STORAGE DEVICES

(71) Applicant: The Regents of the University of California, Oakland, CA (US)

(72) Inventors: Maher F. El-Kady, Los Angeles, CA (US); Richard B. Kaner, Pacific Palisades, CA (US); Mir Fazlollah Mousavi, Tehran (IR)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/885,905

(22) Filed: Feb. 1, 2018

(51) Int. Cl.

| | |
|---|---|
| ***H01M 4/32*** | (2006.01) |
| ***H01G 11/28*** | (2013.01) |
| ***H01M 4/52*** | (2010.01) |
| ***H01M 4/62*** | (2006.01) |
| ***H01M 4/66*** | (2006.01) |
| ***H01M 4/80*** | (2006.01) |
| ***H01G 11/50*** | (2013.01) |
| ***H01G 11/86*** | (2013.01) |
| ***H01M 10/26*** | (2006.01) |
| *H01G 11/52* | (2013.01) |

(52) U.S. Cl.

CPC .............. *H01M 4/32* (2013.01); *H01G 11/28* (2013.01); *H01G 11/50* (2013.01); *H01G 11/86* (2013.01); *H01M 4/52* (2013.01); *H01M 4/521* (2013.01); *H01M 4/625* (2013.01); *H01M 4/661* (2013.01); *H01M 4/808* (2013.01); *H01M 10/26* (2013.01); *H01G 11/52* (2013.01); *H01M 2220/30* (2013.01); *H01M 2300/0014* (2013.01)

(58) Field of Classification Search

CPC .......... H01M 4/32; H01M 10/26; H01M 4/52; H01M 4/521; H01M 4/808; H01M 4/661; H01M 4/625; H01G 11/86; H01G 11/28; H01G 11/50

See application file for complete search history.

(56) References Cited

U.S. PATENT DOCUMENTS

| | | | | |
|---|---|---|---|---|
| 3,951,687 | A | 4/1976 | Takamura et al. | |
| 4,552,821 | A | 11/1985 | Gibbard et al. | |
| 5,219,678 | A | 6/1993 | Hasebe et al. | |
| 5,512,385 | A | 4/1996 | Komori et al. | |
| 8,852,294 | B2 | 10/2014 | Yamazaki | |
| 9,959,984 | B2 * | 5/2018 | Jun | H01G 11/48 |
| 2012/0034524 | A1 | 2/2012 | Caracciolo et al. | |
| 2013/0189580 | A1 * | 7/2013 | Dai | H05K 3/30 429/221 |
| 2015/0364789 | A1 * | 12/2015 | Ogawa | H01G 11/30 429/314 |
| 2016/0293346 | A1 * | 10/2016 | Xiong | H01G 11/26 |

* cited by examiner

*Primary Examiner* — Stewart A Fraser

(74) *Attorney, Agent, or Firm* — Withrow & Terranova, P.L.L.C.

(57) ABSTRACT

Provided herein are energy storage devices comprising a first electrode comprising a layered double hydroxide, a conductive scaffold, and a first current collector; a second electrode comprising a hydroxide and a second current collector; a separator; and an electrolyte. In some embodiments, the specific combination of device chemistry, active materials, and electrolytes described herein form storage devices that operate at high voltage and exhibit the capacity of a battery and the power performance of supercapacitors in one device.

14 Claims, 21 Drawing Sheets

REDOX AND ION-ADSORBTION ELECTRODES AND ENERGY STORAGE DEVICES

BACKGROUND OF THE INVENTION

The worldwide market for electronics such as smartphones, power tools, electric vehicles, grid stabilization devices, and laptops is continually growing and evolving as a result of the development and widespread use of electrical devices. As many such devices are designed to be portable and rechargeable, they rely upon energy storage devices to supply the needed current. However, existing batteries and capacitors have energy densities, power densities, life cycles, and recharge times that present a significant limitation on the design and utility of electrical devices.

SUMMARY OF THE INVENTION

A first aspect provided herein is a first electrode comprising a layered double hydroxide, a conductive scaffold, and a first current collector.

In some embodiments, the layered double hydroxide comprises a metallic layered double hydroxide. In some embodiments, the metallic layered double hydroxide comprises a zinc-iron layered double hydroxide, an aluminum-iron layered double hydroxide, a chromium-iron layered double hydroxide, an indium-iron layered double hydroxide, a manganese-iron layered double hydroxide, or any combination thereof. In some embodiments, the metallic layered double hydroxide comprises a manganese-iron layered double hydroxide.

In some embodiments, the metallic layered double hydroxide comprises a zinc-iron layered double hydroxide. In some embodiments, the ratio between the zinc and iron is about 1:1 to about 6:1. In some embodiments, the ratio between the zinc and iron is at least about 1:1. In some embodiments, the ratio between the zinc and iron is at most about 6:1. In some embodiments, the ratio between the zinc and iron is about 1:1 to about 1.5:1, about 1:1 to about 2:1, about 1:1 to about 2.5:1, about 1:1 to about 3:1, about 1:1 to about 3.5:1, about 1:1 to about 4:1, about 1:1 to about 4.5:1, about 1:1 to about 5:1, about 1:1 to about 5.5:1, about 1:1 to about 6:1, about 1.5:1 to about 2:1, about 1.5:1 to about 2.5:1, about 1.5:1 to about 3:1, about 1.5:1 to about 3.5:1, about 1.5:1 to about 4:1, about 1.5:1 to about 4.5:1, about 1.5:1 to about 5:1, about 1.5:1 to about 5.5:1, about 1.5:1 to about 6:1, about 2:1 to about 2.5:1, about 2:1 to about 3:1, about 2:1 to about 3.5:1, about 2:1 to about 4:1, about 2:1 to about 4.5:1, about 2:1 to about 5:1, about 2:1 to about 5.5:1, about 2:1 to about 6:1, about 2.5:1 to about 3:1, about 2.5:1 to about 3.5:1, about 2.5:1 to about 4:1, about 2.5:1 to about 4.5:1, about 2.5:1 to about 5:1, about 2.5:1 to about 5.5:1, about 2.5:1 to about 6:1, about 3:1 to about 3.5:1, about 3:1 to about 4:1, about 3:1 to about 4.5:1, about 3:1 to about 5:1, about 3:1 to about 5.5:1, about 3:1 to about 6:1, about 3.5:1 to about 4:1, about 3.5:1 to about 4.5:1, about 3.5:1 to about 5:1, about 3.5:1 to about 5.5:1, about 3.5:1 to about 6:1, about 4:1 to about 4.5:1, about 4:1 to about 5:1, about 4:1 to about 5.5:1, about 4:1 to about 6:1, about 4.5:1 to about 5:1, about 4.5:1 to about 5.5:1, about 4.5:1 to about 6:1, about 5:1 to about 5.5:1, about 5:1 to about 6:1, or about 5.5:1 to about 6:1. In some embodiments, the ratio between the zinc and iron is about 1:1, about 1.5:1, about 2:1, about 2.5:1, about 3:1, about 3.5:1, about 4:1, about 4.5:1, about 5:1, about 5.5:1, or about 6:1. In some embodiments, the ratio between the zinc and iron is at least about 1:1, about 1.5:1, about 2:1, about 2.5:1, about 3:1, about 3.5:1, about 4:1, about 4.5:1, about 5:1, about 5.5:1, or about 6:1. In some embodiments, the ratio between the zinc and iron is at most about 1:1, about 1.5:1, about 2:1, about 2.5:1, about 3:1, about 3.5:1, about 4:1, about 4.5:1, about 5:1, about 5.5:1, or about 6:1.

In some embodiments, the conductive scaffold comprises conductive foam, conductive aerogel, metallic ionogel, carbon nanotubes, carbon nanosheets, activated carbon, carbon cloth, carbon black, or any combination thereof. In some embodiments, the conductive scaffold comprises a three-dimensional scaffold. In some embodiments, the conductive scaffold comprises a conductive foam. In some embodiments, the conductive foam comprises carbon foam, graphene foam, graphite foam, carbon foam, or any combination thereof. In some embodiments, the conductive scaffold comprises a conductive aerogel. In some embodiments, the conductive aerogel comprises carbon aerogel, graphene aerogel, graphite aerogel, carbon aerogel, or any combination thereof. In some embodiments, the conductive scaffold comprises a three-dimensional (3D) conductive aerogel. In some embodiments, the 3D conductive aerogel comprises 3D carbon aerogel, 3D graphene aerogel, 3D graphite aerogel, 3D carbon aerogel, or any combination thereof. In some embodiments, the conductive scaffold comprises a metallic ionogel. In some embodiments, the metallic ionogel comprises carbon ionogel, graphene ionogel, graphite ionogel, a conductive polymer, a conductive ceramic, or any combination thereof.

In some embodiments, the mass ratio between the layered double hydroxide and the conductive scaffold is about 0.2:1 to about 2.4:1. In some embodiments, the mass ratio between the layered double hydroxide and the conductive scaffold is at least about 0.2:1. In some embodiments, the mass ratio between the layered double hydroxide and the conductive scaffold is at most about 2.4:1. In some embodiments, the mass ratio between the layered double hydroxide and the conductive scaffold is about 0.2:1 to about 0.4:1, about 0.2:1 to about 0.6:1, about 0.2:1 to about 0.8:1, about 0.2:1 to about 1:1, about 0.2:1 to about 1.2:1, about 0.2:1 to about 1.4:1, about 0.2:1 to about 1.6:1, about 0.2:1 to about 1.8:1, about 0.2:1 to about 2:1, about 0.2:1 to about 2.2:1, about 0.2:1 to about 2.4:1, about 0.4:1 to about 0.6:1, about 0.4:1 to about 0.8:1, about 0.4:1 to about 1:1, about 0.4:1 to about 1.2:1, about 0.4:1 to about 1.4:1, about 0.4:1 to about 1.6:1, about 0.4:1 to about 1.8:1, about 0.4:1 to about 2:1, about 0.4:1 to about 2.2:1, about 0.4:1 to about 2.4:1, about 0.6:1 to about 0.8:1, about 0.6:1 to about 1:1, about 0.6:1 to about 1.2:1, about 0.6:1 to about 1.4:1, about 0.6:1 to about 1.6:1, about 0.6:1 to about 1.8:1, about 0.6:1 to about 2:1, about 0.6:1 to about 2.2:1, about 0.6:1 to about 2.4:1, about 0.8:1 to about 1:1, about 0.8:1 to about 1.2:1, about 0.8:1 to about 1.4:1, about 0.8:1 to about 1.6:1, about 0.8:1 to about 1.8:1, about 0.8:1 to about 2:1, about 0.8:1 to about 2.2:1, about 0.8:1 to about 2.4:1, about 1:1 to about 1.2:1, about 1:1 to about 1.4:1, about 1:1 to about 1.6:1, about 1:1 to about 1.8:1, about 1:1 to about 2:1, about 1:1 to about 2.2:1, about 1:1 to about 2.4:1, about 1.2:1 to about 1.4:1, about 1.2:1 to about 1.6:1, about 1.2:1 to about 1.8:1, about 1.2:1 to about 2:1, about 1.2:1 to about 2.2:1, about 1.2:1 to about 2.4:1, about 1.4:1 to about 1.6:1, about 1.4:1 to about 1.8:1, about 1.4:1 to about 2:1, about 1.4:1 to about 2.2:1, about 1.4:1 to about 2.4:1, about 1.6:1 to about 1.8:1, about 1.6:1 to about 2:1, about 1.6:1 to about 2.2:1, about 1.6:1 to about 2.4:1, about 1.8:1 to about 2:1, about 1.8:1 to about 2.2:1, about 1.8:1 to about 2.4:1, about 2:1 to about 2.2:1, about 2:1 to about 2.4:1, or about 2.2:1 to about 2.4:1. In some embodiments, the mass ratio between the layered double hydroxide and the conductive scaffold is about 0.2:1, about 0.4:1, about 0.6:1, about 0.8:1, about 1:1, about 1.2:1, about 1.4:1, about 1.6:1, about 1.8:1, about 2:1, about 2.2:1, or about 2.4:1. In some embodiments, the mass ratio between the layered double hydroxide and the conductive scaffold is at least about 0.2:1, about 0.4:1, about 0.6:1, about 0.8:1, about 1:1, about 1.2:1, about 1.4:1, about 1.6:1, about 1.8:1, about 2:1, about 2.2:1, or about 2.4:1. In some embodiments, the mass ratio between the layered double hydroxide and the conductive scaffold is at most about 0.2:1, about 0.4:1, about 0.6:1, about 0.8:1, about 1:1, about 1.2:1, about 1.4:1, about 1.6:1, about 1.8:1, about 2:1, about 2.2:1, or about 2.4:1.

In some embodiments, the first current collector comprises a conductive foam. In some embodiments, the conductive foam comprises aluminum foam, carbon foam, graphene foam, graphite foam, copper foam, nickel foam, palladium foam, platinum foam, steel foam, or any combination thereof. In some embodiments, the conductive foam comprises graphene foam. In some embodiments, the conductive foam comprises graphite foam. In some embodiments, the conductive foam comprises copper foam. In some embodiments, the conductive foam comprises nickel foam.

In some embodiments, the first electrode has a capacitance of about 500 F/g to about 2,250 F/g. In some embodiments, the first electrode has a capacitance of at least about 500 F/g. In some embodiments, the first electrode has a capacitance of at most about 2,250 F/g. In some embodiments, the first electrode has a capacitance of about 500 F/g to about 750 F/g, about 500 F/g to about 1,000 F/g, about 500 F/g to about 1,250 F/g, about 500 F/g to about 1,500 F/g, about 500 F/g to about 1,750 F/g, about 500 F/g to about 2,000 F/g, about 500 F/g to about 2,250 F/g, about 750 F/g to about 1,000 F/g, about 750 F/g to about 1,250 F/g, about 750 F/g to about 1,500 F/g, about 750 F/g to about 1,750 F/g, about 750 F/g to about 2,000 F/g, about 750 F/g to about 2,250 F/g, about 1,000 F/g to about 1,250 F/g, about 1,000 F/g to about 1,500 F/g, about 1,000 F/g to about 1,750 F/g, about 1,000 F/g to about 2,000 F/g, about 1,000 F/g to about 2,250 F/g, about 1,250 F/g to about 1,500 F/g, about 1,250 F/g to about 1,750 F/g, about 1,250 F/g to about 2,000 F/g, about 1,250 F/g to about 2,250 F/g, about 1,500 F/g to about 1,750 F/g, about 1,500 F/g to about 2,000 F/g, about 1,500 F/g to about 2,250 F/g, about 1,750 F/g to about 2,000 F/g, about 1,750 F/g to about 2,250 F/g, or about 2,000 F/g to about 2,250 F/g. In some embodiments, the first electrode has a capacitance of about 500 F/g, about 750 F/g, about 1,000 F/g, about 1,250 F/g, about 1,500 F/g, about 1,750 F/g, about 2,000 F/g, or about 2,250 F/g. In some embodiments, the first electrode has a capacitance of about 1,150 F/g. In some embodiments, the first electrode has a capacitance of at least about 750 F/g, about 1,000 F/g, about 1,250 F/g, about 1,500 F/g, about 1,750 F/g, about 2,000 F/g, about or 2,250 F/g.

In some embodiments, the first electrode has a gravimetric capacity of about 30 mAh/g to about 120 mAh/g. In some embodiments, the first electrode has a gravimetric capacity of at least about 30 mAh/g. In some embodiments, the first electrode has a gravimetric capacity of at most about 120 mAh/g. In some embodiments, the first electrode has a gravimetric capacity of about 30 mAh/g to about 40 mAh/g, about 30 mAh/g to about 50 mAh/g, about 30 mAh/g to about 60 mAh/g, about 30 mAh/g to about 70 mAh/g, about 30 mAh/g to about 80 mAh/g, about 30 mAh/g to about 90 mAh/g, about 30 mAh/g to about 100 mAh/g, about 30 mAh/g to about 110 mAh/g, about 30 mAh/g to about 120 mAh/g, about 40 mAh/g to about 50 mAh/g, about 40 mAh/g to about 60 mAh/g, about 40 mAh/g to about 70 mAh/g, about 40 mAh/g to about 80 mAh/g, about 40 mAh/g to about 90 mAh/g, about 40 mAh/g to about 100 mAh/g, about 40 mAh/g to about 110 mAh/g, about 40 mAh/g to about 120 mAh/g, about 50 mAh/g to about 60 mAh/g, about 50 mAh/g to about 70 mAh/g, about 50 mAh/g to about 80 mAh/g, about 50 mAh/g to about 90 mAh/g, about 50 mAh/g to about 100 mAh/g, about 50 mAh/g to about 110 mAh/g, about 50 mAh/g to about 120 mAh/g, about 60 mAh/g to about 70 mAh/g, about 60 mAh/g to about 80 mAh/g, about 60 mAh/g to about 90 mAh/g, about 60 mAh/g to about 100 mAh/g, about 60 mAh/g to about 110 mAh/g, about 60 mAh/g to about 120 mAh/g, about 70 mAh/g to about 80 mAh/g, about 70 mAh/g to about 90 mAh/g, about 70 mAh/g to about 100 mAh/g, about 70 mAh/g to about 110 mAh/g, about 70 mAh/g to about 120 mAh/g, about 80 mAh/g to about 90 mAh/g, about 80 mAh/g to about 100 mAh/g, about 80 mAh/g to about 110 mAh/g, about 80 mAh/g to about 120 mAh/g, about 90 mAh/g to about 100 mAh/g, about 90 mAh/g to about 110 mAh/g, about 90 mAh/g to about 120 mAh/g, about 100 mAh/g to about 110 mAh/g, about 100 mAh/g to about 120 mAh/g, or about 110 mAh/g to about 120 mAh/g. In some embodiments, the first electrode has a gravimetric capacity of about 30 mAh/g, about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g. In some embodiments, the first electrode has a gravimetric capacity of at least about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g.

In some embodiments, the first electrode is configured to be employed as the positive electrode. In some embodiments, the first electrode is configured to be employed as the negative electrode.

A second aspect provided herein is a second electrode comprising a hydroxide and a second current collector.

In some embodiments, the hydroxide comprises aluminum hydroxide, ammonium hydroxide, arsenic hydroxide, barium hydroxide, beryllium hydroxide, bismuth(III) hydroxide, boron hydroxide, cadmium hydroxide, calcium hydroxide, cerium(III) hydroxide, cesium hydroxide, chromium(II) hydroxide, chromium(III) hydroxide, chromium (V) hydroxide, chromium(VI) hydroxide, cobalt(II) hydroxide, cobalt(III) hydroxide, copper(I) hydroxide, copper(II) hydroxide, gallium(II) hydroxide, gallium(III) hydroxide, gold(I) hydroxide, gold(III) hydroxide, indium(I) hydroxide, indium(II) hydroxide, indium(III) hydroxide, iridium(III) hydroxide, iron(II) hydroxide, iron(III) hydroxide, lanthanum hydroxide, lead(II) hydroxide, lead(IV) hydroxide, lithium hydroxide, magnesium hydroxide, manganese(II) hydroxide, manganese(III) hydroxide, manganese(IV) hydroxide, manganese(VII) hydroxide, mercury(I) hydroxide, mercury(II) hydroxide, molybdenum hydroxide, neodymium hydroxide, nickel oxo-hydroxide, nickel(II) hydroxide, nickel(III) hydroxide, niobium hydroxide, osmium(IV) hydroxide, palladium(II) hydroxide, palladium(IV) hydroxide, platinum(II) hydroxide, platinum(IV) hydroxide, plutonium(IV) hydroxide, potassium hydroxide, radium hydroxide, rubidium hydroxide, ruthenium(III) hydroxide, scandium hydroxide, silicon hydroxide, silver hydroxide, sodium hydroxide, strontium hydroxide, tantalum(V) hydroxide, technetium(II) hydroxide, tetramethylammonium hydroxide, thallium(I) hydroxide, thallium(III) hydroxide, thorium hydroxide, tin(II) hydroxide, tin(IV) hydroxide, titanium(II) hydroxide, titanium(III) hydroxide, titanium(IV) hydroxide, tungsten(II) hydroxide, uranyl hydroxide, vanadium(II) hydroxide, vanadium(III) hydroxide, vanadium(V) hydroxide, ytterbium hydroxide, yttrium hydroxide, zinc hydroxide, zirconium hydroxide. In some embodiments, the hydroxide comprises cobalt(II) hydroxide. In some embodiments, the hydroxide comprises cobalt (III) hydroxide. In some embodiments, the hydroxide comprises copper(I) hydroxide. In some embodiments, the hydroxide comprises copper(II) hydroxide. In some embodiments, the hydroxide comprises nickel(II) hydroxide. In some embodiments, the hydroxide comprises nickel(III) hydroxide.

In some embodiments, the hydroxide comprises hydroxide nanoparticles, hydroxide nanopowder, hydroxide nanoflowers, hydroxide nanoflakes, hydroxide nanodots, hydroxide nanorods, hydroxide nanochains, hydroxide nanofibers, hydroxide nanoparticles, hydroxide nanoplatelets, hydroxide nanoribbons, hydroxide nanorings, hydroxide nanosheets, or a combination thereof. In some embodiments, the hydroxide comprises hydroxide nanoflakes. In some embodiments, the hydroxide comprises hydroxide nanopowder.

In some embodiments, the hydroxide comprises cobalt(II) hydroxide nanopowder. In some embodiments, the hydroxide comprises cobalt(III) hydroxide nanosheets. In some embodiments, the hydroxide comprises nickel(III) hydroxide nanoflakes. In some embodiments, the hydroxide comprises copper(I) hydroxide nanoflakes. In some embodiments, the hydroxide comprises copper(II) hydroxide nanopowder. In some embodiments, the hydroxide comprises nickel(II) hydroxide nanoflakes.

In some embodiments, the hydroxide is deposited on the second current collector. In some embodiments, the second current collector comprises a conductive foam. In some embodiments, the conductive foam comprises aluminum foam, carbon foam, graphene foam, graphite foam, copper foam, nickel foam, palladium foam, platinum foam, steel foam, or any combination thereof. In some embodiments, the conductive foam comprises graphene foam. In some embodiments, the conductive foam comprises graphite foam. In some embodiments, the conductive foam comprises copper foam. In some embodiments, the conductive foam comprises nickel foam.

In some embodiments, the second electrode has a capacitance of about 500 F/g to about 2,500 F/g. In some embodiments, the second electrode has a capacitance of at least about 500 F/g. In some embodiments, the second electrode has a capacitance of at most about 2,500 F/g. In some embodiments, the second electrode has a capacitance of about 500 F/g to about 750 F/g, about 500 F/g to about 1,000 F/g, about 500 F/g to about 1,250 F/g, about 500 F/g to about 1,500 F/g, about 500 F/g to about 1,750 F/g, about 500 F/g to about 2,000 F/g, about 500 F/g to about 2,250 F/g, about 500 F/g to about 2,500 F/g, about 750 F/g to about 1,000 F/g, about 750 F/g to about 1,250 F/g, about 750 F/g to about 1,500 F/g, about 750 F/g to about 1,750 F/g, about 750 F/g to about 2,000 F/g, about 750 F/g to about 2,250 F/g, about 750 F/g to about 2,500 F/g, about 1,000 F/g to about 1,250 F/g, about 1,000 F/g to about 1,500 F/g, about 1,000 F/g to about 1,750 F/g, about 1,000 F/g to about 2,000 F/g, about 1,000 F/g to about 2,250 F/g, about 1,000 F/g to about 2,500 F/g, about 1,250 F/g to about 1,500 F/g, about 1,250 F/g to about 1,750 F/g, about 1,250 F/g to about 2,000 F/g, about 1,250 F/g to about 2,250 F/g, about 1,250 F/g to about 2,500 F/g, about 1,500 F/g to about 1,750 F/g, about 1,500 F/g to about 2,000 F/g, about 1,500 F/g to about 2,250 F/g, about 1,500 F/g to about 2,500 F/g, about 1,750 F/g to about 2,000 F/g, about 1,750 F/g to about 2,250 F/g, about 1,750 F/g to about 2,500 F/g, about 2,000 F/g to about 2,250 F/g, about 2,000 F/g to about 2,500 F/g, or about 2,250 F/g to about 2,500 F/g. In some embodiments, the second electrode has a capacitance of about 500 F/g, about 750 F/g, about 1,000 F/g, about 1,250 F/g, about 1,500 F/g, about 1,750 F/g, about 2,000 F/g, about 2,250 F/g, or about 2,500 F/g. In some embodiments, the second electrode has a capacitance of at least about 750 F/g, about 1,000 F/g, about 1,250 F/g, about 1,500 F/g, about 1,750 F/g, about 2,000 F/g, about 2,250 F/g, or about 2,500 F/g.

In some embodiments, the second electrode has a gravimetric capacity of about 30 mAh/g to about 120 mAh/g. In some embodiments, the second electrode has a gravimetric capacity of at least about 30 mAh/g. In some embodiments, the second electrode has a gravimetric capacity of at most about 120 mAh/g. In some embodiments, the second electrode has a gravimetric capacity of about 30 mAh/g to about 40 mAh/g, about 30 mAh/g to about 50 mAh/g, about 30 mAh/g to about 60 mAh/g, about 30 mAh/g to about 70 mAh/g, about 30 mAh/g to about 80 mAh/g, about 30 mAh/g to about 90 mAh/g, about 30 mAh/g to about 100 mAh/g, about 30 mAh/g to about 110 mAh/g, about 30 mAh/g to about 120 mAh/g, about 40 mAh/g to about 50 mAh/g, about 40 mAh/g to about 60 mAh/g, about 40 mAh/g to about 70 mAh/g, about 40 mAh/g to about 80 mAh/g, about 40 mAh/g to about 90 mAh/g, about 40 mAh/g to about 100 mAh/g, about 40 mAh/g to about 110 mAh/g, about 40 mAh/g to about 120 mAh/g, about 50 mAh/g to about 60 mAh/g, about 50 mAh/g to about 70 mAh/g, about 50 mAh/g to about 80 mAh/g, about 50 mAh/g to about 90 mAh/g, about 50 mAh/g to about 100 mAh/g, about 50 mAh/g to about 110 mAh/g, about 50 mAh/g to about 120 mAh/g, about 60 mAh/g to about 70 mAh/g, about 60 mAh/g to about 80 mAh/g, about 60 mAh/g to about 90 mAh/g, about 60 mAh/g to about 100 mAh/g, about 60 mAh/g to about 110 mAh/g, about 60 mAh/g to about 120 mAh/g, about 70 mAh/g to about 80 mAh/g, about 70 mAh/g to about 90 mAh/g, about 70 mAh/g to about 100 mAh/g, about 70 mAh/g to about 110 mAh/g, about 70 mAh/g to about 120 mAh/g, about 80 mAh/g to about 90 mAh/g, about 80 mAh/g to about 100 mAh/g, about 80 mAh/g to about 110 mAh/g, about 80 mAh/g to about 120 mAh/g, about 90 mAh/g to about 100 mAh/g, about 90 mAh/g to about 110 mAh/g, about 90 mAh/g to about 120 mAh/g, about 100 mAh/g to about 110 mAh/g, about 100 mAh/g to about 120 mAh/g, or about 110 mAh/g to about 120 mAh/g. In some embodiments, the second electrode has a gravimetric capacity of about 30 mAh/g, about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g. In some embodiments, the second electrode has a gravimetric capacity of at least about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g.

In some embodiments, the second electrode is configured to be employed as the positive electrode. In some embodiments, the second electrode is configured to be employed as the negative electrode.

A third aspect provided herein is an energy storage device comprising a first electrode comprising a layered double hydroxide, a conductive scaffold, and a first current collector; a second electrode comprising a hydroxide and a second current collector; a separator; and an electrolyte. In some embodiments, the first electrode comprises a layered double hydroxide, a conductive scaffold, and a first current collector. In some embodiments, the first electrode comprises a layered double hydroxide. In some embodiments, the first electrode comprises a scaffold. In some embodiments, the first electrode comprises a conductive scaffold. In some embodiments, the first electrode comprises a first current collector. In some embodiments, the second electrode comprises a hydroxide and a second current collector. In some embodiments, the electrolyte comprises a base and a conductive additive. In some embodiments, the specific selection of the electrolyte within the energy storage devices of the current disclosure enables a significantly high energy density. In some embodiments, the energy storage device comprises a first electrode comprising layered double hydroxide, a conductive scaffold, and a first current collector, a second electrode comprising a hydroxide and a second current collector, a separator, and an electrolyte.

In some embodiments, the energy storage device stores energy through both redox reactions and ion adsorption. In some embodiments, the energy storage device comprises a battery, a supercapacitor, a hybrid supercapacitor, a pseudocapacitor, or any combination thereof.

In some embodiments, the first electrode comprises a layered double hydroxide, a conductive scaffold, and a first current collector. In some embodiments, the layered double hydroxide comprises a metallic layered double hydroxide. In some embodiments, the layered double hydroxide comprises a zinc-based layered double hydroxide. In some embodiments, the metallic layered double hydroxide comprises a zinc-iron layered double hydroxide, an aluminum-iron layered double hydroxide, a chromium-iron layered double hydroxide, an indium-iron layered double hydroxide, a manganese-iron layered double hydroxide, or any combination thereof. In some embodiments, the metallic layered double hydroxide comprises a zinc-iron layered double hydroxide. In some embodiments, the metallic layered double hydroxide comprises a manganese-iron layered double hydroxide.

In some embodiments, the conductive scaffold comprises conductive foam, conductive aerogel, metallic ionogel, carbon nanotubes, carbon nanosheets, activated carbon, carbon cloth, carbon black, or any combination thereof. In some embodiments, the conductive scaffold comprises a 3D scaffold. In some embodiments, the conductive scaffold comprises a conductive foam. In some embodiments, the conductive foam comprises carbon foam, graphene foam, graphite foam, carbon foam, or any combination thereof. In some embodiments, the conductive scaffold comprises a conductive aerogel. In some embodiments, the conductive aerogel comprises carbon aerogel, graphene aerogel, graphite aerogel, carbon aerogel, or any combination thereof. In some embodiments, the conductive scaffold comprises a 3D conductive aerogel. In some embodiments, the 3D conductive aerogel comprises 3D carbon aerogel, 3D graphene aerogel, 3D graphite aerogel, 3D carbon aerogel, or any combination thereof. In some embodiments, the conductive scaffold comprises a metallic ionogel. In some embodiments, the metallic ionogel comprises carbon ionogel, graphene ionogel, graphite ionogel, In some embodiments, the conductive scaffold comprises a metal. In some embodiments, the metal comprises aluminum, copper, carbon, iron, silver, gold, palladium, platinum, iridium, platinum iridium alloy, ruthenium, rhodium, osmium, tantalum, titanium, tungsten, polysilicon, indium tin oxide or any combination thereof. In some embodiments, the conductive scaffold comprises a conductive polymer. In some embodiments, the conductive polymer comprises trans-polyacetylene, polyfluorene, polythiophene, polypyrrole, polyphenylene, polyaniline, poly(p-phenylene vinylene), polypyrenes polyazulene, polynaphthalene, polycarbazole, polyindole, polyazepine, poly(3,4-ethylenedioxythiophene), poly(p-phenylene sulfide), poly(acetylene, poly(p-phenylene vinylene), or any combination thereof. In some embodiments, the conductive scaffold comprises a conductive ceramic. In some embodiments, the conductive ceramic comprises zirconium barium titanate, strontium titanate, calcium titanate, magnesium titanate, calcium magnesium titanate, zinc titanate, lanthanum titanate, neodymium titanate, barium zirconate, calcium zirconate, lead magnesium niobate, lead zinc niobate, lithium niobate, barium stannate, calcium stannate, magnesium aluminium silicate, magnesium silicate, barium tantalate, titanium dioxide, niobium oxide, zirconia, silica, sapphire, beryllium oxide, zirconium tin titanate, or any combination thereof. In some embodiments, the conducting scaffold is composed of an alloy of two or more materials or elements.

In some embodiments, the mass ratio between the layered double hydroxide and the conductive scaffold is about 0.2:1 to about 2.4:1. In some embodiments, the mass ratio between the layered double hydroxide and the conductive scaffold is at least about 0.2:1, about 0.4:1, about 0.6:1, about 0.8:1, about 1:1, about 1.2:1, about 1.4:1, about 1.6:1, about 1.8:1, about 2:1, about 2.2:1, or about 2.4:1. In some embodiments, the mass ratio between the layered double hydroxide and the conductive scaffold is at most about 0.2:1, about 0.4:1, about 0.6:1, about 0.8:1, about 1:1, about 1.2:1, about 1.4:1, about 1.6:1, about 1.8:1, about 2:1, about 2.2:1, or about 2.4:1. In some embodiments, the mass ratio between the layered double hydroxide and the conductive scaffold is about 0.2:1 to about 0.4:1, about 0.2:1 to about 0.6:1, about 0.2:1 to about 0.8:1, about 0.2:1 to about 1:1, about 0.2:1 to about 1.2:1, about 0.2:1 to about 1.4:1, about 0.2:1 to about 1.6:1, about 0.2:1 to about 1.8:1, about 0.2:1 to about 2:1, about 0.2:1 to about 2.2:1, about 0.2:1 to about 2.4:1, about 0.4:1 to about 0.6:1, about 0.4:1 to about 0.8:1, about 0.4:1 to about 1:1, about 0.4:1 to about 1.2:1, about 0.4:1 to about 1.4:1, about 0.4:1 to about 1.6:1, about 0.4:1 to about 1.8:1, about 0.4:1 to about 2:1, about 0.4:1 to about 2.2:1, about 0.4:1 to about 2.4:1, about 0.6:1 to about 0.8:1, about 0.6:1 to about 1:1, about 0.6:1 to about 1.2:1, about 0.6:1 to about 1.4:1, about 0.6:1 to about 1.6:1, about 0.6:1 to about 1.8:1, about 0.6:1 to about 2:1, about 0.6:1 to about 2.2:1, about 0.6:1 to about 2.4:1, about 0.8:1 to about 1:1, about 0.8:1 to about 1.2:1, about 0.8:1 to about 1.4:1, about 0.8:1 to about 1.6:1, about 0.8:1 to about 1.8:1, about 0.8:1 to about 2:1, about 0.8:1 to about 2.2:1, about 0.8:1 to about 2.4:1, about 1:1 to about 1.2:1, about 1:1 to about 1.4:1, about 1:1 to about 1.6:1, about 1:1 to about 1.8:1, about 1:1 to about 2:1, about 1:1 to about 2.2:1, about 1:1 to about 2.4:1, about 1.2:1 to about 1.4:1, about 1.2:1 to about 1.6:1, about 1.2:1 to about 1.8:1, about 1.2:1 to about 2:1, about 1.2:1 to about 2.2:1, about 1.2:1 to about 2.4:1, about 1.4:1 to about 1.6:1, about 1.4:1 to about 1.8:1, about 1.4:1 to about 2:1, about 1.4:1 to about 2.2:1, about 1.4:1 to about 2.4:1, about 1.6:1 to about 1.8:1, about 1.6:1 to about 2:1, about 1.6:1 to about 2.2:1, about 1.6:1 to about 2.4:1, about 1.8:1 to about 2:1, about 1.8:1 to about 2.2:1, about 1.8:1 to about 2.4:1, about 2:1 to about 2.2:1, about 2:1 to about 2.4:1, or about 2.2:1 to about 2.4:1. In some embodiments, the mass ratio between the layered double hydroxide and the conductive scaffold is about 0.2:1, about 0.4:1, about 0.6:1, about 0.8:1, about 1:1, about 1.2:1, about 1.4:1, about 1.6:1, about 1.8:1, about 2:1, about 2.2:1, or about 2.4:1.

In some embodiments, the first current collector comprises a conductive foam. In some embodiments, the conductive foam comprises aluminum foam, carbon foam, graphene foam, graphite foam, copper foam, nickel foam, palladium foam, platinum foam, steel foam, or any combination thereof. In some embodiments, the conductive foam comprises graphene foam. In some embodiments, the conductive foam comprises graphite foam. In some embodiments, the conductive foam comprises copper foam. In some embodiments, the conductive foam comprises nickel foam. In some embodiments, the first current collector is a grid or sheet of a conductive material that provides a conducting path along an active material in an electrode.

In some embodiments, the first electrode has a capacitance of about 500 F/g to about 2,250 F/g. In some embodiments, the first electrode has a capacitance of at least about 500 F/g. In some embodiments, the first electrode has a capacitance of at most about 2,250 F/g. In some embodiments, the first electrode has a capacitance of about 500 F/g to about 750 F/g, about 500 F/g to about 1,000 F/g, about 500 F/g to about 1,250 F/g, about 500 F/g to about 1,500 F/g, about 500 F/g to about 1,750 F/g, about 500 F/g to about 2,000 F/g, about 500 F/g to about 2,250 F/g, about 750 F/g to about 1,000 F/g, about 750 F/g to about 1,250 F/g, about 750 F/g to about 1,500 F/g, about 750 F/g to about 1,750 F/g, about 750 F/g to about 2,000 F/g, about 750 F/g to about 2,250 F/g, about 1,000 F/g to about 1,250 F/g, about 1,000 F/g to about 1,500 F/g, about 1,000 F/g to about 1,750 F/g, about 1,000 F/g to about 2,000 F/g, about 1,000 F/g to about 2,250 F/g, about 1,250 F/g to about 1,500 F/g, about 1,250 F/g to about 1,750 F/g, about 1,250 F/g to about 2,000 F/g, about 1,250 F/g to about 2,250 F/g, about 1,500 F/g to about 1,750 F/g, about 1,500 F/g to about 2,000 F/g, about 1,500 F/g to about 2,250 F/g, about 1,750 F/g to about 2,000 F/g, about 1,750 F/g to about 2,250 F/g, or about 2,000 F/g to about 2,250 F/g. In some embodiments, the first electrode has a capacitance of about 500 F/g, about 750 F/g, about 1,000 F/g, about 1,250 F/g, about 1,500 F/g, about 1,750 F/g, about 2,000 F/g, or about 2,250 F/g. In some embodiments, the first electrode has a capacitance of about 1,150 F/g. In some embodiments, the first electrode has a capacitance of at least about 750 F/g, about 1,000 F/g, about 1,250 F/g, about 1,500 F/g, about 1,750 F/g, about 2,000 F/g, about or 2,250 F/g.

In some embodiments, the first electrode has a gravimetric capacity of about 30 mAh/g to about 120 mAh/g. In some embodiments, the first electrode has a gravimetric capacity of at least about 30 mAh/g. In some embodiments, the first electrode has a gravimetric capacity of at most about 120 mAh/g. In some embodiments, the first electrode has a gravimetric capacity of about 30 mAh/g to about 40 mAh/g, about 30 mAh/g to about 50 mAh/g, about 30 mAh/g to about 60 mAh/g, about 30 mAh/g to about 70 mAh/g, about 30 mAh/g to about 80 mAh/g, about 30 mAh/g to about 90 mAh/g, about 30 mAh/g to about 100 mAh/g, about 30 mAh/g to about 110 mAh/g, about 30 mAh/g to about 120 mAh/g, about 40 mAh/g to about 50 mAh/g, about 40 mAh/g to about 60 mAh/g, about 40 mAh/g to about 70 mAh/g, about 40 mAh/g to about 80 mAh/g, about 40 mAh/g to about 90 mAh/g, about 40 mAh/g to about 100 mAh/g, about 40 mAh/g to about 110 mAh/g, about 40 mAh/g to about 120 mAh/g, about 50 mAh/g to about 60 mAh/g, about 50 mAh/g to about 70 mAh/g, about 50 mAh/g to about 80 mAh/g, about 50 mAh/g to about 90 mAh/g, about 50 mAh/g to about 100 mAh/g, about 50 mAh/g to about 110 mAh/g, about 50 mAh/g to about 120 mAh/g, about 60 mAh/g to about 70 mAh/g, about 60 mAh/g to about 80 mAh/g, about 60 mAh/g to about 90 mAh/g, about 60 mAh/g to about 100 mAh/g, about 60 mAh/g to about 110 mAh/g, about 60 mAh/g to about 120 mAh/g, about 70 mAh/g to about 80 mAh/g, about 70 mAh/g to about 90 mAh/g, about 70 mAh/g to about 100 mAh/g, about 70 mAh/g to about 110 mAh/g, about 70 mAh/g to about 120 mAh/g, about 80 mAh/g to about 90 mAh/g, about 80 mAh/g to about 100 mAh/g, about 80 mAh/g to about 110 mAh/g, about 80 mAh/g to about 120 mAh/g, about 90 mAh/g to about 100 mAh/g, about 90 mAh/g to about 110 mAh/g, about 90 mAh/g to about 120 mAh/g, about 100 mAh/g to about 110 mAh/g, about 100 mAh/g to about 120 mAh/g, or about 110 mAh/g to about 120 mAh/g. In some embodiments, the first electrode has a gravimetric capacity of about 30 mAh/g, about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g. In some embodiments, the first electrode has a gravimetric capacity of at least about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g.

In some embodiments, the second electrode comprises a hydroxide and a second current collector. In some embodiments, the hydroxide comprises aluminum hydroxide, ammonium hydroxide, arsenic hydroxide, barium hydroxide, beryllium hydroxide, bismuth(III) hydroxide, boron hydroxide, cadmium hydroxide, calcium hydroxide, cerium (III) hydroxide, cesium hydroxide, chromium(II) hydroxide, chromium(III) hydroxide, chromium(V) hydroxide, chromium(VI) hydroxide, cobalt(II) hydroxide, cobalt(III) hydroxide, copper(I) hydroxide, copper(II) hydroxide, gallium(II) hydroxide, gallium(III) hydroxide, gold(I) hydroxide, gold (III) hydroxide, indium(I) hydroxide, indium(II) hydroxide, indium(III) hydroxide, iridium(III) hydroxide, iron(II) hydroxide, iron(III) hydroxide, lanthanum hydroxide, lead (II) hydroxide, lead(IV) hydroxide, lithium hydroxide, magnesium hydroxide, manganese(II) hydroxide, manganese (III) hydroxide, manganese(IV) hydroxide, manganese(VII) hydroxide, mercury(I) hydroxide, mercury(II) hydroxide, molybdenum hydroxide, neodymium hydroxide, nickel oxo-hydroxide, nickel(II) hydroxide, nickel(III) hydroxide, niobium hydroxide, osmium(IV) hydroxide, palladium(II) hydroxide, palladium(IV) hydroxide, platinum(II) hydroxide, platinum(IV) hydroxide, plutonium(IV) hydroxide, potassium hydroxide, radium hydroxide, rubidium hydroxide, ruthenium(III) hydroxide, scandium hydroxide, silicon hydroxide, silver hydroxide, sodium hydroxide, strontium hydroxide, tantalum(V) hydroxide, technetium(II) hydroxide, tetramethylammonium hydroxide, thallium(I) hydroxide, thallium(III) hydroxide, thorium hydroxide, tin(II) hydroxide, tin(IV) hydroxide, titanium(II) hydroxide, titanium(III) hydroxide, titanium(IV) hydroxide, tungsten(II) hydroxide, uranyl hydroxide, vanadium(II) hydroxide, vanadium(III) hydroxide, vanadium(V) hydroxide, ytterbium hydroxide, yttrium hydroxide, zinc hydroxide, zirconium hydroxide. In some embodiments, the hydroxide comprises hydroxide nanoflakes, hydroxide nanoparticles, hydroxide nanopowder, hydroxide nanoflowers, hydroxide nanodots, hydroxide nanorods, hydroxide nanochains, hydroxide nanofibers, hydroxide nanoparticles, hydroxide nanoplatelets, hydroxide nanoribbons, hydroxide nanorings, hydroxide nanosheets, or a combination thereof. In some embodiments, the hydroxide comprises nickel(II) hydroxide. In some embodiments, the hydroxide comprises nickel(III) hydroxide. In some embodiments, the hydroxide comprises palladium(II) hydroxide. In some embodiments, the hydroxide comprises palladium(IV) hydroxide. In some embodiments, the hydroxide comprises copper(I) hydroxide. In some embodiments, the hydroxide comprises copper(II) hydroxide.

In some embodiments, the hydroxide is deposited on the second current collector. In some embodiments, the second current collector comprises a conductive foam. In some embodiments, the conductive foam comprises aluminum foam, carbon foam, graphene foam, graphite foam, copper foam, nickel foam, palladium foam, platinum foam, steel foam, or any combination thereof. In some embodiments, the conductive foam comprises graphene foam. In some embodiments, the conductive foam comprises graphite foam. In some embodiments, the conductive foam comprises copper foam. In some embodiments, the conductive foam comprises nickel foam.

In some embodiments, the second electrode has a capacitance of about 500 F/g to about 2,500 F/g. In some embodiments, the second electrode has a capacitance of at least about 500 F/g. In some embodiments, the second electrode has a capacitance of at most about 2,500 F/g. In some embodiments, the second electrode has a capacitance of about 500 F/g to about 750 F/g, about 500 F/g to about 1,000 F/g, about 500 F/g to about 1,250 F/g, about 500 F/g to about 1,500 F/g, about 500 F/g to about 1,750 F/g, about 500 F/g to about 2,000 F/g, about 500 F/g to about 2,250 F/g, about 500 F/g to about 2,500 F/g, about 750 F/g to about 1,000 F/g, about 750 F/g to about 1,250 F/g, about 750 F/g to about 1,500 F/g, about 750 F/g to about 1,750 F/g, about 750 F/g to about 2,000 F/g, about 750 F/g to about 2,250 F/g, about 750 F/g to about 2,500 F/g, about 1,000 F/g to about 1,250 F/g, about 1,000 F/g to about 1,500 F/g, about 1,000 F/g to about 1,750 F/g, about 1,000 F/g to about 2,000 F/g, about 1,000 F/g to about 2,250 F/g, about 1,000 F/g to about 2,500 F/g, about 1,250 F/g to about 1,500 F/g, about 1,250 F/g to about 1,750 F/g, about 1,250 F/g to about 2,000 F/g, about 1,250 F/g to about 2,250 F/g, about 1,250 F/g to about 2,500 F/g, about 1,500 F/g to about 1,750 F/g, about 1,500 F/g to about 2,000 F/g, about 1,500 F/g to about 2,250 F/g, about 1,500 F/g to about 2,500 F/g, about 1,750 F/g to about 2,000 F/g, about 1,750 F/g to about 2,250 F/g, about 1,750 F/g to about 2,500 F/g, about 2,000 F/g to about 2,250 F/g, about 2,000 F/g to about 2,500 F/g, or about 2,250 F/g to about 2,500 F/g. In some embodiments, the second electrode has a capacitance of about 500 F/g, about 750 F/g, about 1,000 F/g, about 1,250 F/g, about 1,500 F/g, about 1,750 F/g, about 2,000 F/g, about 2,250 F/g, or about 2,500 F/g. In some embodiments, the second electrode has a capacitance of at least about 750 F/g, about 1,000 F/g, about 1,250 F/g, about 1,500 F/g, about 1,750 F/g, about 2,000 F/g, about 2,250 F/g, or about 2,500 F/g.

In some embodiments, the second electrode has a gravimetric capacity of about 30 mAh/g to about 120 mAh/g. In some embodiments, the second electrode has a gravimetric capacity of at least about 30 mAh/g. In some embodiments, the second electrode has a gravimetric capacity of at most about 120 mAh/g. In some embodiments, the second electrode has a gravimetric capacity of about 30 mAh/g to about 40 mAh/g, about 30 mAh/g to about 50 mAh/g, about 30 mAh/g to about 60 mAh/g, about 30 mAh/g to about 70 mAh/g, about 30 mAh/g to about 80 mAh/g, about 30 mAh/g to about 90 mAh/g, about 30 mAh/g to about 100 mAh/g, about 30 mAh/g to about 110 mAh/g, about 30 mAh/g to about 120 mAh/g, about 40 mAh/g to about 50 mAh/g, about 40 mAh/g to about 60 mAh/g, about 40 mAh/g to about 70 mAh/g, about 40 mAh/g to about 80 mAh/g, about 40 mAh/g to about 90 mAh/g, about 40 mAh/g to about 100 mAh/g, about 40 mAh/g to about 110 mAh/g, about 40 mAh/g to about 120 mAh/g, about 50 mAh/g to about 60 mAh/g, about 50 mAh/g to about 70 mAh/g, about 50 mAh/g to about 80 mAh/g, about 50 mAh/g to about 90 mAh/g, about 50 mAh/g to about 100 mAh/g, about 50 mAh/g to about 110 mAh/g, about 50 mAh/g to about 120 mAh/g, about 60 mAh/g to about 70 mAh/g, about 60 mAh/g to about 80 mAh/g, about 60 mAh/g to about 90 mAh/g, about 60 mAh/g to about 100 mAh/g, about 60 mAh/g to about 110 mAh/g, about 60 mAh/g to about 120 mAh/g, about 70 mAh/g to about 80 mAh/g, about 70 mAh/g to about 90 mAh/g, about 70 mAh/g to about 100 mAh/g, about 70 mAh/g to about 110 mAh/g, about 70 mAh/g to about 120 mAh/g, about 80 mAh/g to about 90 mAh/g, about 80 mAh/g to about 100 mAh/g, about 80 mAh/g to about 110 mAh/g, about 80 mAh/g to about 120 mAh/g, about 90 mAh/g to about 100 mAh/g, about 90 mAh/g to about 110 mAh/g, about 90 mAh/g to about 120 mAh/g, about 100 mAh/g to about 110 mAh/g, about 100 mAh/g to about 120 mAh/g, or about 110 mAh/g to about 120 mAh/g. In some embodiments, the second electrode has a gravimetric capacity of about 30 mAh/g, about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g. In some embodiments, the second electrode has a gravimetric capacity of at least about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g.

In some embodiments, the first electrode is configured to be employed as the positive electrode. In some embodiments, the first electrode is configured to be employed as the negative electrode. In some embodiments, the first electrode and the second electrode are the same. In some embodiments, the second electrode is configured to be employed as the positive electrode. In some embodiments, the second electrode is configured to be employed as the negative electrode.

In some embodiments, the electrolyte comprises an aqueous electrolyte. In some embodiments, the electrolyte comprises alkaline electrolyte. In some embodiments, the electrolyte comprises a base. In some embodiments, the base comprises a strong base. In some embodiments, the strong base comprises lithium hydroxide, sodium hydroxide, potassium hydroxide, rubidium hydroxide, cesium hydroxide, magnesium hydroxide, calcium hydroxide, strontium hydroxide, barium hydroxide, or any combination thereof. In some embodiments, the strong base comprises potassium hydroxide. In some embodiments, the strong base comprises calcium hydroxide. In some embodiments, the strong base comprises sodium hydroxide.

In some embodiments, the conductive additive comprises a transition metal oxide. In some embodiments, the transition metal oxide comprises sodium (I) oxide, potassium (I) oxide, ferrous (II) oxide, magnesium (II) oxide, calcium (II) oxide, chromium (III) oxide, copper (I) oxide, zinc (II) oxide, or any combination thereof. In some embodiments, the conductive additive comprises a semiconductive material. In some embodiments, the semiconductive material comprises cuprous chloride, cadmium phosphide, cadmium arsenide, cadmium antimonide, zinc phosphide, zinc arsenide, zinc antimonide, cadmium selenide, cadmium sulfide, cadmium telluride, zinc selenide, zinc sulfide, zinc telluride, zinc oxide, or any combination thereof. In some embodiments, the conductive additive comprises sodium (I) oxide. In some embodiments, the conductive additive comprises. In some embodiments, the conductive additive comprises ferrous (II) oxide. In some embodiments, the conductive additive comprises zinc oxide.

In some embodiments, the electrolyte has a concentration of about 1 M to about 12 M. In some embodiments, the electrolyte has a concentration of at least about 1 M. In some embodiments, the electrolyte has a concentration of at most about 12 M. In some embodiments, the electrolyte has a concentration of about 1 M to about 2 M, about 1 M to about 3 M, about 1 M to about 4 M, about 1 M to about 5 M, about 1 M to about 6 M, about 1 M to about 7 M, about 1 M to about 8 M, about 1 M to about 9 M, about 1 M to about 10 M, about 1 M to about 11 M, about 1 M to about 12 M, about 2 M to about 3 M, about 2 M to about 4 M, about 2 M to about 5 M, about 2 M to about 6 M, about 2 M to about 7 M, about 2 M to about 8 M, about 2 M to about 9 M, about 2 M to about 10 M, about 2 M to about 11 M, about 2 M to about 12 M, about 3 M to about 4 M, about 3 M to about 5 M, about 3 M to about 6 M, about 3 M to about 7 M, about 3 M to about 8 M, about 3 M to about 9 M, about 3 M to about 10 M, about 3 M to about 11 M, about 3 M to about 12 M, about 4 M to about 5 M, about 4 M to about 6 M, about 4 M to about 7 M, about 4 M to about 8 M, about 4 M to about 9 M, about 4 M to about 10 M, about 4 M to about 11 M, about 4 M to about 12 M, about 5 M to about 6 M, about 5 M to about 7 M, about 5 M to about 8 M, about 5 M to about 9 M, about 5 M to about 10 M, about 5 M to about 11 M, about 5 M to about 12 M, about 6 M to about 7 M, about 6 M to about 8 M, about 6 M to about 9 M, about 6 M to about 10 M, about 6 M to about 11 M, about 6 M to about 12 M, about 7 M to about 8 M, about 7 M to about 9 M, about 7 M to about 10 M, about 7 M to about 11 M, about 7 M to about 12 M, about 8 M to about 9 M, about 8 M to about 10 M, about 8 M to about 11 M, about 8 M to about 12 M, about 9 M to about 10 M, about 9 M to about 11 M, about 9 M to about 12 M, about 10 M to about 11 M, about 10 M to about 12 M, or about 11 M to about 12 M. In some embodiments, the electrolyte has a concentration of about 1 M, about 2 M, about 3 M, about 4 M, about 5 M, about 6 M, about 7 M, about 8 M, about 9 M, about 10 M, about 11 M, or about 12 M. In some embodiments, the electrolyte has a concentration of at least about 2 M, about 3 M, about 4 M, about 5 M, about 6 M, about 7 M, about 8 M, about 9 M, about 10 M, about 11 M, or about 12 M. In some embodiments, the electrolyte has a concentration of at most about 1 M, about 2 M, about 3 M, about 4 M, about 5 M, about 6 M, about 7 M, about 8 M, about 9 M, about 10 M, or about 11 M.

In some embodiments, the separator maintains a set distance between the first electrode and the second electrode to prevent electrical short circuits, while allowing the transport of ionic charge carriers. In some embodiments, the separator comprises a permeable membrane placed between the first and second electrodes. In some embodiments, the separator comprises a non-woven fiber, a polymer film, a ceramic, a naturally occurring material, a supported liquid membranes or any combination thereof. In some embodiments, the non-woven fiber comprises cotton, nylon, polyesters, glass, or any combination thereof. In some embodiments, the polymer film comprises polyethylene, polypropylene, poly (tetrafluoroethylene), polyvinyl chloride, or any combination thereof. In some embodiments, the naturally occurring material comprises rubber, asbestos, wood, or any combination thereof. In some embodiments a supported liquid membranes comprises a solid and liquid phase contained within a microporous separator. In some embodiments, the separator comprises a sheet, a web, or mat of directionally oriented fibers, randomly oriented fibers, or any combination thereof. In some embodiments, the separator comprises a single layer. In some embodiments, the separator comprises a plurality of layers.

In some embodiments, the energy storage device has an active material specific energy density of about 400 Wh/kg to about 1,600 Wh/kg. In some embodiments, the energy storage device has an active material specific energy density of at least about 400 Wh/kg. In some embodiments, the energy storage device has an active material specific energy density of at most about 1,600 Wh/kg. In some embodiments, the energy storage device has an active material specific energy density of about 400 Wh/kg to about 500 Wh/kg, about 400 Wh/kg to about 600 Wh/kg, about 400 Wh/kg to about 700 Wh/kg, about 400 Wh/kg to about 800 Wh/kg, about 400 Wh/kg to about 900 Wh/kg, about 400 Wh/kg to about 1,000 Wh/kg, about 400 Wh/kg to about 1,100 Wh/kg, about 400 Wh/kg to about 1,200 Wh/kg, about 400 Wh/kg to about 1,300 Wh/kg, about 400 Wh/kg to about 1,400 Wh/kg, about 400 Wh/kg to about 1,600 Wh/kg, about 500 Wh/kg to about 600 Wh/kg, about 500 Wh/kg to about 700 Wh/kg, about 500 Wh/kg to about 800 Wh/kg, about 500 Wh/kg to about 900 Wh/kg, about 500 Wh/kg to about 1,000 Wh/kg, about 500 Wh/kg to about 1,100 Wh/kg, about 500 Wh/kg to about 1,200 Wh/kg, about 500 Wh/kg to about 1,300 Wh/kg, about 500 Wh/kg to about 1,400 Wh/kg, about 500 Wh/kg to about 1,600 Wh/kg, about 600 Wh/kg to about 700 Wh/kg, about 600 Wh/kg to about 800 Wh/kg, about 600 Wh/kg to about 900 Wh/kg, about 600 Wh/kg to about 1,000 Wh/kg, about 600 Wh/kg to about 1,100 Wh/kg, about 600 Wh/kg to about 1,200 Wh/kg, about 600 Wh/kg to about 1,300 Wh/kg, about 600 Wh/kg to about 1,400 Wh/kg, about 600 Wh/kg to about 1,600 Wh/kg, about 700 Wh/kg to about 800 Wh/kg, about 700 Wh/kg to about 900 Wh/kg, about 700 Wh/kg to about 1,000 Wh/kg, about 700 Wh/kg to about 1,100 Wh/kg, about 700 Wh/kg to about 1,200 Wh/kg, about 700 Wh/kg to about 1,300 Wh/kg, about 700 Wh/kg to about 1,400 Wh/kg, about 700 Wh/kg to about 1,600 Wh/kg, about 800 Wh/kg to about 900 Wh/kg, about 800 Wh/kg to about 1,000 Wh/kg, about 800 Wh/kg to about 1,100 Wh/kg, about 800 Wh/kg to about 1,200 Wh/kg, about 800 Wh/kg to about 1,300 Wh/kg, about 800 Wh/kg to about 1,400 Wh/kg, about 800 Wh/kg to about 1,600 Wh/kg, about 900 Wh/kg to about 1,000 Wh/kg, about 900 Wh/kg to about 1,100 Wh/kg, about 900 Wh/kg to about 1,200 Wh/kg, about 900 Wh/kg to about 1,300 Wh/kg, about 900 Wh/kg to about 1,400 Wh/kg, about 900 Wh/kg to about 1,600 Wh/kg, about 1,000 Wh/kg to about 1,100 Wh/kg, about 1,000 Wh/kg to about 1,200 Wh/kg, about 1,000 Wh/kg to about 1,300 Wh/kg, about 1,000 Wh/kg to about 1,400 Wh/kg, about 1,000 Wh/kg to about 1,600 Wh/kg, about 1,100 Wh/kg to about 1,200 Wh/kg, about 1,100 Wh/kg to about 1,300 Wh/kg, about 1,100 Wh/kg to about 1,400 Wh/kg, about 1,100 Wh/kg to about 1,600 Wh/kg, about 1,200 Wh/kg to about 1,300 Wh/kg, about 1,200 Wh/kg to about 1,400 Wh/kg, about 1,200 Wh/kg to about 1,600 Wh/kg, about 1,300 Wh/kg to about 1,400 Wh/kg, about 1,300 Wh/kg to about 1,600 Wh/kg, or about 1,400 Wh/kg to about 1,600 Wh/kg. In some embodiments, the energy storage device has an active material specific energy density of about 400 Wh/kg, about 500 Wh/kg, about 600 Wh/kg, about 700 Wh/kg, about 800 Wh/kg, about 900 Wh/kg, about 1,000 Wh/kg, about 1,100 Wh/kg, about 1,200 Wh/kg, about 1,300 Wh/kg, about 1,400 Wh/kg, or about 1,600 Wh/kg. In some embodiments, the energy storage device has an active material specific energy density of at least about 500 Wh/kg, about 600 Wh/kg, about 700 Wh/kg, about 800 Wh/kg, about 900 Wh/kg, about 1,000 Wh/kg, about 1,100 Wh/kg, about 1,200 Wh/kg, about 1,300 Wh/kg, about 1,400 Wh/kg, or about 1,600 Wh/kg.

In some embodiments, the energy storage device has a total gravimetric energy density of about 200 Wh/kg to about 800 Wh/kg. In some embodiments, the energy storage device has a total gravimetric energy density of at least about 200 Wh/kg. In some embodiments, the energy storage device has a total gravimetric energy density of at most about 800 Wh/kg. In some embodiments, the energy storage device has a total gravimetric energy density of about 200 Wh/kg to about 250 Wh/kg, about 200 Wh/kg to about 300 Wh/kg, about 200 Wh/kg to about 350 Wh/kg, about 200 Wh/kg to about 400 Wh/kg, about 200 Wh/kg to about 450 Wh/kg, about 200 Wh/kg to about 500 Wh/kg, about 200 Wh/kg to about 550 Wh/kg, about 200 Wh/kg to about 600 Wh/kg, about 200 Wh/kg to about 650 Wh/kg, about 200 Wh/kg to about 700 Wh/kg, about 200 Wh/kg to about 800 Wh/kg, about 250 Wh/kg to about 300 Wh/kg, about 250 Wh/kg to about 350 Wh/kg, about 250 Wh/kg to about 400 Wh/kg, about 250 Wh/kg to about 450 Wh/kg, about 250 Wh/kg to about 500 Wh/kg, about 250 Wh/kg to about 550 Wh/kg, about 250 Wh/kg to about 600 Wh/kg, about 250 Wh/kg to about 650 Wh/kg, about 250 Wh/kg to about 700 Wh/kg, about 250 Wh/kg to about 800 Wh/kg, about 300 Wh/kg to about 350 Wh/kg, about 300 Wh/kg to about 400 Wh/kg, about 300 Wh/kg to about 450 Wh/kg, about 300 Wh/kg to about 500 Wh/kg, about 300 Wh/kg to about 550 Wh/kg, about 300 Wh/kg to about 600 Wh/kg, about 300 Wh/kg to about 650 Wh/kg, about 300 Wh/kg to about 700 Wh/kg, about 300 Wh/kg to about 800 Wh/kg, about 350 Wh/kg to about 400 Wh/kg, about 350 Wh/kg to about 450 Wh/kg, about 350 Wh/kg to about 500 Wh/kg, about 350 Wh/kg to about 550 Wh/kg, about 350 Wh/kg to about 600 Wh/kg, about 350 Wh/kg to about 650 Wh/kg, about 350 Wh/kg to about 700 Wh/kg, about 350 Wh/kg to about 800 Wh/kg, about 400 Wh/kg to about 450 Wh/kg, about 400 Wh/kg to about 500 Wh/kg, about 400 Wh/kg to about 550 Wh/kg, about 400 Wh/kg to about 600 Wh/kg, about 400 Wh/kg to about 650 Wh/kg, about 400 Wh/kg to about 700 Wh/kg, about 400 Wh/kg to about 800 Wh/kg, about 450 Wh/kg to about 500 Wh/kg, about 450 Wh/kg to about 550 Wh/kg, about 450 Wh/kg to about 600 Wh/kg, about 450 Wh/kg to about 650 Wh/kg, about 450 Wh/kg to about 700 Wh/kg, about 450 Wh/kg to about 800 Wh/kg, about 500 Wh/kg to about 550 Wh/kg, about 500 Wh/kg to about 600 Wh/kg, about 500 Wh/kg to about 650 Wh/kg, about 500 Wh/kg to about 700 Wh/kg, about 500 Wh/kg to about 800 Wh/kg, about 550 Wh/kg to about 600 Wh/kg, about 550 Wh/kg to about 650 Wh/kg, about 550 Wh/kg to about 700 Wh/kg, about 550 Wh/kg to about 800 Wh/kg, about 600 Wh/kg to about 650 Wh/kg, about 600 Wh/kg to about 700 Wh/kg, about 600 Wh/kg to about 800 Wh/kg, about 650 Wh/kg to about 700 Wh/kg, about 650 Wh/kg to about 800 Wh/kg, or about 700 Wh/kg to about 800 Wh/kg. In some embodiments, the energy storage device has a total gravimetric energy density of about 200 Wh/kg, about 250 Wh/kg, about 300 Wh/kg, about 350 Wh/kg, about 400 Wh/kg, about 450 Wh/kg, about 500 Wh/kg, about 550 Wh/kg, about 600 Wh/kg, about 650 Wh/kg, about 700 Wh/kg, or about 800 Wh/kg. In some embodiments, the energy storage device has a total gravimetric energy density of at least about 250 Wh/kg, about 300 Wh/kg, about 350 Wh/kg, about 400 Wh/kg, about 450 Wh/kg, about 500 Wh/kg, about 550 Wh/kg, about 600 Wh/kg, about 650 Wh/kg, about 700 Wh/kg, or about 800 Wh/kg.

In some embodiments, the energy storage device has a total volumetric energy density of about 300 Wh/L to about 1,500 Wh/L. In some embodiments, the energy storage device has a total volumetric energy density of at least about 300 Wh/L. In some embodiments, the energy storage device has a total volumetric energy density of at most about 1,500 Wh/L. In some embodiments, the energy storage device has a total volumetric energy density of about 300 Wh/L to about 400 Wh/L, about 300 Wh/L to about 500 Wh/L, about 300 Wh/L to about 600 Wh/L, about 300 Wh/L to about 700 Wh/L, about 300 Wh/L to about 800 Wh/L, about 300 Wh/L to about 900 Wh/L, about 300 Wh/L to about 1,000 Wh/L, about 300 Wh/L to about 1,100 Wh/L, about 300 Wh/L to about 1,200 Wh/L, about 300 Wh/L to about 1,300 Wh/L, about 300 Wh/L to about 1,500 Wh/L, about 400 Wh/L to about 500 Wh/L, about 400 Wh/L to about 600 Wh/L, about 400 Wh/L to about 700 Wh/L, about 400 Wh/L to about 800 Wh/L, about 400 Wh/L to about 900 Wh/L, about 400 Wh/L to about 1,000 Wh/L, about 400 Wh/L to about 1,100 Wh/L, about 400 Wh/L to about 1,200 Wh/L, about 400 Wh/L to about 1,300 Wh/L, about 400 Wh/L to about 1,500 Wh/L, about 500 Wh/L to about 600 Wh/L, about 500 Wh/L to about 700 Wh/L, about 500 Wh/L to about 800 Wh/L, about 500 Wh/L to about 900 Wh/L, about 500 Wh/L to about 1,000 Wh/L, about 500 Wh/L to about 1,100 Wh/L, about 500 Wh/L to about 1,200 Wh/L, about 500 Wh/L to about 1,300 Wh/L, about 500 Wh/L to about 1,500 Wh/L, about 600 Wh/L to about 700 Wh/L, about 600 Wh/L to about 800 Wh/L, about 600 Wh/L to about 900 Wh/L, about 600 Wh/L to about 1,000 Wh/L, about 600 Wh/L to about 1,100 Wh/L, about 600 Wh/L to about 1,200 Wh/L, about 600 Wh/L to about 1,300 Wh/L, about 600 Wh/L to about 1,500 Wh/L, about 700 Wh/L to about 800 Wh/L, about 700 Wh/L to about 900 Wh/L, about 700 Wh/L to about 1,000 Wh/L, about 700 Wh/L to about 1,100 Wh/L, about 700 Wh/L to about 1,200 Wh/L, about 700 Wh/L to about 1,300 Wh/L, about 700 Wh/L to about 1,500 Wh/L, about 800 Wh/L to about 900 Wh/L, about 800 Wh/L to about 1,000 Wh/L, about 800 Wh/L to about 1,100 Wh/L, about 800 Wh/L to about 1,200 Wh/L, about 800 Wh/L to about 1,300 Wh/L, about 800 Wh/L to about 1,500 Wh/L, about 900 Wh/L to about 1,000 Wh/L, about 900 Wh/L to about 1,100 Wh/L, about 900 Wh/L to about 1,200 Wh/L, about 900 Wh/L to about 1,300 Wh/L, about 900 Wh/L to about 1,500 Wh/L, about 1,000 Wh/L to about 1,100 Wh/L, about 1,000 Wh/L to about 1,200 Wh/L, about 1,000 Wh/L to about 1,300 Wh/L, about 1,000 Wh/L to about 1,500 Wh/L, about 1,100 Wh/L to about 1,200 Wh/L, about 1,100 Wh/L to about 1,300 Wh/L, about 1,100 Wh/L to about 1,500 Wh/L, about 1,200 Wh/L to about 1,300 Wh/L, about 1,200 Wh/L to about 1,500 Wh/L, or about 1,300 Wh/L to about 1,500 Wh/L. In some embodiments, the energy storage device has a total volumetric energy density of about 300 Wh/L, about 400 Wh/L, about 500 Wh/L, about 600 Wh/L, about 700 Wh/L, about 800 Wh/L, about 900 Wh/L, about 1,000 Wh/L, about 1,100 Wh/L, about 1,200 Wh/L, about 1,300 Wh/L, or about 1,500 Wh/L. In some embodiments, the energy storage device has a total volumetric energy density of at least about 400 Wh/L, about 500 Wh/L, about 600 Wh/L, about 700 Wh/L, about 800 Wh/L, about 900 Wh/L, about 1,000 Wh/L, about 1,100 Wh/L, about 1,200 Wh/L, about 1,300 Wh/L, or about 1,500 Wh/L.

In some embodiments, the energy storage device has an active material specific power density of about 75 kW/kg to about 275 kW/kg. In some embodiments, the energy storage device has an active material specific power density of at least about 75 KW/kg. In some embodiments, the energy storage device has an active material specific power density of at most about 275 kW/kg. In some embodiments, the energy storage device has an active material specific power density of about 75 kW/kg to about 100 kW/kg, about 75 kW/kg to about 125 kW/kg, about 75 kW/kg to about 150 kW/kg, about 75 kW/kg to about 175 kW/kg, about 75 kW/kg to about 200 kW/kg, about 75 kW/kg to about 225 kW/kg, about 75 kW/kg to about 250 kW/kg, about 75 kW/kg to about 275 kW/kg, about 100 kW/kg to about 125 kW/kg, about 100 kW/kg to about 150 kW/kg, about 100 kW/kg to about 175 kW/kg, about 100 kW/kg to about 200 kW/kg, about 100 kW/kg to about 225 kW/kg, about 100 kW/kg to about 250 kW/kg, about 100 kW/kg to about 275 kW/kg, about 125 kW/kg to about 150 kW/kg, about 125 kW/kg to about 175 kW/kg, about 125 kW/kg to about 200 kW/kg, about 125 kW/kg to about 225 kW/kg, about 125 kW/kg to about 250 kW/kg, about 125 kW/kg to about 275 kW/kg, about 150 kW/kg to about 175 kW/kg, about 150 kW/kg to about 200 kW/kg, about 150 kW/kg to about 225 kW/kg, about 150 kW/kg to about 250 kW/kg, about 150 kW/kg to about 275 kW/kg, about 175 kW/kg to about 200 kW/kg, about 175 kW/kg to about 225 kW/kg, about 175 kW/kg to about 250 kW/kg, about 175 kW/kg to about 275 kW/kg, about 200 kW/kg to about 225 kW/kg, about 200 kW/kg to about 250 kW/kg, about 200 kW/kg to about 275 kW/kg, about 225 kW/kg to about 250 kW/kg, about 225 kW/kg to about 275 kW/kg, or about 250 kW/kg to about 275 kW/kg. In some embodiments, the energy storage device has an active material specific power density of about 75 kW/kg, about 100 kW/kg, about 125 kW/kg, about 150 kW/kg, about 175 kW/kg, about 200 kW/kg, about 225 kW/kg, about 250 kW/kg, or about 275 kW/kg. In some embodiments, the energy storage device has an active material specific power density of at least about 100 kW/kg, about 125 kW/kg, about 150 kW/kg, about 175 kW/kg, about 200 kW/kg, about 225 kW/kg, about 250 kW/kg, or about 275 kW/kg.

In some embodiments, the energy storage device has a total power density of about 30 kW/kg to about 120 kW/kg. In some embodiments, the energy storage device has a total power density of at least about 30 kW/kg. In some embodiments, the energy storage device has a total power density of at most about 120 kW/kg. In some embodiments, the energy storage device has a total power density of about 30 kW/kg to about 40 kW/kg, about 30 kW/kg to about 50 kW/kg, about 30 kW/kg to about 60 kW/kg, about 30 kW/kg to about 70 kW/kg, about 30 kW/kg to about 80 kW/kg, about 30 kW/kg to about 90 kW/kg, about 30 kW/kg to about 100 kW/kg, about 30 kW/kg to about 110 kW/kg, about 30 kW/kg to about 120 kW/kg, about 40 kW/kg to about 50 kW/kg, about 40 kW/kg to about 60 kW/kg, about 40 kW/kg to about 70 kW/kg, about 40 kW/kg to about 80 kW/kg, about 40 kW/kg to about 90 kW/kg, about 40 kW/kg to about 100 kW/kg, about 40 kW/kg to about 110 kW/kg, about 40 kW/kg to about 120 kW/kg, about 50 kW/kg to about 60 kW/kg, about 50 kW/kg to about 70 kW/kg, about 50 kW/kg to about 80 kW/kg, about 50 kW/kg to about 90 kW/kg, about 50 kW/kg to about 100 kW/kg, about 50 kW/kg to about 110 kW/kg, about 50 kW/kg to about 120 kW/kg, about 60 kW/kg to about 70 kW/kg, about 60 kW/kg to about 80 kW/kg, about 60 kW/kg to about 90 kW/kg, about 60 kW/kg to about 100 kW/kg, about 60 kW/kg to about 110 kW/kg, about 60 kW/kg to about 120 kW/kg, about 70 kW/kg to about 80 kW/kg, about 70 kW/kg to about 90 kW/kg, about 70 kW/kg to about 100 kW/kg, about 70 kW/kg to about 110 kW/kg, about 70 kW/kg to about 120 kW/kg, about 80 kW/kg to about 90 kW/kg, about 80 kW/kg to about 100 kW/kg, about 80 kW/kg to about 110 kW/kg, about 80 kW/kg to about 120 kW/kg, about 90 kW/kg to about 100 kW/kg, about 90 kW/kg to about 110 kW/kg, about 90 kW/kg to about 120 kW/kg, about 100 kW/kg to about 110 kW/kg, about 100 kW/kg to about 120 kW/kg, or about 110 kW/kg to about 120 kW/kg. In some embodiments, the energy storage device has a total power density of about 30 kW/kg, about 40 kW/kg, about 50 kW/kg, about 60 kW/kg, about 70 kW/kg, about 80 kW/kg, about 90 kW/kg, about 100 kW/kg, about 110 kW/kg, or about 120 kW/kg. In some embodiments, the energy storage device has a total power density of at least about 40 kW/kg, about 50 kW/kg, about 60 kW/kg, about 70 kW/kg, about 80 kW/kg, about 90 kW/kg, about 100 kW/kg, about 110 kW/kg, or about 120 kW/kg.

In some embodiments, the energy storage device has a cell-specific capacity at a voltage of about 1.7 V of about 2,000 mAh to about 10,000 mAh. In some embodiments, the energy storage device has a cell-specific capacity at a voltage of about 1.7 V of at least about 2,000 mAh. In some embodiments, the energy storage device has a cell-specific capacity at a voltage of about 1.7 V of at most about 10,000 mAh. In some embodiments, the energy storage device has a cell-specific capacity at a voltage of about 1.7 V of about 2,000 mAh to about 2,500 mAh, about 2,000 mAh to about 3,000 mAh, about 2,000 mAh to about 3,500 mAh, about 2,000 mAh to about 4,000 mAh, about 2,000 mAh to about 4,500 mAh, about 2,000 mAh to about 5,000 mAh, about 2,000 mAh to about 5,500 mAh, about 2,000 mAh to about 6,000 mAh, about 2,000 mAh to about 7,000 mAh, about 2,000 mAh to about 8,000 mAh, about 2,000 mAh to about 10,000 mAh, about 2,500 mAh to about 3,000 mAh, about 2,500 mAh to about 3,500 mAh, about 2,500 mAh to about 4,000 mAh, about 2,500 mAh to about 4,500 mAh, about 2,500 mAh to about 5,000 mAh, about 2,500 mAh to about 5,500 mAh, about 2,500 mAh to about 6,000 mAh, about 2,500 mAh to about 7,000 mAh, about 2,500 mAh to about 8,000 mAh, about 2,500 mAh to about 10,000 mAh, about 3,000 mAh to about 3,500 mAh, about 3,000 mAh to about 4,000 mAh, about 3,000 mAh to about 4,500 mAh, about 3,000 mAh to about 5,000 mAh, about 3,000 mAh to about 5,500 mAh, about 3,000 mAh to about 6,000 mAh, about 3,000 mAh to about 7,000 mAh, about 3,000 mAh to about 8,000 mAh, about 3,000 mAh to about 10,000 mAh, about 3,500 mAh to about 4,000 mAh, about 3,500 mAh to about 4,500 mAh, about 3,500 mAh to about 5,000 mAh, about 3,500 mAh to about 5,500 mAh, about 3,500 mAh to about 6,000 mAh, about 3,500 mAh to about 7,000 mAh, about 3,500 mAh to about 8,000 mAh, about 3,500 mAh to about 10,000 mAh, about 4,000 mAh to about 4,500 mAh, about 4,000 mAh to about 5,000 mAh, about 4,000 mAh to about 5,500 mAh, about 4,000 mAh to about 6,000 mAh, about 4,000 mAh to about 7,000 mAh, about 4,000 mAh to about 8,000 mAh, about 4,000 mAh to about 10,000 mAh, about 4,500 mAh to about 5,000 mAh, about 4,500 mAh to about 5,500 mAh, about 4,500 mAh to about 6,000 mAh, about 4,500 mAh to about 7,000 mAh, about 4,500 mAh to about 8,000 mAh, about 4,500 mAh to about 10,000 mAh, about 5,000 mAh to about 5,500 mAh, about 5,000 mAh to about 6,000 mAh, about 5,000 mAh to about 7,000 mAh, about 5,000 mAh to about 8,000 mAh, about 5,000 mAh to about 10,000 mAh, about 5,500 mAh to about 6,000 mAh, about 5,500 mAh to about 7,000 mAh, about 5,500 mAh to about 8,000 mAh, about 5,500 mAh to about 10,000 mAh, about 6,000 mAh to about 7,000 mAh, about 6,000 mAh to about 8,000 mAh, about 6,000 mAh to about 10,000 mAh, about 7,000 mAh to about 8,000 mAh, about 7,000 mAh to about 10,000 mAh, or about 8,000 mAh to about 10,000 mAh. In some embodiments, the energy storage device has a cell-specific capacity at a voltage of about 1.7 V of about 2,000 mAh, about 2,500 mAh, about 3,000 mAh, about 3,500 mAh, about 4,000 mAh, about 4,500 mAh, about 5,000 mAh, about 5,500 mAh, about 6,000 mAh, about 7,000 mAh, about 8,000 mAh, or about 10,000 mAh. In some embodiments, the energy storage device has a cell-specific capacity at a voltage of about 1.7 V of at least about 2,500 mAh, about 3,000 mAh, about 3,500 mAh, about 4,000 mAh, about 4,500 mAh, about 5,000 mAh, about 5,500 mAh, about 6,000 mAh, about 7,000 mAh, about 8,000 mAh, or about 10,000 mAh.

In some embodiments, the energy storage device has a cell-specific capacity at a voltage of about 1.5 V of about 2,000 mAh to about 8,000 mAh. In some embodiments, the energy storage device has a cell-specific capacity at a voltage of about 1.5 V of at least about 2,000 mAh. In some embodiments, the energy storage device has a cell-specific capacity at a voltage of about 1.5 V of at most about 8,000 mAh. In some embodiments, the energy storage device has a cell-specific capacity at a voltage of about 1.5 V of about 2,000 mAh to about 2,500 mAh, about 2,000 mAh to about 3,000 mAh, about 2,000 mAh to about 3,500 mAh, about 2,000 mAh to about 4,000 mAh, about 2,000 mAh to about 4,500 mAh, about 2,000 mAh to about 5,000 mAh, about 2,000 mAh to about 5,500 mAh, about 2,000 mAh to about 6,000 mAh, about 2,000 mAh to about 7,000 mAh, about 2,000 mAh to about 8,000 mAh, about 2,500 mAh to about 3,000 mAh, about 2,500 mAh to about 3,500 mAh, about 2,500 mAh to about 4,000 mAh, about 2,500 mAh to about 4,500 mAh, about 2,500 mAh to about 5,000 mAh, about 2,500 mAh to about 5,500 mAh, about 2,500 mAh to about 6,000 mAh, about 2,500 mAh to about 7,000 mAh, about 2,500 mAh to about 8,000 mAh, about 3,000 mAh to about 3,500 mAh, about 3,000 mAh to about 4,000 mAh, about 3,000 mAh to about 4,500 mAh, about 3,000 mAh to about 5,000 mAh, about 3,000 mAh to about 5,500 mAh, about 3,000 mAh to about 6,000 mAh, about 3,000 mAh to about 7,000 mAh, about 3,000 mAh to about 8,000 mAh, about 3,500 mAh to about 4,000 mAh, about 3,500 mAh to about 4,500 mAh, about 3,500 mAh to about 5,000 mAh, about 3,500 mAh to about 5,500 mAh, about 3,500 mAh to about 6,000 mAh, about 3,500 mAh to about 7,000 mAh, about 3,500 mAh to about 8,000 mAh, about 4,000 mAh to about 4,500 mAh, about 4,000 mAh to about 5,000 mAh, about 4,000 mAh to about 5,500 mAh, about 4,000 mAh to about 6,000 mAh, about 4,000 mAh to about 7,000 mAh, about 4,000 mAh to about 8,000 mAh, about 4,500 mAh to about 5,000 mAh, about 4,500 mAh to about 5,500 mAh, about 4,500 mAh to about 6,000 mAh, about 4,500 mAh to about 7,000 mAh, about 4,500 mAh to about 8,000 mAh, about 5,000 mAh to about 5,500 mAh, about 5,000 mAh to about 6,000 mAh, about 5,000 mAh to about 7,000 mAh, about 5,000 mAh to about 8,000 mAh, about 5,500 mAh to about 6,000 mAh, about 5,500 mAh to about 7,000 mAh, about 5,500 mAh to about 8,000 mAh, about 6,000 mAh to about 7,000 mAh, about 6,000 mAh to about 8,000 mAh, or about 7,000 mAh to about 8,000 mAh. In some embodiments, the energy storage device has a cell-specific capacity at a voltage of about 1.5 V of about 2,000 mAh, about 2,500 mAh, about 3,000 mAh, about 3,500 mAh, about 4,000 mAh, about 4,500 mAh, about 5,000 mAh, about 5,500 mAh, about 6,000 mAh, about 7,000 mAh, or about 8,000 mAh. In some embodiments, the energy storage device has a cell-specific capacity at a voltage of about 1.5 V of at least about 2,500 mAh, about 3,000 mAh, about 3,500 mAh, about 4,000 mAh, about 4,500 mAh, about 5,000 mAh, about 5,500 mAh, about 6,000 mAh, about 7,000 mAh, or about 8,000 mAh.

In some embodiments, the energy storage device has a gravimetric capacity at a discharge rate of about 1 C of about 250 mAh/g to about 1,000 mAh/g. In some embodiments, the energy storage device has a gravimetric capacity at a discharge rate of about 1 C of at least about 250 mAh/g. In some embodiments, the energy storage device has a gravimetric capacity at a discharge rate of about 1 C of at most about 1,000 mAh/g. In some embodiments, the energy storage device has a gravimetric capacity at a discharge rate of about 1 C of about 250 mAh/g to about 300 mAh/g, about 250 mAh/g to about 350 mAh/g, about 250 mAh/g to about 400 mAh/g, about 250 mAh/g to about 450 mAh/g, about 250 mAh/g to about 500 mAh/g, about 250 mAh/g to about 550 mAh/g, about 250 mAh/g to about 600 mAh/g, about 250 mAh/g to about 650 mAh/g, about 250 mAh/g to about 700 mAh/g, about 250 mAh/g to about 800 mAh/g, about 250 mAh/g to about 1,000 mAh/g, about 300 mAh/g to about 350 mAh/g, about 300 mAh/g to about 400 mAh/g, about 300 mAh/g to about 450 mAh/g, about 300 mAh/g to about 500 mAh/g, about 300 mAh/g to about 550 mAh/g, about 300 mAh/g to about 600 mAh/g, about 300 mAh/g to about 650 mAh/g, about 300 mAh/g to about 700 mAh/g, about 300 mAh/g to about 800 mAh/g, about 300 mAh/g to about 1,000 mAh/g, about 350 mAh/g to about 400 mAh/g, about 350 mAh/g to about 450 mAh/g, about 350 mAh/g to about 500 mAh/g, about 350 mAh/g to about 550 mAh/g, about 350 mAh/g to about 600 mAh/g, about 350 mAh/g to about 650 mAh/g, about 350 mAh/g to about 700 mAh/g, about 350 mAh/g to about 800 mAh/g, about 350 mAh/g to about 1,000 mAh/g, about 400 mAh/g to about 450 mAh/g, about 400 mAh/g to about 500 mAh/g, about 400 mAh/g to about 550 mAh/g, about 400 mAh/g to about 600 mAh/g, about 400 mAh/g to about 650 mAh/g, about 400 mAh/g to about 700 mAh/g, about 400 mAh/g to about 800 mAh/g, about 400 mAh/g to about 1,000 mAh/g, about 450 mAh/g to about 500 mAh/g, about 450 mAh/g to about 550 mAh/g, about 450 mAh/g to about 600 mAh/g, about 450 mAh/g to about 650 mAh/g, about 450 mAh/g to about 700 mAh/g, about 450 mAh/g to about 800 mAh/g, about 450 mAh/g to about 1,000 mAh/g, about 500 mAh/g to about 550 mAh/g, about 500 mAh/g to about 600 mAh/g, about 500 mAh/g to about 650 mAh/g, about 500 mAh/g to about 700 mAh/g, about 500 mAh/g to about 800 mAh/g, about 500 mAh/g to about 1,000 mAh/g, about 550 mAh/g to about 600 mAh/g, about 550 mAh/g to about 650 mAh/g, about 550 mAh/g to about 700 mAh/g, about 550 mAh/g to about 800 mAh/g, about 550 mAh/g to about 1,000 mAh/g, about 600 mAh/g to about 650 mAh/g, about 600 mAh/g to about 700 mAh/g, about 600 mAh/g to about 800 mAh/g, about 600 mAh/g to about 1,000 mAh/g, about 650 mAh/g to about 700 mAh/g, about 650 mAh/g to about 800 mAh/g, about 650 mAh/g to about 1,000 mAh/g, about 700 mAh/g to about 800 mAh/g, about 700 mAh/g to about 1,000 mAh/g, or about 800 mAh/g to about 1,000 mAh/g. In some embodiments, the energy storage device has a gravimetric capacity at a discharge rate of about 1 C of about 250 mAh/g, about 300 mAh/g, about 350 mAh/g, about 400 mAh/g, about 450 mAh/g, about 500 mAh/g, about 550 mAh/g, about 600 mAh/g, about 650 mAh/g, about 700 mAh/g, about 800 mAh/g, or about 1,000 mAh/g. In some embodiments, the energy storage device has a gravimetric capacity at a discharge rate of about 1 C of at least about 300 mAh/g, about 350 mAh/g, about 400 mAh/g, about 450 mAh/g, about 500 mAh/g, about 550 mAh/g, about 600 mAh/g, about 650 mAh/g, about 700 mAh/g, about 800 mAh/g, or about 1,000 mAh/g.

In some embodiments, the energy storage device has a gravimetric capacity at a discharge rate of about 2 C of about 250 mAh/g to about 800 mAh/g. In some embodiments, the energy storage device has a gravimetric capacity at a discharge rate of about 2 C of at least about 250 mAh/g. In some embodiments, the energy storage device has a gravimetric capacity at a discharge rate of about 2 C of at most about 800 mAh/g. In some embodiments, the energy storage device has a gravimetric capacity at a discharge rate of about 2 C of about 250 mAh/g to about 300 mAh/g, about 250 mAh/g to about 350 mAh/g, about 250 mAh/g to about 400 mAh/g, about 250 mAh/g to about 450 mAh/g, about 250 mAh/g to about 500 mAh/g, about 250 mAh/g to about 550 mAh/g, about 250 mAh/g to about 600 mAh/g, about 250 mAh/g to about 650 mAh/g, about 250 mAh/g to about 700 mAh/g, about 250 mAh/g to about 800 mAh/g, about 300 mAh/g to about 350 mAh/g, about 300 mAh/g to about 400 mAh/g, about 300 mAh/g to about 450 mAh/g, about 300 mAh/g to about 500 mAh/g, about 300 mAh/g to about 550 mAh/g, about 300 mAh/g to about 600 mAh/g, about 300 mAh/g to about 650 mAh/g, about 300 mAh/g to about 700 mAh/g, about 300 mAh/g to about 800 mAh/g, about 350 mAh/g to about 400 mAh/g, about 350 mAh/g to about 450 mAh/g, about 350 mAh/g to about 500 mAh/g, about 350 mAh/g to about 550 mAh/g, about 350 mAh/g to about 600 mAh/g, about 350 mAh/g to about 650 mAh/g, about 350 mAh/g to about 700 mAh/g, about 350 mAh/g to about 800 mAh/g, about 400 mAh/g to about 450 mAh/g, about 400 mAh/g to about 500 mAh/g, about 400 mAh/g to about 550 mAh/g, about 400 mAh/g to about 600 mAh/g, about 400 mAh/g to about 650 mAh/g, about 400 mAh/g to about 700 mAh/g, about 400 mAh/g to about 800 mAh/g, about 450 mAh/g to about 500 mAh/g, about 450 mAh/g to about 550 mAh/g, about 450 mAh/g to about 600 mAh/g, about 450 mAh/g to about 650 mAh/g, about 450 mAh/g to about 700 mAh/g, about 450 mAh/g to about 800 mAh/g, about 500 mAh/g to about 550 mAh/g, about 500 mAh/g to about 600 mAh/g, about 500 mAh/g to about 650 mAh/g, about 500 mAh/g to about 700 mAh/g, about 500 mAh/g to about 800 mAh/g, about 550 mAh/g to about 600 mAh/g, about 550 mAh/g to about 650 mAh/g, about 550 mAh/g to about 700 mAh/g, about 550 mAh/g to about 800 mAh/g, about 600 mAh/g to about 650 mAh/g, about 600 mAh/g to about 700 mAh/g, about 600 mAh/g to about 800 mAh/g, about 650 mAh/g to about 700 mAh/g, about 650 mAh/g to about 800 mAh/g, or about 700 mAh/g to about 800 mAh/g. In some embodiments, the energy storage device has a gravimetric capacity at a discharge rate of about 2 C of about 250 mAh/g, about 300 mAh/g, about 350 mAh/g, about 400 mAh/g, about 450 mAh/g, about 500 mAh/g, about 550 mAh/g, about 600 mAh/g, about 650 mAh/g, about 700 mAh/g, or about 800 mAh/g. In some embodiments, the energy storage device has a gravimetric capacity at a discharge rate of about 2 C of at least about 300 mAh/g, about 350 mAh/g, about 400 mAh/g, about 450 mAh/g, about 500 mAh/g, about 550 mAh/g, about 600 mAh/g, about 650 mAh/g, about 700 mAh/g, or about 800 mAh/g.

In some embodiments, the energy storage device has a gravimetric capacity at a discharge rate of about 10 C of about 150 mAh/g to about 650 mAh/g. In some embodiments, the energy storage device has a gravimetric capacity at a discharge rate of about 10 C of at least about 150 mAh/g. In some embodiments, the energy storage device has a gravimetric capacity at a discharge rate of about 10 C of at most about 650 mAh/g. In some embodiments, the energy storage device has a gravimetric capacity at a discharge rate of about 10 C of about 150 mAh/g to about 200 mAh/g, about 150 mAh/g to about 250 mAh/g, about 150 mAh/g to about 300 mAh/g, about 150 mAh/g to about 350 mAh/g, about 150 mAh/g to about 400 mAh/g, about 150 mAh/g to about 450 mAh/g, about 150 mAh/g to about 500 mAh/g, about 150 mAh/g to about 550 mAh/g, about 150 mAh/g to about 600 mAh/g, about 150 mAh/g to about 650 mAh/g, about 200 mAh/g to about 250 mAh/g, about 200 mAh/g to about 300 mAh/g, about 200 mAh/g to about 350 mAh/g, about 200 mAh/g to about 400 mAh/g, about 200 mAh/g to about 450 mAh/g, about 200 mAh/g to about 500 mAh/g, about 200 mAh/g to about 550 mAh/g, about 200 mAh/g to about 600 mAh/g, about 200 mAh/g to about 650 mAh/g, about 250 mAh/g to about 300 mAh/g, about 250 mAh/g to about 350 mAh/g, about 250 mAh/g to about 400 mAh/g, about 250 mAh/g to about 450 mAh/g, about 250 mAh/g to about 500 mAh/g, about 250 mAh/g to about 550 mAh/g, about 250 mAh/g to about 600 mAh/g, about 250 mAh/g to about 650 mAh/g, about 300 mAh/g to about 350 mAh/g, about 300 mAh/g to about 400 mAh/g, about 300 mAh/g to about 450 mAh/g, about 300 mAh/g to about 500 mAh/g, about 300 mAh/g to about 550 mAh/g, about 300 mAh/g to about 600 mAh/g, about 300 mAh/g to about 650 mAh/g, about 350 mAh/g to about 400 mAh/g, about 350 mAh/g to about 450 mAh/g, about 350 mAh/g to about 500 mAh/g, about 350 mAh/g to about 550 mAh/g, about 350 mAh/g to about 600 mAh/g, about 350 mAh/g to about 650 mAh/g, about 400 mAh/g to about 450 mAh/g, about 400 mAh/g to about 500 mAh/g, about 400 mAh/g to about 550 mAh/g, about 400 mAh/g to about 600 mAh/g, about 400 mAh/g to about 650 mAh/g, about 450 mAh/g to about 500 mAh/g, about 450 mAh/g to about 550 mAh/g, about 450 mAh/g to about 600 mAh/g, about 450 mAh/g to about 650 mAh/g, about 500 mAh/g to about 550 mAh/g, about 500 mAh/g to about 600 mAh/g, about 500 mAh/g to about 650 mAh/g, about 550 mAh/g to about 600 mAh/g, about 550 mAh/g to about 650 mAh/g, or about 600 mAh/g to about 650 mAh/g. In some embodiments, the energy storage device has a gravimetric capacity at a discharge rate of about 10 C of about 150 mAh/g, about 200 mAh/g, about 250 mAh/g, about 300 mAh/g, about 350 mAh/g, about 400 mAh/g, about 450 mAh/g, about 500 mAh/g, about 550 mAh/g, about 600 mAh/g, or about 650 mAh/g. In some embodiments, the energy storage device has a gravimetric capacity at a discharge rate of about 10 C of at least about 200 mAh/g, about 250 mAh/g, about 300 mAh/g, about 350 mAh/g, about 400 mAh/g, about 450 mAh/g, about 500 mAh/g, about 550 mAh/g, about 600 mAh/g, or about 650 mAh/g.

In some embodiments, the energy storage device has a gravimetric capacity at a discharge rate of about 60 C of about 90 mAh/g to about 350 mAh/g. In some embodiments, the energy storage device has a gravimetric capacity at a discharge rate of about 60 C of at least about 90 mAh/g. In some embodiments, the energy storage device has a gravimetric capacity at a discharge rate of about 60 C of at most about 350 mAh/g. In some embodiments, the energy storage device has a gravimetric capacity at a discharge rate of about 60 C of about 90 mAh/g to about 100 mAh/g, about 90 mAh/g to about 125 mAh/g, about 90 mAh/g to about 150 mAh/g, about 90 mAh/g to about 175 mAh/g, about 90 mAh/g to about 200 mAh/g, about 90 mAh/g to about 225 mAh/g, about 90 mAh/g to about 250 mAh/g, about 90 mAh/g to about 275 mAh/g, about 90 mAh/g to about 300 mAh/g, about 90 mAh/g to about 325 mAh/g, about 90 mAh/g to about 350 mAh/g, about 100 mAh/g to about 125 mAh/g, about 100 mAh/g to about 150 mAh/g, about 100 mAh/g to about 175 mAh/g, about 100 mAh/g to about 200 mAh/g, about 100 mAh/g to about 225 mAh/g, about 100 mAh/g to about 250 mAh/g, about 100 mAh/g to about 275 mAh/g, about 100 mAh/g to about 300 mAh/g, about 100 mAh/g to about 325 mAh/g, about 100 mAh/g to about 350 mAh/g, about 125 mAh/g to about 150 mAh/g, about 125 mAh/g to about 175 mAh/g, about 125 mAh/g to about 200 mAh/g, about 125 mAh/g to about 225 mAh/g, about 125 mAh/g to about 250 mAh/g, about 125 mAh/g to about 275 mAh/g, about 125 mAh/g to about 300 mAh/g, about 125 mAh/g to about 325 mAh/g, about 125 mAh/g to about 350 mAh/g, about 150 mAh/g to about 175 mAh/g, about 150 mAh/g to about 200 mAh/g, about 150 mAh/g to about 225 mAh/g, about 150 mAh/g to about 250 mAh/g, about 150 mAh/g to about 275 mAh/g, about 150 mAh/g to about 300 mAh/g, about 150 mAh/g to about 325 mAh/g, about 150 mAh/g to about 350 mAh/g, about 175 mAh/g to about 200 mAh/g, about 175 mAh/g to about 225 mAh/g, about 175 mAh/g to about 250 mAh/g, about 175 mAh/g to about 275 mAh/g, about 175 mAh/g to about 300 mAh/g, about 175 mAh/g to about 325 mAh/g, about 175 mAh/g to about 350 mAh/g, about 200 mAh/g to about 225 mAh/g, about 200 mAh/g to about 250 mAh/g, about 200 mAh/g to about 275 mAh/g, about 200 mAh/g to about 300 mAh/g, about 200 mAh/g to about 325 mAh/g, about 200 mAh/g to about 350 mAh/g, about 225 mAh/g to about 250 mAh/g, about 225 mAh/g to about 275 mAh/g, about 225 mAh/g to about 300 mAh/g, about 225 mAh/g to about 325 mAh/g, about 225 mAh/g to about 350 mAh/g, about 250 mAh/g to about 275 mAh/g, about 250 mAh/g to about 300 mAh/g, about 250 mAh/g to about 325 mAh/g, about 250 mAh/g to about 350 mAh/g, about 275 mAh/g to about 300 mAh/g, about 275 mAh/g to about 325 mAh/g, about 275 mAh/g to about 350 mAh/g, about 300 mAh/g to about 325 mAh/g, about 300 mAh/g to about 350 mAh/g, or about 325 mAh/g to about 350 mAh/g. In some embodiments, the energy storage device has a gravimetric capacity at a discharge rate of about 60 C of about 90 mAh/g, about 100 mAh/g, about 125 mAh/g, about 150 mAh/g, about 175 mAh/g, about 200 mAh/g, about 225 mAh/g, about 250 mAh/g, about 275 mAh/g, about 300 mAh/g, about 325 mAh/g, or about 350 mAh/g. In some embodiments, the energy storage device has a gravimetric capacity at a discharge rate of about 60 C of at least about 100 mAh/g, about 125 mAh/g, about 150 mAh/g, about 175 mAh/g, about 200 mAh/g, about 225 mAh/g, about 250 mAh/g, about 275 mAh/g, about 300 mAh/g, about 325 mAh/g, or about 350 mAh/g.

In some embodiments, the energy storage device has a gravimetric capacity at a discharge rate of about 100 C of about 60 mAh/g to about 240 mAh/g. In some embodiments, the energy storage device has a gravimetric capacity at a discharge rate of about 100 C of at least about 60 mAh/g. In some embodiments, the energy storage device has a gravimetric capacity at a discharge rate of about 100 C of at most about 240 mAh/g. In some embodiments, the energy storage device has a gravimetric capacity at a discharge rate of about 100 C of about 60 mAh/g to about 80 mAh/g, about 60 mAh/g to about 100 mAh/g, about 60 mAh/g to about 120 mAh/g, about 60 mAh/g to about 140 mAh/g, about 60 mAh/g to about 160 mAh/g, about 60 mAh/g to about 180 mAh/g, about 60 mAh/g to about 200 mAh/g, about 60 mAh/g to about 220 mAh/g, about 60 mAh/g to about 240 mAh/g, about 80 mAh/g to about 100 mAh/g, about 80 mAh/g to about 120 mAh/g, about 80 mAh/g to about 140 mAh/g, about 80 mAh/g to about 160 mAh/g, about 80 mAh/g to about 180 mAh/g, about 80 mAh/g to about 200 mAh/g, about 80 mAh/g to about 220 mAh/g, about 80 mAh/g to about 240 mAh/g, about 100 mAh/g to about 120 mAh/g, about 100 mAh/g to about 140 mAh/g, about 100 mAh/g to about 160 mAh/g, about 100 mAh/g to about 180 mAh/g, about 100 mAh/g to about 200 mAh/g, about 100 mAh/g to about 220 mAh/g, about 100 mAh/g to about 240 mAh/g, about 120 mAh/g to about 140 mAh/g, about 120 mAh/g to about 160 mAh/g, about 120 mAh/g to about 180 mAh/g, about 120 mAh/g to about 200 mAh/g, about 120 mAh/g to about 220 mAh/g, about 120 mAh/g to about 240 mAh/g, about 140 mAh/g to about 160 mAh/g, about 140 mAh/g to about 180 mAh/g, about 140 mAh/g to about 200 mAh/g, about 140 mAh/g to about 220 mAh/g, about 140 mAh/g to about 240 mAh/g, about 160 mAh/g to about 180 mAh/g, about 160 mAh/g to about 200 mAh/g, about 160 mAh/g to about 220 mAh/g, about 160 mAh/g to about 240 mAh/g, about 180 mAh/g to about 200 mAh/g, about 180 mAh/g to about 220 mAh/g, about 180 mAh/g to about 240 mAh/g, about 200 mAh/g to about 220 mAh/g, about 200 mAh/g to about 240 mAh/g, or about 220 mAh/g to about 240 mAh/g. In some embodiments, the energy storage device has a gravimetric capacity at a discharge rate of about 100 C of about 60 mAh/g, about 80 mAh/g, about 100 mAh/g, about 120 mAh/g, about 140 mAh/g, about 160 mAh/g, about 180 mAh/g, about 200 mAh/g, about 220 mAh/g, or about 240 mAh/g. In some embodiments, the energy storage device has a gravimetric capacity at a discharge rate of about 100 C of at least about 80 mAh/g, about 100 mAh/g, about 120 mAh/g, about 140 mAh/g, about 160 mAh/g, about 180 mAh/g, about 200 mAh/g, about 220 mAh/g, or about 240 mAh/g.

In some embodiments, the energy storage device has a gravimetric capacity at a discharge rate of about 160 C of about 45 mAh/g to about 180 mAh/g. In some embodiments, the energy storage device has a gravimetric capacity at a discharge rate of about 160 C of at least about 45 mAh/g. In some embodiments, the energy storage device has a gravimetric capacity at a discharge rate of about 160 C of at most about 180 mAh/g. In some embodiments, the energy storage device has a gravimetric capacity at a discharge rate of about 160 C of about 45 mAh/g to about 50 mAh/g, about 45 mAh/g to about 60 mAh/g, about 45 mAh/g to about 70 mAh/g, about 45 mAh/g to about 80 mAh/g, about 45 mAh/g to about 100 mAh/g, about 45 mAh/g to about 120 mAh/g, about 45 mAh/g to about 130 mAh/g, about 45 mAh/g to about 140 mAh/g, about 45 mAh/g to about 150 mAh/g, about 45 mAh/g to about 160 mAh/g, about 45 mAh/g to about 180 mAh/g, about 50 mAh/g to about 60 mAh/g, about 50 mAh/g to about 70 mAh/g, about 50 mAh/g to about 80 mAh/g, about 50 mAh/g to about 100 mAh/g, about 50 mAh/g to about 120 mAh/g, about 50 mAh/g to about 130 mAh/g, about 50 mAh/g to about 140 mAh/g, about 50 mAh/g to about 150 mAh/g, about 50 mAh/g to about 160 mAh/g, about 50 mAh/g to about 180 mAh/g, about 60 mAh/g to about 70 mAh/g, about 60 mAh/g to about 80 mAh/g, about 60 mAh/g to about 100 mAh/g, about 60 mAh/g to about 120 mAh/g, about 60 mAh/g to about 130 mAh/g, about 60 mAh/g to about 140 mAh/g, about 60 mAh/g to about 150 mAh/g, about 60 mAh/g to about 160 mAh/g, about 60 mAh/g to about 180 mAh/g, about 70 mAh/g to about 80 mAh/g, about 70 mAh/g to about 100 mAh/g, about 70 mAh/g to about 120 mAh/g, about 70 mAh/g to about 130 mAh/g, about 70 mAh/g to about 140 mAh/g, about 70 mAh/g to about 150 mAh/g, about 70 mAh/g to about 160 mAh/g, about 70 mAh/g to about 180 mAh/g, about 80 mAh/g to about 100 mAh/g, about 80 mAh/g to about 120 mAh/g, about 80 mAh/g to about 130 mAh/g, about 80 mAh/g to about 140 mAh/g, about 80 mAh/g to about 150 mAh/g, about 80 mAh/g to about 160 mAh/g, about 80 mAh/g to about 180 mAh/g, about 100 mAh/g to about 120 mAh/g, about 100 mAh/g to about 130 mAh/g, about 100 mAh/g to about 140 mAh/g, about 100 mAh/g to about 150 mAh/g, about 100 mAh/g to about 160 mAh/g, about 100 mAh/g to about 180 mAh/g, about 120 mAh/g to about 130 mAh/g, about 120 mAh/g to about 140 mAh/g, about 120 mAh/g to about 150 mAh/g, about 120 mAh/g to about 160 mAh/g, about 120 mAh/g to about 180 mAh/g, about 130 mAh/g to about 140 mAh/g, about 130 mAh/g to about 150 mAh/g, about 130 mAh/g to about 160 mAh/g, about 130 mAh/g to about 180 mAh/g, about 140 mAh/g to about 150 mAh/g, about 140 mAh/g to about 160 mAh/g, about 140 mAh/g to about 180 mAh/g, about 150 mAh/g to about 160 mAh/g, about 150 mAh/g to about 180 mAh/g, or about 160 mAh/g to about 180 mAh/g. In some embodiments, the energy storage device has a gravimetric capacity at a discharge rate of about 160 C of about 45 mAh/g, about 50 mAh/g, about 60 mAh/g, about 70 mAh/g, about 80 mAh/g, about 100 mAh/g, about 120 mAh/g, about 130 mAh/g, about 140 mAh/g, about 150 mAh/g, about 160 mAh/g, or about 180 mAh/g. In some embodiments, the energy storage device has a gravimetric capacity at a discharge rate of about 160 C of at least about 50 mAh/g, about 60 mAh/g, about 70 mAh/g, about 80 mAh/g, about 100 mAh/g, about 120 mAh/g, about 130 mAh/g, about 140 mAh/g, about 150 mAh/g, about 160 mAh/g, or about 180 mAh/g.

In some embodiments, the energy storage device has a gravimetric capacity at a discharge rate of about 200 C of about 35 mAh/g to about 150 mAh/g. In some embodiments, the energy storage device has a gravimetric capacity at a discharge rate of about 200 C of at least about 35 mAh/g. In some embodiments, the energy storage device has a gravimetric capacity at a discharge rate of about 200 C of at most about 150 mAh/g. In some embodiments, the energy storage device has a gravimetric capacity at a discharge rate of about 200 C of about 35 mAh/g to about 40 mAh/g, about 35 mAh/g to about 50 mAh/g, about 35 mAh/g to about 60 mAh/g, about 35 mAh/g to about 70 mAh/g, about 35 mAh/g to about 80 mAh/g, about 35 mAh/g to about 90 mAh/g, about 35 mAh/g to about 100 mAh/g, about 35 mAh/g to about 120 mAh/g, about 35 mAh/g to about 130 mAh/g, about 35 mAh/g to about 140 mAh/g, about 35 mAh/g to about 150 mAh/g, about 40 mAh/g to about 50 mAh/g, about 40 mAh/g to about 60 mAh/g, about 40 mAh/g to about 70 mAh/g, about 40 mAh/g to about 80 mAh/g, about 40 mAh/g to about 90 mAh/g, about 40 mAh/g to about 100 mAh/g, about 40 mAh/g to about 120 mAh/g, about 40 mAh/g to about 130 mAh/g, about 40 mAh/g to about 140 mAh/g, about 40 mAh/g to about 150 mAh/g, about 50 mAh/g to about 60 mAh/g, about 50 mAh/g to about 70 mAh/g, about 50 mAh/g to about 80 mAh/g, about 50 mAh/g to about 90 mAh/g, about 50 mAh/g to about 100 mAh/g, about 50 mAh/g to about 120 mAh/g, about 50 mAh/g to about 130 mAh/g, about 50 mAh/g to about 140 mAh/g, about 50 mAh/g to about 150 mAh/g, about 60 mAh/g to about 70 mAh/g, about 60 mAh/g to about 80 mAh/g, about 60 mAh/g to about 90 mAh/g, about 60 mAh/g to about 100 mAh/g, about 60 mAh/g to about 120 mAh/g, about 60 mAh/g to about 130 mAh/g, about 60 mAh/g to about 140 mAh/g, about 60 mAh/g to about 150 mAh/g, about 70 mAh/g to about 80 mAh/g, about 70 mAh/g to about 90 mAh/g, about 70 mAh/g to about 100 mAh/g, about 70 mAh/g to about 120 mAh/g, about 70 mAh/g to about 130 mAh/g, about 70 mAh/g to about 140 mAh/g, about 70 mAh/g to about 150 mAh/g, about 80 mAh/g to about 90 mAh/g, about 80 mAh/g to about 100 mAh/g, about 80 mAh/g to about 120 mAh/g, about 80 mAh/g to about 130 mAh/g, about 80 mAh/g to about 140 mAh/g, about 80 mAh/g to about 150 mAh/g, about 90 mAh/g to about 100 mAh/g, about 90 mAh/g to about 120 mAh/g, about 90 mAh/g to about 130 mAh/g, about 90 mAh/g to about 140 mAh/g, about 90 mAh/g to about 150 mAh/g, about 100 mAh/g to about 120 mAh/g, about 100 mAh/g to about 130 mAh/g, about 100 mAh/g to about 140 mAh/g, about 100 mAh/g to about 150 mAh/g, about 120 mAh/g to about 130 mAh/g, about 120 mAh/g to about 140 mAh/g, about 120 mAh/g to about 150 mAh/g, about 130 mAh/g to about 140 mAh/g, about 130 mAh/g to about 150 mAh/g, or about 140 mAh/g to about 150 mAh/g. In some embodiments, the energy storage device has a gravimetric capacity at a discharge rate of about 200 C of about 35 mAh/g, about 40 mAh/g, about 50 mAh/g, about 60 mAh/g, about 70 mAh/g, about 80 mAh/g, about 90 mAh/g, about 100 mAh/g, about 120 mAh/g, about 130 mAh/g, about 140 mAh/g, or about 150 mAh/g. In some embodiments, the energy storage device has a gravimetric capacity at a discharge rate of about 200 C of at least about 40 mAh/g, about 50 mAh/g, about 60 mAh/g, about 70 mAh/g, about 80 mAh/g, about 90 mAh/g, about 100 mAh/g, about 120 mAh/g, about 130 mAh/g, about 140 mAh/g, or about 150 mAh/g.

In some embodiments, the energy storage device has a charge rate of about 5 mAh/g to about 1,600 mAh/g. In some embodiments, the energy storage device has a charge rate of at least about 5 mAh/g. In some embodiments, the energy storage device has a charge rate of at most about 1,600 mAh/g. In some embodiments, the energy storage device has a charge rate of about 5 mAh/g to about 10 mAh/g, about 5 mAh/g to about 20 mAh/g, about 5 mAh/g to about 50 mAh/g, about 5 mAh/g to about 100 mAh/g, about 5 mAh/g to about 200 mAh/g, about 5 mAh/g to about 500 mAh/g, about 5 mAh/g to about 1,000 mAh/g, about 5 mAh/g to about 1,200 mAh/g, about 5 mAh/g to about 1,600 mAh/g, about 10 mAh/g to about 20 mAh/g, about 10 mAh/g to about 50 mAh/g, about 10 mAh/g to about 100 mAh/g, about 10 mAh/g to about 200 mAh/g, about 10 mAh/g to about 500 mAh/g, about 10 mAh/g to about 1,000 mAh/g, about 10 mAh/g to about 1,200 mAh/g, about 10 mAh/g to about 1,600 mAh/g, about 20 mAh/g to about 50 mAh/g, about 20 mAh/g to about 100 mAh/g, about 20 mAh/g to about 200 mAh/g, about 20 mAh/g to about 500 mAh/g, about 20 mAh/g to about 1,000 mAh/g, about 20 mAh/g to about 1,200 mAh/g, about 20 mAh/g to about 1,600 mAh/g, about 50 mAh/g to about 100 mAh/g, about 50 mAh/g to about 200 mAh/g, about 50 mAh/g to about 500 mAh/g, about 50 mAh/g to about 1,000 mAh/g, about 50 mAh/g to about 1,200 mAh/g, about 50 mAh/g to about 1,600 mAh/g, about 100 mAh/g to about 200 mAh/g, about 100 mAh/g to about 500 mAh/g, about 100 mAh/g to about 1,000 mAh/g, about 100 mAh/g to about 1,200 mAh/g, about 100 mAh/g to about 1,600 mAh/g, about 200 mAh/g to about 500 mAh/g, about 200 mAh/g to about 1,000 mAh/g, about 200 mAh/g to about 1,200 mAh/g, about 200 mAh/g to about 1,600 mAh/g, about 500 mAh/g to about 1,000 mAh/g, about 500 mAh/g to about 1,200 mAh/g, about 500 mAh/g to about 1,600 mAh/g, about 1,000 mAh/g to about 1,200 mAh/g, about 1,000 mAh/g to about 1,600 mAh/g, or about 1,200 mAh/g to about 1,600 mAh/g. In some embodiments, the energy storage device has a charge rate of about 5 mAh/g, about 10 mAh/g, about 20 mAh/g, about 50 mAh/g, about 100 mAh/g, about 200 mAh/g, about 500 mAh/g, about 1,000 mAh/g, about 1,200 mAh/g, or about 1,600 mAh/g. In some embodiments, the energy storage device has a charge rate of at least about 10 mAh/g, about 20 mAh/g, about 50 mAh/g, about 100 mAh/g, about 200 mAh/g, about 500 mAh/g, about 1,000 mAh/g, about 1,200 mAh/g, or about 1,600 mAh/g.

In some embodiments, the energy storage device has a recharge time of about 1.5 seconds to about 3,000 seconds. In some embodiments, the energy storage device has a recharge time of at least about 1.5 seconds. In some embodiments, the energy storage device has a recharge time of at most about 3,000 seconds. In some embodiments, the energy storage device has a recharge time of about 1.5 seconds to about 2 seconds, about 1.5 seconds to about 5 seconds, about 1.5 seconds to about 10 seconds, about 1.5 seconds to about 20 seconds, about 1.5 seconds to about 50 seconds, about 1.5 seconds to about 100 seconds, about 1.5 seconds to about 200 seconds, about 1.5 seconds to about 500 seconds, about 1.5 seconds to about 1,000 seconds, about 1.5 seconds to about 2,000 seconds, about 1.5 seconds to about 3,000 seconds, about 2 seconds to about 5 seconds, about 2 seconds to about 10 seconds, about 2 seconds to about 20 seconds, about 2 seconds to about 50 seconds, about 2 seconds to about 100 seconds, about 2 seconds to about 200 seconds, about 2 seconds to about 500 seconds, about 2 seconds to about 1,000 seconds, about 2 seconds to about 2,000 seconds, about 2 seconds to about 3,000 seconds, about 5 seconds to about 10 seconds, about 5 seconds to about 20 seconds, about 5 seconds to about 50 seconds, about 5 seconds to about 100 seconds, about 5 seconds to about 200 seconds, about 5 seconds to about 500 seconds, about 5 seconds to about 1,000 seconds, about 5 seconds to about 2,000 seconds, about 5 seconds to about 3,000 seconds, about 10 seconds to about 20 seconds, about 10 seconds to about 50 seconds, about 10 seconds to about 100 seconds, about 10 seconds to about 200 seconds, about 10 seconds to about 500 seconds, about 10 seconds to about 1,000 seconds, about 10 seconds to about 2,000 seconds, about 10 seconds to about 3,000 seconds, about 20 seconds to about 50 seconds, about 20 seconds to about 100 seconds, about 20 seconds to about 200 seconds, about 20 seconds to about 500 seconds, about 20 seconds to about 1,000 seconds, about 20 seconds to about 2,000 seconds, about 20 seconds to about 3,000 seconds, about 50 seconds to about 100 seconds, about 50 seconds to about 200 seconds, about 50 seconds to about 500 seconds, about 50 seconds to about 1,000 seconds, about 50 seconds to about 2,000 seconds, about 50 seconds to about 3,000 seconds, about 100 seconds to about 200 seconds, about 100 seconds to about 500 seconds, about 100 seconds to about 1,000 seconds, about 100 seconds to about 2,000 seconds, about 100 seconds to about 3,000 seconds, about 200 seconds to about 500 seconds, about 200 seconds to about 1,000 seconds, about 200 seconds to about 2,000 seconds, about 200 seconds to about 3,000 seconds, about 500 seconds to about 1,000 seconds, about 500 seconds to about 2,000 seconds, about 500 seconds to about 3,000 seconds, about 1,000 seconds to about 2,000 seconds, about 1,000 seconds to about 3,000 seconds, or about 2,000 seconds to about 3,000 seconds. In some embodiments, the energy storage device has a recharge time of about 1.5 seconds, about 2 seconds, about 5 seconds, about 10 seconds, about 20 seconds, about 50 seconds, about 100 seconds, about 200 seconds, about 500 seconds, about 1,000 seconds, about 2,000 seconds, or about 3,000 seconds. In some embodiments, the energy storage device has a recharge time of at most about 1.5 seconds, about 2 seconds, about 5 seconds, about 10 seconds, about 20 seconds, about 50 seconds, about 100 seconds, about 200 seconds, about 500 seconds, about 1,000 seconds, about 2,000 seconds, or about 3,000 seconds.

In some embodiments, the energy storage device has an equivalent series resistance in a 18650 form factor of about 2 milliohms to about 10 milliohms. In some embodiments, the energy storage device has an equivalent series resistance in a 18650 form factor of at least about 2 milliohms. In some embodiments, the energy storage device has an equivalent series resistance in a 18650 form factor of at most about 10 milliohms. In some embodiments, the energy storage device has an equivalent series resistance in a 18650 form factor of about 2 milliohms to about 2.5 milliohms, about 2 milliohms to about 3 milliohms, about 2 milliohms to about 3.5 milliohms, about 2 milliohms to about 4 milliohms, about 2 milliohms to about 4.5 milliohms, about 2 milliohms to about 5 milliohms, about 2 milliohms to about 6 milliohms, about 2 milliohms to about 7 milliohms, about 2 milliohms to about 8 milliohms, about 2 milliohms to about 10 milliohms, about 2.5 milliohms to about 3 milliohms, about 2.5 milliohms to about 3.5 milliohms, about 2.5 milliohms to about 4 milliohms, about 2.5 milliohms to about 4.5 milliohms, about 2.5 milliohms to about 5 milliohms, about 2.5 milliohms to about 6 milliohms, about 2.5 milliohms to about 7 milliohms, about 2.5 milliohms to about 8 milliohms, about 2.5 milliohms to about 10 milliohms, about 3 milliohms to about 3.5 milliohms, about 3 milliohms to about 4 milliohms, about 3 milliohms to about 4.5 milliohms, about 3 milliohms to about 5 milliohms, about 3 milliohms to about 6 milliohms, about 3 milliohms to about 7 milliohms, about 3 milliohms to about 8 milliohms, about 3 milliohms to about 10 milliohms, about 3.5 milliohms to about 4 milliohms, about 3.5 milliohms to about 4.5 milliohms, about 3.5 milliohms to about 5 milliohms, about 3.5 milliohms to about 6 milliohms, about 3.5 milliohms to about 7 milliohms, about 3.5 milliohms to about 8 milliohms, about 3.5 milliohms to about 10 milliohms, about 4 milliohms to about 4.5 milliohms, about 4 milliohms to about 5 milliohms, about 4 milliohms to about 6 milliohms, about 4 milliohms to about 7 milliohms, about 4 milliohms to about 8 milliohms, about 4 milliohms to about 10 milliohms, about 4.5 milliohms to about 5 milliohms, about 4.5 milliohms to about 6 milliohms, about 4.5 milliohms to about 7 milliohms, about 4.5 milliohms to about 8 milliohms, about 4.5 milliohms to about 10 milliohms, about 5 milliohms to about 6 milliohms, about 5 milliohms to about 7 milliohms, about 5 milliohms to about 8 milliohms, about 5 milliohms to about 10 milliohms, about 6 milliohms to about 7 milliohms, about 6 milliohms to about 8 milliohms, about 6 milliohms to about 10 milliohms, about 7 milliohms to about 8 milliohms, about 7 milliohms to about 10 milliohms, or about 8 milliohms to about 10 milliohms. In some embodiments, the energy storage device has an equivalent series resistance in a 18650 form factor of about 2 milliohms, about 2.5 milliohms, about 3 milliohms, about 3.5 milliohms, about 4 milliohms, about 4.5 milliohms, about 5 milliohms, about 6 milliohms, about 7 milliohms, about 8 milliohms, or about 10 milliohms. In some embodiments, the energy storage device has an equivalent series resistance in a 18650 form factor of at most about 2 milliohms, about 2.5 milliohms, about 3 milliohms, about 3.5 milliohms, about 4 milliohms, about 4.5 milliohms, about 5 milliohms, about 6 milliohms, about 7 milliohms, or about 8 milliohms.

In some embodiments, the energy storage device has a charge/discharge lifetime of about 500 cycles to about 10,000 cycles. In some embodiments, the energy storage device has a charge/discharge lifetime of at least about 500 cycles. In some embodiments, the energy storage device has a charge/discharge lifetime of at most about 10,000 cycles. In some embodiments, the energy storage device has a charge/discharge lifetime of about 500 cycles to about 600 cycles, about 500 cycles to about 700 cycles, about 500 cycles to about 800 cycles, about 500 cycles to about 1,000 cycles, about 500 cycles to about 2,000 cycles, about 500 cycles to about 3,000 cycles, about 500 cycles to about 5,000 cycles, about 500 cycles to about 6,000 cycles, about 500 cycles to about 7,000 cycles, about 500 cycles to about 8,000 cycles, about 500 cycles to about 10,000 cycles, about 600 cycles to about 700 cycles, about 600 cycles to about 800 cycles, about 600 cycles to about 1,000 cycles, about 600 cycles to about 2,000 cycles, about 600 cycles to about 3,000 cycles, about 600 cycles to about 5,000 cycles, about 600 cycles to about 6,000 cycles, about 600 cycles to about 7,000 cycles, about 600 cycles to about 8,000 cycles, about 600 cycles to about 10,000 cycles, about 700 cycles to about 800 cycles, about 700 cycles to about 1,000 cycles, about 700 cycles to about 2,000 cycles, about 700 cycles to about 3,000 cycles, about 700 cycles to about 5,000 cycles, about 700 cycles to about 6,000 cycles, about 700 cycles to about 7,000 cycles, about 700 cycles to about 8,000 cycles, about 700 cycles to about 10,000 cycles, about 800 cycles to about 1,000 cycles, about 800 cycles to about 2,000 cycles, about 800 cycles to about 3,000 cycles, about 800 cycles to about 5,000 cycles, about 800 cycles to about 6,000 cycles, about 800 cycles to about 7,000 cycles, about 800 cycles to about 8,000 cycles, about 800 cycles to about 10,000 cycles, about 1,000 cycles to about 2,000 cycles, about 1,000 cycles to about 3,000 cycles, about 1,000 cycles to about 5,000 cycles, about 1,000 cycles to about 6,000 cycles, about 1,000 cycles to about 7,000 cycles, about 1,000 cycles to about 8,000 cycles, about 1,000 cycles to about 10,000 cycles, about 2,000 cycles to about 3,000 cycles, about 2,000 cycles to about 5,000 cycles, about 2,000 cycles to about 6,000 cycles, about 2,000 cycles to about 7,000 cycles, about 2,000 cycles to about 8,000 cycles, about 2,000 cycles to about 10,000 cycles, about 3,000 cycles to about 5,000 cycles, about 3,000 cycles to about 6,000 cycles, about 3,000 cycles to about 7,000 cycles, about 3,000 cycles to about 8,000 cycles, about 3,000 cycles to about 10,000 cycles, about 5,000 cycles to about 6,000 cycles, about 5,000 cycles to about 7,000 cycles, about 5,000 cycles to about 8,000 cycles, about 5,000 cycles to about 10,000 cycles, about 6,000 cycles to about 7,000 cycles, about 6,000 cycles to about 8,000 cycles, about 6,000 cycles to about 10,000 cycles, about 7,000 cycles to about 8,000 cycles, about 7,000 cycles to about 10,000 cycles, or about 8,000 cycles to about 10,000 cycles. In some embodiments, the energy storage device has a charge/discharge lifetime of about 500 cycles, about 600 cycles, about 700 cycles, about 800 cycles, about 1,000 cycles, about 2,000 cycles, about 3,000 cycles, about 5,000 cycles, about 6,000 cycles, about 7,000 cycles, about 8,000 cycles, or about 10,000 cycles. In some embodiments, the energy storage device has a charge/discharge lifetime of at least about 600 cycles, about 700 cycles, about 800 cycles, about 1,000 cycles, about 2,000 cycles, about 3,000 cycles, about 5,000 cycles, about 6,000 cycles, about 7,000 cycles, about 8,000 cycles, or about 10,000 cycles.

In some embodiments, the energy storage device has at least one of a capacity, a power density, and an energy density that diminishes after about 10,000 cycles by about 10% to about 30%. In some embodiments, the energy storage device has at least one of a capacity, a power density, and an energy density that diminishes after about 10,000 cycles by at least about 10%. In some embodiments, the energy storage device has at least one of a capacity, a power density, and an energy density that diminishes after about 10,000 cycles by at most about 30%. In some embodiments, the energy storage device has at least one of a capacity, a power density, and an energy density that diminishes after about 10,000 cycles by about 10% to about 12%, about 10% to about 14%, about 10% to about 16%, about 10% to about 18%, about 10% to about 20%, about 10% to about 22%, about 10% to about 24%, about 10% to about 26%, about 10% to about 28%, about 10% to about 30%, about 12% to about 14%, about 12% to about 16%, about 12% to about 18%, about 12% to about 20%, about 12% to about 22%, about 12% to about 24%, about 12% to about 26%, about 12% to about 28%, about 12% to about 30%, about 14% to about 16%, about 14% to about 18%, about 14% to about 20%, about 14% to about 22%, about 14% to about 24%, about 14% to about 26%, about 14% to about 28%, about 14% to about 30%, about 16% to about 18%, about 16% to about 20%, about 16% to about 22%, about 16% to about 24%, about 16% to about 26%, about 16% to about 28%, about 16% to about 30%, about 18% to about 20%, about 18% to about 22%, about 18% to about 24%, about 18% to about 26%, about 18% to about 28%, about 18% to about 30%, about 20% to about 22%, about 20% to about 24%, about 20% to about 26%, about 20% to about 28%, about 20% to about 30%, about 22% to about 24%, about 22% to about 26%, about 22% to about 28%, about 22% to about 30%, about 24% to about 26%, about 24% to about 28%, about 24% to about 30%, about 26% to about 28%, about 26% to about 30%, or about 28% to about 30%. In some embodiments, the energy storage device has at least one of a capacity, a power density, and an energy density that diminishes after about 10,000 cycles by about 10%, about 12%, about 14%, about 16%, about 18%, about 20%, about 22%, about 24%, about 26%, about 28%, or about 30%. In some embodiments, the energy storage device has at least one of a capacity, a power density, and an energy density that diminishes after about 10,000 cycles by at most about 10%, about 12%, about 14%, about 16%, about 18%, about 20%, about 22%, about 24%, about 26%, or about 28%.

In some embodiments, the energy storage device is not a lithium-ion battery, a lithium-ion capacitor, an alkaline supercapacitor, a nickel-cadmium battery, a nickel-metal-hydride battery, a lead-acid battery, or a nickel-zinc battery.

A fourth aspect provided herein is a method of forming an electrode comprising: forming a solution; stirring the solution; heating the solution; cooling the solution; rinsing the solution in a solvent; and freeze-drying the solution.

In some embodiments, the solution comprises a reducing agent, a deliquescence, and a carbon-based dispersion. In some embodiments, the reducing agent comprises urea, citric acid, ascorbic acid, hydrazine hydrate, hydroquinone, sodium borohydride, hydrogen bromide, hydrogen iodide, or any combination thereof. In some embodiments, the strong base comprises urea. In some embodiments, the strong base comprises hydroquinone. In some embodiments, the strong base comprises ascorbic acid.

In some embodiments, the deliquescence comprises a salt. In some embodiments, the salt comprises a citrate salt, a chloride salt, a nitrate salt, or any combination thereof. In some embodiments, the citrate salt comprises zinc(III) citrate, zinc(III) citrate hexahydrate, iron(III) citrate, iron(III) citrate hexahydrate, or any combination thereof. In some embodiments, the chloride salt comprises zinc(III) chloride, zinc(III) nitrate hexahydrate, iron(III) chloride, iron(III) chloride hexahydrate, or any combination thereof. In some embodiments, the nitrate salt comprises zinc(III) nitrate, zinc(III) nitrate hexahydrate, iron(III) nitrate, iron(III) nitrate hexahydrate, or any combination thereof. In some embodiments, the deliquescence comprises zinc(III) nitrate hexahydrate. In some embodiments, the deliquescence comprises iron(III) nitrate. In some embodiments, the deliquescence comprises zinc (II) nitrate hexahydrate.

In some embodiments, the carbon-based dispersion comprises a carbon-based foam, a carbon-based aerogel, a carbon-based hydrogel, a carbon-based ionogel, carbon-based nanosheets, carbon nanotubes, carbon nanosheets, carbon cloth, or any combination thereof. In some embodiments, the carbon-based dispersion comprises graphene, graphene oxide, graphite, activated carbon, carbon black, or any combination thereof. In some embodiments, the carbon-based dispersion comprises carbon nanotubes. In some embodiments, the carbon-based dispersion comprises graphene oxide. In some embodiments, the carbon-based dispersion comprises activated carbon.

In some embodiments, the mass percentage of the reducing agent in the solution is about 30% to about 90%. In some embodiments, the mass percentage of the reducing agent in the solution is at least about 30%. In some embodiments, the mass percentage of the reducing agent in the solution is at most about 90%. In some embodiments, the mass percentage of the reducing agent in the solution is about 30% to about 35%, about 30% to about 40%, about 30% to about 45%, about 30% to about 50%, about 30% to about 55%, about 30% to about 60%, about 30% to about 65%, about 30% to about 70%, about 30% to about 75%, about 30% to about 80%, about 30% to about 90%, about 35% to about 40%, about 35% to about 45%, about 35% to about 50%, about 35% to about 55%, about 35% to about 60%, about 35% to about 65%, about 35% to about 70%, about 35% to about 75%, about 35% to about 80%, about 35% to about 90%, about 40% to about 45%, about 40% to about 50%, about 40% to about 55%, about 40% to about 60%, about 40% to about 65%, about 40% to about 70%, about 40% to about 75%, about 40% to about 80%, about 40% to about 90%, about 45% to about 50%, about 45% to about 55%, about 45% to about 60%, about 45% to about 65%, about 45% to about 70%, about 45% to about 75%, about 45% to about 80%, about 45% to about 90%, about 50% to about 55%, about 50% to about 60%, about 50% to about 65%, about 50% to about 70%, about 50% to about 75%, about 50% to about 80%, about 50% to about 90%, about 55% to about 60%, about 55% to about 65%, about 55% to about 70%, about 55% to about 75%, about 55% to about 80%, about 55% to about 90%, about 60% to about 65%, about 60% to about 70%, about 60% to about 75%, about 60% to about 80%, about 60% to about 90%, about 65% to about 70%, about 65% to about 75%, about 65% to about 80%, about 65% to about 90%, about 70% to about 75%, about 70% to about 80%, about 70% to about 90%, about 75% to about 80%, about 75% to about 90%, or about 80% to about 90%. In some embodiments, the mass percentage of the reducing agent in the solution is about 30%, about 35%, about 40%, about 45%, about 50%, about 55%, about 60%, about 65%, about 70%, about 75%, about 80%, or about 90%. In some embodiments, the mass percentage of the reducing agent in the solution is at least about 35%, about 40%, about 45%, about 50%, about 55%, about 60%, about 65%, about 70%, about 75%, about 80%, or about 90%. In some embodiments, the mass percentage of the reducing agent in the solution is at most about 30%, about 35%, about 40%, about 45%, about 50%, about 55%, about 60%, about 65%, about 70%, about 75%, or about 80%.

In some embodiments, the mass percentage of the deliquescence in the solution is about 5% to about 30%. In some embodiments, the mass percentage of the deliquescence in the solution is at least about 5%. In some embodiments, the mass percentage of the deliquescence in the solution is at most about 30%. In some embodiments, the mass percentage of the deliquescence in the solution is about 5% to about 6%, about 5% to about 8%, about 5% to about 10%, about 5% to about 12%, about 5% to about 14%, about 5% to about 16%, about 5% to about 18%, about 5% to about 20%, about 5% to about 25%, about 5% to about 30%, about 6% to about 8%, about 6% to about 10%, about 6% to about 12%, about 6% to about 14%, about 6% to about 16%, about 6% to about 18%, about 6% to about 20%, about 6% to about 25%, about 6% to about 30%, about 8% to about 10%, about 8% to about 12%, about 8% to about 14%, about 8% to about 16%, about 8% to about 18%, about 8% to about 20%, about 8% to about 25%, about 8% to about 30%, about 10% to about 12%, about 10% to about 14%, about 10% to about 16%, about 10% to about 18%, about 10% to about 20%, about 10% to about 25%, about 10% to about 30%, about 12% to about 14%, about 12% to about 16%, about 12% to about 18%, about 12% to about 20%, about 12% to about 25%, about 12% to about 30%, about 14% to about 16%, about 14% to about 18%, about 14% to about 20%, about 14% to about 25%, about 14% to about 30%, about 16% to about 18%, about 16% to about 20%, about 16% to about 25%, about 16% to about 30%, about 18% to about 20%, about 18% to about 25%, about 18% to about 30%, about 20% to about 25%, about 20% to about 30%, or about 25% to about 30%. In some embodiments, the mass percentage of the deliquescence in the solution is about 5%, about 6%, about 8%, about 10%, about 12%, about 14%, about 16%, about 18%, about 20%, about 25%, or about 30%. In some embodiments, the mass percentage of the deliquescence in the solution is at least about 6%, about 8%, about 10%, about 12%, about 14%, about 16%, about 18%, about 20%, about 25%, or about 30%. In some embodiments, the mass percentage of the deliquescence in the solution is at most about 5%, about 6%, about 8%, about 10%, about 12%, about 14%, about 16%, about 18%, about 20%, or about 25%.

In some embodiments, the mass percentage of the carbon-based dispersion in the solution is about 10% to about 40%. In some embodiments, the mass percentage of the carbon-based dispersion in the solution is at least about 10%. In some embodiments, the mass percentage of the carbon-based dispersion in the solution is at most about 40%. In some embodiments, the mass percentage of the carbon-based dispersion in the solution is about 10% to about 12%, about 10% to about 14%, about 10% to about 16%, about 10% to about 18%, about 10% to about 20%, about 10% to about 24%, about 10% to about 28%, about 10% to about 32%, about 10% to about 34%, about 10% to about 40%, about 12% to about 14%, about 12% to about 16%, about 12% to about 18%, about 12% to about 20%, about 12% to about 24%, about 12% to about 28%, about 12% to about 32%, about 12% to about 34%, about 12% to about 40%, about 14% to about 16%, about 14% to about 18%, about 14% to about 20%, about 14% to about 24%, about 14% to about 28%, about 14% to about 32%, about 14% to about 34%, about 14% to about 40%, about 16% to about 18%, about 16% to about 20%, about 16% to about 24%, about 16% to about 28%, about 16% to about 32%, about 16% to about 34%, about 16% to about 40%, about 18% to about 20%, about 18% to about 24%, about 18% to about 28%, about 18% to about 32%, about 18% to about 34%, about 18% to about 40%, about 20% to about 24%, about 20% to about 28%, about 20% to about 32%, about 20% to about 34%, about 20% to about 40%, about 24% to about 28%, about 24% to about 32%, about 24% to about 34%, about 24% to about 40%, about 28% to about 32%, about 28% to about 34%, about 28% to about 40%, about 32% to about 34%, about 32% to about 40%, or about 34% to about 40%. In some embodiments, the mass percentage of the carbon-based dispersion in the solution is about 10%, about 12%, about 14%, about 16%, about 18%, about 20%, about 24%, about 28%, about 32%, about 34%, or about 40%. In some embodiments, the mass percentage of the carbon-based dispersion in the solution is at least about 12%, about 14%, about 16%, about 18%, about 20%, about 24%, about 28%, about 32%, about 34%, or about 40%. In some embodiments, the mass percentage of the carbon-based dispersion in the solution is at most about 10%, about 12%, about 14%, about 16%, about 18%, about 20%, about 24%, about 28%, about 32%, or about 34%.

In some embodiments, the solution is stirred for a period of time of about 10 minutes to about 60 minutes. In some embodiments, the solution is stirred for a period of time of at least about 10 minutes. In some embodiments, the solution is stirred for a period of time of at most about 60 minutes. In some embodiments, the solution is stirred for a period of time of about 10 minutes to about 15 minutes, about 10 minutes to about 20 minutes, about 10 minutes to about 25 minutes, about 10 minutes to about 30 minutes, about 10 minutes to about 35 minutes, about 10 minutes to about 40 minutes, about 10 minutes to about 45 minutes, about 10 minutes to about 50 minutes, about 10 minutes to about 55 minutes, about 10 minutes to about 60 minutes, about 15 minutes to about 20 minutes, about 15 minutes to about 25 minutes, about 15 minutes to about 30 minutes, about 15 minutes to about 35 minutes, about 15 minutes to about 40 minutes, about 15 minutes to about 45 minutes, about 15 minutes to about 50 minutes, about 15 minutes to about 55 minutes, about 15 minutes to about 60 minutes, about 20 minutes to about 25 minutes, about 20 minutes to about 30 minutes, about 20 minutes to about 35 minutes, about 20 minutes to about 40 minutes, about 20 minutes to about 45 minutes, about 20 minutes to about 50 minutes, about 20 minutes to about 55 minutes, about 20 minutes to about 60 minutes, about 25 minutes to about 30 minutes, about 25 minutes to about 35 minutes, about 25 minutes to about 40 minutes, about 25 minutes to about 45 minutes, about 25 minutes to about 50 minutes, about 25 minutes to about 55 minutes, about 25 minutes to about 60 minutes, about 30 minutes to about 35 minutes, about 30 minutes to about 40 minutes, about 30 minutes to about 45 minutes, about 30 minutes to about 50 minutes, about 30 minutes to about 55 minutes, about 30 minutes to about 60 minutes, about 35 minutes to about 40 minutes, about 35 minutes to about 45 minutes, about 35 minutes to about 50 minutes, about 35 minutes to about 55 minutes, about 35 minutes to about 60 minutes, about 40 minutes to about 45 minutes, about 40 minutes to about 50 minutes, about 40 minutes to about 55 minutes, about 40 minutes to about 60 minutes, about 45 minutes to about 50 minutes, about 45 minutes to about 55 minutes, about 45 minutes to about 60 minutes, about 50 minutes to about 55 minutes, about 50 minutes to about 60 minutes, or about 55 minutes to about 60 minutes. In some embodiments, the solution is stirred for a period of time of about 10 minutes, about 15 minutes, about 20 minutes, about 25 minutes, about 30 minutes, about 35 minutes, about 40 minutes, about 45 minutes, about 50 minutes, about 55 minutes, or about 60 minutes. In some embodiments, the solution is stirred for a period of time of at least about 15 minutes, about 20 minutes, about 25 minutes, about 30 minutes, about 35 minutes, about 40 minutes, about 45 minutes, about 50 minutes, about 55 minutes, or about 60 minutes. In some embodiments, the solution is stirred for a period of time of at most about 10 minutes, about 15 minutes, about 20 minutes, about 25 minutes, about 30 minutes, about 35 minutes, about 40 minutes, about 45 minutes, about 50 minutes, or about 55 minutes.

In some embodiments, the solution is heated by an autoclave, an oven, a fire, a Bunsen burner, a heat exchanger, a microwave, or any combination thereof.

In some embodiments, the solution is heated at a temperature of about 80° C. to about 360° C. In some embodiments, the solution is heated at a temperature of at least about 80° C. In some embodiments, the solution is heated at a temperature of at most about 360° C. In some embodiments, the solution is heated at a temperature of about 80° C. to about 100° C., about 80° C. to about 120° C., about 80° C. to about 140° C., about 80° C. to about 160° C., about 80° C. to about 180° C., about 80° C. to about 200° C., about 80° C. to about 240° C., about 80° C. to about 280° C., about 80° C. to about 320° C., about 80° C. to about 360° C., about 100° C. to about 120° C., about 100° C. to about 140° C., about 100° C. to about 160° C., about 100° C. to about 180° C., about 100° C. to about 200° C., about 100° C. to about 240° C., about 100° C. to about 280° C., about 100° C. to about 320° C., about 100° C. to about 360° C., about 120° C. to about 140° C., about 120° C. to about 160° C., about 120° C. to about 180° C., about 120° C. to about 200° C., about 120° C. to about 240° C., about 120° C. to about 280° C., about 120° C. to about 320° C., about 120° C. to about 360° C., about 140° C. to about 160° C., about 140° C. to about 180° C., about 140° C. to about 200° C., about 140° C. to about 240° C., about 140° C. to about 280° C., about 140° C. to about 320° C., about 140° C. to about 360° C., about 160° C. to about 180° C., about 160° C. to about 200° C., about 160° C. to about 240° C., about 160° C. to about 280° C., about 160° C. to about 320° C., about 160° C. to about 360° C., about 180° C. to about 200° C., about 180° C. to about 240° C., about 180° C. to about 280° C., about 180° C. to about 320° C., about 180° C. to about 360° C., about 200° C. to about 240° C., about 200° C. to about 280° C., about 200° C. to about 320° C., about 200° C. to about 360° C., about 240° C. to about 280° C., about 240° C. to about 320° C., about 240° C. to about 360° C., about 280° C. to about 320° C., about 280° C. to about 360° C., or about 320° C. to about 360° C. In some embodiments, the solution is heated at a temperature of about 80° C., about 100° C., about 120° C., about 140° C., about 160° C., about 180° C., about 200° C., about 240° C., about 280° C., about 320° C., or about 360° C. In some embodiments, the solution is heated at a temperature of at least about 100° C., about 120° C., about 140° C., about 160° C., about 180° C., about 200° C., about 240° C., about 280° C., about 320° C., or about 360° C. In some embodiments, the solution is heated at a temperature of at most about 80° C., about 100° C., about 120° C., about 140° C., about 160° C., about 180° C., about 200° C., about 240° C., about 280° C., or about 320° C.

In some embodiments, the solution is heated for a period of time of about 4 hours to about 16 hours. In some embodiments, the solution is heated for a period of time of at least about 4 hours. In some embodiments, the solution is heated for a period of time of at most about 16 hours. In some embodiments, the solution is heated for a period of time of about 4 hours to about 5 hours, about 4 hours to about 6 hours, about 4 hours to about 7 hours, about 4 hours to about 8 hours, about 4 hours to about 9 hours, about 4 hours to about 10 hours, about 4 hours to about 11 hours, about 4 hours to about 12 hours, about 4 hours to about 13 hours, about 4 hours to about 14 hours, about 4 hours to about 16 hours, about 5 hours to about 6 hours, about 5 hours to about 7 hours, about 5 hours to about 8 hours, about 5 hours to about 9 hours, about 5 hours to about 10 hours, about 5 hours to about 11 hours, about 5 hours to about 12 hours, about 5 hours to about 13 hours, about 5 hours to about 14 hours, about 5 hours to about 16 hours, about 6 hours to about 7 hours, about 6 hours to about 8 hours, about 6 hours to about 9 hours, about 6 hours to about 10 hours, about 6 hours to about 11 hours, about 6 hours to about 12 hours, about 6 hours to about 13 hours, about 6 hours to about 14 hours, about 6 hours to about 16 hours, about 7 hours to about 8 hours, about 7 hours to about 9 hours, about 7 hours to about 10 hours, about 7 hours to about 11 hours, about 7 hours to about 12 hours, about 7 hours to about 13 hours, about 7 hours to about 14 hours, about 7 hours to about 16 hours, about 8 hours to about 9 hours, about 8 hours to about 10 hours, about 8 hours to about 11 hours, about 8 hours to about 12 hours, about 8 hours to about 13 hours, about 8 hours to about 14 hours, about 8 hours to about 16 hours, about 9 hours to about 10 hours, about 9 hours to about 11 hours, about 9 hours to about 12 hours, about 9 hours to about 13 hours, about 9 hours to about 14 hours, about 9 hours to about 16 hours, about 10 hours to about 11 hours, about 10 hours to about 12 hours, about 10 hours to about 13 hours, about 10 hours to about 14 hours, about 10 hours to about 16 hours, about 11 hours to about 12 hours, about 11 hours to about 13 hours, about 11 hours to about 14 hours, about 11 hours to about 16 hours, about 12 hours to about 13 hours, about 12 hours to about 14 hours, about 12 hours to about 16 hours, about 13 hours to about 14 hours, about 13 hours to about 16 hours, or about 14 hours to about 16 hours. In some embodiments, the solution is heated for a period of time of about 4 hours, about 5 hours, about 6 hours, about 7 hours, about 8 hours, about 9 hours, about 10 hours, about 11 hours, about 12 hours, about 13 hours, about 14 hours, or about 16 hours. In some embodiments, the solution is heated for a period of time of at least about 5 hours, about 6 hours, about 7 hours, about 8 hours, about 9 hours, about 10 hours, about 11 hours, about 12 hours, about 13 hours, about 14 hours, or about 16 hours. In some embodiments, the solution is heated for a period of time of at most about 4 hours, about 5 hours, about 6 hours, about 7 hours, about 8 hours, about 9 hours, about 10 hours, about 11 hours, about 12 hours, about 13 hours, or about 14 hours.

In some embodiments, the solvent comprises deionized water, acetone, water, or any combination thereof. In some embodiments, the solvent comprises deionized water. In some embodiments, the solution is freeze-dried. In some embodiments, the solution is freeze-dried. In some embodiments, the solution is freeze-dried under vacuum.

In some embodiments, the first electrode is configured to be employed as the positive electrode. In some embodiments, the first electrode is configured to be employed as the negative electrode.

A fifth aspect provided herein is a method of forming an electrode comprising forming a second current collector by treating a conductive scaffold in an acid; washing the second current collector in a solvent comprising deionized water, acetone, water, or any combination thereof; depositing a hydroxide onto the second current collector; and submitting the electrode to consecutive potential sweeps.

In some embodiments, the conductive scaffold comprises a conductive foam, a graphene aerogel, amorphous carbon foam, thin-layer graphite foam, carbon nanotubes, carbon nanosheets, or any combination thereof. In some embodiments, the conductive foam comprises aluminum foam, carbon foam, graphene foam, graphite foam, copper foam, nickel foam, palladium foam, platinum foam, steel foam, or any combination thereof. In some embodiments, the conductive foam comprises graphene foam. In some embodiments, the conductive foam comprises graphite foam. In some embodiments, the conductive foam comprises copper foam. In some embodiments, the conductive foam comprises nickel foam.

In some embodiments, the acid comprises a strong acid. In some embodiments, the acid comprises perchloric acid, hydobromic acid, hydroiodic acid, sulfuric acid, methanesolfonic acid, p-toluenesolfonic acid, hydrochloric acid, or any combination thereof. In some embodiments, the acid comprises hydobromic acid. In some embodiments, the acid comprises hydrochloric acid.

In some embodiments, the acid has a concentration of about 1 M to about 6 M. In some embodiments, the acid has a concentration of at least about 1 M. In some embodiments, the acid has a concentration of at most about 6 M. In some embodiments, the acid has a concentration of about 1 M to about 1.5 M, about 1 M to about 2 M, about 1 M to about 2.5 M, about 1 M to about 3 M, about 1 M to about 3.5 M, about 1 M to about 4 M, about 1 M to about 4.5 M, about 1 M to about 5 M, about 1 M to about 5.5 M, about 1 M to about 6 M, about 1.5 M to about 2 M, about 1.5 M to about 2.5 M, about 1.5 M to about 3 M, about 1.5 M to about 3.5 M, about 1.5 M to about 4 M, about 1.5 M to about 4.5 M, about 1.5 M to about 5 M, about 1.5 M to about 5.5 M, about 1.5 M to about 6 M, about 2 M to about 2.5 M, about 2 M to about 3 M, about 2 M to about 3.5 M, about 2 M to about 4 M, about 2 M to about 4.5 M, about 2 M to about 5 M, about 2 M to about 5.5 M, about 2 M to about 6 M, about 2.5 M to about 3 M, about 2.5 M to about 3.5 M, about 2.5 M to about 4 M, about 2.5 M to about 4.5 M, about 2.5 M to about 5 M, about 2.5 M to about 5.5 M, about 2.5 M to about 6 M, about 3 M to about 3.5 M, about 3 M to about 4 M, about 3 M to about 4.5 M, about 3 M to about 5 M, about 3 M to about 5.5 M, about 3 M to about 6 M, about 3.5 M to about 4 M, about 3.5 M to about 4.5 M, about 3.5 M to about 5 M, about 3.5 M to about 5.5 M, about 3.5 M to about 6 M, about 4 M to about 4.5 M, about 4 M to about 5 M, about 4 M to about 5.5 M, about 4 M to about 6 M, about 4.5 M to about 5 M, about 4.5 M to about 5.5 M, about 4.5 M to about 6 M, about 5 M to about 5.5 M, about 5 M to about 6 M, or about 5.5 M to about 6 M. In some embodiments, the acid has a concentration of about 1 M, about 1.5 M, about 2 M, about 2.5 M, about 3 M, about 3.5 M, about 4 M, about 4.5 M, about 5 M, about 5.5 M, or about 6 M. In some embodiments, the acid has a concentration of at least about 1.5 M, about 2 M, about 2.5 M, about 3 M, about 3.5 M, about 4 M, about 4.5 M, about 5 M, about 5.5 M, or about 6 M. In some embodiments, the acid has a concentration of at most about 1 M, about 1.5 M, about 2 M, about 2.5 M, about 3 M, about 3.5 M, about 4 M, about 4.5 M, about 5 M, or about 5.5 M.

In some embodiments, the conductive foam is treated for a period of time of about 1 minute to about 30 minutes. In some embodiments, the conductive foam is treated for a period of time of at least about 1 minute. In some embodiments, the conductive foam is treated for a period of time of at most about 30 minutes. In some embodiments, the conductive foam is treated for a period of time of about 1 minute to about 2 minutes, about 1 minute to about 4 minutes, about 1 minute to about 6 minutes, about 1 minute to about 8 minutes, about 1 minute to about 10 minutes, about 1 minute to about 14 minutes, about 1 minute to about 18 minutes, about 1 minute to about 22 minutes, about 1 minute to about 26 minutes, about 1 minute to about 30 minutes, about 2 minutes to about 4 minutes, about 2 minutes to about 6 minutes, about 2 minutes to about 8 minutes, about 2 minutes to about 10 minutes, about 2 minutes to about 14 minutes, about 2 minutes to about 18 minutes, about 2 minutes to about 22 minutes, about 2 minutes to about 26 minutes, about 2 minutes to about 30 minutes, about 4 minutes to about 6 minutes, about 4 minutes to about 8 minutes, about 4 minutes to about 10 minutes, about 4 minutes to about 14 minutes, about 4 minutes to about 18 minutes, about 4 minutes to about 22 minutes, about 4 minutes to about 26 minutes, about 4 minutes to about 30 minutes, about 6 minutes to about 8 minutes, about 6 minutes to about 10 minutes, about 6 minutes to about 14 minutes, about 6 minutes to about 18 minutes, about 6 minutes to about 22 minutes, about 6 minutes to about 26 minutes, about 6 minutes to about 30 minutes, about 8 minutes to about 10 minutes, about 8 minutes to about 14 minutes, about 8 minutes to about 18 minutes, about 8 minutes to about 22 minutes, about 8 minutes to about 26 minutes, about 8 minutes to about 30 minutes, about 10 minutes to about 14 minutes, about 10 minutes to about 18 minutes, about 10 minutes to about 22 minutes, about 10 minutes to about 26 minutes, about 10 minutes to about 30 minutes, about 14 minutes to about 18 minutes, about 14 minutes to about 22 minutes, about 14 minutes to about 26 minutes, about 14 minutes to about 30 minutes, about 18 minutes to about 22 minutes, about 18 minutes to about 26 minutes, about 18 minutes to about 30 minutes, about 22 minutes to about 26 minutes, about 22 minutes to about 30 minutes, or about 26 minutes to about 30 minutes. In some embodiments, the conductive foam is treated for a period of time of about 1 minute, about 2 minutes, about 4 minutes, about 6 minutes, about 8 minutes, about 10 minutes, about 14 minutes, about 18 minutes, about 22 minutes, about 26 minutes, or about 30 minutes. In some embodiments, the conductive foam is treated for a period of time of at least about 2 minutes, about 4 minutes, about 6 minutes, about 8 minutes, about 10 minutes, about 14 minutes, about 18 minutes, about 22 minutes, about 26 minutes, or about 30 minutes. In some embodiments, the conductive foam is treated for a period of time of at most about 1 minute, about 2 minutes, about 4 minutes, about 6 minutes, about 8 minutes, about 10 minutes, about 14 minutes, about 18 minutes, about 22 minutes, or about 26 minutes.

In some embodiments, the conductive foam is washed in deionized water, acetone, water, or any combination thereof. In some embodiments, the conductive foam is washed in deionized water.

In some embodiments, the hydroxide comprises aluminum hydroxide, ammonium hydroxide, arsenic hydroxide, barium hydroxide, beryllium hydroxide, bismuth(III) hydroxide, boron hydroxide, cadmium hydroxide, calcium hydroxide, cerium(III) hydroxide, cesium hydroxide, chromium(II) hydroxide, chromium(III) hydroxide, chromium (V) hydroxide, chromium(VI) hydroxide, cobalt(II) hydroxide, cobalt(III) hydroxide, copper(I) hydroxide, copper(II) hydroxide, gallium(II) hydroxide, gallium(III) hydroxide, gold(I) hydroxide, gold(III) hydroxide, indium(I) hydroxide, indium(II) hydroxide, indium(III) hydroxide, iridium(III) hydroxide, iron(II) hydroxide, iron(III) hydroxide, lanthanum hydroxide, lead(II) hydroxide, lead(IV) hydroxide, lithium hydroxide, magnesium hydroxide, manganese(II) hydroxide, manganese(III) hydroxide, manganese(IV) hydroxide, manganese(VII) hydroxide, mercury(I) hydroxide, mercury(II) hydroxide, molybdenum hydroxide, neodymium hydroxide, nickel oxo-hydroxide, nickel(II) hydroxide, nickel(III) hydroxide, niobium hydroxide, osmium(IV) hydroxide, palladium(II) hydroxide, palladium(IV) hydroxide, platinum(II) hydroxide, platinum(IV) hydroxide, plutonium(IV) hydroxide, potassium hydroxide, radium hydroxide, rubidium hydroxide, ruthenium(III) hydroxide, scandium hydroxide, silicon hydroxide, silver hydroxide, sodium hydroxide, strontium hydroxide, tantalum(V) hydroxide, technetium(II) hydroxide, tetramethylammonium hydroxide, thallium(I) hydroxide, thallium(III) hydroxide, thorium hydroxide, tin(II) hydroxide, tin(IV) hydroxide, titanium(II) hydroxide, titanium(III) hydroxide, titanium(IV) hydroxide, tungsten(II) hydroxide, uranyl hydroxide, vanadium(II) hydroxide, vanadium(III) hydroxide, vanadium(V) hydroxide, ytterbium hydroxide, yttrium hydroxide, zinc hydroxide, zirconium hydroxide, or any combination thereof. In some embodiments, the hydroxide comprises nickel(II) hydroxide. In some embodiments, the hydroxide comprises nickel(III) hydroxide. In some embodiments, the hydroxide comprises palladium(II) hydroxide. In some embodiments, the hydroxide comprises palladium(IV) hydroxide. In some embodiments, the hydroxide comprises copper(I) hydroxide. In some embodiments, the hydroxide comprises copper(II) hydroxide.

In some embodiments, the hydroxide comprises hydroxide nanoflakes, hydroxide nanoparticles, hydroxide nanopowder, hydroxide nanoflowers, hydroxide nanodots, hydroxide nanorods, hydroxide nanochains, hydroxide nanofibers, hydroxide nanoparticles, hydroxide nanoplatelets, hydroxide nanoribbons, hydroxide nanorings, hydroxide nanosheets, or a combination thereof. In some embodiments, the hydroxide comprises hydroxide nanosheets. In some embodiments, the hydroxide comprises hydroxide nanoflakes.

In some embodiments, the hydroxide comprises cobalt(II) hydroxide nanopowder. In some embodiments, the hydroxide comprises cobalt(III) hydroxide nanosheets. In some embodiments, the hydroxide comprises nickel(III) hydroxide nanoflakes. In some embodiments, the hydroxide comprises copper(I) hydroxide nanoflakes. In some embodiments, the hydroxide comprises copper(II) hydroxide nanopowder. In some embodiments, the hydroxide comprises nickel(II) hydroxide nanoflakes.

In some embodiments, depositing a hydroxide onto the second current collector comprises depositing a hydroxide onto the second current collector by electrochemical deposition, electrocoating, electrophoretic deposition, microwave synthesis, photothermal deposition, thermal decomposition laser deposition, hydrothermal synthesis, or any combination thereof. In some embodiments, electrochemical deposition comprises cyclic voltammetry. In some embodiments, cyclic voltammetry comprises applying consecutive potential sweeps to the second current collector. In some embodiments, applying consecutive potential sweeps to the second current collector comprises applying consecutive potential sweeps to the second current collector in a catalyst.

In some embodiments, the consecutive potential sweeps are performed at a voltage of about −2.4 V to about −0.3 V. In some embodiments, the consecutive potential sweeps are performed at a voltage of at least about −2.4 V. In some embodiments, the consecutive potential sweeps are performed at a voltage of at most about −0.3 V. In some embodiments, the consecutive potential sweeps are performed at a voltage of about −0.3 V to about −0.5 V, about −0.3 V to about −0.9 V, about −0.3 V to about −1.1 V, about −0.3 V to about −1.3 V, about −0.3 V to about −1.5 V, about −0.3 V to about −1.7 V, about −0.3 V to about −1.9 V, about −0.3 V to about −2.1 V, about −0.3 V to about −2.3 V, about −0.3 V to about −2.4 V, about −0.5 V to about −0.9 V, about −0.5 V to about −1.1 V, about −0.5 V to about −1.3 V, about −0.5 V to about −1.5 V, about −0.5 V to about −1.7 V, about −0.5 V to about −1.9 V, about −0.5 V to about −2.1 V, about −0.5 V to about −2.3 V, about −0.5 V to about −2.4 V, about −0.9 V to about −1.1 V, about −0.9 V to about −1.3 V, about −0.9 V to about −1.5 V, about −0.9 V to about −1.7 V, about −0.9 V to about −1.9 V, about −0.9 V to about −2.1 V, about −0.9 V to about −2.3 V, about −0.9 V to about −2.4 V, about −1.1 V to about −1.3 V, about −1.1 V to about −1.5 V, about −1.1 V to about −1.7 V, about −1.1 V to about −1.9 V, about −1.1 V to about −2.1 V, about −1.1 V to about −2.3 V, about −1.1 V to about −2.4 V, about −1.3 V to about −1.5 V, about −1.3 V to about −1.7 V, about −1.3 V to about −1.9 V, about −1.3 V to about −2.1 V, about −1.3 V to about −2.3 V, about −1.3 V to about −2.4 V, about −1.5 V to about −1.7 V, about −1.5 V to about −1.9 V, about −1.5 V to about −2.1 V, about −1.5 V to about −2.3 V, about −1.5 V to about −2.4 V, about −1.7 V to about −1.9 V, about −1.7 V to about −2.1 V, about −1.7 V to about −2.3 V, about −1.7 V to about −2.4 V, about −1.9 V to about −2.1 V, about −1.9 V to about −2.3 V, about −1.9 V to about −2.4 V, about −2.1 V to about −2.3 V, about −2.1 V to about −2.4 V, or about −2.3 V to about −2.4 V. In some embodiments, the consecutive potential sweeps are performed at a voltage to the second current collector of about −0.3 V, about −0.5 V, about −0.9 V, about −1.1 V, about −1.3 V, about −1.5 V, about −1.7 V, about −1.9 V, about −2.1 V, about −2.3 V, or about −2.4 V. In some embodiments, the consecutive potential sweeps are performed at a voltage to the second current collector of at least about −0.5 V, about −0.9 V, about −1.1 V, about −1.3 V, about −1.5 V, about −1.7 V, about −1.9 V, about −2.1 V, about −2.3 V, or about −2.4 V. In some embodiments, the consecutive potential sweeps are performed at a voltage to the second current collector of at most about −0.3 V, about −0.5 V, about −0.9 V, about −1.1 V, about −1.3 V, about −1.5 V, about −1.7 V, about −1.9 V, or about −2.1 V, about −2.3 V.

In some embodiments, the consecutive potential sweeps are performed at a scan rate of about 50 mV/s to about 175 mV/s. In some embodiments, the consecutive potential sweeps are performed at a scan rate of at least about 50 mV/s. In some embodiments, the consecutive potential sweeps are performed at a scan rate of at most about 175 mV/s. In some embodiments, the consecutive potential sweeps are performed at a scan rate of about 50 mV/s to about 60 mV/s, about 50 mV/s to about 70 mV/s, about 50 mV/s to about 80 mV/s, about 50 mV/s to about 90 mV/s, about 50 mV/s to about 100 mV/s, about 50 mV/s to about 110 mV/s, about 50 mV/s to about 120 mV/s, about 50 mV/s to about 130 mV/s, about 50 mV/s to about 140 mV/s, about 50 mV/s to about 160 mV/s, about 50 mV/s to about 175 mV/s, about 60 mV/s to about 70 mV/s, about 60 mV/s to about 80 mV/s, about 60 mV/s to about 90 mV/s, about 60 mV/s to about 100 mV/s, about 60 mV/s to about 110 mV/s, about 60 mV/s to about 120 mV/s, about 60 mV/s to about 130 mV/s, about 60 mV/s to about 140 mV/s, about 60 mV/s to about 160 mV/s, about 60 mV/s to about 175 mV/s, about 70 mV/s to about 80 mV/s, about 70 mV/s to about 90 mV/s, about 70 mV/s to about 100 mV/s, about 70 mV/s to about 110 mV/s, about 70 mV/s to about 120 mV/s, about 70 mV/s to about 130 mV/s, about 70 mV/s to about 140 mV/s, about 70 mV/s to about 160 mV/s, about 70 mV/s to about 175 mV/s, about 80 mV/s to about 90 mV/s, about 80 mV/s to about 100 mV/s, about 80 mV/s to about 110 mV/s, about 80 mV/s to about 120 mV/s, about 80 mV/s to about 130 mV/s, about 80 mV/s to about 140 mV/s, about 80 mV/s to about 160 mV/s, about 80 mV/s to about 175 mV/s, about 90 mV/s to about 100 mV/s, about 90 mV/s to about 110 mV/s, about 90 mV/s to about 120 mV/s, about 90 mV/s to about 130 mV/s, about 90 mV/s to about 140 mV/s, about 90 mV/s to about 160 mV/s, about 90 mV/s to about 175 mV/s, about 100 mV/s to about 110 mV/s, about 100 mV/s to about 120 mV/s, about 100 mV/s to about 130 mV/s, about 100 mV/s to about 140 mV/s, about 100 mV/s to about 160 mV/s, about 100 mV/s to about 175 mV/s, about 110 mV/s to about 120 mV/s, about 110 mV/s to about 130 mV/s, about 110 mV/s to about 140 mV/s, about 110 mV/s to about 160 mV/s, about 110 mV/s to about 175 mV/s, about 120 mV/s to about 130 mV/s, about 120 mV/s to about 140 mV/s, about 120 mV/s to about 160 mV/s, about 120 mV/s to about 175 mV/s, about 130 mV/s to about 140 mV/s, about 130 mV/s to about 160 mV/s, about 130 mV/s to about 175 mV/s, about 140 mV/s to about 160 mV/s, about 140 mV/s to about 175 mV/s, or about 160 mV/s to about 175 mV/s. In some embodiments, the consecutive potential sweeps are performed at a scan rate of about 50 mV/s, about 60 mV/s, about 70 mV/s, about 80 mV/s, about 90 mV/s, about 100 mV/s, about 110 mV/s, about 120 mV/s, about 130 mV/s, about 140 mV/s, about 160 mV/s, or about 175 mV/s. In some embodiments, the consecutive potential sweeps are performed at a scan rate of at least about 60 mV/s, about 70 mV/s, about 80 mV/s, about 90 mV/s, about 100 mV/s, about 110 mV/s, about 120 mV/s, about 130 mV/s, about 140 mV/s, about 160 mV/s, or about 175 mV/s. In some embodiments, the consecutive potential sweeps are performed at a scan rate of at most about 50 mV/s, about 60 mV/s, about 70 mV/s, about 80 mV/s, about 90 mV/s, about 100 mV/s, about 110 mV/s, about 120 mV/s, about 130 mV/s, about 140 mV/s, or about 160 mV/s.

In some embodiments, the consecutive potential sweeps comprise applying a voltage of about −0.3 V to about −2.4 V at a scan rate of about 50 mV/s to about 175 mV/s to the electrode In some embodiments, the catalyst comprises nickel acetate, nickel chloride, ammonium nickel(II) sulfate hexahydrate, nickel carbonate, nickel(II) acetate, nickel(II) acetate tetrahydrate, nickel(II) bromide 2-methoxyethyl, nickel(II) bromide, nickel(II) bromide hydrate, nickel(II) bromide trihydrate, nickel(II) carbonate, nickel(II) carbonate hydroxide tetrahydrate, nickel(II) chloride, nickel(II) chloride hexahydrate, nickel(II) chloride hydrate, nickel(II) cyclohexanebutyrate, nickel(II) fluoride, nickel(II) hexafluorosilicate hexahydrate, nickel(II) hydroxide, nickel (II) iodide anhydrous, nickel(II) iodide, nickel(II) nitrate hexahydrate, nickel(II) oxalate dihydrate, nickel(II) perchlorate hexahydrate, nickel(II) sulfamate tetrahydrate, nickel (II) sulfate, nickel(II) sulfate heptahydrate, potassium nickel (IV) paraperiodate, potassium tetracyanonickelate(II) hydrate, or any combination thereof. In some embodiments, the catalyst comprises nickel carbonate. In some embodiments, the catalyst comprises nickel(II) nitrate. In some embodiments, the catalyst comprises nickel acetate.

In some embodiments, the catalyst has a concentration of about 50 mM to about 200 mM. In some embodiments, the catalyst has a concentration of at least about 50 mM. In some embodiments, the catalyst has a concentration of at most about 200 mM. In some embodiments, the catalyst has a concentration of about 50 mM to about 60 mM, about 50 mM to about 70 mM, about 50 mM to about 80 mM, about 50 mM to about 90 mM, about 50 mM to about 100 mM, about 50 mM to about 120 mM, about 50 mM to about 140 mM, about 50 mM to about 160 mM, about 50 mM to about 180 mM, about 50 mM to about 200 mM, about 60 mM to about 70 mM, about 60 mM to about 80 mM, about 60 mM to about 90 mM, about 60 mM to about 100 mM, about 60 mM to about 120 mM, about 60 mM to about 140 mM, about 60 mM to about 160 mM, about 60 mM to about 180 mM, about 60 mM to about 200 mM, about 70 mM to about 80 mM, about 70 mM to about 90 mM, about 70 mM to about 100 mM, about 70 mM to about 120 mM, about 70 mM to about 140 mM, about 70 mM to about 160 mM, about 70 mM to about 180 mM, about 70 mM to about 200 mM, about 80 mM to about 90 mM, about 80 mM to about 100 mM, about 80 mM to about 120 mM, about 80 mM to about 140 mM, about 80 mM to about 160 mM, about 80 mM to about 180 mM, about 80 mM to about 200 mM, about 90 mM to about 100 mM, about 90 mM to about 120 mM, about 90 mM to about 140 mM, about 90 mM to about 160 mM, about 90 mM to about 180 mM, about 90 mM to about 200 mM, about 100 mM to about 120 mM, about 100 mM to about 140 mM, about 100 mM to about 160 mM, about 100 mM to about 180 mM, about 100 mM to about 200 mM, about 120 mM to about 140 mM, about 120 mM to about 160 mM, about 120 mM to about 180 mM, about 120 mM to about 200 mM, about 140 mM to about 160 mM, about 140 mM to about 180 mM, about 140 mM to about 200 mM, about 160 mM to about 180 mM, about 160 mM to about 200 mM, or about 180 mM to about 200 mM. In some embodiments, the catalyst has a concentration of about 50 mM, about 60 mM, about 70 mM, about 80 mM, about 90 mM, about 100 mM, about 120 mM, about 140 mM, about 160 mM, about 180 mM, or about 200 mM. In some embodiments, the catalyst has a concentration of at least about 60 mM, about 70 mM, about 80 mM, about 90 mM, about 100 mM, about 120 mM, about 140 mM, about 160 mM, about 180 mM, or about 200 mM. In some embodiments, the catalyst has a concentration of at most about 50 mM, about 60 mM, about 70 mM, about 80 mM, about 90 mM, about 100 mM, about 120 mM, about 140 mM, about 160 mM, or about 180 mM.

In some embodiments, electrochemical deposition comprises applying a constant voltage to the second current collector.

In some embodiments, the constant voltage is about −2.4 V to about −0.3 V. In some embodiments, the constant voltage is at least about −2.4 V. In some embodiments, the constant voltage is at most about −0.3 V. In some embodiments, the constant voltage is about −0.3 V to about −0.5 V, about −0.3 V to about −0.9 V, about −0.3 V to about −1.1 V, about −0.3 V to about −1.3 V, about −0.3 V to about −1.5 V, about −0.3 V to about −1.7 V, about −0.3 V to about −1.9 V, about −0.3 V to about −2.1 V, about −0.3 V to about −2.3 V, about −0.3 V to about −2.4 V, about −0.5 V to about −0.9 V, about −0.5 V to about −1.1 V, about −0.5 V to about −1.3 V, about −0.5 V to about −1.5 V, about −0.5 V to about −1.7 V, about −0.5 V to about −1.9 V, about −0.5 V to about −2.1 V, about −0.5 V to about −2.3 V, about −0.5 V to about −2.4 V, about −0.9 V to about −1.1 V, about −0.9 V to about −1.3 V, about −0.9 V to about −1.5 V, about −0.9 V to about −1.7 V, about −0.9 V to about −1.9 V, about −0.9 V to about −2.1 V, about −0.9 V to about −2.3 V, about −0.9 V to about −2.4 V, about −1.1 V to about −1.3 V, about −1.1 V to about −1.5 V, about −1.1 V to about −1.7 V, about −1.1 V to about −1.9 V, about −1.1 V to about −2.1 V, about −1.1 V to about −2.3 V, about −1.1 V to about −2.4 V, about −1.3 V to about −1.5 V, about −1.3 V to about −1.7 V, about −1.3 V to about −1.9 V, about −1.3 V to about −2.1 V, about −1.3 V to about −2.3 V, about −1.3 V to about −2.4 V, about −1.5 V to about −1.7 V, about −1.5 V to about −1.9 V, about −1.5 V to about −2.1 V, about −1.5 V to about −2.3 V, about −1.5 V to about −2.4 V, about −1.7 V to about −1.9 V, about −1.7 V to about −2.1 V, about −1.7 V to about −2.3 V, about −1.7 V to about −2.4 V, about −1.9 V to about −2.1 V, about −1.9 V to about −2.3 V, about −1.9 V to about −2.4 V, about −2.1 V to about −2.3 V, about −2.1 V to about −2.4 V, or about −2.3 V to about −2.4 V. In some embodiments, the constant voltage is about −0.3 V, about −0.5 V, about −0.9 V, about −1.1 V, about −1.3 V, about −1.5 V, about −1.7 V, about −1.9 V, about −2.1 V, about −2.3 V, or about −2.4 V. In some embodiments, the constant voltage is at least about −0.9 V, about −1.1 V, about −1.3 V, about −1.5 V, about −1.7 V, about −1.9 V, about −2.1 V, about −2.3 V, or about −2.4 V. In some embodiments, the constant voltage is at most about −0.3 V, about −0.5 V, about −0.9 V, about −1.1 V, about −1.3 V, about −1.5 V, about −1.7 V, about −1.9 V, about −2.1 V, or about −2.3 V.

In some embodiments, hydrothermal synthesis comprises submerging the second current collector in an aqueous solution. In some embodiments, the aqueous solution comprises an acetate, a chloride, a nitrate salt, a reducing agent, or any combination thereof.

In some embodiments, the aqueous solution comprises an acetate. In some embodiments, the acetate comprises, aluminum acetate, aluminum acetotartrate, aluminum diacetate, aluminum sulfacetate, aluminum triacetate, ammonium acetate, antimony(III) acetate, barium acetate, basic beryllium acetate, bismuth(III) acetate, cadmium acetate, cesium acetate, calcium acetate, calcium magnesium acetate, camostat, chromium acetate hydroxide, chromium(II) acetate, clidinium bromide, cobalt(II) acetate, copper(II) acetate, Dess-Martin periodinane (diacetoxyiodo) benzene, iron(II) acetate, iron(III) acetate, lead(II) acetate, lead(IV) acetate, lithium acetate, magnesium acetate, manganese(II) acetate, manganese(III) acetate, mercury(II) acetate, methoxyethylmercuric acetate, molybdenum(II) acetate, nexeridine, nickel(II) acetate, palladium(II) acetate, paris green, platinum(II) acetate, potassium acetate, propanidid, rhodium(II) acetate, satraplatin, silver acetate, sodium acetate, sodium chloroacetate, sodium diacetate, sodium triacetoxyborohydride, thallous acetate, tilapertin, triamcinolone hexacetonide, triethylammonium acetate, uranyl acetate, uranyl zinc acetate, white catalyst, zinc acetate, or any combination thereof.

In some embodiments, the aqueous solution comprises a chloride. In some embodiments, the chloride comprises aluminum trichloride, ammonium chloride, barium chloride, barium chloride dihydrate, calcium chloride, calcium chloride dihydrate, cobalt(II) chloride hexahydrate, cobalt(III) chloride, copper(II) chloride, copper(II) chloride dihydrate, iron(II) chloride, iron(III) chloride, iron(III) chloride hexahydrate, lead(II) chloride, lead(IV) chloride, magnesium chloride, magnesium chloride hexahydrate, manganese(II) chloride tetrahydrate, manganese(IV) chloride, mercury(I) chloride, nickel(II) chloride hexahydrate, nickel(III) chloride, phosphorus pentachloride, phosphorus trichloride, potassium chloride, silver chloride, sodium chloride, strontium chloride, sulfur hexachloride, tin(IV) chloride pentahydrate, zinc chloride, or any combination thereof.

In some embodiments, the aqueous solution comprises a nitrate salt. In some embodiments, the nitrate salt comprises aluminum nitrate, barium nitrate, beryllium nitrate, cadmium nitrate, calcium nitrate, cesium nitrate, chromium nitrate, cobalt nitrate, cupric nitrate, dicyclohexylammonium nitrite, didymium nitrate, econazole nitrate, ferric nitrate, gallium nitrate, guanidine nitrate, lanthanum nitrate hexahydrate, lead nitrate, lithium nitrate, magnesium nitrate, manganese nitrate, mercuric nitrate, mercurous nitrate, nickel nitrate, nickel nitrite, potassium nitrite, silver nitrate, sodium nitrate, strontium nitrate, thallium nitrate, uranyl nitrate, zinc ammonium nitrite, zinc nitrate, zirconium nitrate, or any combination thereof.

In some embodiments, the aqueous solution comprises a reducing agent. In some embodiments, the reducing agent comprises urea, citric acid, ascorbic acid, hydrazine hydrate, hydroquinone, sodium borohydride, hydrogen bromide, hydrogen iodide, or any combination thereof.

In some embodiments thermal decomposition is performed at a temperature of about 150° C. to about 400° C. In some embodiments thermal decomposition is performed at a temperature of at least about 150° C. In some embodiments thermal decomposition is performed at a temperature of at most about 400° C. In some embodiments thermal decomposition is performed at a temperature of about 150° C. to about 200° C., about 150° C. to about 250° C., about 150° C. to about 300° C., about 150° C. to about 350° C., about 150° C. to about 400° C., about 200° C. to about 250° C., about 200° C. to about 300° C., about 200° C. to about 350° C., about 200° C. to about 400° C., about 250° C. to about 300° C., about 250° C. to about 350° C., about 250° C. to about 400° C., about 300° C. to about 350° C., about 300° C. to about 400° C., or about 350° C. to about 400° C. In some embodiments thermal decomposition is performed at a temperature of about 150° C., about 200° C., about 250° C., about 300° C., about 350° C., or about 400° C. In some embodiments thermal decomposition is performed at a temperature of at least about 200° C., about 250° C., about 300° C., about 350° C., or about 400° C. In some embodiments thermal decomposition is performed at a temperature of at most about 150° C., about 200° C., about 250° C., about 300° C., or about 350° C.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE INVENTION

Figure 1:
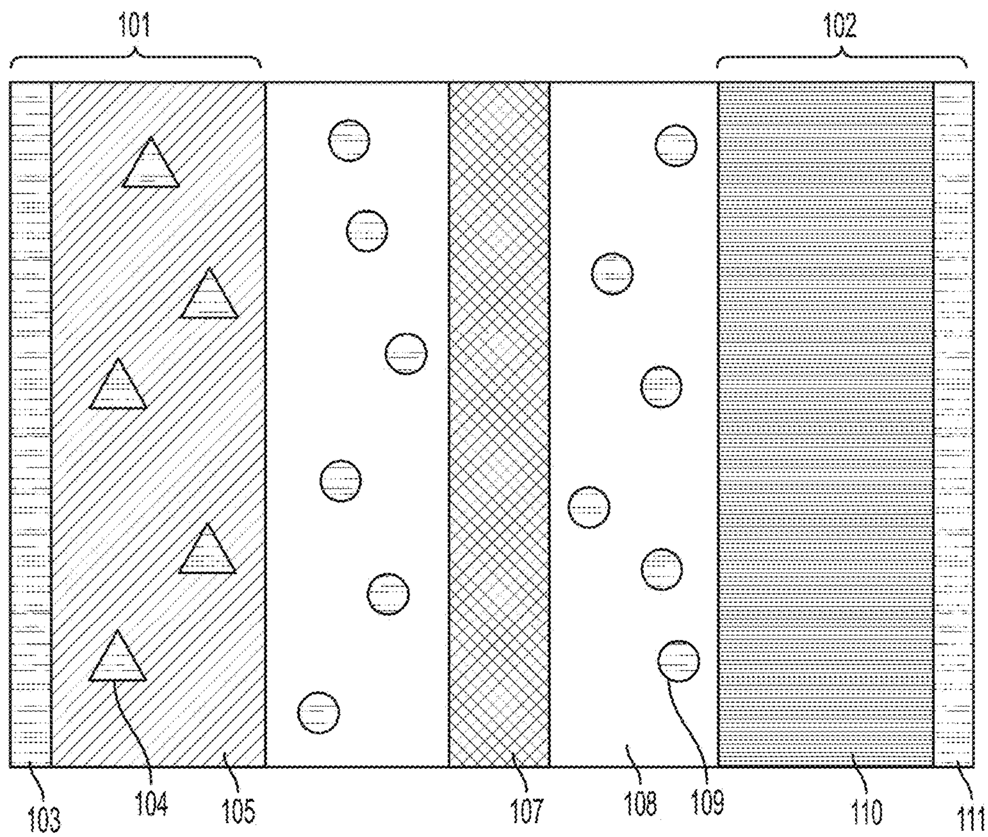
FIG. 1 is a schematic diagram of an exemplary energy storage device.

Lithium ion batteries are widely used as energy storage devices in electronics due to their portability, high energy density, and low self-discharge. Unfortunately, current lithium ion battery technology exhibits safety issues such as the battery fires which spurred the recall of Samsung's Galaxy Note 7 in September 2016. Additionally, although lithium ion batteries exhibit a high energy density, such devices often exhibit low power densities, typically below 3 kW/kg, and recharging times for such energy storage devices is on the order of hours.

As such, there is a long felt and unmet need for safe and powerful energy storage devices that are light weight, structurally flexible, and exhibit high power densities, high energy densities, and extended cycle life spans. Further, there is a current unmet need for electrode and electrolyte materials configured to store a large amount of energy in a short time, and which slowly and controllably release the energy for use in an electronic device.

First Electrode

Described herein, in certain embodiments, is a first electrode comprising a layered double hydroxide, a conductive scaffold, and a first current collector.

In some embodiments, the layered double hydroxide comprises a metallic layered double hydroxide. In some embodiments, the metallic layered double hydroxide comprises a zinc-iron layered double hydroxide, an aluminum-iron layered double hydroxide, a chromium-iron layered double hydroxide, an indium-iron layered double hydroxide, a manganese-iron layered double hydroxide, or any combination thereof. In some embodiments, the metallic layered double hydroxide comprises a manganese-iron layered double hydroxide.

In some embodiments, the metallic layered double hydroxide comprises a zinc-iron layered double hydroxide. In some embodiments, the ratio between the zinc and iron is about 1:1 to about 6:1. In some embodiments, the ratio between the zinc and iron is at least about 1:1. In some embodiments, the ratio between the zinc and iron is at most about 6:1. In some embodiments, the ratio between the zinc and iron is about 1:1 to about 1.5:1, about 1:1 to about 2:1, about 1:1 to about 2.5:1, about 1:1 to about 3:1, about 1:1 to about 3.5:1, about 1:1 to about 4:1, about 1:1 to about 4.5:1, about 1:1 to about 5:1, about 1:1 to about 5.5:1, about 1:1 to about 6:1, about 1.5:1 to about 2:1, about 1.5:1 to about 2.5:1, about 1.5:1 to about 3:1, about 1.5:1 to about 3.5:1, about 1.5:1 to about 4:1, about 1.5:1 to about 4.5:1, about 1.5:1 to about 5:1, about 1.5:1 to about 5.5:1, about 1.5:1 to about 6:1, about 2:1 to about 2.5:1, about 2:1 to about 3:1, about 2:1 to about 3.5:1, about 2:1 to about 4:1, about 2:1 to about 4.5:1, about 2:1 to about 5:1, about 2:1 to about 5.5:1, about 2:1 to about 6:1, about 2.5:1 to about 3:1, about 2.5:1 to about 3.5:1, about 2.5:1 to about 4:1, about 2.5:1 to about 4.5:1, about 2.5:1 to about 5:1, about 2.5:1 to about 5.5:1, about 2.5:1 to about 6:1, about 3:1 to about 3.5:1, about 3:1 to about 4:1, about 3:1 to about 4.5:1, about 3:1 to about 5:1, about 3:1 to about 5.5:1, about 3:1 to about 6:1, about 3.5:1 to about 4:1, about 3.5:1 to about 4.5:1, about 3.5:1 to about 5:1, about 3.5:1 to about 5.5:1, about 3.5:1 to about 6:1, about 4:1 to about 4.5:1, about 4:1 to about 5:1, about 4:1 to about 5.5:1, about 4:1 to about 6:1, about 4.5:1 to about 5:1, about 4.5:1 to about 5.5:1, about 4.5:1 to about 6:1, about 5:1 to about 5.5:1, about 5:1 to about 6:1, or about 5.5:1 to about 6:1. In some embodiments, the ratio between the zinc and iron is about 1:1, about 1.5:1, about 2:1, about 2.5:1, about 3:1, about 3.5:1, about 4:1, about 4.5:1, about 5:1, about 5.5:1, or about 6:1.

In some embodiments, the conductive scaffold comprises conductive foam, conductive aerogel, metallic ionogel, carbon nanotubes, carbon nanosheets, activated carbon, carbon cloth, carbon black, or any combination thereof. In some embodiments, the conductive scaffold comprises a three-dimensional (3D) scaffold. In some embodiments, the conductive scaffold comprises a conductive foam. In some embodiments, the conductive foam comprises carbon foam, graphene foam, graphite foam, carbon foam, or any combination thereof. In some embodiments, the conductive scaffold comprises a conductive aerogel. In some embodiments, the conductive aerogel comprises carbon aerogel, graphene aerogel, graphite aerogel, carbon aerogel, or any combination thereof. In some embodiments, the conductive scaffold comprises a 3D conductive aerogel. In some embodiments, the 3D conductive aerogel comprises 3D carbon aerogel, 3D graphene aerogel, 3D graphite aerogel, 3D carbon aerogel, or any combination thereof. In some embodiments, the conductive scaffold comprises a metallic ionogel. In some embodiments, the metallic ionogel comprises carbon ionogel, graphene ionogel, graphite ionogel, or any combination thereof.

In some embodiments, the conductive scaffold comprises a metal. In some embodiments, the metal comprises aluminum, copper, carbon, iron, silver, gold, palladium, platinum, iridium, platinum iridium alloy, ruthenium, rhodium, osmium, tantalum, titanium, tungsten, polysilicon, indium tin oxide or any combination thereof. In some embodiments, the conductive scaffold comprises a conductive polymer. In some embodiments, the conductive polymer comprises trans-polyacetylene, polyfluorene, polythiophene, polypyrrole, polyphenylene, polyaniline, poly(p-phenylene vinylene), polypyrenes polyazulene, polynaphthalene, polycarbazole, polyindole, polyazepine, poly(3,4-ethylenedioxythiophene), poly(p-phenylene sulfide), poly(acetylene, poly (p-phenylene vinylene), or any combination thereof. In some embodiments, the conductive scaffold comprises a conductive ceramic. In some embodiments, the conductive ceramic comprises zirconium barium titanate, strontium titanate, calcium titanate, magnesium titanate, calcium magnesium titanate, zinc titanate, lanthanum titanate, neodymium titanate, barium zirconate, calcium zirconate, lead magnesium niobate, lead zinc niobate, lithium niobate, barium stannate, calcium stannate, magnesium aluminium silicate, magnesium silicate, barium tantalate, titanium dioxide, niobium oxide, zirconia, silica, sapphire, beryllium oxide, zirconium tin titanate, or any combination thereof. In some embodiments, the conducting scaffold is composed of an alloy of two or more materials or elements.

In some embodiments, the mass ratio between the layered double hydroxide and the conductive scaffold is about 0.2:1 to about 2.4:1. In some embodiments, the mass ratio between the layered double hydroxide and the conductive scaffold is at least about 0.2:1. In some embodiments, the mass ratio between the layered double hydroxide and the conductive scaffold is at most about 2.4:1. In some embodiments, the mass ratio between the layered double hydroxide and the conductive scaffold is about 0.2:1 to about 0.4:1, about 0.2:1 to about 0.6:1, about 0.2:1 to about 0.8:1, about 0.2:1 to about 1:1, about 0.2:1 to about 1.2:1, about 0.2:1 to about 1.4:1, about 0.2:1 to about 1.6:1, about 0.2:1 to about 1.8:1, about 0.2:1 to about 2:1, about 0.2:1 to about 2.2:1, about 0.2:1 to about 2.4:1, about 0.4:1 to about 0.6:1, about 0.4:1 to about 0.8:1, about 0.4:1 to about 1:1, about 0.4:1 to about 1.2:1, about 0.4:1 to about 1.4:1, about 0.4:1 to about 1.6:1, about 0.4:1 to about 1.8:1, about 0.4:1 to about 2:1, about 0.4:1 to about 2.2:1, about 0.4:1 to about 2.4:1, about 0.6:1 to about 0.8:1, about 0.6:1 to about 1:1, about 0.6:1 to about 1.2:1, about 0.6:1 to about 1.4:1, about 0.6:1 to about 1.6:1, about 0.6:1 to about 1.8:1, about 0.6:1 to about 2:1, about 0.6:1 to about 2.2:1, about 0.6:1 to about 2.4:1, about 0.8:1 to about 1:1, about 0.8:1 to about 1.2:1, about 0.8:1 to about 1.4:1, about 0.8:1 to about 1.6:1, about 0.8:1 to about 1.8:1, about 0.8:1 to about 2:1, about 0.8:1 to about 2.2:1, about 0.8:1 to about 2.4:1, about 1:1 to about 1.2:1, about 1:1 to about 1.4:1, about 1:1 to about 1.6:1, about 1:1 to about 1.8:1, about 1:1 to about 2:1, about 1:1 to about 2.2:1, about 1:1 to about 2.4:1, about 1.2:1 to about 1.4:1, about 1.2:1 to about 1.6:1, about 1.2:1 to about 1.8:1, about 1.2:1 to about 2:1, about 1.2:1 to about 2.2:1, about 1.2:1 to about 2.4:1, about 1.4:1 to about 1.6:1, about 1.4:1 to about 1.8:1, about 1.4:1 to about 2:1, about 1.4:1 to about 2.2:1, about 1.4:1 to about 2.4:1, about 1.6:1 to about 1.8:1, about 1.6:1 to about 2:1, about 1.6:1 to about 2.2:1, about 1.6:1 to about 2.4:1, about 1.8:1 to about 2:1, about 1.8:1 to about 2.2:1, about 1.8:1 to about 2.4:1, about 2:1 to about 2.2:1, about 2:1 to about 2.4:1, or about 2.2:1 to about 2.4:1. In some embodiments, the mass ratio between the layered double hydroxide and the conductive scaffold is about 0.2:1, about 0.4:1, about 0.6:1, about 0.8:1, about 1:1, about 1.2:1, about 1.4:1, about 1.6:1, about 1.8:1, about 2:1, about 2.2:1, or about 2.4:1.

In some embodiments, the first current collector comprises a conductive foam. In some embodiments, the conductive foam comprises aluminum foam, carbon foam, graphene foam, graphite foam, copper foam, nickel foam, palladium foam, platinum foam, steel foam, or any combination thereof. In some embodiments, the conductive foam comprises graphene foam. In some embodiments, the conductive foam comprises graphite foam. In some embodiments, the conductive foam comprises copper foam. In some embodiments, the conductive foam comprises nickel foam.

In some embodiments, a conductive foam is a cellular structure consisting of a solid metal with gas-filled pores comprising a large portion of the volume of the foam. In some embodiments, the conductive foam comprises a closed-cell foam wherein the pores are sealed. In some embodiments, the conductive foam comprises a opened-cell foam wherein the pores are open.

In some embodiments, an aerogel is a synthetic, porous, ultralight material derived from a gel, in which the liquid component of the gel has been replaced with a gas to form a low-density material. In some embodiments, an ionogel comprises a solid interconnected network within a liquid phase. In some embodiments, an ionogel comprises an ionic conducting liquid immobilized within a matrix. In some embodiments, the matrix is a polymer matrix.

In some embodiments, a carbon nanotube is an allotrope of carbon with a cylindrical nanostructure. In some embodiments, a carbon nanosheet is an allotrope of carbon with a two-dimensional nanostructure. In some embodiments, the carbon nanosheet comprises graphene. In some embodiments, activated carbon, also called activated charcoal, comprises a form of carbon with small, low-volume pores with a high surface area. In some embodiments, carbon black is a form of paracrystalline carbon that has a high surface-area-to-volume ratio.

In some embodiments, the first current collector comprises a conductive foam. In some embodiments, the conductive foam comprises aluminum foam, carbon foam, graphene foam, graphite foam, copper foam, nickel foam, palladium foam, platinum foam, steel foam, or any combination thereof. In some embodiments, the conductive foam comprises graphene foam. In some embodiments, the conductive foam comprises graphite foam. In some embodiments, the conductive foam comprises copper foam. In some embodiments, the conductive foam comprises nickel foam.

In some embodiments, a current collector is a grid or sheet of a conductive material that provides a conducting path along an active material in an electrode.

In some embodiments, the first electrode has a capacitance of about 500 F/g to about 2,250 F/g. In some embodiments, the first electrode has a capacitance of at least about 500 F/g. In some embodiments, the first electrode has a capacitance of at most about 2,250 F/g. In some embodiments, the first electrode has a capacitance of about 500 F/g to about 750 F/g, about 500 F/g to about 1,000 F/g, about 500 F/g to about 1,250 F/g, about 500 F/g to about 1,500 F/g, about 500 F/g to about 1,750 F/g, about 500 F/g to about 2,000 F/g, about 500 F/g to about 2,250 F/g, about 750 F/g to about 1,000 F/g, about 750 F/g to about 1,250 F/g, about 750 F/g to about 1,500 F/g, about 750 F/g to about 1,750 F/g, about 750 F/g to about 2,000 F/g, about 750 F/g to about 2,250 F/g, about 1,000 F/g to about 1,250 F/g, about 1,000 F/g to about 1,500 F/g, about 1,000 F/g to about 1,750 F/g, about 1,000 F/g to about 2,000 F/g, about 1,000 F/g to about 2,250 F/g, about 1,250 F/g to about 1,500 F/g, about 1,250 F/g to about 1,750 F/g, about 1,250 F/g to about 2,000 F/g, about 1,250 F/g to about 2,250 F/g, about 1,500 F/g to about 1,750 F/g, about 1,500 F/g to about 2,000 F/g, about 1,500 F/g to about 2,250 F/g, about 1,750 F/g to about 2,000 F/g, about 1,750 F/g to about 2,250 F/g, or about 2,000 F/g to about 2,250 F/g. In some embodiments, the first electrode has a capacitance of about 500 F/g, about 750 F/g, about 1,000 F/g, about 1,250 F/g, about 1,500 F/g, about 1,750 F/g, about 2,000 F/g, or about 2,250 F/g. In some embodiments, the first electrode has a capacitance of about 1,150 F/g. In some embodiments, the first electrode has a capacitance of at least about 750 F/g, about 1,000 F/g, about 1,250 F/g, about 1,500 F/g, about 1,750 F/g, about 2,000 F/g, about or 2,250 F/g.

In some embodiments, the first electrode has a gravimetric capacity of about 30 mAh/g to about 120 mAh/g. In some embodiments, the first electrode has a gravimetric capacity of at least about 30 mAh/g. In some embodiments, the first electrode has a gravimetric capacity of at most about 120 mAh/g. In some embodiments, the first electrode has a gravimetric capacity of about 30 mAh/g to about 40 mAh/g, about 30 mAh/g to about 50 mAh/g, about 30 mAh/g to about 60 mAh/g, about 30 mAh/g to about 70 mAh/g, about 30 mAh/g to about 80 mAh/g, about 30 mAh/g to about 90 mAh/g, about 30 mAh/g to about 100 mAh/g, about 30 mAh/g to about 110 mAh/g, about 30 mAh/g to about 120 mAh/g, about 40 mAh/g to about 50 mAh/g, about 40 mAh/g to about 60 mAh/g, about 40 mAh/g to about 70 mAh/g, about 40 mAh/g to about 80 mAh/g, about 40 mAh/g to about 90 mAh/g, about 40 mAh/g to about 100 mAh/g, about 40 mAh/g to about 110 mAh/g, about 40 mAh/g to about 120 mAh/g, about 50 mAh/g to about 60 mAh/g, about 50 mAh/g to about 70 mAh/g, about 50 mAh/g to about 80 mAh/g, about 50 mAh/g to about 90 mAh/g, about 50 mAh/g to about 100 mAh/g, about 50 mAh/g to about 110 mAh/g, about 50 mAh/g to about 120 mAh/g, about 60 mAh/g to about 70 mAh/g, about 60 mAh/g to about 80 mAh/g, about 60 mAh/g to about 90 mAh/g, about 60 mAh/g to about 100 mAh/g, about 60 mAh/g to about 110 mAh/g, about 60 mAh/g to about 120 mAh/g, about 70 mAh/g to about 80 mAh/g, about 70 mAh/g to about 90 mAh/g, about 70 mAh/g to about 100 mAh/g, about 70 mAh/g to about 110 mAh/g, about 70 mAh/g to about 120 mAh/g, about 80 mAh/g to about 90 mAh/g, about 80 mAh/g to about 100 mAh/g, about 80 mAh/g to about 110 mAh/g, about 80 mAh/g to about 120 mAh/g, about 90 mAh/g to about 100 mAh/g, about 90 mAh/g to about 110 mAh/g, about 90 mAh/g to about 120 mAh/g, about 100 mAh/g to about 110 mAh/g, about 100 mAh/g to about 120 mAh/g, or about 110 mAh/g to about 120 mAh/g. In some embodiments, the first electrode has a gravimetric capacity of about 30 mAh/g, about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g. In some embodiments, the first electrode has a gravimetric capacity of at least about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g.

In some embodiments, the first electrode is configured to be employed as the positive electrode. In some embodiments, the first electrode is configured to be employed as the negative electrode.

Figure 2A:
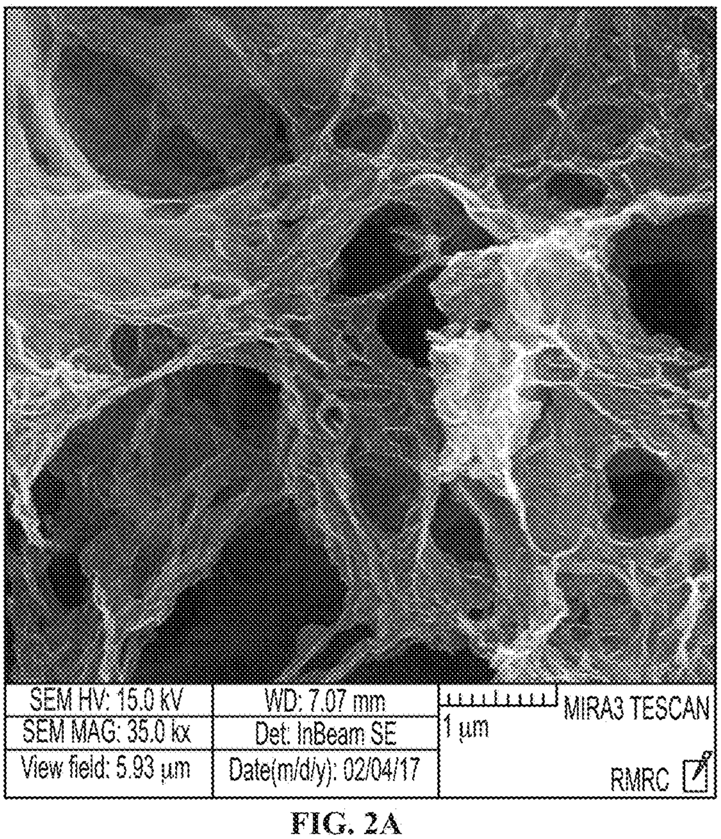
FIG. 2A is a scanning electron microscope image of an exemplary first electrode comprising three-dimensional graphene aerogel (3DGA).
Figure 2B:
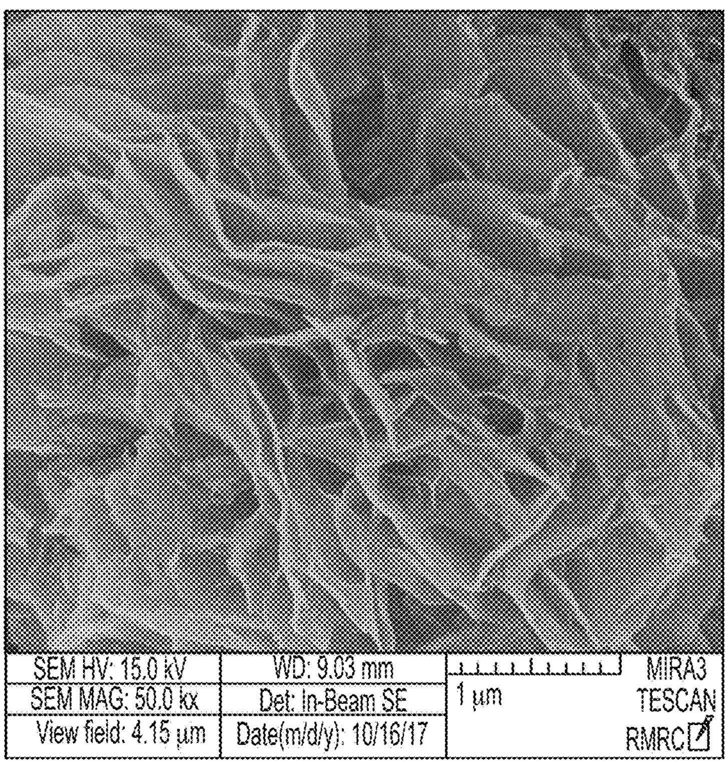
FIG. 2B is a scanning electron microscope image of an exemplary first electrode comprising a layered double hydroxide (LDH).
Figure 3:
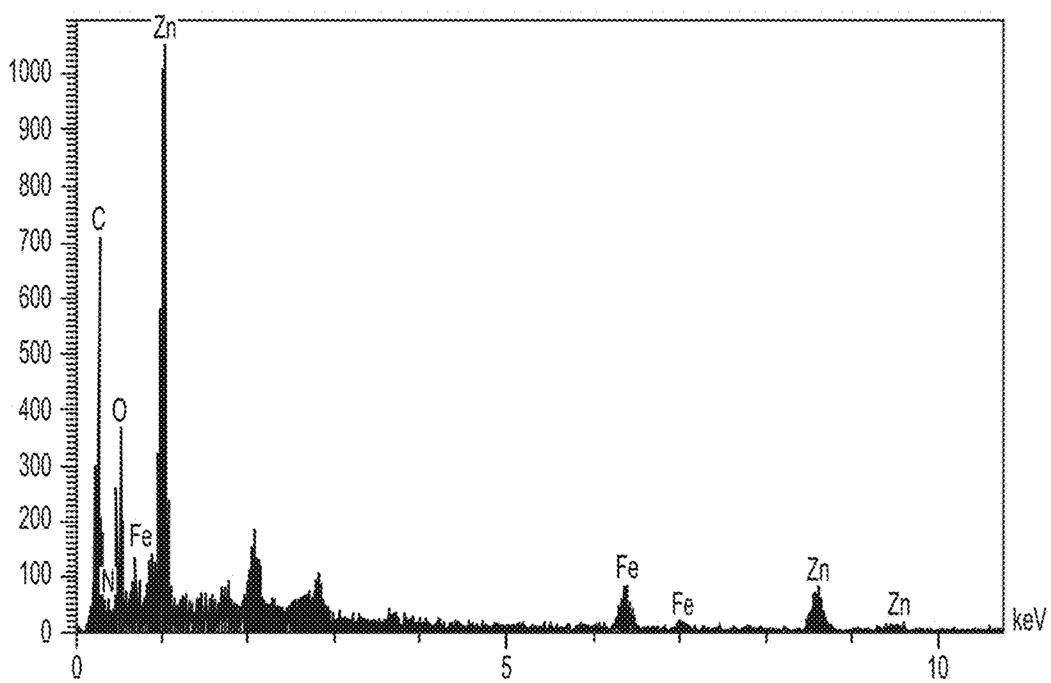
FIG. 3 is an energy-dispersive X-ray (EDS) spectrum of an exemplary first electrode comprising Zn—Fe LDH/3DGA.

Scanning electron microscope images of an exemplary electrode comprising three-dimensional graphene aerogel (3DGA) and an exemplary electrode comprising a layered double hydroxide are shown in FIGS. 2A and 2B, respectively. The elemental components of an exemplary first electrode comprising Zn—Fe LDH/3DGA are shown per the energy-dispersive X-ray (EDS) spectrum in FIG. 3 and the quantitative results in Table 1 below.

TABLE 1

| Elt | Line | Int | Error | K | Kr | W % | A % | ZAF | Pk/Bg |
|---|---|---|---|---|---|---|---|---|---|
| C | Ka | 216.7 | 4.0776 | 0.4072 | 0.1418 | 49.58 | 63.21 | 0.2859 | 150.59 |
| N | Ka | 15.3 | 4.0776 | 0.0389 | 0.0135 | 11.62 | 12.70 | 0.1165 | 9.74 |
| O | Ka | 103.0 | 4.0776 | 0.0964 | 0.0336 | 18.46 | 17.67 | 0.1819 | 25.73 |
| Fe | Ka | 43.8 | 0.6048 | 0.0713 | 0.0248 | 3.07 | 0.84 | 0.8074 | 7.78 |
| Zn | Ka | 46.1 | 0.5783 | 0.2049 | 0.0713 | 9.69 | 2.27 | 0.7361 | 10.87 |

Figure 4A:
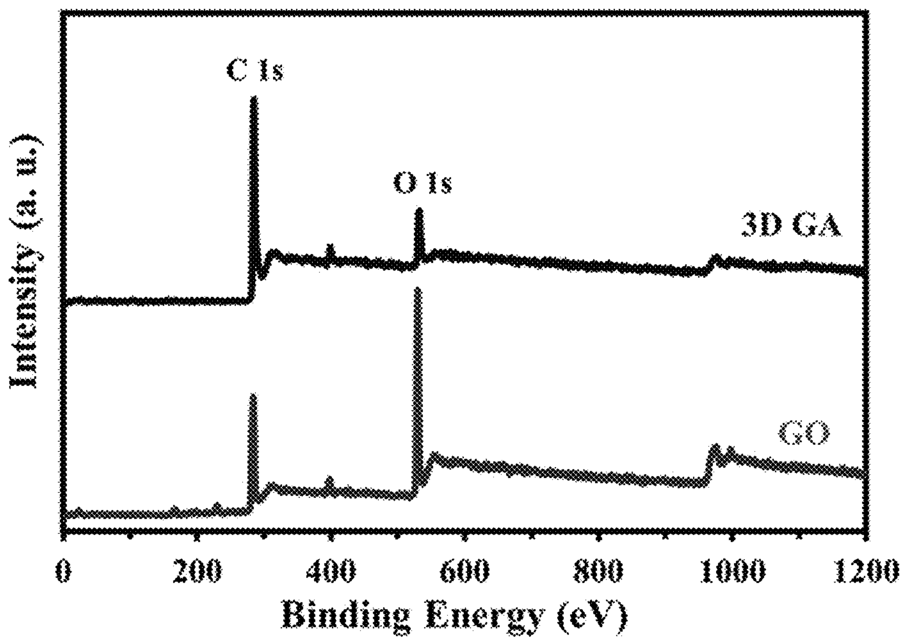
FIG. 4A is an X-ray photoelectron spectra (XPS) graph of an exemplary first electrode comprising graphene oxide (GO) and an exemplary first electrode comprising 3DGA.
Figures 5A, 5B, 5C, 5D:
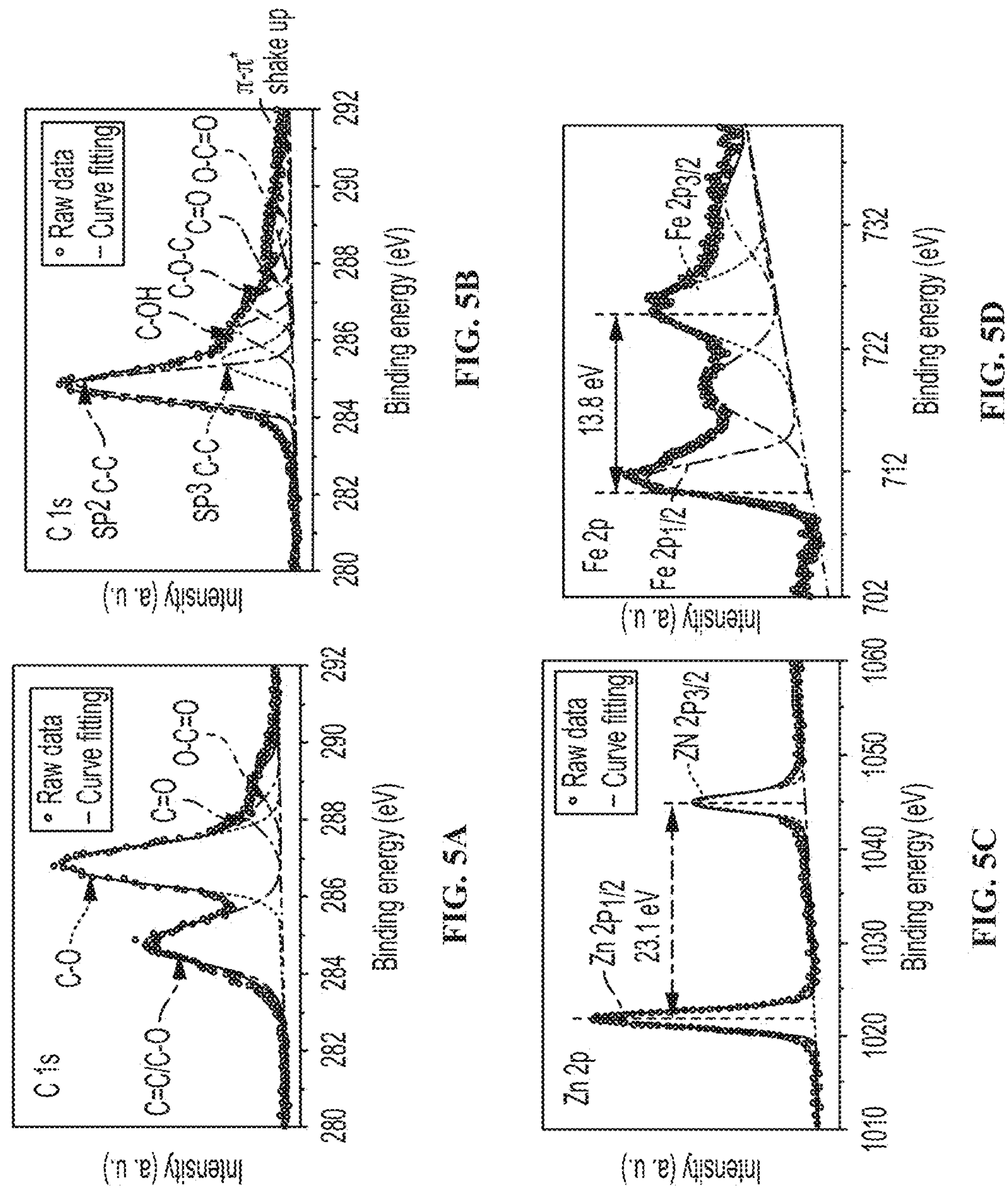
FIG. 5A is a C1s XPS graph of an exemplary first electrode comprising GO.
FIG. 5B is a C1s XPS graph of an exemplary first electrode comprising Zn—Fe LDH/3DGA.
FIG. 5C is a Zn2p XPS graph of an exemplary first electrode comprising Zn—Fe LDH/3DGA.
FIG. 5D is a Fe2p XPS graph of an exemplary first electrode comprising Zn—Fe LDH/3DGA.

In some embodiments, the first electrode comprises graphene oxide (GO). In some embodiments, the first electrode comprises 3DGA. FIG. 4A is an X-ray photoelectron spectra (XPS) graph characterizing an exemplary first electrode comprising GO and an exemplary first electrode comprising a 3DGA. The exemplary first electrode comprising GO is further characterized in C1s XPS graph per FIG. 5A.

Figure 4B:
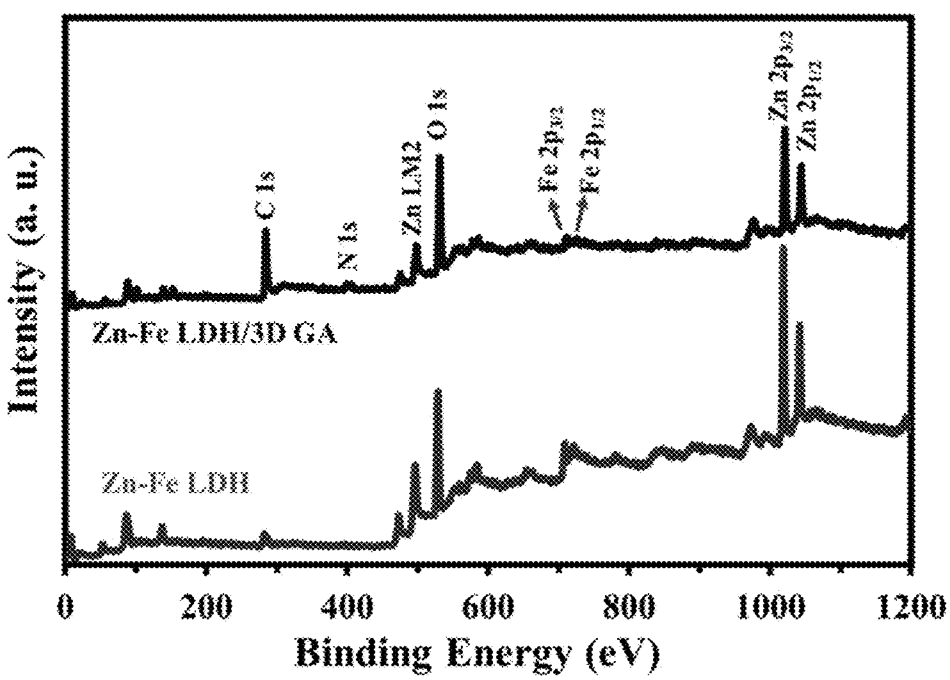
FIG. 4B is an XPS graph of an exemplary first electrode comprising Zn—Fe LDH and an exemplary first electrode comprising Zn—Fe LDH/3DGA.

In some embodiments, the first electrode comprises Zn—Fe LDH. In some embodiments, the first electrode comprises Zn—Fe LDH/3DGA. FIG. 4B is an XPS graph characterizing an exemplary first electrode comprising Zn—Fe layered double hydroxide (LDH) and an exemplary first electrode comprising Zn—Fe LDH/3DGA. The exemplary first electrode comprising Zn—Fe LDH/3DGA is further characterized in C1s XPS graph per FIG. 5B, the Zn2p XPS graph in FIG. 5C, and the Fe 2p XPS graph in FIG. 5D.

Figure 6:
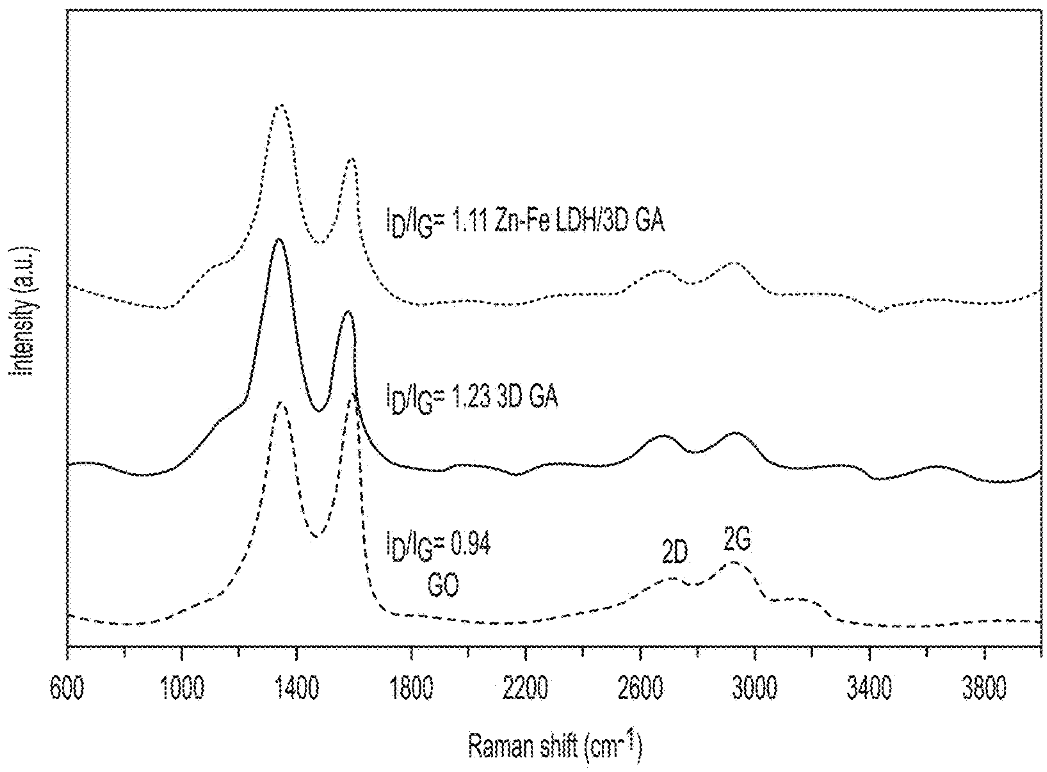
FIG. 6 is a Raman spectra of exemplary first electrodes comprising GO, 3DGA, and Zn—Fe LDH/3DGA.

FIG. 6 is a Raman spectra of exemplary first electrodes comprising GO, 3DGA, and Zn—Fe LDH/3DGA.

Figure 7:
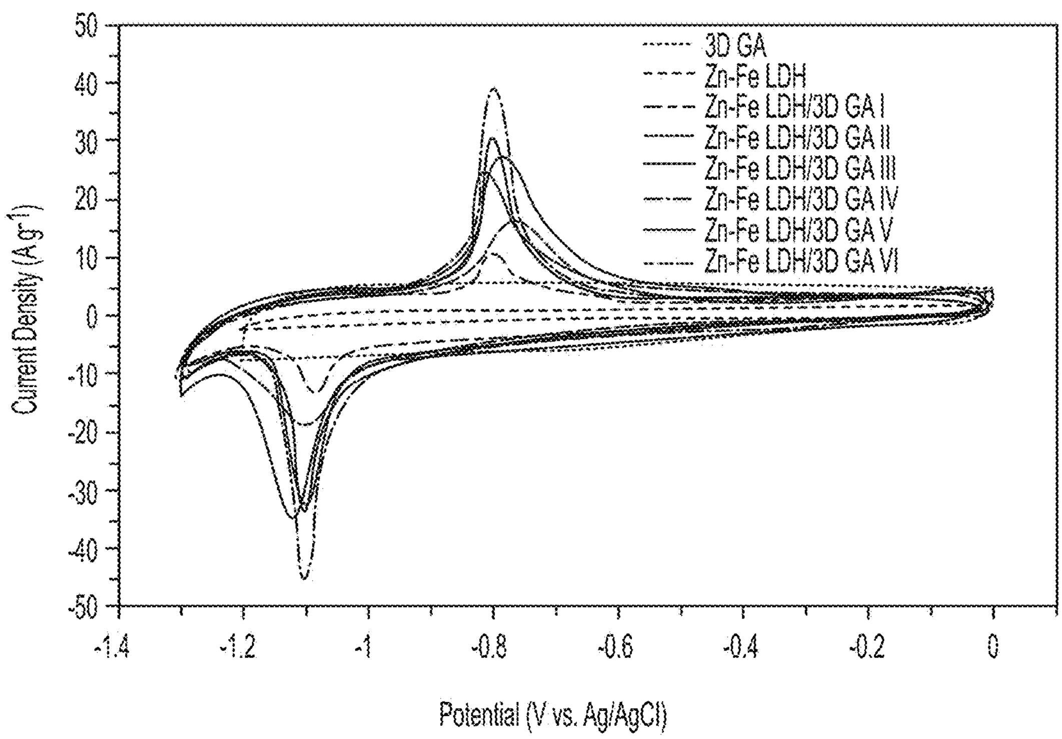
FIG. 7 is a cyclic voltammetry (CV) graph of exemplary first electrodes comprising 3DGA, Zn—Fe LDH, and Zn—Fe LDH with six concentrations of 3DGA, recorded at a scan rate of 20 mV/s in a 3.0 M KOH electrolyte.

The effect of the concentration of 3DGA on the performance of exemplary first electrodes comprising 3DGA, Zn—Fe LDH, and Zn—Fe LDH/3DGA at a scan rate of 20 mV/s and in a 3.0 M KOH electrolyte is shown in the CV graph per FIG. 7. Six of the exemplary Zn—Fe LDH/3DGA first electrodes, labeled as samples I to VI in per FIG. 7 and Table 2 below, each comprise a 3:1 Zn to Fe ratio, and six varying concentrations of 3DGA from 2:5 to 7:5. As shown, the exemplary Zn—Fe LDH/3DGA-IV sample electrode with a Zn—Fe to GO ratio of 1:1 exhibits the highest capacity among the exemplary samples, of about 160 mAh/g.

TABLE 2

| Sample | Zn-Fe to GO Ratio | Capacity (mAh/g) |
|---|---|---|
| Zn-Fe LDH/3DGA - I | 2:5 | 99.7 |
| Zn-Fe LDH/3DGA - II | 3:5 | 124.2 |
| Zn-Fe LDH/3DGA - III | 4:5 | 148.6 |
| Zn-Fe LDH/3DGA - IV | 1:1 | 160.3 |
| Zn-Fe LDH/3DGA - V | 6:5 | 156.2 |
| Zn-Fe LDH/3DGA - VI | 7:5 | 131.3 |

Figure 8:
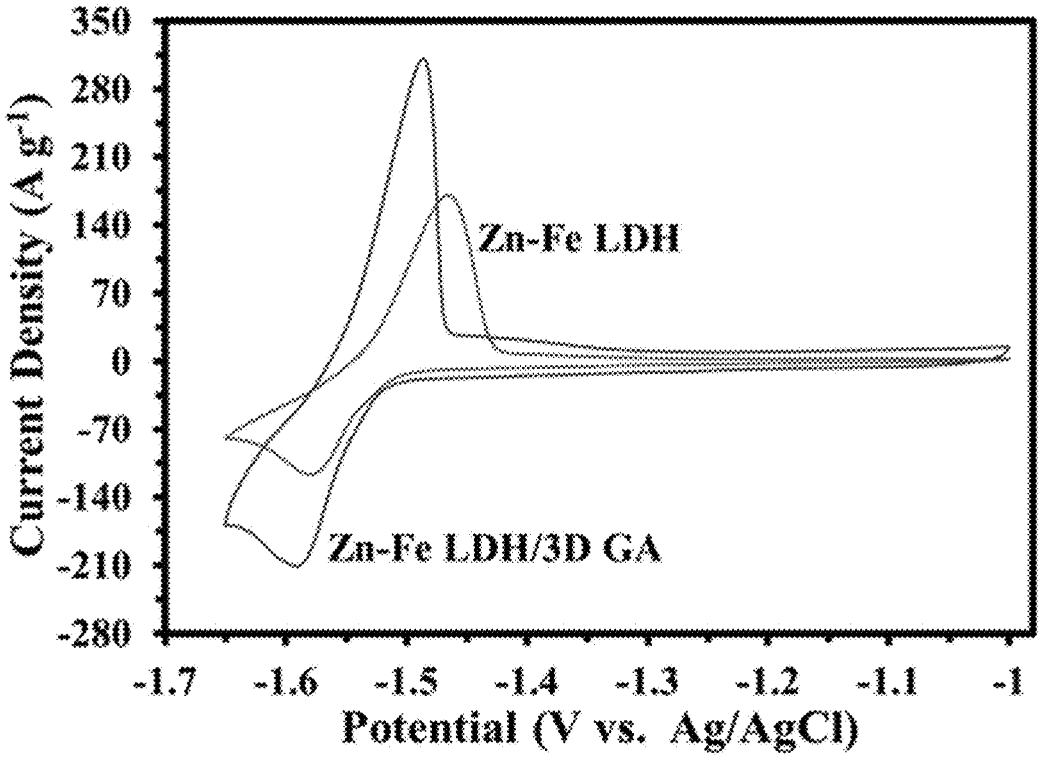
FIG. 8 is a CV graph of an exemplary first electrode comprising Zn—Fe LDH and an exemplary first electrode comprising Zn—Fe LDH/3DGA, in a ZnO-saturated KOH solution at a scan rate of 20 mV/s.
Figure 9:
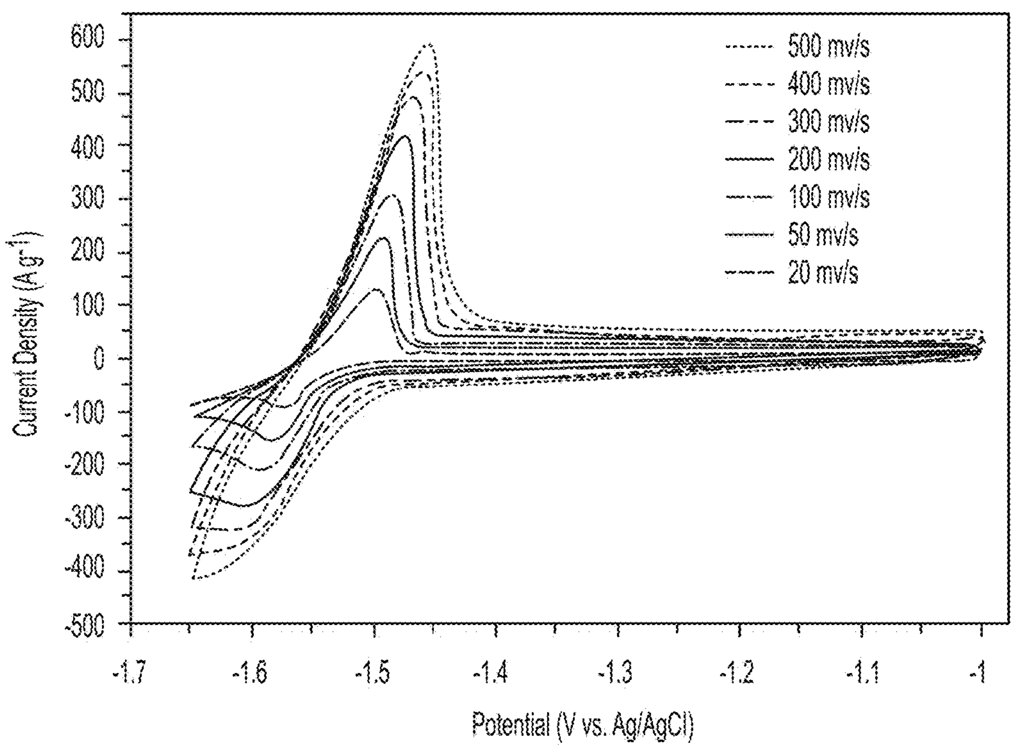
FIG. 9 is a CV graph at different scan rates of an exemplary first electrode comprising Zn—Fe LDH/3DGA in a ZnO-saturated KOH solution.

FIG. 8 is a CV graph of an exemplary first electrode comprising Zn—Fe LDH and an exemplary first electrode comprising Zn—Fe LDH/3DGA, in a ZnO-saturated KOH solution at a scan rate of 20 mV/s. FIG. 9 is a CV graph at different scan rates of an exemplary first electrode comprising Zn—Fe LDH/3DGA in a ZnO-saturated KOH solution.

Figure 10:
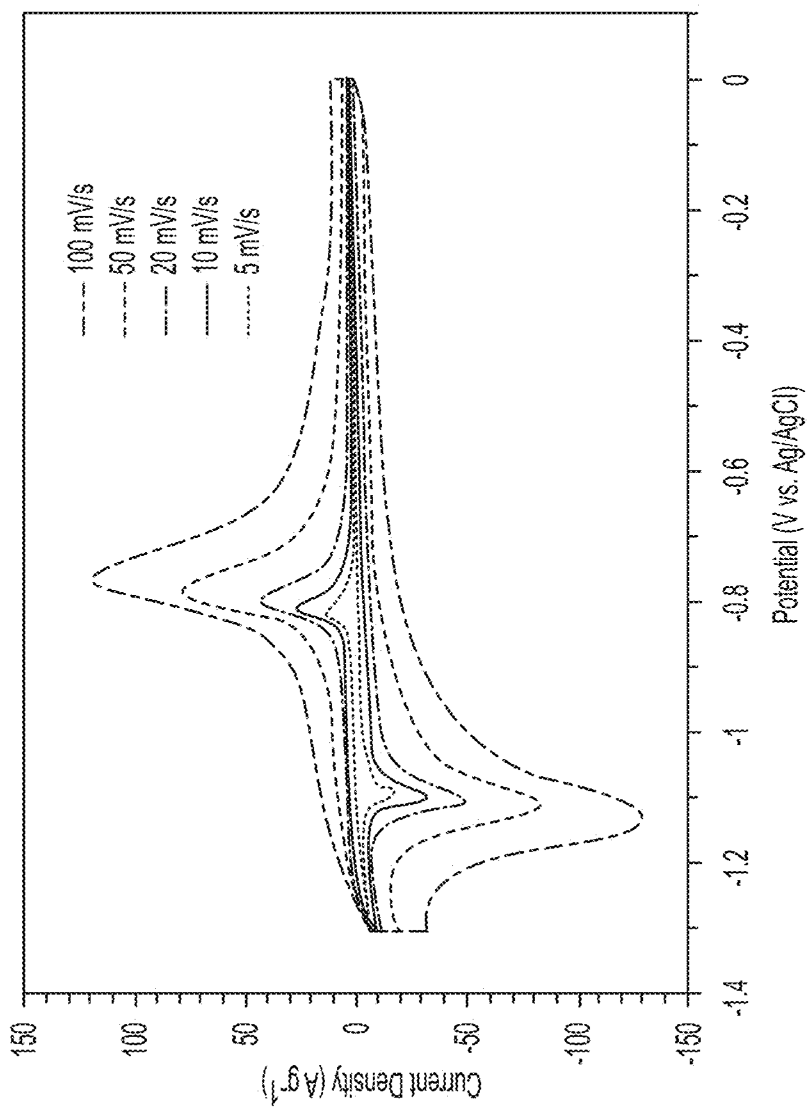
FIG. 10 is a CV graph at different scan rates of an exemplary first electrode comprising Zn—Fe LDH/3DGA with a zinc to iron mass ratio of 1:3, and a Zn—Fe to GO mass ratio of 1:1.
Figure 11:
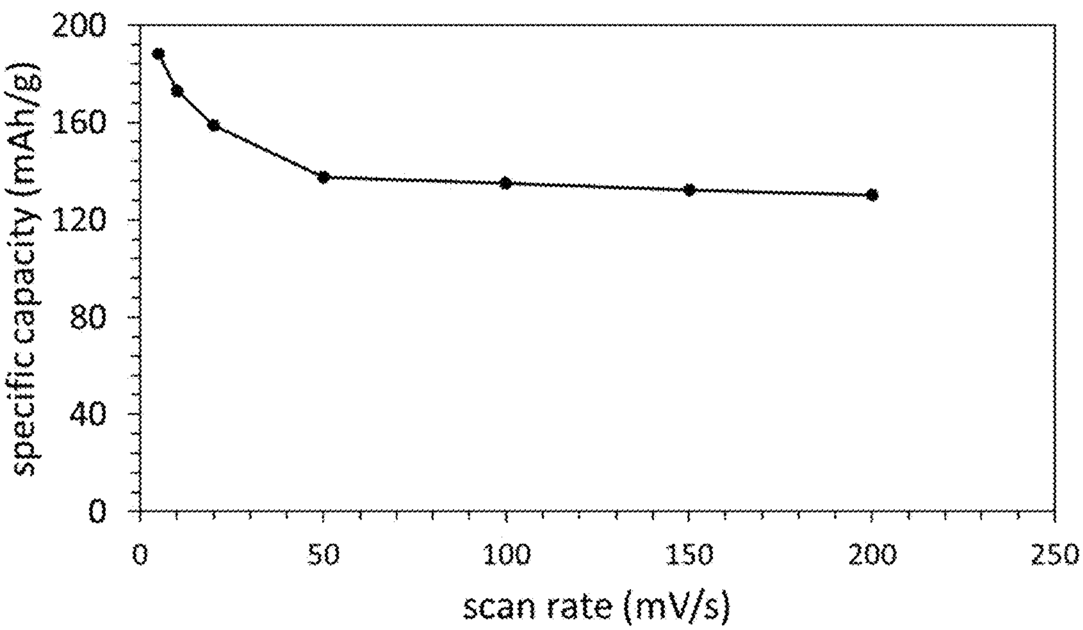
FIG. 11 is a graph comparing the scan rate and active material specific capacity of an exemplary first electrode comprising Zn—Fe LDH/3DGA with a zinc to iron mass ratio of 1:3, and a Zn—Fe to GO mass ratio of 1:1

Finally, the performance of exemplary first electrodes comprising Zn—Fe LDH/3DGA with a zinc to iron mass ratio of 1:3, and a Zn—Fe to GO mass ratio of 1:1 is shown at different scan rates per the CV graph in FIG. 10. Further, the relationship between the scan rate and active material specific capacity of the exemplary electrode is shown in FIG. 11, whereby the electrode maintains a capacity retention of about 70% as the scan rate increases from 0 mV/s to 200 mV/s.

Second Electrode

Described herein, in certain embodiments, is a second electrode comprising a hydroxide and a second current collector.

In some embodiments, the hydroxide comprises aluminum hydroxide, ammonium hydroxide, arsenic hydroxide, barium hydroxide, beryllium hydroxide, bismuth(III) hydroxide, boron hydroxide, cadmium hydroxide, calcium hydroxide, cerium(III) hydroxide, cesium hydroxide, chromium(II) hydroxide, chromium(III) hydroxide, chromium (V) hydroxide, chromium(VI) hydroxide, cobalt(II) hydroxide, cobalt(III) hydroxide, copper(I) hydroxide, copper(II) hydroxide, gallium(II) hydroxide, gallium(III) hydroxide, gold(I) hydroxide, gold(III) hydroxide, indium(I) hydroxide, indium(II) hydroxide, indium(III) hydroxide, iridium(III) hydroxide, iron(II) hydroxide, iron(III) hydroxide, lanthanum hydroxide, lead(II) hydroxide, lead(IV) hydroxide, lithium hydroxide, magnesium hydroxide, manganese(II) hydroxide, manganese(III) hydroxide, manganese(IV) hydroxide, manganese(VII) hydroxide, mercury(I) hydroxide, mercury(II) hydroxide, molybdenum hydroxide, neodymium hydroxide, nickel oxo-hydroxide, nickel(II) hydroxide, nickel(III) hydroxide, niobium hydroxide, osmium(IV) hydroxide, palladium(II) hydroxide, palladium(IV) hydroxide, platinum(II) hydroxide, platinum(IV) hydroxide, plutonium(IV) hydroxide, potassium hydroxide, radium hydroxide, rubidium hydroxide, ruthenium(III) hydroxide, scandium hydroxide, silicon hydroxide, silver hydroxide, sodium hydroxide, strontium hydroxide, tantalum(V) hydroxide, technetium(II) hydroxide, tetramethylammonium hydroxide, thallium(I) hydroxide, thallium(III) hydroxide, thorium hydroxide, tin(II) hydroxide, tin(IV) hydroxide, titanium(II) hydroxide, titanium(III) hydroxide, titanium(IV) hydroxide, tungsten(II) hydroxide, uranyl hydroxide, vanadium(II) hydroxide, vanadium(III) hydroxide, vanadium(V) hydroxide, ytterbium hydroxide, yttrium hydroxide, zinc hydroxide, zirconium hydroxide. In some embodiments, the hydroxide comprises hydroxide nanoflakes, hydroxide nanoparticles, hydroxide nanopowder, hydroxide nanoflowers, hydroxide nanodots, hydroxide nanorods, hydroxide nanochains, hydroxide nanofibers, hydroxide nanoparticles, hydroxide nanoplatelets, hydroxide nanoribbons, hydroxide nanorings, hydroxide nanosheets, or a combination thereof. In some embodiments, the hydroxide comprises cobalt(II) hydroxide. In some embodiments, the hydroxide comprises cobalt(III) hydroxide. In some embodiments, the hydroxide comprises copper(I) hydroxide. In some embodiments, the hydroxide comprises copper(II) hydroxide. In some embodiments, the hydroxide comprises nickel(II) hydroxide. In some embodiments, the hydroxide comprises nickel(III) hydroxide.

In some embodiments, the hydroxide comprises cobalt(II) hydroxide nanopowder. In some embodiments, the hydroxide comprises cobalt(III) hydroxide nanosheets. In some embodiments, the hydroxide comprises nickel(III) hydroxide nanoflakes. In some embodiments, the hydroxide comprises copper(I) hydroxide nanoflakes. In some embodiments, the hydroxide comprises copper(II) hydroxide nanopowder. In some embodiments, the hydroxide comprises nickel(II) hydroxide nanoflakes.

In some embodiments, the hydroxide is deposited on the second current collector.

In some embodiments, the second current collector comprises a conductive foam. In some embodiments, the conductive foam comprises aluminum foam, carbon foam, graphene foam, graphite foam, copper foam, nickel foam, palladium foam, platinum foam, steel foam, or any combination thereof. In some embodiments, the conductive foam comprises graphene foam. In some embodiments, the conductive foam comprises graphite foam. In some embodiments, the conductive foam comprises copper foam. In some embodiments, the conductive foam comprises nickel foam.

In some embodiments, the second electrode has a capacitance of about 500 F/g to about 2,500 F/g. In some embodiments, the second electrode has a capacitance of at least about 500 F/g. In some embodiments, the second electrode has a capacitance of at most about 2,500 F/g. In some embodiments, the second electrode has a capacitance of about 500 F/g to about 750 F/g, about 500 F/g to about 1,000 F/g, about 500 F/g to about 1,250 F/g, about 500 F/g to about 1,500 F/g, about 500 F/g to about 1,750 F/g, about 500 F/g to about 2,000 F/g, about 500 F/g to about 2,250 F/g, about 500 F/g to about 2,500 F/g, about 750 F/g to about 1,000 F/g, about 750 F/g to about 1,250 F/g, about 750 F/g to about 1,500 F/g, about 750 F/g to about 1,750 F/g, about 750 F/g to about 2,000 F/g, about 750 F/g to about 2,250 F/g, about 750 F/g to about 2,500 F/g, about 1,000 F/g to about 1,250 F/g, about 1,000 F/g to about 1,500 F/g, about 1,000 F/g to about 1,750 F/g, about 1,000 F/g to about 2,000 F/g, about 1,000 F/g to about 2,250 F/g, about 1,000 F/g to about 2,500 F/g, about 1,250 F/g to about 1,500 F/g, about 1,250 F/g to about 1,750 F/g, about 1,250 F/g to about 2,000 F/g, about 1,250 F/g to about 2,250 F/g, about 1,250 F/g to about 2,500 F/g, about 1,500 F/g to about 1,750 F/g, about 1,500 F/g to about 2,000 F/g, about 1,500 F/g to about 2,250 F/g, about 1,500 F/g to about 2,500 F/g, about 1,750 F/g to about 2,000 F/g, about 1,750 F/g to about 2,250 F/g, about 1,750 F/g to about 2,500 F/g, about 2,000 F/g to about 2,250 F/g, about 2,000 F/g to about 2,500 F/g, or about 2,250 F/g to about 2,500 F/g. In some embodiments, the second electrode has a capacitance of about 500 F/g, about 750 F/g, about 1,000 F/g, about 1,250 F/g, about 1,500 F/g, about 1,750 F/g, about 2,000 F/g, about 2,250 F/g, or about 2,500 F/g. In some embodiments, the second electrode has a capacitance of at least about 750 F/g, about 1,000 F/g, about 1,250 F/g, about 1,500 F/g, about 1,750 F/g, about 2,000 F/g, about 2,250 F/g, or about 2,500 F/g.

In some embodiments, the second electrode has a gravimetric capacity of about 30 mAh/g to about 120 mAh/g. In some embodiments, the second electrode has a gravimetric capacity of at least about 30 mAh/g. In some embodiments, the second electrode has a gravimetric capacity of at most about 120 mAh/g. In some embodiments, the second electrode has a gravimetric capacity of about 30 mAh/g to about 40 mAh/g, about 30 mAh/g to about 50 mAh/g, about 30 mAh/g to about 60 mAh/g, about 30 mAh/g to about 70 mAh/g, about 30 mAh/g to about 80 mAh/g, about 30 mAh/g to about 90 mAh/g, about 30 mAh/g to about 100 mAh/g, about 30 mAh/g to about 110 mAh/g, about 30 mAh/g to about 120 mAh/g, about 40 mAh/g to about 50 mAh/g, about 40 mAh/g to about 60 mAh/g, about 40 mAh/g to about 70 mAh/g, about 40 mAh/g to about 80 mAh/g, about 40 mAh/g to about 90 mAh/g, about 40 mAh/g to about 100 mAh/g, about 40 mAh/g to about 110 mAh/g, about 40 mAh/g to about 120 mAh/g, about 50 mAh/g to about 60 mAh/g, about 50 mAh/g to about 70 mAh/g, about 50 mAh/g to about 80 mAh/g, about 50 mAh/g to about 90 mAh/g, about 50 mAh/g to about 100 mAh/g, about 50 mAh/g to about 110 mAh/g, about 50 mAh/g to about 120 mAh/g, about 60 mAh/g to about 70 mAh/g, about 60 mAh/g to about 80 mAh/g, about 60 mAh/g to about 90 mAh/g, about 60 mAh/g to about 100 mAh/g, about 60 mAh/g to about 110 mAh/g, about 60 mAh/g to about 120 mAh/g, about 70 mAh/g to about 80 mAh/g, about 70 mAh/g to about 90 mAh/g, about 70 mAh/g to about 100 mAh/g, about 70 mAh/g to about 110 mAh/g, about 70 mAh/g to about 120 mAh/g, about 80 mAh/g to about 90 mAh/g, about 80 mAh/g to about 100 mAh/g, about 80 mAh/g to about 110 mAh/g, about 80 mAh/g to about 120 mAh/g, about 90 mAh/g to about 100 mAh/g, about 90 mAh/g to about 110 mAh/g, about 90 mAh/g to about 120 mAh/g, about 100 mAh/g to about 110 mAh/g, about 100 mAh/g to about 120 mAh/g, or about 110 mAh/g to about 120 mAh/g. In some embodiments, the second electrode has a gravimetric capacity of about 30 mAh/g, about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g. In some embodiments, the second electrode has a gravimetric capacity of at least about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g.

In some embodiments, the second electrode is configured to be employed as the positive electrode. In some embodiments, the second electrode is configured to be employed as the negative electrode.

Figure 12:
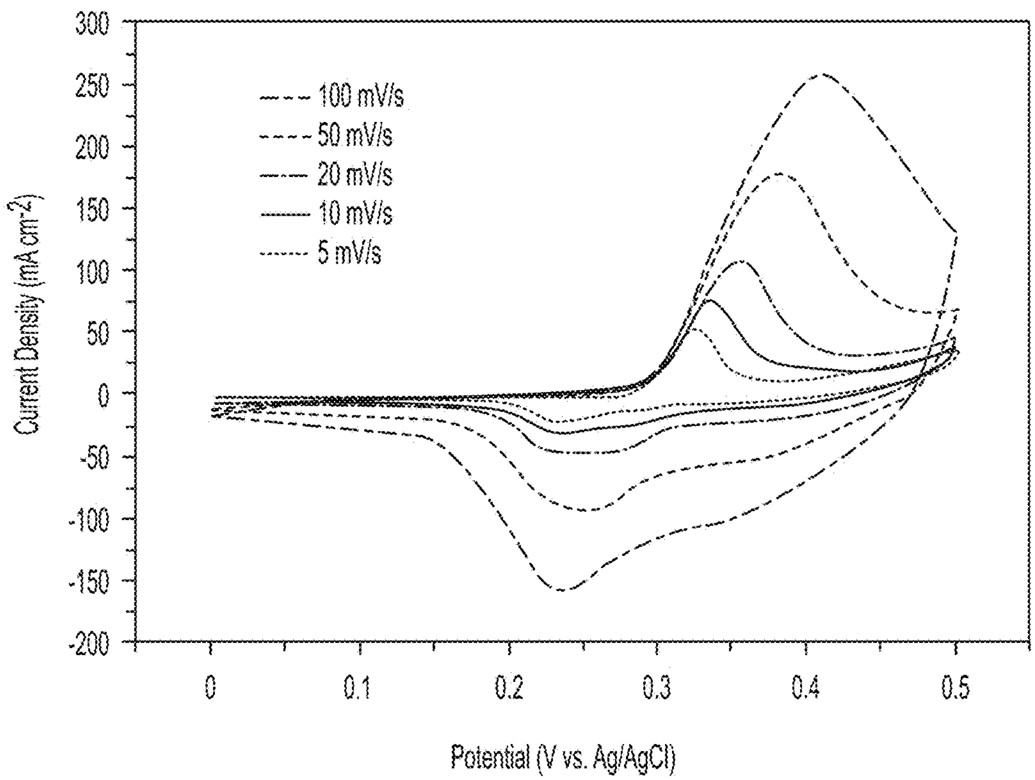
FIG. 12 is a CV graph of a 3E cell comprising an exemplary second electrode comprising $Ni(OH)_2$ in 3.0 M KOH at different scan rates.
Figure 13:
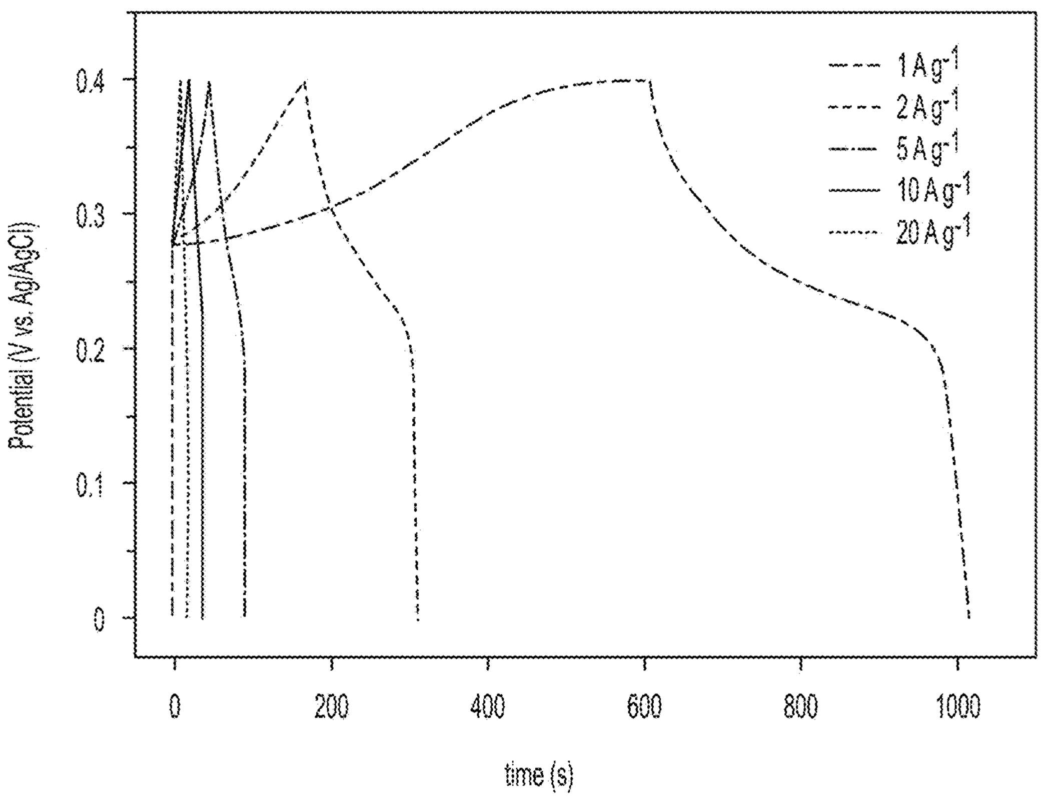
FIG. 13 is a charge-discharge graph of a 3E cell comprising an exemplary second electrode comprising $Ni(OH)_2$ in KOH at different current densities.

In some embodiments, the hydroxide comprises $Ni(OH)_2$. The performance characteristics of an exemplary second electrode comprising $Ni(OH)_2$ in a 3E cell and 3.0 M KOH is shown at different scan rates, per the CV graph FIG. 12, and per the charge discharge graph in FIG. 13, at different current densities. As seen in FIG. 13, the discharge portions of the potential vs time curves for the exemplary second electrode discharge evenly and gradually.

Energy Storage Devices

Provided herein, per FIG. 1, is an energy storage device comprising a first electrode 101, a second electrode 102, a separator 107, and an electrolyte 108. In some embodiments, the first electrode 101, comprises a layered double hydroxide 104, a conductive scaffold 105, and a first current collector 103. In some embodiments, the second electrode 102, comprises a hydroxide 110 and a second current collector 111. In some embodiments, the electrolyte 108, comprises a base and a conductive additive 109.

In some embodiments, the specific combination of device chemistry, active materials, and electrolytes described herein form energy storage devices that operate at high voltages and exhibit both the capacity of a battery and the power performance of supercapacitors in one device. In some embodiments, the energy storage devices of the current disclosure store more charge than a traditional lithium ion battery.

In some embodiments, the energy storage devices of the current disclosure are assembled in air, without the need for expensive "dry rooms" necessary to produce many other energy storage devices. In some embodiments, the energy storage device of the present disclosure are capable of being formed primarily from earth-abundant elements such as, but not limited to, nickel, zinc, iron, and carbon.

In some embodiments, the energy storage device stores energy through both redox reactions with ion adsorption. A redox reaction is a chemical reaction in which the oxidation states of atoms are changed by the transfer of electrons between chemical species. Ion adsorption, also known as electrosorption or intercalation, comprises the transportation of ions through the inter-particle pores of an electrode, resulting in a reversible faradaic charge-transfer. The ability of the energy storage device of the current disclosure to store energy through both redox reactions with ion adsorption enables fast charge rates, steady discharge rates, high power and energy densities, and high capacities.

In some embodiments, the first electrode comprises a layered double hydroxide, a conductive scaffold, and a first current collector.

In some embodiments, the layered double hydroxide comprises a metallic layered double hydroxide. In some embodiments, the metallic layered double hydroxide comprises a zinc-iron layered double hydroxide, an aluminum-iron layered double hydroxide, a chromium-iron layered double hydroxide, an indium-iron layered double hydroxide, a manganese-iron layered double hydroxide, or any combination thereof. In some embodiments, the metallic layered double hydroxide comprises a manganese-iron layered double hydroxide.

In some embodiments, the metallic layered double hydroxide comprises a zinc-iron layered double hydroxide. In some embodiments, the ratio between the zinc and iron is about 1:1 to about 6:1. In some embodiments, the ratio between the zinc and iron is at least about 1:1. In some embodiments, the ratio between the zinc and iron is at most about 6:1. In some embodiments, the ratio between the zinc and iron is about 1:1 to about 1.5:1, about 1:1 to about 2:1, about 1:1 to about 2.5:1, about 1:1 to about 3:1, about 1:1 to about 3.5:1, about 1:1 to about 4:1, about 1:1 to about 4.5:1, about 1:1 to about 5:1, about 1:1 to about 5.5:1, about 1:1 to about 6:1, about 1.5:1 to about 2:1, about 1.5:1 to about 2.5:1, about 1.5:1 to about 3:1, about 1.5:1 to about 3.5:1, about 1.5:1 to about 4:1, about 1.5:1 to about 4.5:1, about 1.5:1 to about 5:1, about 1.5:1 to about 5.5:1, about 1.5:1 to about 6:1, about 2:1 to about 2.5:1, about 2:1 to about 3:1, about 2:1 to about 3.5:1, about 2:1 to about 4:1, about 2:1 to about 4.5:1, about 2:1 to about 5:1, about 2:1 to about 5.5:1, about 2:1 to about 6:1, about 2.5:1 to about 3:1, about 2.5:1 to about 3.5:1, about 2.5:1 to about 4:1, about 2.5:1 to about 4.5:1, about 2.5:1 to about 5:1, about 2.5:1 to about 5.5:1, about 2.5:1 to about 6:1, about 3:1 to about 3.5:1, about 3:1 to about 4:1, about 3:1 to about 4.5:1, about 3:1 to about 5:1, about 3:1 to about 5.5:1, about 3:1 to about 6:1, about 3.5:1 to about 4:1, about 3.5:1 to about 4.5:1, about 3.5:1 to about 5:1, about 3.5:1 to about 5.5:1, about 3.5:1 to about 6:1, about 4:1 to about 4.5:1, about 4:1 to about 5:1, about 4:1 to about 5.5:1, about 4:1 to about 6:1, about 4.5:1 to about 5:1, about 4.5:1 to about 5.5:1, about 4.5:1 to about 6:1, about 5:1 to about 5.5:1, about 5:1 to about 6:1, or about 5.5:1 to about 6:1. In some embodiments, the ratio between the zinc and iron is about 1:1, about 1.5:1, about 2:1, about 2.5:1, about 3:1, about 3.5:1, about 4:1, about 4.5:1, about 5:1, about 5.5:1, or about 6:1.

In some embodiments, the conductive scaffold comprises conductive foam, conductive aerogel, metallic ionogel, carbon nanotubes, carbon nanosheets, activated carbon, carbon cloth, carbon black, or any combination thereof. In some embodiments, the conductive scaffold comprises a 3D scaffold. In some embodiments, the conductive scaffold comprises a conductive foam. In some embodiments, the conductive foam comprises carbon foam, graphene foam, graphite foam, carbon foam, or any combination thereof. In some embodiments, the conductive scaffold comprises a conductive aerogel. In some embodiments, the conductive aerogel comprises carbon aerogel, graphene aerogel, graphite aerogel, carbon aerogel, or any combination thereof. In some embodiments, the conductive scaffold comprises a 3D conductive aerogel. In some embodiments, the 3D conductive aerogel comprises 3D carbon aerogel, 3D graphene aerogel, 3D graphite aerogel, 3D carbon aerogel, or any combination thereof. In some embodiments, the conductive scaffold comprises a metallic ionogel. In some embodiments, the metallic ionogel comprises carbon ionogel, graphene ionogel, graphite ionogel, In some embodiments, the conductive scaffold comprises a metal. In some embodiments, the metal comprises aluminum, copper, carbon, iron, silver, gold, palladium, platinum, iridium, platinum iridium alloy, ruthenium, rhodium, osmium, tantalum, titanium, tungsten, polysilicon, indium tin oxide or any combination thereof. In some embodiments, the conductive scaffold comprises a conductive polymer. In some embodiments, the conductive polymer comprises trans-polyacetylene, polyfluorene, polythiophene, polypyrrole, polyphenylene, polyaniline, poly(p-phenylene vinylene), polypyrenes polyazulene, polynaphthalene, polycarbazole, polyindole, polyazepine, poly(3,4-ethylenedioxythiophene), poly(p- phenylene sulfide), poly(acetylene, poly(p-phenylene vinylene), or any combination thereof. In some embodiments, the conductive scaffold comprises a conductive ceramic. In some embodiments, the conductive ceramic comprises zirconium barium titanate, strontium titanate, calcium titanate, magnesium titanate, calcium magnesium titanate, zinc titanate, lanthanum titanate, neodymium titanate, barium zirconate, calcium zirconate, lead magnesium niobate, lead zinc niobate, lithium niobate, barium stannate, calcium stannate, magnesium aluminium silicate, magnesium silicate, barium tantalate, titanium dioxide, niobium oxide, zirconia, silica, sapphire, beryllium oxide, zirconium tin titanate, or any combination thereof. In some embodiments, the conducting scaffold is composed of an alloy of two or more materials or elements.

In some embodiments, the mass ratio between the layered double hydroxide and the conductive scaffold is about 0.2:1 to about 2.4:1. In some embodiments, the mass ratio between the layered double hydroxide and the conductive scaffold is at least about 0.2:1. In some embodiments, the mass ratio between the layered double hydroxide and the conductive scaffold is at most about 2.4:1. In some embodiments, the mass ratio between the layered double hydroxide and the conductive scaffold is about 0.2:1 to about 0.4:1, about 0.2:1 to about 0.6:1, about 0.2:1 to about 0.8:1, about 0.2:1 to about 1:1, about 0.2:1 to about 1.2:1, about 0.2:1 to about 1.4:1, about 0.2:1 to about 1.6:1, about 0.2:1 to about 1.8:1, about 0.2:1 to about 2:1, about 0.2:1 to about 2.2:1, about 0.2:1 to about 2.4:1, about 0.4:1 to about 0.6:1, about 0.4:1 to about 0.8:1, about 0.4:1 to about 1:1, about 0.4:1 to about 1.2:1, about 0.4:1 to about 1.4:1, about 0.4:1 to about 1.6:1, about 0.4:1 to about 1.8:1, about 0.4:1 to about 2:1, about 0.4:1 to about 2.2:1, about 0.4:1 to about 2.4:1, about 0.6:1 to about 0.8:1, about 0.6:1 to about 1:1, about 0.6:1 to about 1.2:1, about 0.6:1 to about 1.4:1, about 0.6:1 to about 1.6:1, about 0.6:1 to about 1.8:1, about 0.6:1 to about 2:1, about 0.6:1 to about 2.2:1, about 0.6:1 to about 2.4:1, about 0.8:1 to about 1:1, about 0.8:1 to about 1.2:1, about 0.8:1 to about 1.4:1, about 0.8:1 to about 1.6:1, about 0.8:1 to about 1.8:1, about 0.8:1 to about 2:1, about 0.8:1 to about 2.2:1, about 0.8:1 to about 2.4:1, about 1:1 to about 1.2:1, about 1:1 to about 1.4:1, about 1:1 to about 1.6:1, about 1:1 to about 1.8:1, about 1:1 to about 2:1, about 1:1 to about 2.2:1, about 1:1 to about 2.4:1, about 1.2:1 to about 1.4:1, about 1.2:1 to about 1.6:1, about 1.2:1 to about 1.8:1, about 1.2:1 to about 2:1, about 1.2:1 to about 2.2:1, about 1.2:1 to about 2.4:1, about 1.4:1 to about 1.6:1, about 1.4:1 to about 1.8:1, about 1.4:1 to about 2:1, about 1.4:1 to about 2.2:1, about 1.4:1 to about 2.4:1, about 1.6:1 to about 1.8:1, about 1.6:1 to about 2:1, about 1.6:1 to about 2.2:1, about 1.6:1 to about 2.4:1, about 1.8:1 to about 2:1, about 1.8:1 to about 2.2:1, about 1.8:1 to about 2.4:1, about 2:1 to about 2.2:1, about 2:1 to about 2.4:1, or about 2.2:1 to about 2.4:1. In some embodiments, the mass ratio between the layered double hydroxide and the conductive scaffold is about 0.2:1, about 0.4:1, about 0.6:1, about 0.8:1, about 1:1, about 1.2:1, about 1.4:1, about 1.6:1, about 1.8:1, about 2:1, about 2.2:1, or about 2.4:1.

In some embodiments, the first current collector comprises a conductive foam. In some embodiments, the conductive foam comprises aluminum foam, carbon foam, graphene foam, graphite foam, copper foam, nickel foam, palladium foam, platinum foam, steel foam, or any combination thereof. In some embodiments, the conductive foam comprises graphene foam. In some embodiments, the conductive foam comprises graphite foam. In some embodiments, the conductive foam comprises copper foam. In some embodiments, the conductive foam comprises nickel foam. In some embodiments, a current collector is a grid or sheet of a conductive material that provides a conducting path along an active material in an electrode.

In some embodiments, the first electrode has a capacitance of about 500 F/g to about 2,250 F/g. In some embodiments, the first electrode has a capacitance of at least about 500 F/g. In some embodiments, the first electrode has a capacitance of at most about 2,250 F/g. In some embodiments, the first electrode has a capacitance of about 500 F/g to about 750 F/g, about 500 F/g to about 1,000 F/g, about 500 F/g to about 1,250 F/g, about 500 F/g to about 1,500 F/g, about 500 F/g to about 1,750 F/g, about 500 F/g to about 2,000 F/g, about 500 F/g to about 2,250 F/g, about 750 F/g to about 1,000 F/g, about 750 F/g to about 1,250 F/g, about 750 F/g to about 1,500 F/g, about 750 F/g to about 1,750 F/g, about 750 F/g to about 2,000 F/g, about 750 F/g to about 2,250 F/g, about 1,000 F/g to about 1,250 F/g, about 1,000 F/g to about 1,500 F/g, about 1,000 F/g to about 1,750 F/g, about 1,000 F/g to about 2,000 F/g, about 1,000 F/g to about 2,250 F/g, about 1,250 F/g to about 1,500 F/g, about 1,250 F/g to about 1,750 F/g, about 1,250 F/g to about 2,000 F/g, about 1,250 F/g to about 2,250 F/g, about 1,500 F/g to about 1,750 F/g, about 1,500 F/g to about 2,000 F/g, about 1,500 F/g to about 2,250 F/g, about 1,750 F/g to about 2,000 F/g, about 1,750 F/g to about 2,250 F/g, or about 2,000 F/g to about 2,250 F/g. In some embodiments, the first electrode has a capacitance of about 500 F/g, about 750 F/g, about 1,000 F/g, about 1,250 F/g, about 1,500 F/g, about 1,750 F/g, about 2,000 F/g, or about 2,250 F/g. In some embodiments, the first electrode has a capacitance of about 1,150 F/g. In some embodiments, the first electrode has a capacitance of at least about 750 F/g, about 1,000 F/g, about 1,250 F/g, about 1,500 F/g, about 1,750 F/g, about 2,000 F/g, about or 2,250 F/g.

In some embodiments, the first electrode has a gravimetric capacity of about 30 mAh/g to about 120 mAh/g. In some embodiments, the first electrode has a gravimetric capacity of at least about 30 mAh/g. In some embodiments, the first electrode has a gravimetric capacity of at most about 120 mAh/g. In some embodiments, the first electrode has a gravimetric capacity of about 30 mAh/g to about 40 mAh/g, about 30 mAh/g to about 50 mAh/g, about 30 mAh/g to about 60 mAh/g, about 30 mAh/g to about 70 mAh/g, about 30 mAh/g to about 80 mAh/g, about 30 mAh/g to about 90 mAh/g, about 30 mAh/g to about 100 mAh/g, about 30 mAh/g to about 110 mAh/g, about 30 mAh/g to about 120 mAh/g, about 40 mAh/g to about 50 mAh/g, about 40 mAh/g to about 60 mAh/g, about 40 mAh/g to about 70 mAh/g, about 40 mAh/g to about 80 mAh/g, about 40 mAh/g to about 90 mAh/g, about 40 mAh/g to about 100 mAh/g, about 40 mAh/g to about 110 mAh/g, about 40 mAh/g to about 120 mAh/g, about 50 mAh/g to about 60 mAh/g, about 50 mAh/g to about 70 mAh/g, about 50 mAh/g to about 80 mAh/g, about 50 mAh/g to about 90 mAh/g, about 50 mAh/g to about 100 mAh/g, about 50 mAh/g to about 110 mAh/g, about 50 mAh/g to about 120 mAh/g, about 60 mAh/g to about 70 mAh/g, about 60 mAh/g to about 80 mAh/g, about 60 mAh/g to about 90 mAh/g, about 60 mAh/g to about 100 mAh/g, about 60 mAh/g to about 110 mAh/g, about 60 mAh/g to about 120 mAh/g, about 70 mAh/g to about 80 mAh/g, about 70 mAh/g to about 90 mAh/g, about 70 mAh/g to about 100 mAh/g, about 70 mAh/g to about 110 mAh/g, about 70 mAh/g to about 120 mAh/g, about 80 mAh/g to about 90 mAh/g, about 80 mAh/g to about 100 mAh/g, about 80 mAh/g to about 110 mAh/g, about 80 mAh/g to about 120 mAh/g, about 90 mAh/g to about 100 mAh/g, about 90 mAh/g to about 110 mAh/g, about 90 mAh/g to about 120 mAh/g, about 100 mAh/g to about 110 mAh/g, about 100 mAh/g to about 120 mAh/g, or about 110 mAh/g to about 120 mAh/g. In some embodiments, the first electrode has a gravimetric capacity of about 30 mAh/g, about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g. In some embodiments, the first electrode has a gravimetric capacity of at least about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g.

In some embodiments, the second electrode comprises a hydroxide and a second current collector.

In some embodiments, the hydroxide comprises aluminum hydroxide, ammonium hydroxide, arsenic hydroxide, barium hydroxide, beryllium hydroxide, bismuth(III) hydroxide, boron hydroxide, cadmium hydroxide, calcium hydroxide, cerium(III) hydroxide, cesium hydroxide, chromium(II) hydroxide, chromium(III) hydroxide, chromium (V) hydroxide, chromium(VI) hydroxide, cobalt(II) hydroxide, cobalt(III) hydroxide, copper(I) hydroxide, copper(II) hydroxide, gallium(II) hydroxide, gallium(III) hydroxide, gold(I) hydroxide, gold(III) hydroxide, indium(I) hydroxide, indium(II) hydroxide, indium(III) hydroxide, iridium(III) hydroxide, iron(II) hydroxide, iron(III) hydroxide, lanthanum hydroxide, lead(II) hydroxide, lead(IV) hydroxide, lithium hydroxide, magnesium hydroxide, manganese(II) hydroxide, manganese(III) hydroxide, manganese(IV) hydroxide, manganese(VII) hydroxide, mercury(I) hydroxide, mercury(II) hydroxide, molybdenum hydroxide, neodymium hydroxide, nickel oxo-hydroxide, nickel(II) hydroxide, nickel(III) hydroxide, niobium hydroxide, osmium(IV) hydroxide, palladium(II) hydroxide, palladium(IV) hydroxide, platinum(II) hydroxide, platinum(IV) hydroxide, plutonium(IV) hydroxide, potassium hydroxide, radium hydroxide, rubidium hydroxide, ruthenium(III) hydroxide, scandium hydroxide, silicon hydroxide, silver hydroxide, sodium hydroxide, strontium hydroxide, tantalum(V) hydroxide, technetium(II) hydroxide, tetramethylammonium hydroxide, thallium(I) hydroxide, thallium(III) hydroxide, thorium hydroxide, tin(II) hydroxide, tin(IV) hydroxide, titanium(II) hydroxide, titanium(III) hydroxide, titanium(IV) hydroxide, tungsten(II) hydroxide, uranyl hydroxide, vanadium(II) hydroxide, vanadium(III) hydroxide, vanadium(V) hydroxide, ytterbium hydroxide, yttrium hydroxide, zinc hydroxide, zirconium hydroxide.

In some embodiments, the hydroxide comprises hydroxide nanoflakes, hydroxide nanoparticles, hydroxide nanopowder, hydroxide nanoflowers, hydroxide nanodots, hydroxide nanorods, hydroxide nanochains, hydroxide nanofibers, hydroxide nanoparticles, hydroxide nanoplatelets, hydroxide nanoribbons, hydroxide nanorings, hydroxide nanosheets, or a combination thereof. In some embodiments, the hydroxide comprises nickel(II) hydroxide. In some embodiments, the hydroxide comprises nickel(III) hydroxide. In some embodiments, the hydroxide comprises palladium(II) hydroxide. In some embodiments, the hydroxide comprises palladium(IV) hydroxide. In some embodiments, the hydroxide comprises copper(I) hydroxide. In some embodiments, the hydroxide comprises copper(II) hydroxide.

In some embodiments, the hydroxide comprises cobalt(II) hydroxide nanopowder. In some embodiments, the hydroxide comprises cobalt(III) hydroxide nanosheets. In some embodiments, the hydroxide comprises nickel(III) hydroxide nanoflakes. In some embodiments, the hydroxide comprises copper(I) hydroxide nanoflakes. In some embodiments, the hydroxide comprises copper(II) hydroxide nanopowder. In some embodiments, the hydroxide comprises nickel(II) hydroxide nanoflakes.

In some embodiments, the hydroxide is deposited on the second current collector. In some embodiments, the second current collector comprises a conductive foam. In some embodiments, the conductive foam comprises aluminum foam, carbon foam, graphene foam, graphite foam, copper foam, nickel foam, palladium foam, platinum foam, steel foam, or any combination thereof. In some embodiments, the conductive foam comprises graphene foam. In some embodiments, the conductive foam comprises graphite foam. In some embodiments, the conductive foam comprises copper foam. In some embodiments, the conductive foam comprises nickel foam.

In some embodiments, the second electrode has a capacitance of about 500 F/g to about 2,500 F/g. In some embodiments, the second electrode has a capacitance of at least about 500 F/g. In some embodiments, the second electrode has a capacitance of at most about 2,500 F/g. In some embodiments, the second electrode has a capacitance of about 500 F/g to about 750 F/g, about 500 F/g to about 1,000 F/g, about 500 F/g to about 1,250 F/g, about 500 F/g to about 1,500 F/g, about 500 F/g to about 1,750 F/g, about 500 F/g to about 2,000 F/g, about 500 F/g to about 2,250 F/g, about 500 F/g to about 2,500 F/g, about 750 F/g to about 1,000 F/g, about 750 F/g to about 1,250 F/g, about 750 F/g to about 1,500 F/g, about 750 F/g to about 1,750 F/g, about 750 F/g to about 2,000 F/g, about 750 F/g to about 2,250 F/g, about 750 F/g to about 2,500 F/g, about 1,000 F/g to about 1,250 F/g, about 1,000 F/g to about 1,500 F/g, about 1,000 F/g to about 1,750 F/g, about 1,000 F/g to about 2,000 F/g, about 1,000 F/g to about 2,250 F/g, about 1,000 F/g to about 2,500 F/g, about 1,250 F/g to about 1,500 F/g, about 1,250 F/g to about 1,750 F/g, about 1,250 F/g to about 2,000 F/g, about 1,250 F/g to about 2,250 F/g, about 1,250 F/g to about 2,500 F/g, about 1,500 F/g to about 1,750 F/g, about 1,500 F/g to about 2,000 F/g, about 1,500 F/g to about 2,250 F/g, about 1,500 F/g to about 2,500 F/g, about 1,750 F/g to about 2,000 F/g, about 1,750 F/g to about 2,250 F/g, about 1,750 F/g to about 2,500 F/g, about 2,000 F/g to about 2,250 F/g, about 2,000 F/g to about 2,500 F/g, or about 2,250 F/g to about 2,500 F/g. In some embodiments, the second electrode has a capacitance of about 500 F/g, about 750 F/g, about 1,000 F/g, about 1,250 F/g, about 1,500 F/g, about 1,750 F/g, about 2,000 F/g, about 2,250 F/g, or about 2,500 F/g. In some embodiments, the second electrode has a capacitance of at least about 750 F/g, about 1,000 F/g, about 1,250 F/g, about 1,500 F/g, about 1,750 F/g, about 2,000 F/g, about 2,250 F/g, or about 2,500 F/g.

In some embodiments, the second electrode has a gravimetric capacity of about 30 mAh/g to about 120 mAh/g. In some embodiments, the second electrode has a gravimetric capacity of at least about 30 mAh/g. In some embodiments, the second electrode has a gravimetric capacity of at most about 120 mAh/g. In some embodiments, the second electrode has a gravimetric capacity of about 30 mAh/g to about 40 mAh/g, about 30 mAh/g to about 50 mAh/g, about 30 mAh/g to about 60 mAh/g, about 30 mAh/g to about 70 mAh/g, about 30 mAh/g to about 80 mAh/g, about 30 mAh/g to about 90 mAh/g, about 30 mAh/g to about 100 mAh/g, about 30 mAh/g to about 110 mAh/g, about 30 mAh/g to about 120 mAh/g, about 40 mAh/g to about 50 mAh/g, about 40 mAh/g to about 60 mAh/g, about 40 mAh/g to about 70 mAh/g, about 40 mAh/g to about 80 mAh/g, about 40 mAh/g to about 90 mAh/g, about 40 mAh/g to about 100 mAh/g, about 40 mAh/g to about 110 mAh/g, about 40 mAh/g to about 120 mAh/g, about 50 mAh/g to about 60 mAh/g, about 50 mAh/g to about 70 mAh/g, about 50 mAh/g to about 80 mAh/g, about 50 mAh/g to about 90 mAh/g, about 50 mAh/g to about 100 mAh/g, about 50 mAh/g to about 110 mAh/g, about 50 mAh/g to about 120 mAh/g, about 60 mAh/g to about 70 mAh/g, about 60 mAh/g to about 80 mAh/g, about 60 mAh/g to about 90 mAh/g, about 60 mAh/g to about 100 mAh/g, about 60 mAh/g to about 110 mAh/g, about 60 mAh/g to about 120 mAh/g, about 70 mAh/g to about 80 mAh/g, about 70 mAh/g to about 90 mAh/g, about 70 mAh/g to about 100 mAh/g, about 70 mAh/g to about 110 mAh/g, about 70 mAh/g to about 120 mAh/g, about 80 mAh/g to about 90 mAh/g, about 80 mAh/g to about 100 mAh/g, about 80 mAh/g to about 110 mAh/g, about 80 mAh/g to about 120 mAh/g, about 90 mAh/g to about 100 mAh/g, about 90 mAh/g to about 110 mAh/g, about 90 mAh/g to about 120 mAh/g, about 100 mAh/g to about 110 mAh/g, about 100 mAh/g to about 120 mAh/g, or about 110 mAh/g to about 120 mAh/g. In some embodiments, the second electrode has a gravimetric capacity of about 30 mAh/g, about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g. In some embodiments, the second electrode has a gravimetric capacity of at least about 40 mAh/g, about 50 mAh/g, about 60 mAh/g, about 70 mAh/g, about 80 mAh/g, about 90 mAh/g, about 100 mAh/g, about 110 mAh/g, or about 120 mAh/g.

In some embodiments, the first electrode is configured to be employed as the positive electrode. In some embodiments, the first electrode is configured to be employed as the negative electrode. In some embodiments, the second electrode is configured to be employed as the positive electrode. In some embodiments, the second electrode is configured to be employed as the negative electrode. In some embodiments, the first electrode and the second electrode are the same.

An electrolyte is a substance that produces an electrically conducting solution when dissolved in a solvent. In some embodiments, the electrolyte comprises an aqueous electrolyte. In some embodiments, the electrolyte comprises alkaline electrolyte. In some embodiments, the electrolyte comprises a base and a conductive additive.

In some embodiments, the base comprises a strong base. In some embodiments, the strong base comprises lithium hydroxide, sodium hydroxide, potassium hydroxide, rubidium hydroxide, cesium hydroxide, magnesium hydroxide, calcium hydroxide, strontium hydroxide, barium hydroxide, or any combination thereof. In some embodiments, the strong base comprises potassium hydroxide. In some embodiments, the strong base comprises calcium hydroxide. In some embodiments, the strong base comprises sodium hydroxide.

In some embodiments, the conductive additive comprises a transition metal oxide. In some embodiments, the transition metal oxide comprises sodium (I) oxide, potassium (I) oxide, ferrous (II) oxide, magnesium (II) oxide, calcium (II) oxide, chromium (III) oxide, copper (I) oxide, zinc (II) oxide, or any combination thereof. In some embodiments, the conductive additive comprises a semiconductive material. In some embodiments, the semiconductive material comprises cuprous chloride, cadmium phosphide, cadmium arsenide, cadmium antimonide, zinc phosphide, zinc arsenide, zinc antimonide, cadmium selenide, cadmium sulfide, cadmium telluride, zinc selenide, zinc sulfide, zinc telluride, zinc oxide, or any combination thereof. In some embodiments, the conductive additive comprises sodium (I) oxide. In some embodiments, the conductive additive comprises. In some embodiments, the conductive additive comprises ferrous (II) oxide. In some embodiments, the conductive additive comprises zinc oxide.

In some embodiments, the electrolyte has a concentration of about 1 M to about 12 M. In some embodiments, the electrolyte has a concentration of at least about 1 M. In some embodiments, the electrolyte has a concentration of at most about 12 M. In some embodiments, the electrolyte has a concentration of about 1 M to about 2 M, about 1 M to about 3 M, about 1 M to about 4 M, about 1 M to about 5 M, about 1 M to about 6 M, about 1 M to about 7 M, about 1 M to about 8 M, about 1 M to about 9 M, about 1 M to about 10 M, about 1 M to about 11 M, about 1 M to about 12 M, about 2 M to about 3 M, about 2 M to about 4 M, about 2 M to about 5 M, about 2 M to about 6 M, about 2 M to about 7 M, about 2 M to about 8 M, about 2 M to about 9 M, about 2 M to about 10 M, about 2 M to about 11 M, about 2 M to about 12 M, about 3 M to about 4 M, about 3 M to about 5 M, about 3 M to about 6 M, about 3 M to about 7 M, about 3 M to about 8 M, about 3 M to about 9 M, about 3 M to about 10 M, about 3 M to about 11 M, about 3 M to about 12 M, about 4 M to about 5 M, about 4 M to about 6 M, about 4 M to about 7 M, about 4 M to about 8 M, about 4 M to about 9 M, about 4 M to about 10 M, about 4 M to about 11 M, about 4 M to about 12 M, about 5 M to about 6 M, about 5 M to about 7 M, about 5 M to about 8 M, about 5 M to about 9 M, about 5 M to about 10 M, about 5 M to about 11 M, about 5 M to about 12 M, about 6 M to about 7 M, about 6 M to about 8 M, about 6 M to about 9 M, about 6 M to about 10 M, about 6 M to about 11 M, about 6 M to about 12 M, about 7 M to about 8 M, about 7 M to about 9 M, about 7 M to about 10 M, about 7 M to about 11 M, about 7 M to about 12 M, about 8 M to about 9 M, about 8 M to about 10 M, about 8 M to about 11 M, about 8 M to about 12 M, about 9 M to about 10 M, about 9 M to about 11 M, about 9 M to about 12 M, about 10 M to about 11 M, about 10 M to about 12 M, or about 11 M to about 12 M. In some embodiments, the electrolyte has a concentration of about 1 M, about 2 M, about 3 M, about 4 M, about 5 M, about 6 M, about 7 M, about 8 M, about 9 M, about 10 M, about 11 M, or about 12 M. In some embodiments, the electrolyte has a concentration of at least about 2 M, about 3 M, about 4 M, about 5 M, about 6 M, about 7 M, about 8 M, about 9 M, about 10 M, about 11 M, or about 12 M. In some embodiments, the electrolyte has a concentration of at most about 1 M, about 2 M, about 3 M, about 4 M, about 5 M, about 6 M, about 7 M, about 8 M, about 9 M, about 10 M, or about 11 M.

In some embodiments, the specific selection of the electrolyte within the energy storage devices of the current disclosure enables significantly high energy densities.

In some embodiments, the separator maintains a set distance between the first electrode and the second electrode to prevent electrical short circuits, while allowing the transport of ionic charge carriers. In some embodiments, the separator comprises a permeable membrane placed between the first and second electrodes. In some embodiments, the separator comprises a non-woven fiber, a polymer film, a ceramic, a naturally occurring material, a supported liquid membranes or any combination thereof. In some embodiments, the non-woven fiber comprises cotton, nylon, polyesters, glass, or any combination thereof. In some embodiments, the polymer film comprises polyethylene, polypropylene, poly (tetrafluoroethylene), polyvinyl chloride, or any combination thereof. In some embodiments, the naturally occurring material comprises rubber, asbestos, wood, or any combination thereof. In some embodiments a supported liquid membranes comprises a solid and liquid phase contained within a microporous separator.

In some embodiments, the separator comprises a sheet, a web, or mat of directionally oriented fibers, randomly oriented fibers, or any combination thereof. In some embodiments, the separator comprises a single layer. In some embodiments, the separator comprises a plurality of layers.

In some embodiments, the energy storage device comprises a first electrode comprising Zn—Fe LDH/3DGA and a second electrode comprising $Ni(OH)_2$, and an electrolyte comprising ZnO-saturated KOH. In these embodiments, the electrochemical reactions within the first electrode is defined as:

$$Zn(OH)_2+OH^-=ZnOOH+H2O+e^-$$

$$Fe(OH)_2+OH^-=FeOOH+H2O+e^-$$

In these embodiments, the electrochemical reactions within the second electrode is defined as:

$$Ni(OH)2+OH^-=NiOOH+H2O+e^-$$

In these embodiments, the electrochemical reactions within the electrolyte is defined as:

$$ZnO+H2O+2e^-=ZnO+2OH^-$$

In some embodiments, the combination of these reactions enables an energy storage device to store energy through both redox reactions and ion adsorption, which operate at high voltages and exhibit both the capacity of a battery and the power performance of supercapacitors in one device.

Performance of Energy Storage Devices

Per FIG. 20B, and Table 3 below, the energy storage devices of the present disclosure exhibit superior gravimetric energy densities, charge rates, and charge times as compared to currently available energy storage devices such as lithium-ion energy devices, lead-acid energy devices, nickel-cadmium energy devices, nickel-metal hydride energy devices, and nickel-zinc energy devices.

TABLE 3

| | Positive electrode | Negative Electrode | Electrolyte | Voltage (V) | Energy density (Wh/kg) | Charge Rate (C) | Charge Time |
|---|---|---|---|---|---|---|---|
| Lithium ion | Carbon/ Graphite | Metal oxides, phosphates | $Li^+$ ion salt solution | 3.2 to 3.7 | 100-200 | 0.1-0.3 | 3 to 10 hours |
| Lead Acid | $PbO_2$ | Pb | Sulfuric acid | 2.0 | 20-40 | 0.05-0.2 | 5-20 hours |
| Nickel-Cadmium | NiOOH | Cd | KOH solution | 1.2 | 40-60 | 0.3 C | >3 hours |
| Nickel-Metal Hydride | NiOOH | Hydrogen alloy | KOH solution | 1.2 | 60-120 | 0.5 C | >2 hours |
| Nickel-Zinc | NiOOH | Zn | KOH solution | 1.65 | 100 | 0.5 C | >2 hours |
| Current Disclosure | NiOOH nanoflakes | Graphene aerogel loaded with Zn-Fe LDH | KOH solution saturated with ZnO | 1.7 | >400 | 200 C | 2.5 seconds |

In some embodiments, the energy storage device has an active material specific energy density of about 400 Wh/kg to about 1,600 Wh/kg. In some embodiments, the energy storage device has an active material specific energy density of at least about 400 Wh/kg. In some embodiments, the energy storage device has an active material specific energy density of at most about 1,600 Wh/kg. In some embodiments, the energy storage device has an active material specific energy density of about 400 Wh/kg to about 500 Wh/kg, about 400 Wh/kg to about 600 Wh/kg, about 400 Wh/kg to about 700 Wh/kg, about 400 Wh/kg to about 800 Wh/kg, about 400 Wh/kg to about 900 Wh/kg, about 400 Wh/kg to about 1,000 Wh/kg, about 400 Wh/kg to about 1,100 Wh/kg, about 400 Wh/kg to about 1,200 Wh/kg, about 400 Wh/kg to about 1,300 Wh/kg, about 400 Wh/kg to about 1,400 Wh/kg, about 400 Wh/kg to about 1,600 Wh/kg, about 500 Wh/kg to about 600 Wh/kg, about 500 Wh/kg to about 700 Wh/kg, about 500 Wh/kg to about 800 Wh/kg, about 500 Wh/kg to about 900 Wh/kg, about 500 Wh/kg to about 1,000 Wh/kg, about 500 Wh/kg to about 1,100 Wh/kg, about 500 Wh/kg to about 1,200 Wh/kg, about 500 Wh/kg to about 1,300 Wh/kg, about 500 Wh/kg to about 1,400 Wh/kg, about 500 Wh/kg to about 1,600 Wh/kg, about 600 Wh/kg to about 700 Wh/kg, about 600 Wh/kg to about 800 Wh/kg, about 600 Wh/kg to about 900 Wh/kg, about 600 Wh/kg to about 1,000 Wh/kg, about 600 Wh/kg to about 1,100 Wh/kg, about 600 Wh/kg to about 1,200 Wh/kg, about 600 Wh/kg to about 1,300 Wh/kg, about 600 Wh/kg to about 1,400 Wh/kg, about 600 Wh/kg to about 1,600 Wh/kg, about 700 Wh/kg to about 800 Wh/kg, about 700 Wh/kg to about 900 Wh/kg, about 700 Wh/kg to about 1,000 Wh/kg, about 700 Wh/kg to about 1,100 Wh/kg, about 700 Wh/kg to about 1,200 Wh/kg, about 700 Wh/kg to about 1,300 Wh/kg, about 700 Wh/kg to about 1,400 Wh/kg, about 700 Wh/kg to about 1,600 Wh/kg, about 800 Wh/kg to about 900 Wh/kg, about 800 Wh/kg to about 1,000 Wh/kg, about 800 Wh/kg to about 1,100 Wh/kg, about 800 Wh/kg to about 1,200 Wh/kg, about 800 Wh/kg to about 1,300 Wh/kg, about 800 Wh/kg to about 1,400 Wh/kg, about 800 Wh/kg to about 1,600 Wh/kg, about 900 Wh/kg to about 1,000 Wh/kg, about 900 Wh/kg to about 1,100 Wh/kg, about 900 Wh/kg to about 1,200 Wh/kg, about 900 Wh/kg to about 1,300 Wh/kg, about 900 Wh/kg to about 1,400 Wh/kg, about 900 Wh/kg to about 1,600 Wh/kg, about 1,000 Wh/kg to about 1,100 Wh/kg, about 1,000 Wh/kg to about 1,200 Wh/kg, about 1,000 Wh/kg to about 1,300 Wh/kg, about 1,000 Wh/kg to about 1,400 Wh/kg, about 1,000 Wh/kg to about 1,600 Wh/kg, about 1,100 Wh/kg to about 1,200 Wh/kg, about 1,100 Wh/kg to about 1,300 Wh/kg, about 1,100 Wh/kg to about 1,400 Wh/kg, about 1,100 Wh/kg to about 1,600 Wh/kg, about 1,200 Wh/kg to about 1,300 Wh/kg, about 1,200 Wh/kg to about 1,400 Wh/kg, about 1,200 Wh/kg to about 1,600 Wh/kg, about 1,300 Wh/kg to about 1,400 Wh/kg, about 1,300 Wh/kg to about 1,600 Wh/kg, or about 1,400 Wh/kg to about 1,600 Wh/kg. In some embodiments, the energy storage device has an active material specific energy density of about 400 Wh/kg, about 500 Wh/kg, about 600 Wh/kg, about 700 Wh/kg, about 800 Wh/kg, about 900 Wh/kg, about 1,000 Wh/kg, about 1,100 Wh/kg, about 1,200 Wh/kg, about 1,300 Wh/kg, about 1,400 Wh/kg, or about 1,600 Wh/kg. In some embodiments, the energy storage device has an active material specific energy density of at least about 500 Wh/kg, about 600 Wh/kg, about 700 Wh/kg, about 800 Wh/kg, about 900 Wh/kg, about 1,000 Wh/kg, about 1,100 Wh/kg, about 1,200 Wh/kg, about 1,300 Wh/kg, about 1,400 Wh/kg, or about 1,600 Wh/kg.

In some embodiments, the energy storage device has a total gravimetric energy density of about 200 Wh/kg to about 800 Wh/kg. In some embodiments, the energy storage device has a total gravimetric energy density of at least about 200 Wh/kg. In some embodiments, the energy storage device has a total gravimetric energy density of at most about 800 Wh/kg. In some embodiments, the energy storage device has a total gravimetric energy density of about 200 Wh/kg to about 250 Wh/kg, about 200 Wh/kg to about 300 Wh/kg, about 200 Wh/kg to about 350 Wh/kg, about 200 Wh/kg to about 400 Wh/kg, about 200 Wh/kg to about 450 Wh/kg, about 200 Wh/kg to about 500 Wh/kg, about 200 Wh/kg to about 550 Wh/kg, about 200 Wh/kg to about 600 Wh/kg, about 200 Wh/kg to about 650 Wh/kg, about 200 Wh/kg to about 700 Wh/kg, about 200 Wh/kg to about 800 Wh/kg, about 250 Wh/kg to about 300 Wh/kg, about 250 Wh/kg to about 350 Wh/kg, about 250 Wh/kg to about 400 Wh/kg, about 250 Wh/kg to about 450 Wh/kg, about 250 Wh/kg to about 500 Wh/kg, about 250 Wh/kg to about 550 Wh/kg, about 250 Wh/kg to about 600 Wh/kg, about 250 Wh/kg to about 650 Wh/kg, about 250 Wh/kg to about 700 Wh/kg, about 250 Wh/kg to about 800 Wh/kg, about 300 Wh/kg to about 350 Wh/kg, about 300 Wh/kg to about 400 Wh/kg, about 300 Wh/kg to about 450 Wh/kg, about 300 Wh/kg to about 500 Wh/kg, about 300 Wh/kg to about 550 Wh/kg, about 300 Wh/kg to about 600 Wh/kg, about 300 Wh/kg to about 650 Wh/kg, about 300 Wh/kg to about 700 Wh/kg, about 300 Wh/kg to about 800 Wh/kg, about 350 Wh/kg to about 400 Wh/kg, about 350 Wh/kg to about 450 Wh/kg, about 350 Wh/kg to about 500 Wh/kg, about 350 Wh/kg to about 550 Wh/kg, about 350 Wh/kg to about 600 Wh/kg, about 350 Wh/kg to about 650 Wh/kg, about 350 Wh/kg to about 700 Wh/kg, about 350 Wh/kg to about 800 Wh/kg, about 400 Wh/kg to about 450 Wh/kg, about 400 Wh/kg to about 500 Wh/kg, about 400 Wh/kg to about 550 Wh/kg, about 400 Wh/kg to about 600 Wh/kg, about 400 Wh/kg to about 650 Wh/kg, about 400 Wh/kg to about 700 Wh/kg, about 400 Wh/kg to about 800 Wh/kg, about 450 Wh/kg to about 500 Wh/kg, about 450 Wh/kg to about 550 Wh/kg, about 450 Wh/kg to about 600 Wh/kg, about 450 Wh/kg to about 650 Wh/kg, about 450 Wh/kg to about 700 Wh/kg, about 450 Wh/kg to about 800 Wh/kg, about 500 Wh/kg to about 550 Wh/kg, about 500 Wh/kg to about 600 Wh/kg, about 500 Wh/kg to about 650 Wh/kg, about 500 Wh/kg to about 700 Wh/kg, about 500 Wh/kg to about 800 Wh/kg, about 550 Wh/kg to about 600 Wh/kg, about 550 Wh/kg to about 650 Wh/kg, about 550 Wh/kg to about 700 Wh/kg, about 550 Wh/kg to about 800 Wh/kg, about 600 Wh/kg to about 650 Wh/kg, about 600 Wh/kg to about 700 Wh/kg, about 600 Wh/kg to about 800 Wh/kg, about 650 Wh/kg to about 700 Wh/kg, about 650 Wh/kg to about 800 Wh/kg, or about 700 Wh/kg to about 800 Wh/kg. In some embodiments, the energy storage device has a total gravimetric energy density of about 200 Wh/kg, about 250 Wh/kg, about 300 Wh/kg, about 350 Wh/kg, about 400 Wh/kg, about 450 Wh/kg, about 500 Wh/kg, about 550 Wh/kg, about 600 Wh/kg, about 650 Wh/kg, about 700 Wh/kg, or about 800 Wh/kg. In some embodiments, the energy storage device has a total gravimetric energy density of at least about 250 Wh/kg, about 300 Wh/kg, about 350 Wh/kg, about 400 Wh/kg, about 450 Wh/kg, about 500 Wh/kg, about 550 Wh/kg, about 600 Wh/kg, about 650 Wh/kg, about 700 Wh/kg, or about 800 Wh/kg.

In some embodiments, the energy storage device has a total volumetric energy density of about 300 Wh/L to about 1,500 Wh/L. In some embodiments, the energy storage device has a total volumetric energy density of at least about 300 Wh/L. In some embodiments, the energy storage device has a total volumetric energy density of at most about 1,500 Wh/L. In some embodiments, the energy storage device has a total volumetric energy density of about 300 Wh/L to about 400 Wh/L, about 300 Wh/L to about 500 Wh/L, about 300 Wh/L to about 600 Wh/L, about 300 Wh/L to about 700 Wh/L, about 300 Wh/L to about 800 Wh/L, about 300 Wh/L to about 900 Wh/L, about 300 Wh/L to about 1,000 Wh/L, about 300 Wh/L to about 1,100 Wh/L, about 300 Wh/L to about 1,200 Wh/L, about 300 Wh/L to about 1,300 Wh/L, about 300 Wh/L to about 1,500 Wh/L, about 400 Wh/L to about 500 Wh/L, about 400 Wh/L to about 600 Wh/L, about 400 Wh/L to about 700 Wh/L, about 400 Wh/L to about 800 Wh/L, about 400 Wh/L to about 900 Wh/L, about 400 Wh/L to about 1,000 Wh/L, about 400 Wh/L to about 1,100 Wh/L, about 400 Wh/L to about 1,200 Wh/L, about 400 Wh/L to about 1,300 Wh/L, about 400 Wh/L to about 1,500 Wh/L, about 500 Wh/L to about 600 Wh/L, about 500 Wh/L to about 700 Wh/L, about 500 Wh/L to about 800 Wh/L, about 500 Wh/L to about 900 Wh/L, about 500 Wh/L to about 1,000 Wh/L, about 500 Wh/L to about 1,100 Wh/L, about 500 Wh/L to about 1,200 Wh/L, about 500 Wh/L to about 1,300 Wh/L, about 500 Wh/L to about 1,500 Wh/L, about 600 Wh/L to about 700 Wh/L, about 600 Wh/L to about 800 Wh/L, about 600 Wh/L to about 900 Wh/L, about 600 Wh/L to about 1,000 Wh/L, about 600 Wh/L to about 1,100 Wh/L, about 600 Wh/L to about 1,200 Wh/L, about 600 Wh/L to about 1,300 Wh/L, about 600 Wh/L to about 1,500 Wh/L, about 700 Wh/L to about 800 Wh/L, about 700 Wh/L to about 900 Wh/L, about 700 Wh/L to about 1,000 Wh/L, about 700 Wh/L to about 1,100 Wh/L, about 700 Wh/L to about 1,200 Wh/L, about 700 Wh/L to about 1,300 Wh/L, about 700 Wh/L to about 1,500 Wh/L, about 800 Wh/L to about 900 Wh/L, about 800 Wh/L to about 1,000 Wh/L, about 800 Wh/L to about 1,100 Wh/L, about 800 Wh/L to about 1,200 Wh/L, about 800 Wh/L to about 1,300 Wh/L, about 800 Wh/L to about 1,500 Wh/L, about 900 Wh/L to about 1,000 Wh/L, about 900 Wh/L to about 1,100 Wh/L, about 900 Wh/L to about 1,200 Wh/L, about 900 Wh/L to about 1,300 Wh/L, about 900 Wh/L to about 1,500 Wh/L, about 1,000 Wh/L to about 1,100 Wh/L, about 1,000 Wh/L to about 1,200 Wh/L, about 1,000 Wh/L to about 1,300 Wh/L, about 1,000 Wh/L to about 1,500 Wh/L, about 1,100 Wh/L to about 1,200 Wh/L, about 1,100 Wh/L to about 1,300 Wh/L, about 1,100 Wh/L to about 1,500 Wh/L, about 1,200 Wh/L to about 1,300 Wh/L, about 1,200 Wh/L to about 1,500 Wh/L, or about 1,300 Wh/L to about 1,500 Wh/L. In some embodiments, the energy storage device has a total volumetric energy density of about 300 Wh/L, about 400 Wh/L, about 500 Wh/L, about 600 Wh/L, about 700 Wh/L, about 800 Wh/L, about 900 Wh/L, about 1,000 Wh/L, about 1,100 Wh/L, about 1,200 Wh/L, about 1,300 Wh/L, or about 1,500 Wh/L. In some embodiments, the energy storage device has a total volumetric energy density of at least about 400 Wh/L, about 500 Wh/L, about 600 Wh/L, about 700 Wh/L, about 800 Wh/L, about 900 Wh/L, about 1,000 Wh/L, about 1,100 Wh/L, about 1,200 Wh/L, about 1,300 Wh/L, or about 1,500 Wh/L.

Figure 20A:
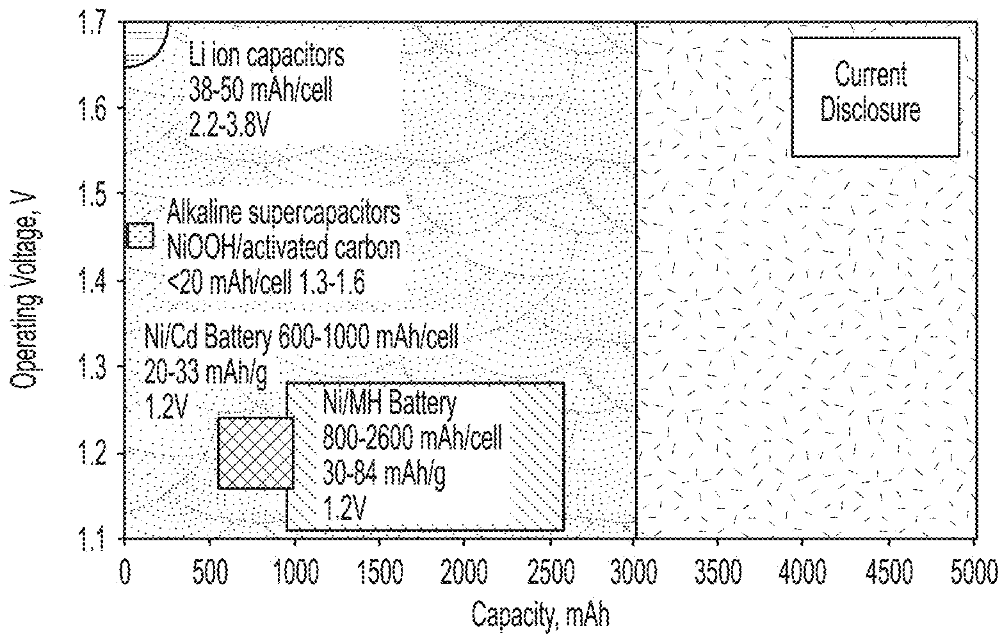
FIG. 20A is a graph comparing the capacities and operating voltages of current energy storage devices with an exemplary energy storage device of the present disclosure.
Figure 20B:
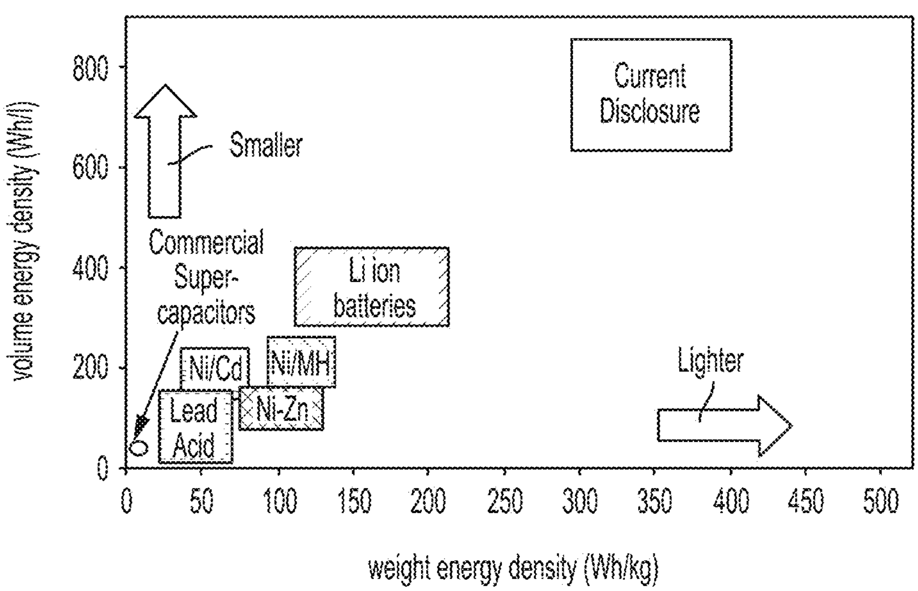
FIG. 20B is a graph comparing the gravimetric energy densities and the volumetric energy densities of current energy storage devices with an exemplary energy storage device of the present disclosure.
Figure 20C:
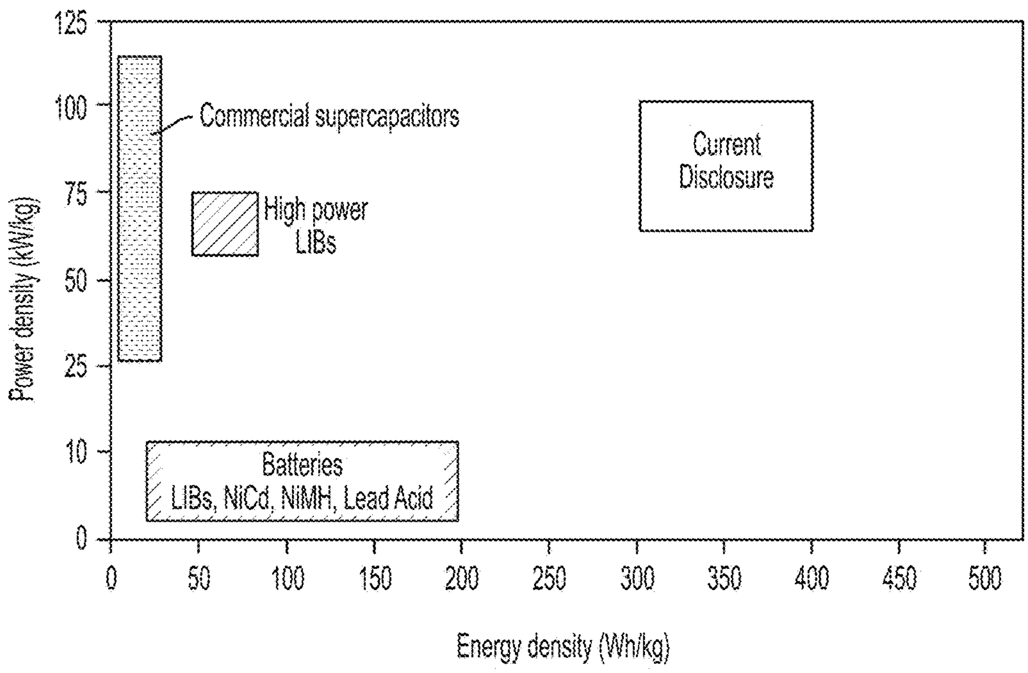
FIG. 20C is a graph comparing the energy densities and power densities of current energy storage devices with an exemplary energy storage device of the present disclosure.

In some embodiments, per FIG. 20C, the energy storage device has an active material specific power density of about 75 Wh/kg to about 270 Wh/kg. In some embodiments, the energy storage device has an active material specific power density of about 140 kW/kg. By contrast, the total energy densities of lithium-ion batteries, nickel-cadmium batteries, nickel-metal-hydride batteries, and lead-acid batteries are less than 200 Wh/kg. By further contrast high power lithium-ion batteries have an energy density of less than 100 Wh/kg, and commercial supercapacitors exhibit energy densities of less than 40 Wh/kg.

In some embodiments, the energy storage device has a total power density of about 30 kW/kg to about 120 kW/kg. In some embodiments, the energy storage device has a total power density of at least about 30 kW/kg. In some embodiments, the energy storage device has a total power density of at most about 120 kW/kg. In some embodiments, the energy storage device has a total power density of about 30 kW/kg to about 40 kW/kg, about 30 kW/kg to about 50 kW/kg, about 30 kW/kg to about 60 kW/kg, about 30 kW/kg to about 70 kW/kg, about 30 kW/kg to about 80 kW/kg, about 30 kW/kg to about 90 kW/kg, about 30 kW/kg to about 100 kW/kg, about 30 kW/kg to about 110 kW/kg, about 30 kW/kg to about 120 kW/kg, about 40 kW/kg to about 50 kW/kg, about 40 kW/kg to about 60 kW/kg, about 40 kW/kg to about 70 kW/kg, about 40 kW/kg to about 80 kW/kg, about 40 kW/kg to about 90 kW/kg, about 40 kW/kg to about 100 kW/kg, about 40 kW/kg to about 110 kW/kg, about 40 kW/kg to about 120 kW/kg, about 50 kW/kg to about 60 kW/kg, about 50 kW/kg to about 70 kW/kg, about 50 kW/kg to about 80 kW/kg, about 50 kW/kg to about 90 kW/kg, about 50 kW/kg to about 100 kW/kg, about 50 kW/kg to about 110 kW/kg, about 50 kW/kg to about 120 kW/kg, about 60 kW/kg to about 70 kW/kg, about 60 kW/kg to about 80 kW/kg, about 60 kW/kg to about 90 kW/kg, about 60 kW/kg to about 100 kW/kg, about 60 kW/kg to about 110 kW/kg, about 60 kW/kg to about 120 kW/kg, about 70 kW/kg to about 80 kW/kg, about 70 kW/kg to about 90 kW/kg, about 70 kW/kg to about 100 kW/kg, about 70 kW/kg to about 110 kW/kg, about 70 kW/kg to about 120 kW/kg, about 80 kW/kg to about 90 kW/kg, about 80 kW/kg to about 100 kW/kg, about 80 kW/kg to about 110 kW/kg, about 80 kW/kg to about 120 kW/kg, about 90 kW/kg to about 100 kW/kg, about 90 kW/kg to about 110 kW/kg, about 90 kW/kg to about 120 kW/kg, about 100 kW/kg to about 110 kW/kg, about 100 kW/kg to about 120 kW/kg, or about 110 kW/kg to about 120 kW/kg. In some embodiments, the energy storage device has a total power density of about 30 kW/kg, about 40 kW/kg, about 50 kW/kg, about 60 kW/kg, about 70 kW/kg, about 80 kW/kg, about 90 kW/kg, about 100 kW/kg, about 110 kW/kg, or about 120 kW/kg. In some embodiments, the energy storage device has a total power density of at least about 40 kW/kg, about 50 kW/kg, about 60 kW/kg, about 70 kW/kg, about 80 kW/kg, about 90 kW/kg, about 100 kW/kg, about 110 kW/kg, or about 120 kW/kg.

By contrast, the total power densities of lithium-ion batteries, nickel-cadmium batteries, nickel-metal-hydride batteries and lead-acid batteries are less than 10 kW/kg.

In some embodiments, the energy storage devices of the current disclosure exhibit a capacity that is superior to commercially available energy storage devices tested under the same conditions. In some embodiments, the specific combination of device chemistry, active materials, and electrolytes described herein form energy storage devices that operate at high voltages and exhibit both the capacity of a battery and the power performance of supercapacitors in one device. In some embodiments, the energy storage devices of the current disclosure store more charge than a traditional lithium ion battery.

Further, FIG. 20A shows that the capacities and operating voltages of exemplary energy storage devices described herein significantly outperform current energy storage devices.

In some embodiments, the energy storage device has a cell-specific capacity at a voltage of about 1.7 V of about 2,000 mAh to about 10,000 mAh. In some embodiments, the energy storage device has a cell-specific capacity at a voltage of about 1.7 V of at least about 2,000 mAh. In some embodiments, the energy storage device has a cell-specific capacity at a voltage of about 1.7 V of at most about 10,000 mAh. In some embodiments, the energy storage device has a cell-specific capacity at a voltage of about 1.7 V of about 2,000 mAh to about 2,500 mAh, about 2,000 mAh to about 3,000 mAh, about 2,000 mAh to about 3,500 mAh, about 2,000 mAh to about 4,000 mAh, about 2,000 mAh to about 4,500 mAh, about 2,000 mAh to about 5,000 mAh, about 2,000 mAh to about 5,500 mAh, about 2,000 mAh to about 6,000 mAh, about 2,000 mAh to about 7,000 mAh, about 2,000 mAh to about 8,000 mAh, about 2,000 mAh to about 10,000 mAh, about 2,500 mAh to about 3,000 mAh, about 2,500 mAh to about 3,500 mAh, about 2,500 mAh to about 4,000 mAh, about 2,500 mAh to about 4,500 mAh, about 2,500 mAh to about 5,000 mAh, about 2,500 mAh to about 5,500 mAh, about 2,500 mAh to about 6,000 mAh, about 2,500 mAh to about 7,000 mAh, about 2,500 mAh to about 8,000 mAh, about 2,500 mAh to about 10,000 mAh, about 3,000 mAh to about 3,500 mAh, about 3,000 mAh to about 4,000 mAh, about 3,000 mAh to about 4,500 mAh, about 3,000 mAh to about 5,000 mAh, about 3,000 mAh to about 5,500 mAh, about 3,000 mAh to about 6,000 mAh, about 3,000 mAh to about 7,000 mAh, about 3,000 mAh to about 8,000 mAh, about 3,000 mAh to about 10,000 mAh, about 3,500 mAh to about 4,000 mAh, about 3,500 mAh to about 4,500 mAh, about 3,500 mAh to about 5,000 mAh, about 3,500 mAh to about 5,500 mAh, about 3,500 mAh to about 6,000 mAh, about 3,500 mAh to about 7,000 mAh, about 3,500 mAh to about 8,000 mAh, about 3,500 mAh to about 10,000 mAh, about 4,000 mAh to about 4,500 mAh, about 4,000 mAh to about 5,000 mAh, about 4,000 mAh to about 5,500 mAh, about 4,000 mAh to about 6,000 mAh, about 4,000 mAh to about 7,000 mAh, about 4,000 mAh to about 8,000 mAh, about 4,000 mAh to about 10,000 mAh, about 4,500 mAh to about 5,000 mAh, about 4,500 mAh to about 5,500 mAh, about 4,500 mAh to about 6,000 mAh, about 4,500 mAh to about 7,000 mAh, about 4,500 mAh to about 8,000 mAh, about 4,500 mAh to about 10,000 mAh, about 5,000 mAh to about 5,500 mAh, about 5,000 mAh to about 6,000 mAh, about 5,000 mAh to about 7,000 mAh, about 5,000 mAh to about 8,000 mAh, about 5,000 mAh to about 10,000 mAh, about 5,500 mAh to about 6,000 mAh, about 5,500 mAh to about 7,000 mAh, about 5,500 mAh to about 8,000 mAh, about 5,500 mAh to about 10,000 mAh, about 6,000 mAh to about 7,000 mAh, about 6,000 mAh to about 8,000 mAh, about 6,000 mAh to about 10,000 mAh, about 7,000 mAh to about 8,000 mAh, about 7,000 mAh to about 10,000 mAh, or about 8,000 mAh to about 10,000 mAh. In some embodiments, the energy storage device has a cell-specific capacity at a voltage of about 1.7 V of about 2,000 mAh, about 2,500 mAh, about 3,000 mAh, about 3,500 mAh, about 4,000 mAh, about 4,500 mAh, about 5,000 mAh, about 5,500 mAh, about 6,000 mAh, about 7,000 mAh, about 8,000 mAh, or about 10,000 mAh. In some embodiments, the energy storage device has a cell-specific capacity at a voltage of about 1.7 V of at least about 2,500 mAh, about 3,000 mAh, about 3,500 mAh, about 4,000 mAh, about 4,500 mAh, about 5,000 mAh, about 5,500 mAh, about 6,000 mAh, about 7,000 mAh, about 8,000 mAh, or about 10,000 mAh.

In some embodiments, the energy storage device has a cell-specific capacity at a voltage of about 1.5 V of about 2,000 mAh to about 8,000 mAh. In some embodiments, the energy storage device has a cell-specific capacity at a voltage of about 1.5 V of at least about 2,000 mAh. In some embodiments, the energy storage device has a cell-specific capacity at a voltage of about 1.5 V of at most about 8,000 mAh. In some embodiments, the energy storage device has a cell-specific capacity at a voltage of about 1.5 V of about 2,000 mAh to about 2,500 mAh, about 2,000 mAh to about 3,000 mAh, about 2,000 mAh to about 3,500 mAh, about 2,000 mAh to about 4,000 mAh, about 2,000 mAh to about 4,500 mAh, about 2,000 mAh to about 5,000 mAh, about 2,000 mAh to about 5,500 mAh, about 2,000 mAh to about 6,000 mAh, about 2,000 mAh to about 7,000 mAh, about 2,000 mAh to about 8,000 mAh, about 2,500 mAh to about 3,000 mAh, about 2,500 mAh to about 3,500 mAh, about 2,500 mAh to about 4,000 mAh, about 2,500 mAh to about 4,500 mAh, about 2,500 mAh to about 5,000 mAh, about 2,500 mAh to about 5,500 mAh, about 2,500 mAh to about 6,000 mAh, about 2,500 mAh to about 7,000 mAh, about 2,500 mAh to about 8,000 mAh, about 3,000 mAh to about 3,500 mAh, about 3,000 mAh to about 4,000 mAh, about 3,000 mAh to about 4,500 mAh, about 3,000 mAh to about 5,000 mAh, about 3,000 mAh to about 5,500 mAh, about 3,000 mAh to about 6,000 mAh, about 3,000 mAh to about 7,000 mAh, about 3,000 mAh to about 8,000 mAh, about 3,500 mAh to about 4,000 mAh, about 3,500 mAh to about 4,500 mAh, about 3,500 mAh to about 5,000 mAh, about 3,500 mAh to about 5,500 mAh, about 3,500 mAh to about 6,000 mAh, about 3,500 mAh to about 7,000 mAh, about 3,500 mAh to about 8,000 mAh, about 4,000 mAh to about 4,500 mAh, about 4,000 mAh to about 5,000 mAh, about 4,000 mAh to about 5,500 mAh, about 4,000 mAh to about 6,000 mAh, about 4,000 mAh to about 7,000 mAh, about 4,000 mAh to about 8,000 mAh, about 4,500 mAh to about 5,000 mAh, about 4,500 mAh to about 5,500 mAh, about 4,500 mAh to about 6,000 mAh, about 4,500 mAh to about 7,000 mAh, about 4,500 mAh to about 8,000 mAh, about 5,000 mAh to about 5,500 mAh, about 5,000 mAh to about 6,000 mAh, about 5,000 mAh to about 7,000 mAh, about 5,000 mAh to about 8,000 mAh, about 5,500 mAh to about 6,000 mAh, about 5,500 mAh to about 7,000 mAh, about 5,500 mAh to about 8,000 mAh, about 6,000 mAh to about 7,000 mAh, about 6,000 mAh to about 8,000 mAh, or about 7,000 mAh to about 8,000 mAh. In some embodiments, the energy storage device has a cell-specific capacity at a voltage of about 1.5 V of about 2,000 mAh, about 2,500 mAh, about 3,000 mAh, about 3,500 mAh, about 4,000 mAh, about 4,500 mAh, about 5,000 mAh, about 5,500 mAh, about 6,000 mAh, about 7,000 mAh, or about 8,000 mAh. In some embodiments, the energy storage device has a cell-specific capacity at a voltage of about 1.5 V of at least about 2,500 mAh, about 3,000 mAh, about 3,500 mAh, about 4,000 mAh, about 4,500 mAh, about 5,000 mAh, about 5,500 mAh, about 6,000 mAh, about 7,000 mAh, or about 8,000 mAh.

By contrast, lithium-ion batteries, alkaline supercapacitors, nickel-cadmium batteries, and nickel-metal-hydride batteries have a capacities of less than, 50 mAh, 20 mAh, 1,000 mAh, and 2,600 mAh, respectively, at operating voltages of between 2.2 V to 3.8V, 1.3 V to 1.6 V, 1.15 to 1.25, and 1.1 V to 1.25 V, respectively.

As such, the specific combination of device chemistry, active materials, and electrolytes described herein form energy storage devices that operate at high voltages and exhibit both the capacity of a battery and the power performance of supercapacitors in one device. The superior electrical performance of the energy storage devices described herein enables fast reliable electrical charge storage and dispensing.

Figure 16:
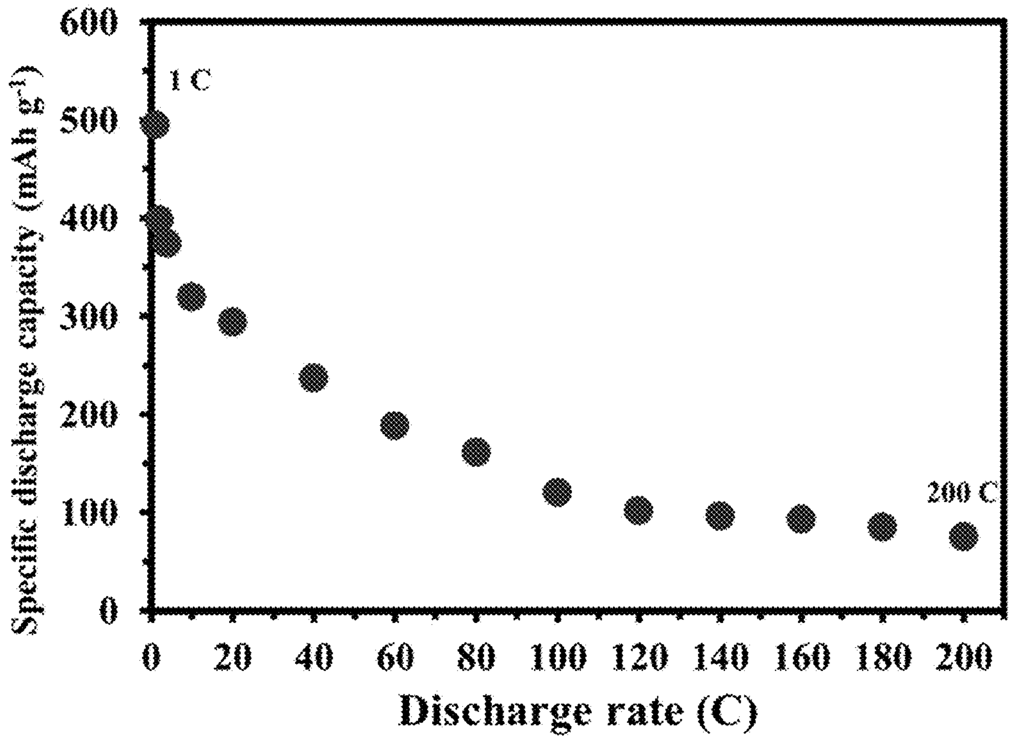
FIG. 16 is a graph showing the relationship between the discharge rate and the discharge capacity for an exemplary energy storage device of the current disclosure.

Per FIG. 16 and Table 4 below, the energy storage devices of the present disclosure exhibit significantly advantageous specific capacities and charge rates.

TABLE 4

| Discharge rate (C) | Specific capacity (mAh/g) |
|---|---|
| 1 | 495 |
| 2 | 398 |
| 4 | 374 |
| 10 | 320 |
| 20 | 294 |
| 40 | 237 |
| 60 | 188 |
| 80 | 161 |
| 100 | 120 |
| 120 | 102 |
| 140 | 96 |
| 160 | 93 |
| 180 | 85 |
| 200 | 75 |

In some embodiments, the energy storage device has a gravimetric capacity at a discharge rate of about 1 C of about 250 mAh/g to about 1,000 mAh/g. In some embodiments, the energy storage device has a gravimetric capacity at a discharge rate of about 1 C of at least about 250 mAh/g. In some embodiments, the energy storage device has a gravimetric capacity at a discharge rate of about 1 C of at most about 1,000 mAh/g. In some embodiments, the energy storage device has a gravimetric capacity at a discharge rate of about 1 C of about 250 mAh/g to about 300 mAh/g, about 250 mAh/g to about 350 mAh/g, about 250 mAh/g to about 400 mAh/g, about 250 mAh/g to about 450 mAh/g, about 250 mAh/g to about 500 mAh/g, about 250 mAh/g to about 550 mAh/g, about 250 mAh/g to about 600 mAh/g, about 250 mAh/g to about 650 mAh/g, about 250 mAh/g to about 700 mAh/g, about 250 mAh/g to about 800 mAh/g, about 250 mAh/g to about 1,000 mAh/g, about 300 mAh/g to about 350 mAh/g, about 300 mAh/g to about 400 mAh/g, about 300 mAh/g to about 450 mAh/g, about 300 mAh/g to about 500 mAh/g, about 300 mAh/g to about 550 mAh/g, about 300 mAh/g to about 600 mAh/g, about 300 mAh/g to about 650 mAh/g, about 300 mAh/g to about 700 mAh/g, about 300 mAh/g to about 800 mAh/g, about 300 mAh/g to about 1,000 mAh/g, about 350 mAh/g to about 400 mAh/g, about 350 mAh/g to about 450 mAh/g, about 350 mAh/g to about 500 mAh/g, about 350 mAh/g to about 550 mAh/g, about 350 mAh/g to about 600 mAh/g, about 350 mAh/g to about 650 mAh/g, about 350 mAh/g to about 700 mAh/g, about 350 mAh/g to about 800 mAh/g, about 350 mAh/g to about 1,000 mAh/g, about 400 mAh/g to about 450 mAh/g, about 400 mAh/g to about 500 mAh/g, about 400 mAh/g to about 550 mAh/g, about 400 mAh/g to about 600 mAh/g, about 400 mAh/g to about 650 mAh/g, about 400 mAh/g to about 700 mAh/g, about 400 mAh/g to about 800 mAh/g, about 400 mAh/g to about 1,000 mAh/g, about 450 mAh/g to about 500 mAh/g, about 450 mAh/g to about 550 mAh/g, about 450 mAh/g to about 600 mAh/g, about 450 mAh/g to about 650 mAh/g, about 450 mAh/g to about 700 mAh/g, about 450 mAh/g to about 800 mAh/g, about 450 mAh/g to about 1,000 mAh/g, about 500 mAh/g to about 550 mAh/g, about 500 mAh/g to about 600 mAh/g, about 500 mAh/g to about 650 mAh/g, about 500 mAh/g to about 700 mAh/g, about 500 mAh/g to about 800 mAh/g, about 500 mAh/g to about 1,000 mAh/g, about 550 mAh/g to about 600 mAh/g, about 550 mAh/g to about 650 mAh/g, about 550 mAh/g to about 700 mAh/g, about 550 mAh/g to about 800 mAh/g, about 550 mAh/g to about 1,000 mAh/g, about 600 mAh/g to about 650 mAh/g, about 600 mAh/g to about 700 mAh/g, about 600 mAh/g to about 800 mAh/g, about 600 mAh/g to about 1,000 mAh/g, about 650 mAh/g to about 700 mAh/g, about 650 mAh/g to about 800 mAh/g, about 650 mAh/g to about 1,000 mAh/g, about 700 mAh/g to about 800 mAh/g, about 700 mAh/g to about 1,000 mAh/g, or about 800 mAh/g to about 1,000 mAh/g. In some embodiments, the energy storage device has a gravimetric capacity at a discharge rate of about 1 C of about 250 mAh/g, about 300 mAh/g, about 350 mAh/g, about 400 mAh/g, about 450 mAh/g, about 500 mAh/g, about 550 mAh/g, about 600 mAh/g, about 650 mAh/g, about 700 mAh/g, about 800 mAh/g, or about 1,000 mAh/g. In some embodiments, the energy storage device has a gravimetric capacity at a discharge rate of about 1 C of at least about 300 mAh/g, about 350 mAh/g, about 400 mAh/g, about 450 mAh/g, about 500 mAh/g, about 550 mAh/g, about 600 mAh/g, about 650 mAh/g, about 700 mAh/g, about 800 mAh/g, or about 1,000 mAh/g.

In some embodiments, the energy storage device has a gravimetric capacity at a discharge rate of about 2 C of about 250 mAh/g to about 800 mAh/g. In some embodiments, the energy storage device has a gravimetric capacity at a discharge rate of about 2 C of at least about 250 mAh/g. In some embodiments, the energy storage device has a gravimetric capacity at a discharge rate of about 2 C of at most about 800 mAh/g. In some embodiments, the energy storage device has a gravimetric capacity at a discharge rate of about 2 C of about 250 mAh/g to about 300 mAh/g, about 250 mAh/g to about 350 mAh/g, about 250 mAh/g to about 400 mAh/g, about 250 mAh/g to about 450 mAh/g, about 250 mAh/g to about 500 mAh/g, about 250 mAh/g to about 550 mAh/g, about 250 mAh/g to about 600 mAh/g, about 250 mAh/g to about 650 mAh/g, about 250 mAh/g to about 700 mAh/g, about 250 mAh/g to about 800 mAh/g, about 300 mAh/g to about 350 mAh/g, about 300 mAh/g to about 400 mAh/g, about 300 mAh/g to about 450 mAh/g, about 300 mAh/g to about 500 mAh/g, about 300 mAh/g to about 550 mAh/g, about 300 mAh/g to about 600 mAh/g, about 300 mAh/g to about 650 mAh/g, about 300 mAh/g to about 700 mAh/g, about 300 mAh/g to about 800 mAh/g, about 350 mAh/g to about 400 mAh/g, about 350 mAh/g to about 450 mAh/g, about 350 mAh/g to about 500 mAh/g, about 350 mAh/g to about 550 mAh/g, about 350 mAh/g to about 600 mAh/g, about 350 mAh/g to about 650 mAh/g, about 350 mAh/g to about 700 mAh/g, about 350 mAh/g to about 800 mAh/g, about 400 mAh/g to about 450 mAh/g, about 400 mAh/g to about 500 mAh/g, about 400 mAh/g to about 550 mAh/g, about 400 mAh/g to about 600 mAh/g, about 400 mAh/g to about 650 mAh/g, about 400 mAh/g to about 700 mAh/g, about 400 mAh/g to about 800 mAh/g, about 450 mAh/g to about 500 mAh/g, about 450 mAh/g to about 550 mAh/g, about 450 mAh/g to about 600 mAh/g, about 450 mAh/g to about 650 mAh/g, about 450 mAh/g to about 700 mAh/g, about 450 mAh/g to about 800 mAh/g, about 500 mAh/g to about 550 mAh/g, about 500 mAh/g to about 600 mAh/g, about 500 mAh/g to about 650 mAh/g, about 500 mAh/g to about 700 mAh/g, about 500 mAh/g to about 800 mAh/g, about 550 mAh/g to about 600 mAh/g, about 550 mAh/g to about 650 mAh/g, about 550 mAh/g to about 700 mAh/g, about 550 mAh/g to about 800 mAh/g, about 600 mAh/g to about 650 mAh/g, about 600 mAh/g to about 700 mAh/g, about 600 mAh/g to about 800 mAh/g, about 650 mAh/g to about 700 mAh/g, about 650 mAh/g to about 800 mAh/g, or about 700 mAh/g to about 800 mAh/g. In some embodiments, the energy storage device has a gravimetric capacity at a discharge rate of about 2 C of about 250 mAh/g, about 300 mAh/g, about 350 mAh/g, about 400 mAh/g, about 450 mAh/g, about 500 mAh/g, about 550 mAh/g, about 600 mAh/g, about 650 mAh/g, about 700 mAh/g, or about 800 mAh/g. In some embodiments, the energy storage device has a gravimetric capacity at a discharge rate of about 2 C of at least about 300 mAh/g, about 350 mAh/g, about 400 mAh/g, about 450 mAh/g, about 500 mAh/g, about 550 mAh/g, about 600 mAh/g, about 650 mAh/g, about 700 mAh/g, or about 800 mAh/g.

In some embodiments, the energy storage device has a gravimetric capacity at a discharge rate of about 10 C of about 150 mAh/g to about 650 mAh/g. In some embodiments, the energy storage device has a gravimetric capacity at a discharge rate of about 10 C of at least about 150 mAh/g. In some embodiments, the energy storage device has a gravimetric capacity at a discharge rate of about 10 C of at most about 650 mAh/g. In some embodiments, the energy storage device has a gravimetric capacity at a discharge rate of about 10 C of 150 mAh/g to about 200 mAh/g, about 150 mAh/g to about 250 mAh/g, about 150 mAh/g to about 300 mAh/g, about 150 mAh/g to about 350 mAh/g, about 150 mAh/g to about 400 mAh/g, about 150 mAh/g to about 450 mAh/g, about 150 mAh/g to about 500 mAh/g, about 150 mAh/g to about 550 mAh/g, about 150 mAh/g to about 600 mAh/g, about 150 mAh/g to about 650 mAh/g, about 200 mAh/g to about 250 mAh/g, about 200 mAh/g to about 300 mAh/g, about 200 mAh/g to about 350 mAh/g, about 200 mAh/g to about 400 mAh/g, about 200 mAh/g to about 450 mAh/g, about 200 mAh/g to about 500 mAh/g, about 200 mAh/g to about 550 mAh/g, about 200 mAh/g to about 600 mAh/g, about 200 mAh/g to about 650 mAh/g, about 250 mAh/g to about 300 mAh/g, about 250 mAh/g to about 350 mAh/g, about 250 mAh/g to about 400 mAh/g, about 250 mAh/g to about 450 mAh/g, about 250 mAh/g to about 500 mAh/g, about 250 mAh/g to about 550 mAh/g, about 250 mAh/g to about 600 mAh/g, about 250 mAh/g to about 650 mAh/g, about 300 mAh/g to about 350 mAh/g, about 300 mAh/g to about 400 mAh/g, about 300 mAh/g to about 450 mAh/g, about 300 mAh/g to about 500 mAh/g, about 300 mAh/g to about 550 mAh/g, about 300 mAh/g to about 600 mAh/g, about 300 mAh/g to about 650 mAh/g, about 350 mAh/g to about 400 mAh/g, about 350 mAh/g to about 450 mAh/g, about 350 mAh/g to about 500 mAh/g, about 350 mAh/g to about 550 mAh/g, about 350 mAh/g to about 600 mAh/g, about 350 mAh/g to about 650 mAh/g, about 400 mAh/g to about 450 mAh/g, about 400 mAh/g to about 500 mAh/g, about 400 mAh/g to about 550 mAh/g, about 400 mAh/g to about 600 mAh/g, about 400 mAh/g to about 650 mAh/g, about 450 mAh/g to about 500 mAh/g, about 450 mAh/g to about 550 mAh/g, about 450 mAh/g to about 600 mAh/g, about 450 mAh/g to about 650 mAh/g, about 500 mAh/g to about 550 mAh/g, about 500 mAh/g to about 600 mAh/g, about 500 mAh/g to about 650 mAh/g, about 550 mAh/g to about 600 mAh/g, about 550 mAh/g to about 650 mAh/g, or about 600 mAh/g to about 650 mAh/g. In some embodiments, the energy storage device has a gravimetric capacity at a discharge rate of about 10 C of about 150 mAh/g, about 200 mAh/g, about 250 mAh/g, about 300 mAh/g, about 350 mAh/g, about 400 mAh/g, about 450 mAh/g, about 500 mAh/g, about 550 mAh/g, about 600 mAh/g, or about 650 mAh/g. In some embodiments, the energy storage device has a gravimetric capacity at a discharge rate of about 10 C of at least about 200 mAh/g, about 250 mAh/g, about 300 mAh/g, about 350 mAh/g, about 400 mAh/g, about 450 mAh/g, about 500 mAh/g, about 550 mAh/g, about 600 mAh/g, or about 650 mAh/g.

In some embodiments, the energy storage device has a gravimetric capacity at a discharge rate of about 60 C of about 90 mAh/g to about 350 mAh/g. In some embodiments, the energy storage device has a gravimetric capacity at a discharge rate of about 60 C of at least about 90 mAh/g. In some embodiments, the energy storage device has a gravimetric capacity at a discharge rate of about 60 C of at most about 350 mAh/g. In some embodiments, the energy storage device has a gravimetric capacity at a discharge rate of about 60 C of about 90 mAh/g to about 100 mAh/g, about 90 mAh/g to about 125 mAh/g, about 90 mAh/g to about 150 mAh/g, about 90 mAh/g to about 175 mAh/g, about 90 mAh/g to about 200 mAh/g, about 90 mAh/g to about 225 mAh/g, about 90 mAh/g to about 250 mAh/g, about 90 mAh/g to about 275 mAh/g, about 90 mAh/g to about 300 mAh/g, about 90 mAh/g to about 325 mAh/g, about 90 mAh/g to about 350 mAh/g, about 100 mAh/g to about 125 mAh/g, about 100 mAh/g to about 150 mAh/g, about 100 mAh/g to about 175 mAh/g, about 100 mAh/g to about 200 mAh/g, about 100 mAh/g to about 225 mAh/g, about 100 mAh/g to about 250 mAh/g, about 100 mAh/g to about 275 mAh/g, about 100 mAh/g to about 300 mAh/g, about 100 mAh/g to about 325 mAh/g, about 100 mAh/g to about 350 mAh/g, about 125 mAh/g to about 150 mAh/g, about 125 mAh/g to about 175 mAh/g, about 125 mAh/g to about 200 mAh/g, about 125 mAh/g to about 225 mAh/g, about 125 mAh/g to about 250 mAh/g, about 125 mAh/g to about 275 mAh/g, about 125 mAh/g to about 300 mAh/g, about 125 mAh/g to about 325 mAh/g, about 125 mAh/g to about 350 mAh/g, about 150 mAh/g to about 175 mAh/g, about 150 mAh/g to about 200 mAh/g, about 150 mAh/g to about 225 mAh/g, about 150 mAh/g to about 250 mAh/g, about 150 mAh/g to about 275 mAh/g, about 150 mAh/g to about 300 mAh/g, about 150 mAh/g to about 325 mAh/g, about 150 mAh/g to about 350 mAh/g, about 175 mAh/g to about 200 mAh/g, about 175 mAh/g to about 225 mAh/g, about 175 mAh/g to about 250 mAh/g, about 175 mAh/g to about 275 mAh/g, about 175 mAh/g to about 300 mAh/g, about 175 mAh/g to about 325 mAh/g, about 175 mAh/g to about 350 mAh/g, about 200 mAh/g to about 225 mAh/g, about 200 mAh/g to about 250 mAh/g, about 200 mAh/g to about 275 mAh/g, about 200 mAh/g to about 300 mAh/g, about 200 mAh/g to about 325 mAh/g, about 200 mAh/g to about 350 mAh/g, about 225 mAh/g to about 250 mAh/g, about 225 mAh/g to about 275 mAh/g, about 225 mAh/g to about 300 mAh/g, about 225 mAh/g to about 325 mAh/g, about 225 mAh/g to about 350 mAh/g, about 250 mAh/g to about 275 mAh/g, about 250 mAh/g to about 300 mAh/g, about 250 mAh/g to about 325 mAh/g, about 250 mAh/g to about 350 mAh/g, about 275 mAh/g to about 300 mAh/g, about 275 mAh/g to about 325 mAh/g, about 275 mAh/g to about 350 mAh/g, about 300 mAh/g to about 325 mAh/g, about 300 mAh/g to about 350 mAh/g, or about 325 mAh/g to about 350 mAh/g. In some embodiments, the energy storage device has a gravimetric capacity at a discharge rate of about 60 C of about 90 mAh/g, about 100 mAh/g, about 125 mAh/g, about 150 mAh/g, about 175 mAh/g, about 200 mAh/g, about 225 mAh/g, about 250 mAh/g, about 275 mAh/g, about 300 mAh/g, about 325 mAh/g, or about 350 mAh/g. In some embodiments, the energy storage device has a gravimetric capacity at a discharge rate of about 60 C of at least about 100 mAh/g, about 125 mAh/g, about 150 mAh/g, about 175 mAh/g, about 200 mAh/g, about 225 mAh/g, about 250 mAh/g, about 275 mAh/g, about 300 mAh/g, about 325 mAh/g, or about 350 mAh/g.

In some embodiments, the energy storage device has a gravimetric capacity at a discharge rate of about 100 C of about 60 mAh/g to about 240 mAh/g. In some embodiments, the energy storage device has a gravimetric capacity at a discharge rate of about 100 C of at least about 60 mAh/g. In some embodiments, the energy storage device has a gravimetric capacity at a discharge rate of about 100 C of at most about 240 mAh/g. In some embodiments, the energy storage device has a gravimetric capacity at a discharge rate of about 100 C of about 60 mAh/g to about 80 mAh/g, about 60 mAh/g to about 100 mAh/g, about 60 mAh/g to about 120 mAh/g, about 60 mAh/g to about 140 mAh/g, about 60 mAh/g to about 160 mAh/g, about 60 mAh/g to about 180 mAh/g, about 60 mAh/g to about 200 mAh/g, about 60 mAh/g to about 220 mAh/g, about 60 mAh/g to about 240 mAh/g, about 80 mAh/g to about 100 mAh/g, about 80 mAh/g to about 120 mAh/g, about 80 mAh/g to about 140 mAh/g, about 80 mAh/g to about 160 mAh/g, about 80 mAh/g to about 180 mAh/g, about 80 mAh/g to about 200 mAh/g, about 80 mAh/g to about 220 mAh/g, about 80 mAh/g to about 240 mAh/g, about 100 mAh/g to about 120 mAh/g, about 100 mAh/g to about 140 mAh/g, about 100 mAh/g to about 160 mAh/g, about 100 mAh/g to about 180 mAh/g, about 100 mAh/g to about 200 mAh/g, about 100 mAh/g to about 220 mAh/g, about 100 mAh/g to about 240 mAh/g, about 120 mAh/g to about 140 mAh/g, about 120 mAh/g to about 160 mAh/g, about 120 mAh/g to about 180 mAh/g, about 120 mAh/g to about 200 mAh/g, about 120 mAh/g to about 220 mAh/g, about 120 mAh/g to about 240 mAh/g, about 140 mAh/g to about 160 mAh/g, about 140 mAh/g to about 180 mAh/g, about 140 mAh/g to about 200 mAh/g, about 140 mAh/g to about 220 mAh/g, about 140 mAh/g to about 240 mAh/g, about 160 mAh/g to about 180 mAh/g, about 160 mAh/g to about 200 mAh/g, about 160 mAh/g to about 220 mAh/g, about 160 mAh/g to about 240 mAh/g, about 180 mAh/g to about 200 mAh/g, about 180 mAh/g to about 220 mAh/g, about 180 mAh/g to about 240 mAh/g, about 200 mAh/g to about 220 mAh/g, about 200 mAh/g to about 240 mAh/g, or about 220 mAh/g to about 240 mAh/g. In some embodiments, the energy storage device has a gravimetric capacity at a discharge rate of about 100 C of about 60 mAh/g, about 80 mAh/g, about 100 mAh/g, about 120 mAh/g, about 140 mAh/g, about 160 mAh/g, about 180 mAh/g, about 200 mAh/g, about 220 mAh/g, or about 240 mAh/g. In some embodiments, the energy storage device has a gravimetric capacity at a discharge rate of about 100 C of at least about 80 mAh/g, about 100 mAh/g, about 120 mAh/g, about 140 mAh/g, about 160 mAh/g, about 180 mAh/g, about 200 mAh/g, about 220 mAh/g, or about 240 mAh/g.

In some embodiments, the energy storage device has a gravimetric capacity at a discharge rate of about 160 C of about 45 mAh/g to about 180 mAh/g. In some embodiments, the energy storage device has a gravimetric capacity at a discharge rate of about 160 C of at least about 45 mAh/g. In some embodiments, the energy storage device has a gravimetric capacity at a discharge rate of about 160 C of at most about 180 mAh/g. In some embodiments, the energy storage device has a gravimetric capacity at a discharge rate of about 160 C of about 45 mAh/g to about 50 mAh/g, about 45 mAh/g to about 60 mAh/g, about 45 mAh/g to about 70 mAh/g, about 45 mAh/g to about 80 mAh/g, about 45 mAh/g to about 100 mAh/g, about 45 mAh/g to about 120 mAh/g, about 45 mAh/g to about 130 mAh/g, about 45 mAh/g to about 140 mAh/g, about 45 mAh/g to about 150 mAh/g, about 45 mAh/g to about 160 mAh/g, about 45 mAh/g to about 180 mAh/g, about 50 mAh/g to about 60 mAh/g, about 50 mAh/g to about 70 mAh/g, about 50 mAh/g to about 80 mAh/g, about 50 mAh/g to about 100 mAh/g, about 50 mAh/g to about 120 mAh/g, about 50 mAh/g to about 130 mAh/g, about 50 mAh/g to about 140 mAh/g, about 50 mAh/g to about 150 mAh/g, about 50 mAh/g to about 160 mAh/g, about 50 mAh/g to about 180 mAh/g, about 60 mAh/g to about 70 mAh/g, about 60 mAh/g to about 80 mAh/g, about 60 mAh/g to about 100 mAh/g, about 60 mAh/g to about 120 mAh/g, about 60 mAh/g to about 130 mAh/g, about 60 mAh/g to about 140 mAh/g, about 60 mAh/g to about 150 mAh/g, about 60 mAh/g to about 160 mAh/g, about 60 mAh/g to about 180 mAh/g, about 70 mAh/g to about 80 mAh/g, about 70 mAh/g to about 100 mAh/g, about 70 mAh/g to about 120 mAh/g, about 70 mAh/g to about 130 mAh/g, about 70 mAh/g to about 140 mAh/g, about 70 mAh/g to about 150 mAh/g, about 70 mAh/g to about 160 mAh/g, about 70 mAh/g to about 180 mAh/g, about 80 mAh/g to about 100 mAh/g, about 80 mAh/g to about 120 mAh/g, about 80 mAh/g to about 130 mAh/g, about 80 mAh/g to about 140 mAh/g, about 80 mAh/g to about 150 mAh/g, about 80 mAh/g to about 160 mAh/g, about 80 mAh/g to about 180 mAh/g, about 100 mAh/g to about 120 mAh/g, about 100 mAh/g to about 130 mAh/g, about 100 mAh/g to about 140 mAh/g, about 100 mAh/g to about 150 mAh/g, about 100 mAh/g to about 160 mAh/g, about 100 mAh/g to about 180 mAh/g, about 120 mAh/g to about 130 mAh/g, about 120 mAh/g to about 140 mAh/g, about 120 mAh/g to about 150 mAh/g, about 120 mAh/g to about 160 mAh/g, about 120 mAh/g to about 180 mAh/g, about 130 mAh/g to about 140 mAh/g, about 130 mAh/g to about 150 mAh/g, about 130 mAh/g to about 160 mAh/g, about 130 mAh/g to about 180 mAh/g, about 140 mAh/g to about 150 mAh/g, about 140 mAh/g to about 160 mAh/g, about 140 mAh/g to about 180 mAh/g, about 150 mAh/g to about 160 mAh/g, about 150 mAh/g to about 180 mAh/g, or about 160 mAh/g to about 180 mAh/g. In some embodiments, the energy storage device has a gravimetric capacity at a discharge rate of about 160 C of about 45 mAh/g, about 50 mAh/g, about 60 mAh/g, about 70 mAh/g, about 80 mAh/g, about 100 mAh/g, about 120 mAh/g, about 130 mAh/g, about 140 mAh/g, about 150 mAh/g, about 160 mAh/g, or about 180 mAh/g. In some embodiments, the energy storage device has a gravimetric capacity at a discharge rate of about 160 C of at least about 50 mAh/g, about 60 mAh/g, about 70 mAh/g, about 80 mAh/g, about 100 mAh/g, about 120 mAh/g, about 130 mAh/g, about 140 mAh/g, about 150 mAh/g, about 160 mAh/g, or about 180 mAh/g.

In some embodiments, the energy storage device has a gravimetric capacity at a discharge rate of about 200 C of about 35 mAh/g to about 150 mAh/g. In some embodiments, the energy storage device has a gravimetric capacity at a discharge rate of about 200 C of at least about 35 mAh/g. In some embodiments, the energy storage device has a gravimetric capacity at a discharge rate of about 200 C of at most about 150 mAh/g. In some embodiments, the energy storage device has a gravimetric capacity at a discharge rate of about 200 C of about 35 mAh/g to about 40 mAh/g, about 35 mAh/g to about 50 mAh/g, about 35 mAh/g to about 60 mAh/g, about 35 mAh/g to about 70 mAh/g, about 35 mAh/g to about 80 mAh/g, about 35 mAh/g to about 90 mAh/g, about 35 mAh/g to about 100 mAh/g, about 35 mAh/g to about 120 mAh/g, about 35 mAh/g to about 130 mAh/g, about 35 mAh/g to about 140 mAh/g, about 35 mAh/g to about 150 mAh/g, about 40 mAh/g to about 50 mAh/g, about 40 mAh/g to about 60 mAh/g, about 40 mAh/g to about 70 mAh/g, about 40 mAh/g to about 80 mAh/g, about 40 mAh/g to about 90 mAh/g, about 40 mAh/g to about 100 mAh/g, about 40 mAh/g to about 120 mAh/g, about 40 mAh/g to about 130 mAh/g, about 40 mAh/g to about 140 mAh/g, about 40 mAh/g to about 150 mAh/g, about 50 mAh/g to about 60 mAh/g, about 50 mAh/g to about 70 mAh/g, about 50 mAh/g to about 80 mAh/g, about 50 mAh/g to about 90 mAh/g, about 50 mAh/g to about 100 mAh/g, about 50 mAh/g to about 120 mAh/g, about 50 mAh/g to about 130 mAh/g, about 50 mAh/g to about 140 mAh/g, about 50 mAh/g to about 150 mAh/g, about 60 mAh/g to about 70 mAh/g, about 60 mAh/g to about 80 mAh/g, about 60 mAh/g to about 90 mAh/g, about 60 mAh/g to about 100 mAh/g, about 60 mAh/g to about 120 mAh/g, about 60 mAh/g to about 130 mAh/g, about 60 mAh/g to about 140 mAh/g, about 60 mAh/g to about 150 mAh/g, about 70 mAh/g to about 80 mAh/g, about 70 mAh/g to about 90 mAh/g, about 70 mAh/g to about 100 mAh/g, about 70 mAh/g to about 120 mAh/g, about 70 mAh/g to about 130 mAh/g, about 70 mAh/g to about 140 mAh/g, about 70 mAh/g to about 150 mAh/g, about 80 mAh/g to about 90 mAh/g, about 80 mAh/g to about 100 mAh/g, about 80 mAh/g to about 120 mAh/g, about 80 mAh/g to about 130 mAh/g, about 80 mAh/g to about 140 mAh/g, about 80 mAh/g to about 150 mAh/g, about 90 mAh/g to about 100 mAh/g, about 90 mAh/g to about 120 mAh/g, about 90 mAh/g to about 130 mAh/g, about 90 mAh/g to about 140 mAh/g, about 90 mAh/g to about 150 mAh/g, about 100 mAh/g to about 120 mAh/g, about 100 mAh/g to about 130 mAh/g, about 100 mAh/g to about 140 mAh/g, about 100 mAh/g to about 150 mAh/g, about 120 mAh/g to about 130 mAh/g, about 120 mAh/g to about 140 mAh/g, about 120 mAh/g to about 150 mAh/g, about 130 mAh/g to about 140 mAh/g, about 130 mAh/g to about 150 mAh/g, or about 140 mAh/g to about 150 mAh/g. In some embodiments, the energy storage device has a gravimetric capacity at a discharge rate of about 200 C of about 35 mAh/g, about 40 mAh/g, about 50 mAh/g, about 60 mAh/g, about 70 mAh/g, about 80 mAh/g, about 90 mAh/g, about 100 mAh/g, about 120 mAh/g, about 130 mAh/g, about 140 mAh/g, or about 150 mAh/g. In some embodiments, the energy storage device has a gravimetric capacity at a discharge rate of about 200 C of at least about 40 mAh/g, about 50 mAh/g, about 60 mAh/g, about 70 mAh/g, about 80 mAh/g, about 90 mAh/g, about 100 mAh/g, about 120 mAh/g, about 130 mAh/g, about 140 mAh/g, or about 150 mAh/g.

In some embodiments, the energy storage device has a charge rate of about 5 mAh/g to about 1,600 mAh/g. In some embodiments, the energy storage device has a charge rate of at least about 5 mAh/g. In some embodiments, the energy storage device has a charge rate of at most about 1,600 mAh/g. In some embodiments, the energy storage device has a charge rate of about 5 mAh/g to about 10 mAh/g, about 5 mAh/g to about 20 mAh/g, about 5 mAh/g to about 50 mAh/g, about 5 mAh/g to about 100 mAh/g, about 5 mAh/g to about 200 mAh/g, about 5 mAh/g to about 500 mAh/g, about 5 mAh/g to about 1,000 mAh/g, about 5 mAh/g to about 1,200 mAh/g, about 5 mAh/g to about 1,600 mAh/g, about 10 mAh/g to about 20 mAh/g, about 10 mAh/g to about 50 mAh/g, about 10 mAh/g to about 100 mAh/g, about 10 mAh/g to about 200 mAh/g, about 10 mAh/g to about 500 mAh/g, about 10 mAh/g to about 1,000 mAh/g, about 10 mAh/g to about 1,200 mAh/g, about 10 mAh/g to about 1,600 mAh/g, about 20 mAh/g to about 50 mAh/g, about 20 mAh/g to about 100 mAh/g, about 20 mAh/g to about 200 mAh/g, about 20 mAh/g to about 500 mAh/g, about 20 mAh/g to about 1,000 mAh/g, about 20 mAh/g to about 1,200 mAh/g, about 20 mAh/g to about 1,600 mAh/g, about 50 mAh/g to about 100 mAh/g, about 50 mAh/g to about 200 mAh/g, about 50 mAh/g to about 500 mAh/g, about 50 mAh/g to about 1,000 mAh/g, about 50 mAh/g to about 1,200 mAh/g, about 50 mAh/g to about 1,600 mAh/g, about 100 mAh/g to about 200 mAh/g, about 100 mAh/g to about 500 mAh/g, about 100 mAh/g to about 1,000 mAh/g, about 100 mAh/g to about 1,200 mAh/g, about 100 mAh/g to about 1,600 mAh/g, about 200 mAh/g to about 500 mAh/g, about 200 mAh/g to about 1,000 mAh/g, about 200 mAh/g to about 1,200 mAh/g, about 200 mAh/g to about 1,600 mAh/g, about 500 mAh/g to about 1,000 mAh/g, about 500 mAh/g to about 1,200 mAh/g, about 500 mAh/g to about 1,600 mAh/g, about 1,000 mAh/g to about 1,200 mAh/g, about 1,000 mAh/g to about 1,600 mAh/g, or about 1,200 mAh/g to about 1,600 mAh/g. In some embodiments, the energy storage device has a charge rate of about 5 mAh/g, about 10 mAh/g, about 20 mAh/g, about 50 mAh/g, about 100 mAh/g, about 200 mAh/g, about 500 mAh/g, about 1,000 mAh/g, about 1,200 mAh/g, or about 1,600 mAh/g. In some embodiments, the energy storage device has a charge rate of at least about 10 mAh/g, about 20 mAh/g, about 50 mAh/g, about 100 mAh/g, about 200 mAh/g, about 500 mAh/g, about 1,000 mAh/g, about 1,200 mAh/g, or about 1,600 mAh/g.

In some embodiments, the energy storage devices of the current disclosure exhibit excellent rate capability and ultra-fast charge/discharges rates of up to about 847 C. In some embodiments, the energy storage device has a charge rate of at about 100 C to about 1,600 C. Charge rate, or C-rate, is a measure of the rate at which an energy storage device is charged relative to its maximum capacity. Energy storage devices with charge rates of 0.5 C, 1 C, and 200 C take 2 hours, 1 hour, and 18 seconds, respectively, to fully charge.

In some embodiments, the energy storage devices of the current disclosure can be recharged in just a few seconds, compared with hours required to charge conventional batteries. In some embodiments, the energy storage device has a recharge time of about 1.5 seconds to about 3,000 seconds. In some embodiments, the energy storage device has a recharge time of at least about 1.5 seconds. In some embodiments, the energy storage device has a recharge time of at most about 3,000 seconds. In some embodiments, the energy storage device has a recharge time of about 1.5 seconds to about 2 seconds, about 1.5 seconds to about 5 seconds, about 1.5 seconds to about 10 seconds, about 1.5 seconds to about 20 seconds, about 1.5 seconds to about 50 seconds, about 1.5 seconds to about 100 seconds, about 1.5 seconds to about 200 seconds, about 1.5 seconds to about 500 seconds, about 1.5 seconds to about 1,000 seconds, about 1.5 seconds to about 2,000 seconds, about 1.5 seconds to about 3,000 seconds, about 2 seconds to about 5 seconds, about 2 seconds to about 10 seconds, about 2 seconds to about 20 seconds, about 2 seconds to about 50 seconds, about 2 seconds to about 100 seconds, about 2 seconds to about 200 seconds, about 2 seconds to about 500 seconds, about 2 seconds to about 1,000 seconds, about 2 seconds to about 2,000 seconds, about 2 seconds to about 3,000 seconds, about 5 seconds to about 10 seconds, about 5 seconds to about 20 seconds, about 5 seconds to about 50 seconds, about 5 seconds to about 100 seconds, about 5 seconds to about 200 seconds, about 5 seconds to about 500 seconds, about 5 seconds to about 1,000 seconds, about 5 seconds to about 2,000 seconds, about 5 seconds to about 3,000 seconds, about 10 seconds to about 20 seconds, about 10 seconds to about 50 seconds, about 10 seconds to about 100 seconds, about 10 seconds to about 200 seconds, about 10 seconds to about 500 seconds, about 10 seconds to about 1,000 seconds, about 10 seconds to about 2,000 seconds, about 10 seconds to about 3,000 seconds, about 20 seconds to about 50 seconds, about 20 seconds to about 100 seconds, about 20 seconds to about 200 seconds, about 20 seconds to about 500 seconds, about 20 seconds to about 1,000 seconds, about 20 seconds to about 2,000 seconds, about 20 seconds to about 3,000 seconds, about 50 seconds to about 100 seconds, about 50 seconds to about 200 seconds, about 50 seconds to about 500 seconds, about 50 seconds to about 1,000 seconds, about 50 seconds to about 2,000 seconds, about 50 seconds to about 3,000 seconds, about 100 seconds to about 200 seconds, about 100 seconds to about 500 seconds, about 100 seconds to about 1,000 seconds, about 100 seconds to about 2,000 seconds, about 100 seconds to about 3,000 seconds, about 200 seconds to about 500 seconds, about 200 seconds to about 1,000 seconds, about 200 seconds to about 2,000 seconds, about 200 seconds to about 3,000 seconds, about 500 seconds to about 1,000 seconds, about 500 seconds to about 2,000 seconds, about 500 seconds to about 3,000 seconds, about 1,000 seconds to about 2,000 seconds, about 1,000 seconds to about 3,000 seconds, or about 2,000 seconds to about 3,000 seconds. In some embodiments, the energy storage device has a recharge time of about 1.5 seconds, about 2 seconds, about 5 seconds, about 10 seconds, about 20 seconds, about 50 seconds, about 100 seconds, about 200 seconds, about 500 seconds, about 1,000 seconds, about 2,000 seconds, or about 3,000 seconds. In some embodiments, the energy storage device has a recharge time of at most about 1.5 seconds, about 2 seconds, about 5 seconds, about 10 seconds, about 20 seconds, about 50 seconds, about 100 seconds, about 200 seconds, about 500 seconds, about 1,000 seconds, about 2,000 seconds, or about 3,000 seconds.

An 18650 form factor defines the size of an energy storage device as being round with a diameter of about 16 mm, and a length of about 65 mm.

In some embodiments, the energy storage device has an equivalent series resistance in a 18650 form factor of about 2 milliohms to about 10 milliohms. In some embodiments, the energy storage device has an equivalent series resistance in a 18650 form factor of at least about 2 milliohms. In some embodiments, the energy storage device has an equivalent series resistance in a 18650 form factor of at most about 10 milliohms. In some embodiments, the energy storage device has an equivalent series resistance in a 18650 form factor of about 2 milliohms to about 2.5 milliohms, about 2 milliohms to about 3 milliohms, about 2 milliohms to about 3.5 milliohms, about 2 milliohms to about 4 milliohms, about 2 milliohms to about 4.5 milliohms, about 2 milliohms to about 5 milliohms, about 2 milliohms to about 6 milliohms, about 2 milliohms to about 7 milliohms, about 2 milliohms to about 8 milliohms, about 2 milliohms to about 10 milliohms, about 2.5 milliohms to about 3 milliohms, about 2.5 milliohms to about 3.5 milliohms, about 2.5 milliohms to about 4 milliohms, about 2.5 milliohms to about 4.5 milliohms, about 2.5 milliohms to about 5 milliohms, about 2.5 milliohms to about 6 milliohms, about 2.5 milliohms to about 7 milliohms, about 2.5 milliohms to about 8 milliohms, about 2.5 milliohms to about 10 milliohms, about 3 milliohms to about 3.5 milliohms, about 3 milliohms to about 4 milliohms, about 3 milliohms to about 4.5 milliohms, about 3 milliohms to about 5 milliohms, about 3 milliohms to about 6 milliohms, about 3 milliohms to about 7 milliohms, about 3 milliohms to about 8 milliohms, about 3 milliohms to about 10 milliohms, about 3.5 milliohms to about 4 milliohms, about 3.5 milliohms to about 4.5 milliohms, about 3.5 milliohms to about 5 milliohms, about 3.5 milliohms to about 6 milliohms, about 3.5 milliohms to about 7 milliohms, about 3.5 milliohms to about 8 milliohms, about 3.5 milliohms to about 10 milliohms, about 4 milliohms to about 4.5 milliohms, about 4 milliohms to about 5 milliohms, about 4 milliohms to about 6 milliohms, about 4 milliohms to about 7 milliohms, about 4 milliohms to about 8 milliohms, about 4 milliohms to about 10 milliohms, about 4.5 milliohms to about 5 milliohms, about 4.5 milliohms to about 6 milliohms, about 4.5 milliohms to about 7 milliohms, about 4.5 milliohms to about 8 milliohms, about 4.5 milliohms to about 10 milliohms, about 5 milliohms to about 6 milliohms, about 5 milliohms to about 7 milliohms, about 5 milliohms to about 8 milliohms, about 5 milliohms to about 10 milliohms, about 6 milliohms to about 7 milliohms, about 6 milliohms to about 8 milliohms, about 6 milliohms to about 10 milliohms, about 7 milliohms to about 8 milliohms, about 7 milliohms to about 10 milliohms, or about 8 milliohms to about 10 milliohms. In some embodiments, the energy storage device has an equivalent series resistance in a 18650 form factor of about 2 milliohms, about 2.5 milliohms, about 3 milliohms, about 3.5 milliohms, about 4 milliohms, about 4.5 milliohms, about 5 milliohms, about 6 milliohms, about 7 milliohms, about 8 milliohms, or about 10 milliohms. In some embodiments, the energy storage device has an equivalent series resistance in a 18650 form factor of at most about 2 milliohms, about 2.5 milliohms, about 3 milliohms, about 3.5 milliohms, about 4 milliohms, about 4.5 milliohms, about 5 milliohms, about 6 milliohms, about 7 milliohms, or about 8 milliohms.

In some embodiments, the energy storage device has a charge/discharge lifetime of about 500 cycles to about 10,000 cycles. In some embodiments, the energy storage device has a charge/discharge lifetime of at least about 500 cycles. In some embodiments, the energy storage device has a charge/discharge lifetime of at most about 10,000 cycles. In some embodiments, the energy storage device has a charge/discharge lifetime of about 500 cycles to about 600 cycles, about 500 cycles to about 700 cycles, about 500 cycles to about 800 cycles, about 500 cycles to about 1,000 cycles, about 500 cycles to about 2,000 cycles, about 500 cycles to about 3,000 cycles, about 500 cycles to about 5,000 cycles, about 500 cycles to about 6,000 cycles, about 500 cycles to about 7,000 cycles, about 500 cycles to about 8,000 cycles, about 500 cycles to about 10,000 cycles, about 600 cycles to about 700 cycles, about 600 cycles to about 800 cycles, about 600 cycles to about 1,000 cycles, about 600 cycles to about 2,000 cycles, about 600 cycles to about 3,000 cycles, about 600 cycles to about 5,000 cycles, about 600 cycles to about 6,000 cycles, about 600 cycles to about 7,000 cycles, about 600 cycles to about 8,000 cycles, about 600 cycles to about 10,000 cycles, about 700 cycles to about 800 cycles, about 700 cycles to about 1,000 cycles, about 700 cycles to about 2,000 cycles, about 700 cycles to about 3,000 cycles, about 700 cycles to about 5,000 cycles, about 700 cycles to about 6,000 cycles, about 700 cycles to about 7,000 cycles, about 700 cycles to about 8,000 cycles, about 700 cycles to about 10,000 cycles, about 800 cycles to about 1,000 cycles, about 800 cycles to about 2,000 cycles, about 800 cycles to about 3,000 cycles, about 800 cycles to about 5,000 cycles, about 800 cycles to about 6,000 cycles, about 800 cycles to about 7,000 cycles, about 800 cycles to about 8,000 cycles, about 800 cycles to about 10,000 cycles, about 1,000 cycles to about 2,000 cycles, about 1,000 cycles to about 3,000 cycles, about 1,000 cycles to about 5,000 cycles, about 1,000 cycles to about 6,000 cycles, about 1,000 cycles to about 7,000 cycles, about 1,000 cycles to about 8,000 cycles, about 1,000 cycles to about 10,000 cycles, about 2,000 cycles to about 3,000 cycles, about 2,000 cycles to about 5,000 cycles, about 2,000 cycles to about 6,000 cycles, about 2,000 cycles to about 7,000 cycles, about 2,000 cycles to about 8,000 cycles, about 2,000 cycles to about 10,000 cycles, about 3,000 cycles to about 5,000 cycles, about 3,000 cycles to about 6,000 cycles, about 3,000 cycles to about 7,000 cycles, about 3,000 cycles to about 8,000 cycles, about 3,000 cycles to about 10,000 cycles, about 5,000 cycles to about 6,000 cycles, about 5,000 cycles to about 7,000 cycles, about 5,000 cycles to about 8,000 cycles, about 5,000 cycles to about 10,000 cycles, about 6,000 cycles to about 7,000 cycles, about 6,000 cycles to about 8,000 cycles, about 6,000 cycles to about 10,000 cycles, about 7,000 cycles to about 8,000 cycles, about 7,000 cycles to about 10,000 cycles, or about 8,000 cycles to about 10,000 cycles. In some embodiments, the energy storage device has a charge/discharge lifetime of about 500 cycles, about 600 cycles, about 700 cycles, about 800 cycles, about 1,000 cycles, about 2,000 cycles, about 3,000 cycles, about 5,000 cycles, about 6,000 cycles, about 7,000 cycles, about 8,000 cycles, or about 10,000 cycles. In some embodiments, the energy storage device has a charge/discharge lifetime of at least about 600 cycles, about 700 cycles, about 800 cycles, about 1,000 cycles, about 2,000 cycles, about 3,000 cycles, about 5,000 cycles, about 6,000 cycles, about 7,000 cycles, about 8,000 cycles, or about 10,000 cycles.

In some embodiments, the energy storage device has at least one of a capacity, a power density, and an energy density that diminishes after about 10,000 cycles by about 10% to about 30%. In some embodiments, the energy storage device has at least one of a capacity, a power density, and an energy density that diminishes after about 10,000 cycles by at least about 10%. In some embodiments, the energy storage device has at least one of a capacity, a power density, and an energy density that diminishes after about 10,000 cycles by at most about 30%. In some embodiments, the energy storage device has at least one of a capacity, a power density, and an energy density that diminishes after about 10,000 cycles by about 10% to about 12%, about 10% to about 14%, about 10% to about 16%, about 10% to about 18%, about 10% to about 20%, about 10% to about 22%, about 10% to about 24%, about 10% to about 26%, about 10% to about 28%, about 10% to about 30%, about 12% to about 14%, about 12% to about 16%, about 12% to about 18%, about 12% to about 20%, about 12% to about 22%, about 12% to about 24%, about 12% to about 26%, about 12% to about 28%, about 12% to about 30%, about 14% to about 16%, about 14% to about 18%, about 14% to about 20%, about 14% to about 22%, about 14% to about 24%, about 14% to about 26%, about 14% to about 28%, about 14% to about 30%, about 16% to about 18%, about 16% to about 20%, about 16% to about 22%, about 16% to about 24%, about 16% to about 26%, about 16% to about 28%, about 16% to about 30%, about 18% to about 20%, about 18% to about 22%, about 18% to about 24%, about 18% to about 26%, about 18% to about 28%, about 18% to about 30%, about 20% to about 22%, about 20% to about 24%, about 20% to about 26%, about 20% to about 28%, about 20% to about 30%, about 22% to about 24%, about 22% to about 26%, about 22% to about 28%, about 22% to about 30%, about 24% to about 26%, about 24% to about 28%, about 24% to about 30%, about 26% to about 28%, about 26% to about 30%, or about 28% to about 30%. In some embodiments, the energy storage device has at least one of a capacity, a power density, and an energy density that diminishes after about 10,000 cycles by about 10%, about 12%, about 14%, about 16%, about 18%, about 20%, about 22%, about 24%, about 26%, about 28%, or about 30%. In some embodiments, the energy storage device has at least one of a capacity, a power density, and an energy density that diminishes after about 10,000 cycles by at most about 10%, about 12%, about 14%, about 16%, about 18%, about 20%, about 22%, about 24%, about 26%, or about 28%.

Figure 14A:
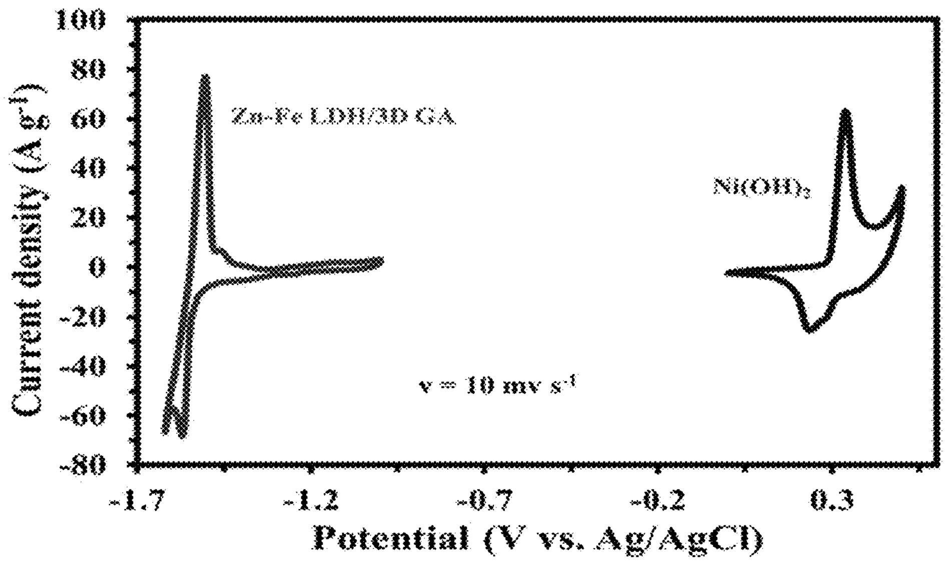
FIG. 14A is a CV graph of an exemplary first electrode comprising Zn—Fe LDH/3DGA and an exemplary second electrode comprising $Ni(OH)_2$ in a 3E cell energy storage device.

In some embodiments, the energy storage device comprises a first electrode comprising Zn—Fe LDH/3DGA and a second electrode comprising $Ni(OH)_2$. The performance characteristics of each of the first electrode and the second electrode are shown per the CV graph of a 3E cell energy storage device comprising an exemplary first electrode comprising Zn—Fe LDH/3DGA and an exemplary second electrode comprising $Ni(OH)_2$ per FIG. 14A.

Figure 14B:
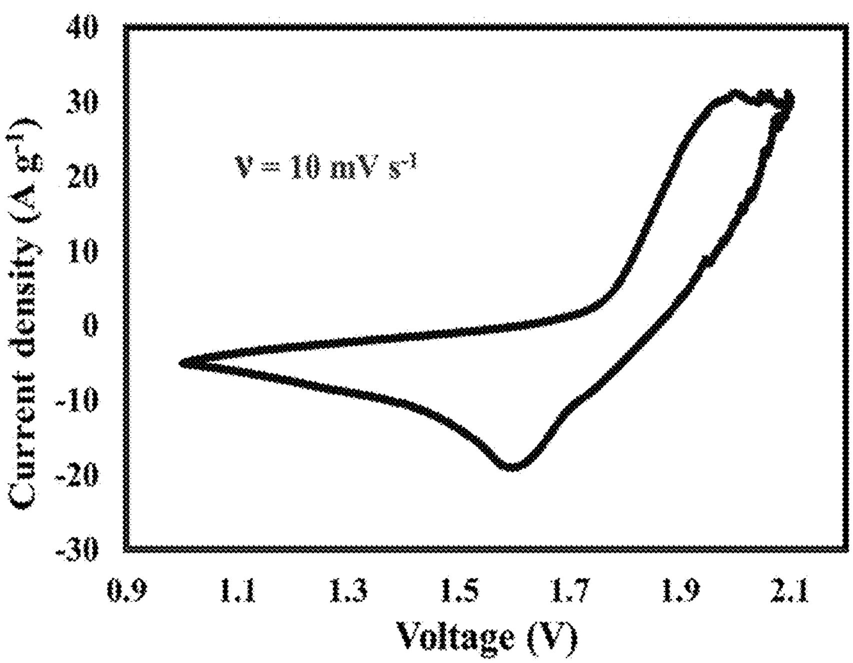
FIG. 14B is a CV graph of an exemplary energy storage device comprising an exemplary first electrode comprising Zn—Fe LDH/3DGA and an exemplary second electrode comprising $Ni(OH)_2$ in a ZnO-saturated KOH solution at a scan rate of 10 mV/s.
Figure 15A:
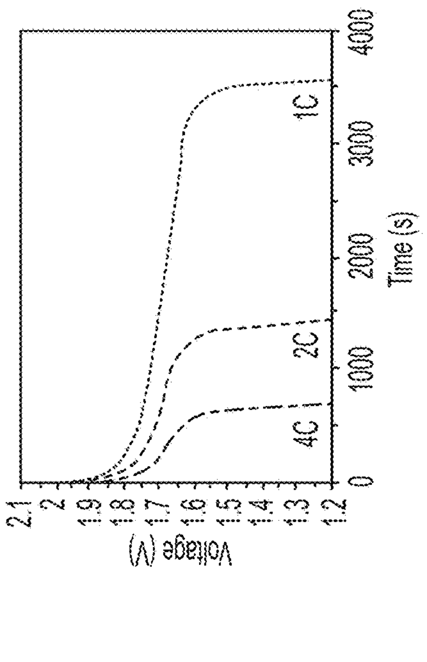
FIG. 15A is a galvanic charge/discharge (GCD) graph of an exemplary energy storage device comprising an exemplary first electrode comprising Zn—Fe LDH/3DGA and an exemplary first electrode comprising $Ni(OH)_2$ in a ZnO-saturated KOH electrolyte at discharge rates from 1 C to 4 C.
Figure 15B:
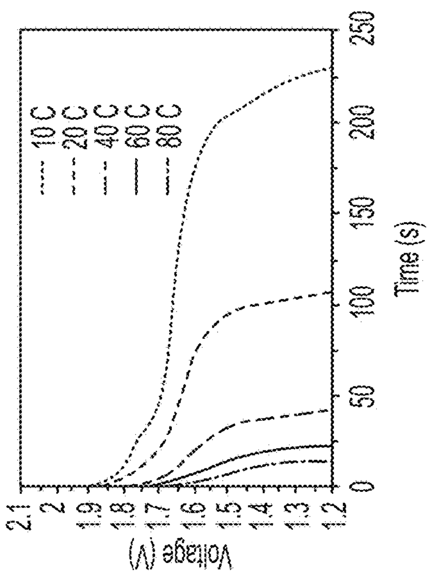
FIG. 15B is a GCD graph of an exemplary energy storage device comprising an exemplary first electrode comprising Zn—Fe LDH/3DGA and an exemplary first electrode comprising $Ni(OH)_2$ in a ZnO-saturated KOH electrolyte at discharge rates from 10 C to 80 C.
Figure 15C:
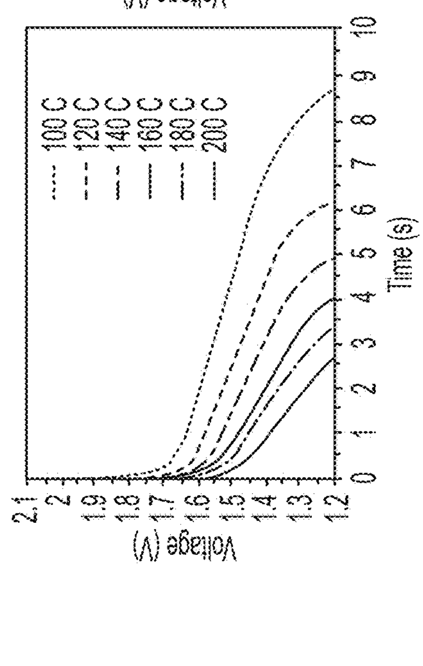
FIG. 15C is a GCD graph of an exemplary energy storage device comprising an exemplary first electrode comprising Zn—Fe LDH/3DGA and an exemplary first electrode comprising $Ni(OH)_2$ in a ZnO-saturated KOH electrolyte at discharge rates from 100 C to 200 C.
Figure 15D:
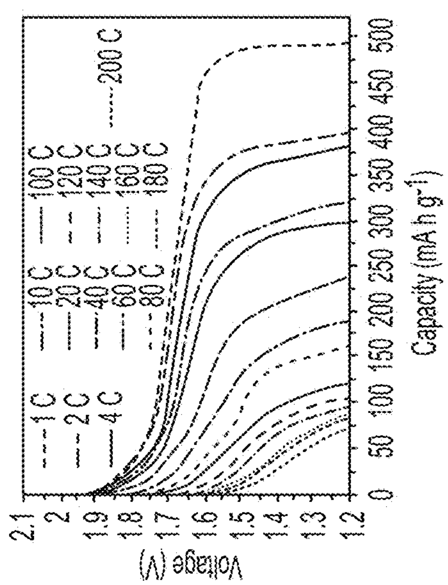
FIG. 15D is a GCD graph of an exemplary energy storage device comprising an exemplary first electrode comprising Zn—Fe LDH/3DGA and an exemplary first electrode comprising $Ni(OH)_2$ in a ZnO-saturated KOH electrolyte at discharge rates from 1 C to 200 C.

In some embodiments, the energy storage device comprises a first electrode comprising Zn—Fe LDH/3DGA, a second electrode comprising $Ni(OH)_2$, and an electrolyte comprising a ZnO-saturated KOH solution. The performance characteristics of an exemplary energy storage device comprising a first electrode comprising Zn—Fe LDH/3DGA, a second electrode comprising $Ni(OH)_2$, and an electrolyte comprising a ZnO-saturated KOH solution at a scan rate of 10 mV/s is shown per the CV graph in FIG. 14B. Further, the performance characteristics of the exemplary energy storage device comprising a first electrode comprising Zn—Fe LDH/3DGA, a second electrode comprising $Ni(OH)_2$, and an electrolyte comprising a ZnO-saturated KOH solution at discharge rates from 1 C to 4 C, 10 C to 80 C, 100 C to 200 C, and 1 C to 200 C are displayed per the galvanic charge/discharge (GCD) graphs in FIGS. 15A-D, respectively. As seen in FIGS. 15A-D, the exemplary energy storage device exhibits a steady discharge rate, enabling high energy and power output throughout discharging.

Figure 17:
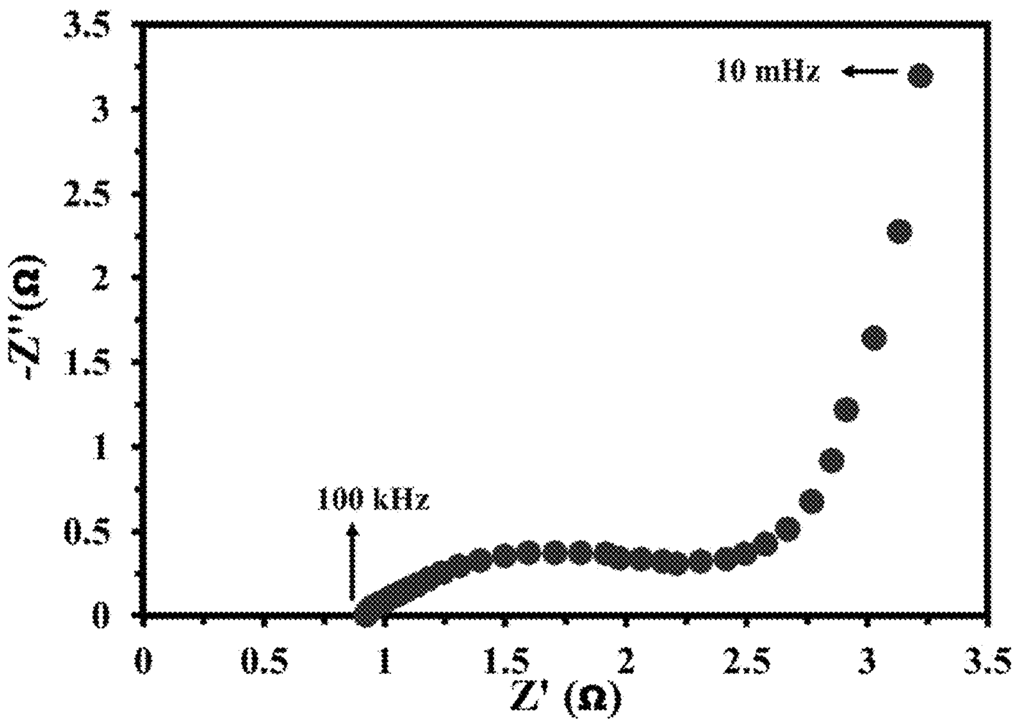
FIG. 17 is a Nyquist plot of an exemplary energy storage device of the current disclosure.

Additionally, FIG. 17 shows a Nyquist plot of an exemplary energy storage device comprising a first electrode comprising Zn—Fe LDH/3DGA, a second electrode comprising $Ni(OH)_2$, and an electrolyte comprising a ZnO-saturated KOH solution.

Figure 18A:
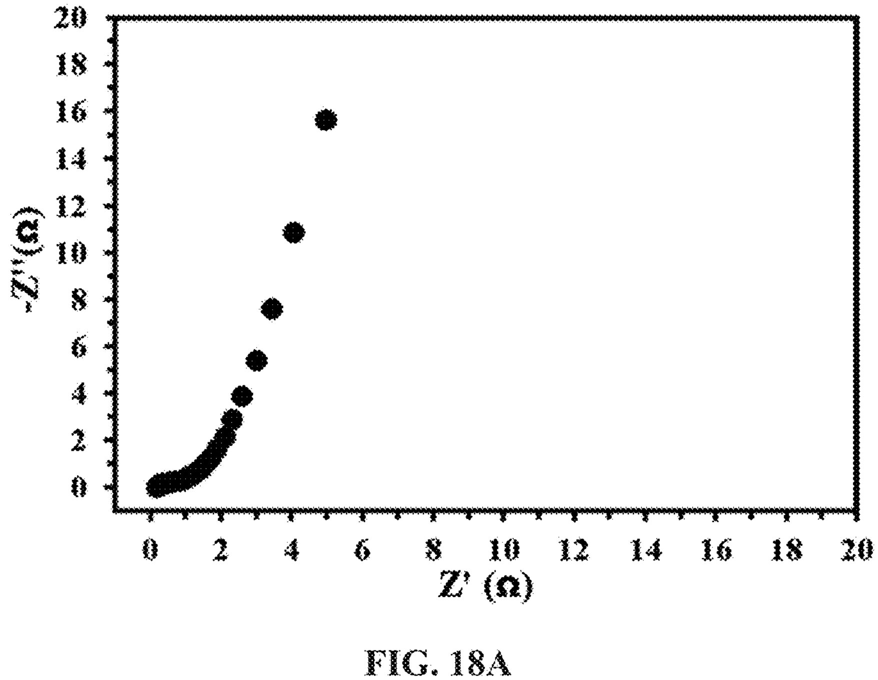
FIG. 18A is a Nyquist plot of an exemplary second electrode.
Figure 18B:
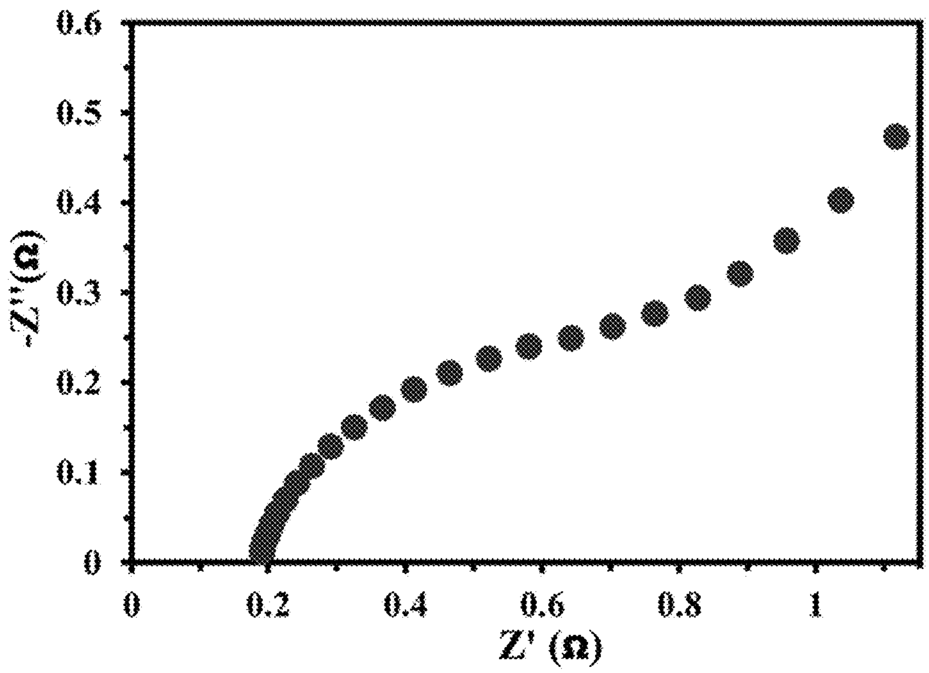
FIG. 18B is a high frequency impedance spectrum of an exemplary second electrode.

The performance characteristics of an exemplary second electrode comprising $Ni(OH)_2$ in a 3E cell and 3.0 M KOH are further characterized by the Nyquist plot in FIG. 18A and the high frequency impedance spectrum per FIG. 18B.

Figure 19:
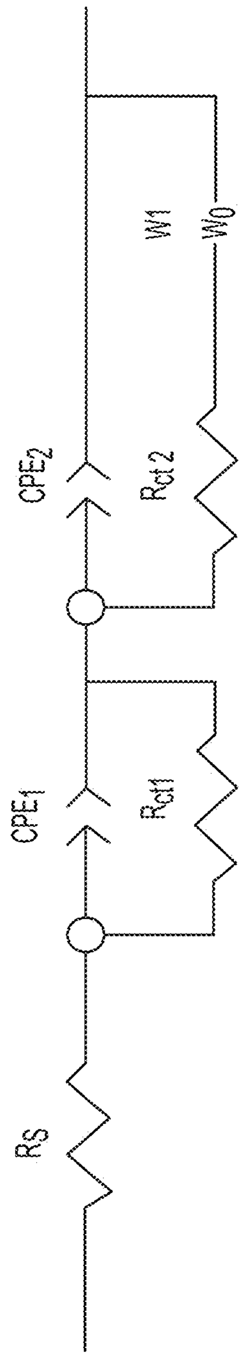
FIG. 19 is an illustration of an equivalent circuit fitted to the experimental electrochemical impedance spectroscopy (EIS) measurements of an exemplary energy storage device.

Finally, FIG. 19 is an illustration of an equivalent circuit fitted to the experimental electrochemical impedance spectroscopy (EIS) measurements in FIG. 17. The equivalent circuit characteristics per the illustration in FIG. 19 are listed in Table 5 below.

TABLE 5

| Property | Value |
|---|---|
| Rs (Ω) | 0.92 |
| Rct1 (Ω) | 0.23 |
| CPE1 (F $s^{n-1}$) | 0.99 |
| n1 | 0.91 |
| Rct2 (Ω) | 1.33 |
| W (Ω $s^{-1/2}$) | 6.24 |
| CPE2 (F sn−1) | 0.077 |
| n2 | 0.55 |

Methods of Forming a First Electrode

Described herein, in certain embodiments, are methods of forming a first electrode comprising: forming a solution; stirring the solution; heating the solution; cooling the solution; rinsing the solution in a solvent; and freeze-drying the solution.

In some embodiments, the solution comprises a reducing agent, a deliquescence, and a carbon-based dispersion. In some embodiments, the reducing agent comprises urea, citric acid, ascorbic acid, hydrazine hydrate, hydroquinone, sodium borohydride, hydrogen bromide, hydrogen iodide, or any combination thereof. In some embodiments, the strong base comprises urea. In some embodiments, the strong base comprises hydroquinone. In some embodiments, the strong base comprises ascorbic acid.

In some embodiments, the deliquescence comprises a salt. In some embodiments, the salt comprises a citrate salt, a chloride salt, a nitrate salt, or any combination thereof. In some embodiments, the citrate salt comprises zinc (III) citrate, zinc (III) citrate hexahydrate, iron (III) citrate, iron (III) citrate hexahydrate, or any combination thereof. In some embodiments, the chloride salt comprises zinc (III) chloride, zinc (III) nitrate hexahydrate, iron (III) chloride, iron (III) chloride hexahydrate, or any combination thereof. In some embodiments, the nitrate salt comprises zinc (III) nitrate, zinc (III) nitrate hexahydrate, iron (III) nitrate, iron (III) nitrate hexahydrate, or any combination thereof. In some embodiments, the deliquescence comprises zinc(III) nitrate hexahydrate. In some embodiments, the deliquescence comprises iron(III) nitrate. In some embodiments, the deliquescence comprises zinc (II) nitrate hexahydrate.

In some embodiments, the carbon-based dispersion comprises a carbon-based foam, a carbon-based aerogel, a carbon-based hydrogel, a carbon-based ionogel, carbon-based nanosheets, carbon nanotubes, carbon nanosheets, carbon cloth, or any combination thereof. In some embodiments, the carbon-based dispersion comprises graphene, graphene oxide, graphite, activated carbon, carbon black, or any combination thereof. In some embodiments, the carbon-based dispersion comprises carbon nanotubes. In some embodiments, the carbon-based dispersion comprises graphene oxide. In some embodiments, the carbon-based dispersion comprises activated carbon.

In some embodiments, the mass percentage of the reducing agent in the solution is about 30% to about 90%. In some embodiments, the mass percentage of the reducing agent in the solution is at least about 30%. In some embodiments, the mass percentage of the reducing agent in the solution is at most about 90%. In some embodiments, the mass percentage of the reducing agent in the solution is about 30% to about 35%, about 30% to about 40%, about 30% to about 45%, about 30% to about 50%, about 30% to about 55%, about 30% to about 60%, about 30% to about 65%, about 30% to about 70%, about 30% to about 75%, about 30% to about 80%, about 30% to about 90%, about 35% to about 40%, about 35% to about 45%, about 35% to about 50%, about 35% to about 55%, about 35% to about 60%, about 35% to about 65%, about 35% to about 70%, about 35% to about 75%, about 35% to about 80%, about 35% to about 90%, about 40% to about 45%, about 40% to about 50%, about 40% to about 55%, about 40% to about 60%, about 40% to about 65%, about 40% to about 70%, about 40% to about 75%, about 40% to about 80%, about 40% to about 90%, about 45% to about 50%, about 45% to about 55%, about 45% to about 60%, about 45% to about 65%, about 45% to about 70%, about 45% to about 75%, about 45% to about 80%, about 45% to about 90%, about 50% to about 55%, about 50% to about 60%, about 50% to about 65%, about 50% to about 70%, about 50% to about 75%, about 50% to about 80%, about 50% to about 90%, about 55% to about 60%, about 55% to about 65%, about 55% to about 70%, about 55% to about 75%, about 55% to about 80%, about 55% to about 90%, about 60% to about 65%, about 60% to about 70%, about 60% to about 75%, about 60% to about 80%, about 60% to about 90%, about 65% to about 70%, about 65% to about 75%, about 65% to about 80%, about 65% to about 90%, about 70% to about 75%, about 70% to about 80%, about 70% to about 90%, about 75% to about 80%, about 75% to about 90%, or about 80% to about 90%. In some embodiments, the mass percentage of the reducing agent in the solution is about 30%, about 35%, about 40%, about 45%, about 50%, about 55%, about 60%, about 65%, about 70%, about 75%, about 80%, or about 90%. In some embodiments, the mass percentage of the reducing agent in the solution is at least about 35%, about 40%, about 45%, about 50%, about 55%, about 60%, about 65%, about 70%, about 75%, about 80%, or about 90%. In some embodiments, the mass percentage of the reducing agent in the solution is at most about 30%, about 35%, about 40%, about 45%, about 50%, about 55%, about 60%, about 65%, about 70%, about 75%, or about 80%.

In some embodiments, the mass percentage of the deliquescence in the solution is about 5% to about 30%. In some embodiments, the mass percentage of the deliquescence in the solution is at least about 5%. In some embodiments, the mass percentage of the deliquescence in the solution is at most about 30%. In some embodiments, the mass percentage of the deliquescence in the solution is about 5% to about 6%, about 5% to about 8%, about 5% to about 10%, about 5% to about 12%, about 5% to about 14%, about 5% to about 16%, about 5% to about 18%, about 5% to about 20%, about 5% to about 25%, about 5% to about 30%, about 6% to about 8%, about 6% to about 10%, about 6% to about 12%, about 6% to about 14%, about 6% to about 16%, about 6% to about 18%, about 6% to about 20%, about 6% to about 25%, about 6% to about 30%, about 8% to about 10%, about 8% to about 12%, about 8% to about 14%, about 8% to about 16%, about 8% to about 18%, about 8% to about 20%, about 8% to about 25%, about 8% to about 30%, about 10% to about 12%, about 10% to about 14%, about 10% to about 16%, about 10% to about 18%, about 10% to about 20%, about 10% to about 25%, about 10% to about 30%, about 12% to about 14%, about 12% to about 16%, about 12% to about 18%, about 12% to about 20%, about 12% to about 25%, about 12% to about 30%, about 14% to about 16%, about 14% to about 18%, about 14% to about 20%, about 14% to about 25%, about 14% to about 30%, about 16% to about 18%, about 16% to about 20%, about 16% to about 25%, about 16% to about 30%, about 18% to about 20%, about 18% to about 25%, about 18% to about 30%, about 20% to about 25%, about 20% to about 30%, or about 25% to about 30%. In some embodiments, the mass percentage of the deliquescence in the solution is about 5%, about 6%, about 8%, about 10%, about 12%, about 14%, about 16%, about 18%, about 20%, about 25%, or about 30%. In some embodiments, the mass percentage of the deliquescence in the solution is at least about 6%, about 8%, about 10%, about 12%, about 14%, about 16%, about 18%, about 20%, about 25%, or about 30%. In some embodiments, the mass percentage of the deliquescence in the solution is at most about 5%, about 6%, about 8%, about 10%, about 12%, about 14%, about 16%, about 18%, about 20%, or about 25%.

In some embodiments, the mass percentage of the carbon-based dispersion in the solution is about 10% to about 40%. In some embodiments, the mass percentage of the carbon-based dispersion in the solution is at least about 10%. In some embodiments, the mass percentage of the carbon-based dispersion in the solution is at most about 40%. In some embodiments, the mass percentage of the carbon-based dispersion in the solution is about 10% to about 12%, about 10% to about 14%, about 10% to about 16%, about 10% to about 18%, about 10% to about 20%, about 10% to about 24%, about 10% to about 28%, about 10% to about 32%, about 10% to about 34%, about 10% to about 40%, about 12% to about 14%, about 12% to about 16%, about 12% to about 18%, about 12% to about 20%, about 12% to about 24%, about 12% to about 28%, about 12% to about 32%, about 12% to about 34%, about 12% to about 40%, about 14% to about 16%, about 14% to about 18%, about 14% to about 20%, about 14% to about 24%, about 14% to about 28%, about 14% to about 32%, about 14% to about 34%, about 14% to about 40%, about 16% to about 18%, about 16% to about 20%, about 16% to about 24%, about 16% to about 28%, about 16% to about 32%, about 16% to about 34%, about 16% to about 40%, about 18% to about 20%, about 18% to about 24%, about 18% to about 28%, about 18% to about 32%, about 18% to about 34%, about 18% to about 40%, about 20% to about 24%, about 20% to about 28%, about 20% to about 32%, about 20% to about 34%, about 20% to about 40%, about 24% to about 28%, about 24% to about 32%, about 24% to about 34%, about 24% to about 40%, about 28% to about 32%, about 28% to about 34%, about 28% to about 40%, about 32% to about 34%, about 32% to about 40%, or about 34% to about 40%. In some embodiments, the mass percentage of the carbon-based dispersion in the solution is about 10%, about 12%, about 14%, about 16%, about 18%, about 20%, about 24%, about 28%, about 32%, about 34%, or about 40%. In some embodiments, the mass percentage of the carbon-based dispersion in the solution is at least about 12%, about 14%, about 16%, about 18%, about 20%, about 24%, about 28%, about 32%, about 34%, or about 40%. In some embodiments, the mass percentage of the carbon-based dispersion in the solution is at most about 10%, about 12%, about 14%, about 16%, about 18%, about 20%, about 24%, about 28%, about 32%, or about 34%.

In some embodiments, the solution is stirred for a period of time of about 10 minutes to about 60 minutes. In some embodiments, the solution is stirred for a period of time of at least about 10 minutes. In some embodiments, the solution is stirred for a period of time of at most about 60 minutes. In some embodiments, the solution is stirred for a period of time of about 10 minutes to about 15 minutes, about 10 minutes to about 20 minutes, about 10 minutes to about 25 minutes, about 10 minutes to about 30 minutes, about 10 minutes to about 35 minutes, about 10 minutes to about 40 minutes, about 10 minutes to about 45 minutes, about 10 minutes to about 50 minutes, about 10 minutes to about 55 minutes, about 10 minutes to about 60 minutes, about 15 minutes to about 20 minutes, about 15 minutes to about 25 minutes, about 15 minutes to about 30 minutes, about 15 minutes to about 35 minutes, about 15 minutes to about 40 minutes, about 15 minutes to about 45 minutes, about 15 minutes to about 50 minutes, about 15 minutes to about 55 minutes, about 15 minutes to about 60 minutes, about 20 minutes to about 25 minutes, about 20 minutes to about 30 minutes, about 20 minutes to about 35 minutes, about 20 minutes to about 40 minutes, about 20 minutes to about 45 minutes, about 20 minutes to about 50 minutes, about 20 minutes to about 55 minutes, about 20 minutes to about 60 minutes, about 25 minutes to about 30 minutes, about 25 minutes to about 35 minutes, about 25 minutes to about 40 minutes, about 25 minutes to about 45 minutes, about 25 minutes to about 50 minutes, about 25 minutes to about 55 minutes, about 25 minutes to about 60 minutes, about 30 minutes to about 35 minutes, about 30 minutes to about 40 minutes, about 30 minutes to about 45 minutes, about 30 minutes to about 50 minutes, about 30 minutes to about 55 minutes, about 30 minutes to about 60 minutes, about 35 minutes to about 40 minutes, about 35 minutes to about 45 minutes, about 35 minutes to about 50 minutes, about 35 minutes to about 55 minutes, about 35 minutes to about 60 minutes, about 40 minutes to about 45 minutes, about 40 minutes to about 50 minutes, about 40 minutes to about 55 minutes, about 40 minutes to about 60 minutes, about 45 minutes to about 50 minutes, about 45 minutes to about 55 minutes, about 45 minutes to about 60 minutes, about 50 minutes to about 55 minutes, about 50 minutes to about 60 minutes, or about 55 minutes to about 60 minutes. In some embodiments, the solution is stirred for a period of time of about 10 minutes, about 15 minutes, about 20 minutes, about 25 minutes, about 30 minutes, about 35 minutes, about 40 minutes, about 45 minutes, about 50 minutes, about 55 minutes, or about 60 minutes. In some embodiments, the solution is stirred for a period of time of at least about 15 minutes, about 20 minutes, about 25 minutes, about 30 minutes, about 35 minutes, about 40 minutes, about 45 minutes, about 50 minutes, about 55 minutes, or about 60 minutes. In some embodiments, the solution is stirred for a period of time of at most about 10 minutes, about 15 minutes, about 20 minutes, about 25 minutes, about 30 minutes, about 35 minutes, about 40 minutes, about 45 minutes, about 50 minutes, or about 55 minutes.

In some embodiments, the solution is heated by an autoclave, an oven, a fire, a Bunsen burner, a heat exchanger, a microwave, or any combination thereof.

In some embodiments, the solution is heated at a temperature of about 80° C. to about 360° C. In some embodiments, the solution is heated at a temperature of at least about 80° C. In some embodiments, the solution is heated at a temperature of at most about 360° C. In some embodiments, the solution is heated at a temperature of about 80° C. to about 100° C., about 80° C. to about 120° C., about 80° C. to about 140° C., about 80° C. to about 160° C., about 80° C. to about 180° C., about 80° C. to about 200° C., about 80° C. to about 240° C., about 80° C. to about 280° C., about 80° C. to about 320° C., about 80° C. to about 360° C., about 100° C. to about 120° C., about 100° C. to about 140° C., about 100° C. to about 160° C., about 100° C. to about 180° C., about 100° C. to about 200° C., about 100° C. to about 240° C., about 100° C. to about 280° C., about 100° C. to about 320° C., about 100° C. to about 360° C., about 120° C. to about 140° C., about 120° C. to about 160° C., about 120° C. to about 180° C., about 120° C. to about 200° C., about 120° C. to about 240° C., about 120° C. to about 280° C., about 120° C. to about 320° C., about 120° C. to about 360° C., about 140° C. to about 160° C., about 140° C. to about 180° C., about 140° C. to about 200° C., about 140° C. to about 240° C., about 140° C. to about 280° C., about 140° C. to about 320° C., about 140° C. to about 360° C., about 160° C. to about 180° C., about 160° C. to about 200° C., about 160° C. to about 240° C., about 160° C. to about 280° C., about 160° C. to about 320° C., about 160° C. to about 360° C., about 180° C. to about 200° C., about 180° C. to about 240° C., about 180° C. to about 280° C., about 180° C. to about 320° C., about 180° C. to about 360° C., about 200° C. to about 240° C., about 200° C. to about 280° C., about 200° C. to about 320° C., about 200° C. to about 360° C., about 240° C. to about 280° C., about 240° C. to about 320° C., about 240° C. to about 360° C., about 280° C. to about 320° C., about 280° C. to about 360° C., or about 320° C. to about 360° C. In some embodiments, the solution is heated at a temperature of about 80° C., about 100° C., about 120° C., about 140° C., about 160° C., about 180° C., about 200° C., about 240° C., about 280° C., about 320° C., or about 360° C. In some embodiments, the solution is heated at a temperature of at least about 100° C., about 120° C., about 140° C., about 160° C., about 180° C., about 200° C., about 240° C., about 280° C., about 320° C., or about 360° C. In some embodiments, the solution is heated at a temperature of at most about 80° C., about 100° C., about 120° C., about 140° C., about 160° C., about 180° C., about 200° C., about 240° C., about 280° C., or about 320° C.

In some embodiments, the solution is heated for a period of time of about 4 hours to about 16 hours. In some embodiments, the solution is heated for a period of time of at least about 4 hours. In some embodiments, the solution is heated for a period of time of at most about 16 hours. In some embodiments, the solution is heated for a period of time of about 4 hours to about 5 hours, about 4 hours to about 6 hours, about 4 hours to about 7 hours, about 4 hours to about 8 hours, about 4 hours to about 9 hours, about 4 hours to about 10 hours, about 4 hours to about 11 hours, about 4 hours to about 12 hours, about 4 hours to about 13 hours, about 4 hours to about 14 hours, about 4 hours to about 16 hours, about 5 hours to about 6 hours, about 5 hours to about 7 hours, about 5 hours to about 8 hours, about 5 hours to about 9 hours, about 5 hours to about 10 hours, about 5 hours to about 11 hours, about 5 hours to about 12 hours, about 5 hours to about 13 hours, about 5 hours to about 14 hours, about 5 hours to about 16 hours, about 6 hours to about 7 hours, about 6 hours to about 8 hours, about 6 hours to about 9 hours, about 6 hours to about 10 hours, about 6 hours to about 11 hours, about 6 hours to about 12 hours, about 6 hours to about 13 hours, about 6 hours to about 14 hours, about 6 hours to about 16 hours, about 7 hours to about 8 hours, about 7 hours to about 9 hours, about 7 hours to about 10 hours, about 7 hours to about 11 hours, about 7 hours to about 12 hours, about 7 hours to about 13 hours, about 7 hours to about 14 hours, about 7 hours to about 16 hours, about 8 hours to about 9 hours, about 8 hours to about 10 hours, about 8 hours to about 11 hours, about 8 hours to about 12 hours, about 8 hours to about 13 hours, about 8 hours to about 14 hours, about 8 hours to about 16 hours, about 9 hours to about 10 hours, about 9 hours to about 11 hours, about 9 hours to about 12 hours, about 9 hours to about 13 hours, about 9 hours to about 14 hours, about 9 hours to about 16 hours, about 10 hours to about 11 hours, about 10 hours to about 12 hours, about 10 hours to about 13 hours, about 10 hours to about 14 hours, about 10 hours to about 16 hours, about 11 hours to about 12 hours, about 11 hours to about 13 hours, about 11 hours to about 14 hours, about 11 hours to about 16 hours, about 12 hours to about 13 hours, about 12 hours to about 14 hours, about 12 hours to about 16 hours, about 13 hours to about 14 hours, about 13 hours to about 16 hours, or about 14 hours to about 16 hours. In some embodiments, the solution is heated for a period of time of about 4 hours, about 5 hours, about 6 hours, about 7 hours, about 8 hours, about 9 hours, about 10 hours, about 11 hours, about 12 hours, about 13 hours, about 14 hours, or about 16 hours. In some embodiments, the solution is heated for a period of time of at least about 5 hours, about 6 hours, about 7 hours, about 8 hours, about 9 hours, about 10 hours, about 11 hours, about 12 hours, about 13 hours, about 14 hours, or about 16 hours. In some embodiments, the solution is heated for a period of time of at most about 4 hours, about 5 hours, about 6 hours, about 7 hours, about 8 hours, about 9 hours, about 10 hours, about 11 hours, about 12 hours, about 13 hours, or about 14 hours.

In some embodiments, the solvent comprises deionized water, acetone, water, or any combination thereof. In some embodiments, the solution is freeze-dried. In some embodiments, the solution is freeze-dried under vacuum.

In some embodiments, the first electrode is configured to be employed as the positive electrode. In some embodiments, the first electrode is configured to be employed as the negative electrode.

Methods of Forming a Second Electrode

Described herein, in certain embodiments, are methods of forming a second electrode comprising forming a second current collector by treating a conductive scaffold in an acid, washing the second current collector, and depositing a hydroxide onto the second current collector.

In some embodiments, the second current collector comprises a conductive foam. In some embodiments, the conductive foam comprises aluminum foam, carbon foam, graphene foam, graphite foam, copper foam, nickel foam, palladium foam, platinum foam, steel foam, or any combination thereof. In some embodiments, the conductive foam comprises graphene foam. In some embodiments, the conductive foam comprises graphite foam. In some embodiments, the conductive foam comprises copper foam. In some embodiments, the conductive foam comprises nickel foam.

In some embodiments, the acid comprises a strong acid. In some embodiments, the acid comprises perchloric acid, hydobromic acid, hydroiodic acid, sulfuric acid, methanesolfonic acid, p-toluenesolfonic acid, hydrochloric acid, or any combination thereof. In some embodiments, the acid comprises hydobromic acid. In some embodiments, the acid comprises hydrochloric acid.

In some embodiments, the acid has a concentration of about 1 M to about 6 M. In some embodiments, the acid has a concentration of at least about 1 M. In some embodiments, the acid has a concentration of at most about 6 M. In some embodiments, the acid has a concentration of about 1 M to about 1.5 M, about 1 M to about 2 M, about 1 M to about 2.5 M, about 1 M to about 3 M, about 1 M to about 3.5 M, about 1 M to about 4 M, about 1 M to about 4.5 M, about 1 M to about 5 M, about 1 M to about 5.5 M, about 1 M to about 6 M, about 1.5 M to about 2 M, about 1.5 M to about 2.5 M, about 1.5 M to about 3 M, about 1.5 M to about 3.5 M, about 1.5 M to about 4 M, about 1.5 M to about 4.5 M, about 1.5 M to about 5 M, about 1.5 M to about 5.5 M, about 1.5 M to about 6 M, about 2 M to about 2.5 M, about 2 M to about 3 M, about 2 M to about 3.5 M, about 2 M to about 4 M, about 2 M to about 4.5 M, about 2 M to about 5 M, about 2 M to about 5.5 M, about 2 M to about 6 M, about 2.5 M to about 3 M, about 2.5 M to about 3.5 M, about 2.5 M to about 4 M, about 2.5 M to about 4.5 M, about 2.5 M to about 5 M, about 2.5 M to about 5.5 M, about 2.5 M to about 6 M, about 3 M to about 3.5 M, about 3 M to about 4 M, about 3 M to about 4.5 M, about 3 M to about 5 M, about 3 M to about 5.5 M, about 3 M to about 6 M, about 3.5 M to about 4 M, about 3.5 M to about 4.5 M, about 3.5 M to about 5 M, about 3.5 M to about 5.5 M, about 3.5 M to about 6 M, about 4 M to about 4.5 M, about 4 M to about 5 M, about 4 M to about 5.5 M, about 4 M to about 6 M, about 4.5 M to about 5 M, about 4.5 M to about 5.5 M, about 4.5 M to about 6 M, about 5 M to about 5.5 M, about 5 M to about 6 M, or about 5.5 M to about 6 M. In some embodiments, the acid has a concentration of about 1 M, about 1.5 M, about 2 M, about 2.5 M, about 3 M, about 3.5 M, about 4 M, about 4.5 M, about 5 M, about 5.5 M, or about 6 M. In some embodiments, the acid has a concentration of at least about 1.5 M, about 2 M, about 2.5 M, about 3 M, about 3.5 M, about 4 M, about 4.5 M, about 5 M, about 5.5 M, or about 6 M. In some embodiments, the acid has a concentration of at most about 1 M, about 1.5 M, about 2 M, about 2.5 M, about 3 M, about 3.5 M, about 4 M, about 4.5 M, about 5 M, or about 5.5 M.

In some embodiments, the conductive foam is treated for a period of time of about 1 minute to about 30 minutes. In some embodiments, the conductive foam is treated for a period of time of at least about 1 minute. In some embodiments, the conductive foam is treated for a period of time of at most about 30 minutes. In some embodiments, the conductive foam is treated for a period of time of about 1 minute to about 2 minutes, about 1 minute to about 4 minutes, about 1 minute to about 6 minutes, about 1 minute to about 8 minutes, about 1 minute to about 10 minutes, about 1 minute to about 14 minutes, about 1 minute to about 18 minutes, about 1 minute to about 22 minutes, about 1 minute to about 26 minutes, about 1 minute to about 30 minutes, about 2 minutes to about 4 minutes, about 2 minutes to about 6 minutes, about 2 minutes to about 8 minutes, about 2 minutes to about 10 minutes, about 2 minutes to about 14 minutes, about 2 minutes to about 18 minutes, about 2 minutes to about 22 minutes, about 2 minutes to about 26 minutes, about 2 minutes to about 30 minutes, about 4 minutes to about 6 minutes, about 4 minutes to about 8 minutes, about 4 minutes to about 10 minutes, about 4 minutes to about 14 minutes, about 4 minutes to about 18 minutes, about 4 minutes to about 22 minutes, about 4 minutes to about 26 minutes, about 4 minutes to about 30 minutes, about 6 minutes to about 8 minutes, about 6 minutes to about 10 minutes, about 6 minutes to about 14 minutes, about 6 minutes to about 18 minutes, about 6 minutes to about 22 minutes, about 6 minutes to about 26 minutes, about 6 minutes to about 30 minutes, about 8 minutes to about 10 minutes, about 8 minutes to about 14 minutes, about 8 minutes to about 18 minutes, about 8 minutes to about 22 minutes, about 8 minutes to about 26 minutes, about 8 minutes to about 30 minutes, about 10 minutes to about 14 minutes, about 10 minutes to about 18 minutes, about 10 minutes to about 22 minutes, about 10 minutes to about 26 minutes, about 10 minutes to about 30 minutes, about 14 minutes to about 18 minutes, about 14 minutes to about 22 minutes, about 14 minutes to about 26 minutes, about 14 minutes to about 30 minutes, about 18 minutes to about 22 minutes, about 18 minutes to about 26 minutes, about 18 minutes to about 30 minutes, about 22 minutes to about 26 minutes, about 22 minutes to about 30 minutes, or about 26 minutes to about 30 minutes. In some embodiments, the conductive foam is treated for a period of time of about 1 minute, about 2 minutes, about 4 minutes, about 6 minutes, about 8 minutes, about 10 minutes, about 14 minutes, about 18 minutes, about 22 minutes, about 26 minutes, or about 30 minutes. In some embodiments, the conductive foam is treated for a period of time of at least about 2 minutes, about 4 minutes, about 6 minutes, about 8 minutes, about 10 minutes, about 14 minutes, about 18 minutes, about 22 minutes, about 26 minutes, or about 30 minutes. In some embodiments, the conductive foam is treated for a period of time of at most about 1 minute, about 2 minutes, about 4 minutes, about 6 minutes, about 8 minutes, about 10 minutes, about 14 minutes, about 18 minutes, about 22 minutes, or about 26 minutes.

In some embodiments, the conductive foam is washed in deionized water, acetone, water, or any combination thereof.

In some embodiments, the hydroxide comprises aluminum hydroxide, ammonium hydroxide, arsenic hydroxide, barium hydroxide, beryllium hydroxide, bismuth(III) hydroxide, boron hydroxide, cadmium hydroxide, calcium hydroxide, cerium(III) hydroxide, cesium hydroxide, chromium(II) hydroxide, chromium(III) hydroxide, chromium (V) hydroxide, chromium(VI) hydroxide, cobalt(II) hydroxide, cobalt(III) hydroxide, copper(I) hydroxide, copper(II) hydroxide, gallium(II) hydroxide, gallium(III) hydroxide, gold(I) hydroxide, gold(III) hydroxide, indium(I) hydroxide, indium(II) hydroxide, indium(III) hydroxide, iridium(III) hydroxide, iron(II) hydroxide, iron(III) hydroxide, lanthanum hydroxide, lead(II) hydroxide, lead(IV) hydroxide, lithium hydroxide, magnesium hydroxide, manganese(II) hydroxide, manganese(III) hydroxide, manganese(IV) hydroxide, manganese(VII) hydroxide, mercury(I) hydroxide, mercury(II) hydroxide, molybdenum hydroxide, neodymium hydroxide, nickel oxo-hydroxide, nickel(II) hydroxide, nickel(III) hydroxide, niobium hydroxide, osmium(IV) hydroxide, palladium(II) hydroxide, palladium(IV) hydroxide, platinum(II) hydroxide, platinum(IV) hydroxide, plutonium(IV) hydroxide, potassium hydroxide, radium hydroxide, rubidium hydroxide, ruthenium(III) hydroxide, scandium hydroxide, silicon hydroxide, silver hydroxide, sodium hydroxide, strontium hydroxide, tantalum(V) hydroxide, technetium(II) hydroxide, tetramethylammonium hydroxide, thallium(I) hydroxide, thallium(III) hydroxide, thorium hydroxide, tin(II) hydroxide, tin(IV) hydroxide, titanium(II) hydroxide, titanium(III) hydroxide, titanium(IV) hydroxide, tungsten(II) hydroxide, uranyl hydroxide, vanadium(II) hydroxide, vanadium(III) hydroxide, vanadium(V) hydroxide, ytterbium hydroxide, yttrium hydroxide, zinc hydroxide, zirconium hydroxide, or any combination thereof. In some embodiments, the hydroxide comprises nickel(II) hydroxide. In some embodiments, the hydroxide comprises nickel(III) hydroxide. In some embodiments, the hydroxide comprises palladium(II) hydroxide. In some embodiments, the hydroxide comprises palladium(IV) hydroxide. In some embodiments, the hydroxide comprises copper(I) hydroxide. In some embodiments, the hydroxide comprises copper(II) hydroxide.

In some embodiments, the hydroxide comprises hydroxide nanoflakes, hydroxide nanoparticles, hydroxide nanopowder, hydroxide nanoflowers, hydroxide nanodots, hydroxide nanorods, hydroxide nanochains, hydroxide nanofibers, hydroxide nanoparticles, hydroxide nanoplatelets, hydroxide nanoribbons, hydroxide nanorings, hydroxide nanosheets, or a combination thereof. In some embodiments, the hydroxide comprises hydroxide nanosheets. In some embodiments, the hydroxide comprises hydroxide nanoflakes.

In some embodiments, the hydroxide comprises cobalt(II) hydroxide nanopowder. In some embodiments, the hydroxide comprises cobalt(III) hydroxide nanosheets. In some embodiments, the hydroxide comprises nickel(III) hydroxide nanoflakes. In some embodiments, the hydroxide comprises copper(I) hydroxide nanoflakes. In some embodiments, the hydroxide comprises copper(II) hydroxide nanopowder. In some embodiments, the hydroxide comprises nickel(II) hydroxide nanoflakes.

In some embodiments, depositing a hydroxide onto the second current collector comprises depositing a hydroxide onto the second current collector by electrochemical deposition, electrocoating, electrophoretic deposition, microwave synthesis, photothermal deposition, thermal decomposition laser deposition, hydrothermal synthesis, or any combination thereof. In some embodiments, electrochemical deposition comprises cyclic voltammetry. In some embodiments, cyclic voltammetry comprises applying consecutive potential sweeps to the second current collector. In some embodiments, applying consecutive potential sweeps to the second current collector comprises applying consecutive potential sweeps to the second current collector in a catalyst.

In some embodiments, the consecutive potential sweeps are performed at a voltage of about −2.4 V to about −0.3 V. In some embodiments, the consecutive potential sweeps are performed at a voltage of at least about −2.4 V. In some embodiments, the consecutive potential sweeps are performed at a voltage of at most about −0.3 V. In some embodiments, the consecutive potential sweeps are performed at a voltage of about −0.3 V to about −0.5 V, about −0.3 V to about −0.9 V, about −0.3 V to about −1.1 V, about −0.3 V to about −1.3 V, about −0.3 V to about −1.5 V, about −0.3 V to about −1.7 V, about −0.3 V to about −1.9 V, about −0.3 V to about −2.1 V, about −0.3 V to about −2.3 V, about −0.3 V to about −2.4 V, about −0.5 V to about −0.9 V, about −0.5 V to about −1.1 V, about −0.5 V to about −1.3 V, about −0.5 V to about −1.5 V, about −0.5 V to about −1.7 V, about −0.5 V to about −1.9 V, about −0.5 V to about −2.1 V, about −0.5 V to about −2.3 V, about −0.5 V to about −2.4 V, about −0.9 V to about −1.1 V, about −0.9 V to about −1.3 V, about −0.9 V to about −1.5 V, about −0.9 V to about −1.7 V, about −0.9 V to about −1.9 V, about −0.9 V to about −2.1 V, about −0.9 V to about −2.3 V, about −0.9 V to about −2.4 V, about −1.1 V to about −1.3 V, about −1.1 V to about −1.5 V, about −1.1 V to about −1.7 V, about −1.1 V to about −1.9 V, about −1.1 V to about −2.1 V, about −1.1 V to about −2.3 V, about −1.1 V to about −2.4 V, about −1.3 V to about −1.5 V, about −1.3 V to about −1.7 V, about −1.3 V to about −1.9 V, about −1.3 V to about −2.1 V, about −1.3 V to about −2.3 V, about −1.3 V to about −2.4 V, about −1.5 V to about −1.7 V, about −1.5 V to about −1.9 V, about −1.5 V to about −2.1 V, about −1.5 V to about −2.3 V, about −1.5 V to about −2.4 V, about −1.7 V to about −1.9 V, about −1.7 V to about −2.1 V, about −1.7 V to about −2.3 V, about −1.7 V to about −2.4 V, about −1.9 V to about −2.1 V, about −1.9 V to about −2.3 V, about −1.9 V to about −2.4 V, about −2.1 V to about −2.3 V, about −2.1 V to about −2.4 V, or about −2.3 V to about −2.4 V. In some embodiments, the consecutive potential sweeps are performed at a voltage to the second current collector of about −0.3 V, about −0.5 V, about −0.9 V, about −1.1 V, about −1.3 V, about −1.5 V, about −1.7 V, about −1.9 V, about −2.1 V, about −2.3 V, or about −2.4 V. In some embodiments, the consecutive potential sweeps are performed at a voltage to the second current collector of at least about −0.5 V, about −0.9 V, about −1.1 V, about −1.3 V, about −1.5 V, about −1.7 V, about −1.9 V, about −2.1 V, about −2.3 V, or about −2.4 V. In some embodiments, the consecutive potential sweeps are performed at a voltage to the second current collector of at most about −0.3 V, about −0.5 V, about −0.9 V, about −1.1 V, about −1.3 V, about −1.5 V, about −1.7 V, about −1.9 V, or about −2.1 V, about −2.3 V.

In some embodiments, the consecutive potential sweeps are performed at a scan rate of about 50 mV/s to about 175 mV/s. In some embodiments, the consecutive potential sweeps are performed at a scan rate of at least about 50 mV/s. In some embodiments, the consecutive potential sweeps are performed at a scan rate of at most about 175 mV/s. In some embodiments, the consecutive potential sweeps are performed at a scan rate of about 50 mV/s to about 60 mV/s, about 50 mV/s to about 70 mV/s, about 50 mV/s to about 80 mV/s, about 50 mV/s to about 90 mV/s, about 50 mV/s to about 100 mV/s, about 50 mV/s to about 110 mV/s, about 50 mV/s to about 120 mV/s, about 50 mV/s to about 130 mV/s, about 50 mV/s to about 140 mV/s, about 50 mV/s to about 160 mV/s, about 50 mV/s to about 175 mV/s, about 60 mV/s to about 70 mV/s, about 60 mV/s to about 80 mV/s, about 60 mV/s to about 90 mV/s, about 60 mV/s to about 100 mV/s, about 60 mV/s to about 110 mV/s, about 60 mV/s to about 120 mV/s, about 60 mV/s to about 130 mV/s, about 60 mV/s to about 140 mV/s, about 60 mV/s to about 160 mV/s, about 60 mV/s to about 175 mV/s, about 70 mV/s to about 80 mV/s, about 70 mV/s to about 90 mV/s, about 70 mV/s to about 100 mV/s, about 70 mV/s to about 110 mV/s, about 70 mV/s to about 120 mV/s, about 70 mV/s to about 130 mV/s, about 70 mV/s to about 140 mV/s, about 70 mV/s to about 160 mV/s, about 70 mV/s to about 175 mV/s, about 80 mV/s to about 90 mV/s, about 80 mV/s to about 100 mV/s, about 80 mV/s to about 110 mV/s, about 80 mV/s to about 120 mV/s, about 80 mV/s to about 130 mV/s, about 80 mV/s to about 140 mV/s, about 80 mV/s to about 160 mV/s, about 80 mV/s to about 175 mV/s, about 90 mV/s to about 100 mV/s, about 90 mV/s to about 110 mV/s, about 90 mV/s to about 120 mV/s, about 90 mV/s to about 130 mV/s, about 90 mV/s to about 140 mV/s, about 90 mV/s to about 160 mV/s, about 90 mV/s to about 175 mV/s, about 100 mV/s to about 110 mV/s, about 100 mV/s to about 120 mV/s, about 100 mV/s to about 130 mV/s, about 100 mV/s to about 140 mV/s, about 100 mV/s to about 160 mV/s, about 100 mV/s to about 175 mV/s, about 110 mV/s to about 120 mV/s, about 110 mV/s to about 130 mV/s, about 110 mV/s to about 140 mV/s, about 110 mV/s to about 160 mV/s, about 110 mV/s to about 175 mV/s, about 120 mV/s to about 130 mV/s, about 120 mV/s to about 140 mV/s, about 120 mV/s to about 160 mV/s, about 120 mV/s to about 175 mV/s, about 130 mV/s to about 140 mV/s, about 130 mV/s to about 160 mV/s, about 130 mV/s to about 175 mV/s, about 140 mV/s to about 160 mV/s, about 140 mV/s to about 175 mV/s, or about 160 mV/s to about 175 mV/s. In some embodiments, the consecutive potential sweeps are performed at a scan rate of about 50 mV/s, about 60 mV/s, about 70 mV/s, about 80 mV/s, about 90 mV/s, about 100 mV/s, about 110 mV/s, about 120 mV/s, about 130 mV/s, about 140 mV/s, about 160 mV/s, or about 175 mV/s. In some embodiments, the consecutive potential sweeps are performed at a scan rate of at least about 60 mV/s, about 70 mV/s, about 80 mV/s, about 90 mV/s, about 100 mV/s, about 110 mV/s, about 120 mV/s, about 130 mV/s, about 140 mV/s, about 160 mV/s, or about 175 mV/s. In some embodiments, the consecutive potential sweeps are performed at a scan rate of at most about 50 mV/s, about 60 mV/s, about 70 mV/s, about 80 mV/s, about 90 mV/s, about 100 mV/s, about 110 mV/s, about 120 mV/s, about 130 mV/s, about 140 mV/s, or about 160 mV/s.

In some embodiments, the catalyst comprises nickel acetate, nickel chloride, ammonium nickel(II) sulfate hexahydrate, nickel carbonate, nickel(II) acetate, nickel(II) acetate tetrahydrate, nickel(II) bromide 2-methoxyethyl, nickel(II) bromide, nickel(II) bromide hydrate, nickel(II) bromide trihydrate, nickel(II) carbonate, nickel(II) carbonate hydroxide tetrahydrate, nickel(II) chloride, nickel(II) chloride hexahydrate, nickel(II) chloride hydrate, nickel(II) cyclohexanebutyrate, nickel(II) fluoride, nickel(II) hexafluorosilicate hexahydrate, nickel(II) hydroxide, nickel (II) iodide anhydrous, nickel(II) iodide, nickel(II) nitrate hexahydrate, nickel(II) oxalate dihydrate, nickel(II) perchlorate hexahydrate, nickel(II) sulfamate tetrahydrate, nickel (II) sulfate, nickel(II) sulfate heptahydrate, potassium nickel (IV) paraperiodate, potassium tetracyanonickelate(II) hydrate, or any combination thereof. In some embodiments, the catalyst comprises nickel carbonate. In some embodiments, the catalyst comprises nickel(II) nitrate. In some embodiments, the catalyst comprises nickel acetate.

In some embodiments, the catalyst has a concentration of about 50 mM to about 200 mM. In some embodiments, the catalyst has a concentration of at least about 50 mM. In some embodiments, the catalyst has a concentration of at most about 200 mM. In some embodiments, the catalyst has a concentration of about 50 mM to about 60 mM, about 50 mM to about 70 mM, about 50 mM to about 80 mM, about 50 mM to about 90 mM, about 50 mM to about 100 mM, about 50 mM to about 120 mM, about 50 mM to about 140 mM, about 50 mM to about 160 mM, about 50 mM to about 180 mM, about 50 mM to about 200 mM, about 60 mM to about 70 mM, about 60 mM to about 80 mM, about 60 mM to about 90 mM, about 60 mM to about 100 mM, about 60 mM to about 120 mM, about 60 mM to about 140 mM, about 60 mM to about 160 mM, about 60 mM to about 180 mM, about 60 mM to about 200 mM, about 70 mM to about 80 mM, about 70 mM to about 90 mM, about 70 mM to about 100 mM, about 70 mM to about 120 mM, about 70 mM to about 140 mM, about 70 mM to about 160 mM, about 70 mM to about 180 mM, about 70 mM to about 200 mM, about 80 mM to about 90 mM, about 80 mM to about 100 mM, about 80 mM to about 120 mM, about 80 mM to about 140 mM, about 80 mM to about 160 mM, about 80 mM to about 180 mM, about 80 mM to about 200 mM, about 90 mM to about 100 mM, about 90 mM to about 120 mM, about 90 mM to about 140 mM, about 90 mM to about 160 mM, about 90 mM to about 180 mM, about 90 mM to about 200 mM, about 100 mM to about 120 mM, about 100 mM to about 140 mM, about 100 mM to about 160 mM, about 100 mM to about 180 mM, about 100 mM to about 200 mM, about 120 mM to about 140 mM, about 120 mM to about 160 mM, about 120 mM to about 180 mM, about 120 mM to about 200 mM, about 140 mM to about 160 mM, about 140 mM to about 180 mM, about 140 mM to about 200 mM, about 160 mM to about 180 mM, about 160 mM to about 200 mM, or about 180 mM to about 200 mM. In some embodiments, the catalyst has a concentration of about 50 mM, about 60 mM, about 70 mM, about 80 mM, about 90 mM, about 100 mM, about 120 mM, about 140 mM, about 160 mM, about 180 mM, or about 200 mM. In some embodiments, the catalyst has a concentration of at least about 60 mM, about 70 mM, about 80 mM, about 90 mM, about 100 mM, about 120 mM, about 140 mM, about 160 mM, about 180 mM, or about 200 mM. In some embodiments, the catalyst has a concentration of at most about 50 mM, about 60 mM, about 70 mM, about 80 mM, about 90 mM, about 100 mM, about 120 mM, about 140 mM, about 160 mM, or about 180 mM.

In some embodiments, electrochemical deposition comprises applying a constant voltage to the second current collector. In some embodiments, the constant voltage is about −2.4 V to about −0.3 V. In some embodiments, the constant voltage is at least about −2.4 V. In some embodiments, the constant voltage is at most about −0.3 V. In some embodiments, the constant voltage is about −0.3 V to about −0.5 V, about −0.3 V to about −0.9 V, about −0.3 V to about −1.1 V, about −0.3 V to about −1.3 V, about −0.3 V to about −1.5 V, about −0.3 V to about −1.7 V, about −0.3 V to about −1.9 V, about −0.3 V to about −2.1 V, about −0.3 V to about −2.3 V, about −0.3 V to about −2.4 V, about −0.5 V to about −0.9 V, about −0.5 V to about −1.1 V, about −0.5 V to about −1.3 V, about −0.5 V to about −1.5 V, about −0.5 V to about −1.7 V, about −0.5 V to about −1.9 V, about −0.5 V to about −2.1 V, about −0.5 V to about −2.3 V, about −0.5 V to about −2.4 V, about −0.9 V to about −1.1 V, about −0.9 V to about −1.3 V, about −0.9 V to about −1.5 V, about −0.9 V to about −1.7 V, about −0.9 V to about −1.9 V, about −0.9 V to about −2.1 V, about −0.9 V to about −2.3 V, about −0.9 V to about −2.4 V, about −1.1 V to about −1.3 V, about −1.1 V to about −1.5 V, about −1.1 V to about −1.7 V, about −1.1 V to about −1.9 V, about −1.1 V to about −2.1 V, about −1.1 V to about −2.3 V, about −1.1 V to about −2.4 V, about −1.3 V to about −1.5 V, about −1.3 V to about −1.7 V, about −1.3 V to about −1.9 V, about −1.3 V to about −2.1 V, about −1.3 V to about −2.3 V, about −1.3 V to about −2.4 V, about −1.5 V to about −1.7 V, about −1.5 V to about −1.9 V, about −1.5 V to about −2.1 V, about −1.5 V to about −2.3 V, about −1.5 V to about −2.4 V, about −1.7 V to about −1.9 V, about −1.7 V to about −2.1 V, about −1.7 V to about −2.3 V, about −1.7 V to about −2.4 V, about −1.9 V to about −2.1 V, about −1.9 V to about −2.3 V, about −1.9 V to about −2.4 V, about −2.1 V to about −2.3 V, about −2.1 V to about −2.4 V, or about −2.3 V to about −2.4 V. In some embodiments, the constant voltage is about −0.3 V, about −0.5 V, about −0.9 V, about −1.1 V, about −1.3 V, about −1.5 V, about −1.7 V, about −1.9 V, about −2.1 V, about −2.3 V, or about −2.4 V. In some embodiments, the constant voltage is at least about −0.9 V, about −1.1 V, about −1.3 V, about −1.5 V, about −1.7 V, about −1.9 V, about −2.1 V, about −2.3 V, or about −2.4 V. In some embodiments, the constant voltage is at most about −0.3 V, about −0.5 V, about −0.9 V, about −1.1 V, about −1.3 V, about −1.5 V, about −1.7 V, about −1.9 V, about −2.1 V, or about −2.3 V.

In some embodiments, hydrothermal synthesis comprises submerging the second current collector in an aqueous solution. In some embodiments, the aqueous solution comprises an acetate, a chloride, a nitrate salt, a reducing agent, or any combination thereof.

In some embodiments, the acetate comprises, aluminum acetate, aluminum acetotartrate, aluminum diacetate, aluminum sulfacetate, aluminum triacetate, ammonium acetate, antimony(III) acetate, barium acetate, basic beryllium acetate, bismuth(III) acetate, cadmium acetate, cesium acetate, calcium acetate, calcium magnesium acetate, camostat, chromium acetate hydroxide, chromium(II) acetate, clidinium bromide, cobalt(II) acetate, copper(II) acetate, dess-martin periodinane, (diacetoxyiodo)benzene, iron(II) acetate, iron(III) acetate, lead(II) acetate, lead(IV) acetate, lithium acetate, magnesium acetate, manganese(II) acetate, manganese(III) acetate, mercury(II) acetate, methoxyethylmercuric acetate, molybdenum(II) acetate, nexeridine, nickel(II) acetate, palladium(II) acetate, paris green, platinum(II) acetate, potassium acetate, propanidid, rhodium(II) acetate, satraplatin, silver acetate, sodium acetate, sodium chloroacetate, sodium diacetate, sodium triacetoxyborohydride, thallous acetate, tilapertin, triamcinolone hexacetonide, triethylammonium acetate, uranyl acetate, uranyl zinc acetate, white catalyst, zinc acetate, or any combination thereof.

In some embodiments, the chloride comprises aluminum trichloride, ammonium chloride, barium chloride, barium chloride dihydrate, calcium chloride, calcium chloride dihydrate, cobalt(II) chloride hexahydrate, cobalt(III) chloride, copper(II) chloride, copper(II) chloride dihydrate, iron(II) chloride, iron(III) chloride, iron(III) chloride hexahydrate, lead(II) chloride, lead(IV) chloride, magnesium chloride, magnesium chloride hexahydrate, manganese(II) chloride tetrahydrate, manganese(IV) chloride, mercury(I) chloride, nickel(II) chloride hexahydrate, nickel(III) chloride, phosphorus pentachloride, phosphorus trichloride, potassium chloride, silver chloride, sodium chloride, strontium chloride, sulfur hexachloride, tin(IV) chloride pentahydrate, zinc chloride, or any combination thereof.

In some embodiments, the nitrate salt comprises aluminum nitrate, barium nitrate, beryllium nitrate, cadmium nitrate, calcium nitrate, cesium nitrate, chromium nitrate, cobalt nitrate, cupric nitrate, dicyclohexylammonium nitrite, didymium nitrate, econazole nitrate, ferric nitrate, gallium nitrate, guanidine nitrate, lanthanum nitrate hexahydrate, lead nitrate, lithium nitrate, magnesium nitrate, manganese nitrate, mercuric nitrate, mercurous nitrate, nickel nitrate, nickel nitrite, potassium nitrite, silver nitrate, sodium nitrate, strontium nitrate, thallium nitrate, uranyl nitrate, zinc ammonium nitrite, zinc nitrate, zirconium nitrate, or any combination thereof.

In some embodiments, the reducing agent comprises urea, citric acid, ascorbic acid, hydrazine hydrate, hydroquinone, sodium borohydride, hydrogen bromide, hydrogen iodide, or any combination thereof.

In some embodiments thermal decomposition is performed at a temperature of about 150° C. to about 400° C. In some embodiments thermal decomposition is performed at a temperature of at least about 150° C. In some embodiments thermal decomposition is performed at a temperature of at most about 400° C. In some embodiments thermal decomposition is performed at a temperature of about 150° C. to about 200° C., about 150° C. to about 250° C., about 150° C. to about 300° C., about 150° C. to about 350° C., about 150° C. to about 400° C., about 200° C. to about 250° C., about 200° C. to about 300° C., about 200° C. to about 350° C., about 200° C. to about 400° C., about 250° C. to about 300° C., about 250° C. to about 350° C., about 250° C. to about 400° C., about 300° C. to about 350° C., about 300° C. to about 400° C., or about 350° C. to about 400° C. In some embodiments thermal decomposition is performed at a temperature of about 150° C., about 200° C., about 250° C., about 300° C., about 350° C., or about 400° C. In some embodiments thermal decomposition is performed at a temperature of at least about 200° C., about 250° C., about 300° C., about 350° C., or about 400° C. In some embodiments thermal decomposition is performed at a temperature of at most about 150° C., about 200° C., about 250° C., about 300° C., or about 350° C.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

As used herein, the term "active material specific" refers to a property based solely on the active materials of the electrode or the energy storage device, not including any casing materials.

As used herein, the term "cell specific" refers to a property based on the entirety of an electrode or energy storage device, including any casing materials.

As used herein, the term "charge discharge lifetime" refers to the number of charge and discharge cycles at which the rated capacity of an energy storage reduces by about 80%.

As used herein, the term "3D" refers to three-dimensional.

As used herein, the term "GO" refers to graphene oxide.

As used herein, the term "GA" refers to a graphene aerogel.

As used herein, the term "3DGA" refers to a three-dimensional graphene aerogel.

As used herein, the term "freeze-drying," also known as lyophilisation, lyophilization, or cryodesiccation, refers to a process a dehydration process of freezing the material and reducing the surrounding pressure to allow a frozen fluid in the material to sublime directly from the solid phase to the gas phase.

As used herein, the term "LDH" refers to layered double hydroxide. In some embodiments, an LDH is a class of ionic solids characterized by a layered structure with the generic layer sequence $[AcBZAcB]_n$, where c represents layers of metal cations, A and B are layers of hydroxide ($HO^-$) anions, and Z are layers of other anions and neutral molecules.

NON-LIMITING EXAMPLES

Exemplary First Electrodes

Embodiment 1

The first electrode comprises a layered double hydroxide comprising manganese-iron layered double hydroxide, a conductive scaffold comprising 3DGA, and a current collector comprising graphite foam.

Embodiment 2

The first electrode comprises a layered double hydroxide comprising zinc-iron double layered hydroxide, a conductive scaffold comprising graphene foam, and a current collector comprising copper foam.

Embodiment 3

The first electrode comprises a layered double hydroxide comprising zinc-iron double layered hydroxide, a conductive scaffold comprising 3DGA, and a current collector comprising nickel foam.

Embodiment 4

The first electrode comprises a layered double hydroxide comprising chromium-iron double layered hydroxide, a conductive scaffold comprising graphite ionogel, and a current collector comprising nickel foam.

Embodiment 5

The first electrode comprises a layered double hydroxide comprising nickel-aluminum double layered hydroxide, a conductive scaffold comprising 3DGA foam, and a current collector comprising graphite foam.

Embodiment 6

The first electrode comprises a layered double hydroxide comprising lithium-aluminum double layered hydroxide, a conductive scaffold comprising graphene foam, and a current collector comprising nickel foam.

Embodiment 7

The first electrode comprises a layered double hydroxide comprising nickel-iron double layered hydroxide, a conductive scaffold comprising graphite ionogel, and a current collector comprising copper foam.

Embodiment 8

The first electrode comprises a layered double hydroxide comprising zinc-cobalt double layered hydroxide, a conductive scaffold comprising 3DGA, and a current collector comprising nickel foam.

Exemplary Energy Storage Devices

Embodiment 9

The energy storage device comprises a first electrode comprising a layered double hydroxide comprising manganese-iron double layered hydroxide, a conductive scaffold comprising graphene ionogel, and a first current collector comprising nickel foam; a second electrode comprising a hydroxide comprising copper(II) hydroxide and a second current collector comprising nickel foam; a separator, and an electrolyte comprising a 3M ferrous (II) oxide-saturated potassium hydroxide solution.

Embodiment 10

The energy storage device comprises a first electrode comprising a layered double hydroxide comprising zinc-iron double layered hydroxide, a conductive scaffold comprising graphene foam, and a current collector comprising copper foam; a second electrode comprising a hydroxide comprising nickel (II) hydroxide and a second current collector comprising nickel foam; a separator, and an electrolyte comprising a 6M zinc (II) oxide-saturated sodium hydroxide solution.

Embodiment 11

The energy storage device comprises a first electrode comprising a layered double hydroxide comprising zinc-iron double layered hydroxide, a conductive scaffold comprising 3DGA, and a first current collector comprising nickel foam; a second electrode comprising a hydroxide comprising nickel (II) hydroxide and a second current collector comprising nickel foam; a separator, and an electrolyte comprising a 6M zinc (II) oxide-saturated sodium hydroxide solution.

Embodiment 12

The energy storage device comprises a first electrode comprising a layered double hydroxide comprising chromium-iron double layered hydroxide, a conductive scaffold comprising carbon cloth, and a first current collector comprising graphene foam; a second electrode comprising a hydroxide comprising nickel hydroxide and a second current collector comprising carbon foam; a separator, and an electrolyte comprising a 5M copper (I) oxide-saturated calcium hydroxide solution.

Embodiment 13

The energy storage device comprises a first electrode comprising a layered double hydroxide comprising nickel-aluminum double layered hydroxide, a conductive scaffold comprising 3DGA foam, and a current collector comprising graphite foam; a second electrode comprising a hydroxide comprising nickel hydroxide and a second current collector comprising carbon foam; a separator, and an electrolyte comprising a 5M copper (I) oxide-saturated calcium hydroxide solution.

Embodiment 14

The energy storage device comprises a first electrode comprising a layered double hydroxide comprising lithium-aluminum double layered hydroxide, a conductive scaffold comprising graphene foam, and a current collector comprising nickel foam; a second electrode comprising a hydroxide comprising nickel hydroxide and a second current collector comprising carbon foam; a separator, and an electrolyte comprising a 5M copper (I) oxide-saturated calcium hydroxide solution.

Embodiment 15

The energy storage device comprises a first electrode comprising a layered double hydroxide comprising nickel-iron double layered hydroxide, a conductive scaffold comprising graphite ionogel, and a current collector comprising copper foam; a second electrode comprising a hydroxide comprising nickel hydroxide and a second current collector comprising carbon foam; a separator, and an electrolyte comprising a 5M copper (I) oxide-saturated calcium hydroxide solution.

Embodiment 16

The energy storage device comprises a first electrode comprising a layered double hydroxide comprising zinc-cobalt double layered hydroxide, a conductive scaffold comprising 3DGA, and a current collector comprising nickel foam; a second electrode comprising a hydroxide comprising nickel hydroxide and a second current collector comprising carbon foam; a separator, and an electrolyte comprising a 5M copper (I) oxide-saturated calcium hydroxide solution.

Preparation of Exemplary First Electrodes

Embodiment 17

A GO was prepared by the modified Hummers' method and dispersed in water by mixing. The first electrode was prepared by successively adding hydroquinone, zinc(II) nitrate hexahydrate, and iron(III) citrate into a GO aqueous dispersion to form a composite hydrogel. The composite hydrogel was then stirred to form a homogeneous mixture and sealed in an oven. After cooling to room temperature, the composite hydrogel was immersed in water to remove any impurities and freeze-dried.

Embodiment 18

A GO was prepared by the modified Hummers' method and dispersed in water by sonication. The first electrode was prepared by successively adding urea, zinc(II) nitrate hexahydrate, and iron(III) nitrate into GO aqueous dispersion to form a composite hydrogel. The composite hydrogel was then stirred to form a homogeneous mixture and sealed in a Teflon-lined autoclave. After unaided cooling to room temperature, the composite hydrogel was immersed in deionized water to remove any impurities and freeze-dried under vacuum.

Embodiment 19

A GO was prepared by the modified Hummers' method and dispersed in water by sonication. The first electrode was prepared by successively adding urea, iron nitrate(II) hexahydrate, and iron(III) citrate into GO aqueous dispersion to form a composite hydrogel. The composite hydrogel was then heated, cooled to room temperature, and immersed in acetone to remove any impurities and freeze-dried under vacuum.

Preparation of an Exemplary Second Electrodes

Embodiment 20

An electrode was prepared in a three-electrode cell with a platinum plate counter electrode, and an Ag/AgCl reference electrode by treating a nickel foam substrate with a hydrochloric acid solution to remove the surface oxide layer, thoroughly washing the substrate with deionized water, and electrodepositing nickel(II) hydroxide on the substrate by cyclic voltammetry by consecutive potential sweeps in an aqueous solution of nickel(II) nitrate hexahydrate.

Embodiment 21

An electrode was prepared in a three-electrode cell with a platinum plate counter electrode, and an Ag/AgCl reference electrode by treating a carbon foam substrate with a hydobromic acid solution and electrodepositing copper (II) hydroxide on the substrate by cyclic voltammetry by consecutive potential sweeps in an aqueous solution of nickel carbonate.

What is claimed is:

1. An energy storage device comprising:
- a first electrode comprising:
  - a layered double hydroxide;
  - a three-dimensional graphene based conductive scaffold; and
  - a first current collector;
- a second electrode comprising:
  - a hydroxide; and
  - a second current collector;
  - a separator; and
  - an electrolyte;
- wherein the energy storage device stores energy through both redox reactions and ion adsorption; and
- wherein the layered double hydroxide comprises a metallic layered double hydroxide comprising a zinc-based layered double hydroxide, an iron-based layered double hydroxide, an aluminum-based layered double hydroxide, a chromium-based layered double hydroxide, an indium-based layered double hydroxide, a manganese-based layered double hydroxide, or any combination thereof.

2. The energy storage device of claim 1, wherein the redox reaction occurs at the first electrode and comprises at least one of a redox reaction of zinc hydroxide and a redox reaction of iron hydroxide.

3. The energy storage device of claim 1, wherein the redox reaction occurs at the second electrode and comprises a redox reaction of nickel hydroxide.

4. The energy storage device of claim 1, wherein the ion adsorption occurs at the electrolyte and comprises an ion adsorption of zinc oxide.

5. The energy storage device of claim 1, wherein the layered double hydroxide comprises a metallic layered double hydroxide comprising a zinc-iron layered double hydroxide, an aluminum-iron layered double hydroxide, a chromium-iron layered double hydroxide, an indium-iron layered double hydroxide, a manganese-iron layered double hydroxide, or any combination thereof.

6. The energy storage device of claim 1, wherein the three-dimensional graphene based conductive scaffold comprises conductive foam, conductive aerogel, graphene foam, graphite foam, graphene aerogel, graphite aerogel, or any combination thereof.

7. The energy storage device of claim 1, wherein the electrolyte comprises an aqueous alkaline electrolyte comprising a strong base and a conductive additive.

8. The energy storage device of claim 7, wherein the conductive additive comprises sodium (I) oxide, potassium (I) oxide, ferrous (II) oxide, magnesium (II) oxide, calcium (II) oxide, chromium (III) oxide, copper (I) oxide, zinc (II) oxide, cuprous chloride, cadmium phosphide, cadmium arsenide, cadmium antimonide, zinc phosphide, zinc arsenide, zinc antimonide, cadmium selenide, cadmium sulfide, cadmium telluride, zinc selenide, zinc sulfide, zinc telluride, zinc oxide, or any combination thereof.

9. The energy storage device of claim 7, wherein the strong base comprises lithium hydroxide, sodium hydroxide, potassium hydroxide, rubidium hydroxide, cesium hydroxide, magnesium hydroxide, calcium hydroxide strontium hydroxide, barium hydroxide, or any combination thereof.

10. The energy storage device of claim 1, having a charge rate of at least about 10 C.

11. The energy storage device of claim 1, having a recharge time of at most about 1 hour.

12. The energy storage device of claim 1, having a cell-specific capacity of at least about 2,500 mAh.

13. The energy storage device of claim 1, having an active material specific energy density of at least about 400 Wh/kg.

14. The energy storage device of claim 1, having a total power density of at least about 30 kW/kg.

* * * * *